(12) United States Patent
Obama et al.

(10) Patent No.: US 8,913,327 B2
(45) Date of Patent: Dec. 16, 2014

(54) ZOOM LENS SYSTEM, OPTICAL APPARATUS AND METHOD FOR MANUFACTURING ZOOM LENS SYSTEM

(75) Inventors: Akihiko Obama, Tokyo (JP); Norikazu Yokoi, Yokohama (JP); Issei Tanaka, Yokohama (JP)

(73) Assignee: Nikon Corporation, Tokyo (JP)

(*) Notice: Subject to any disclaimer, the term of this patent is extended or adjusted under 35 U.S.C. 154(b) by 387 days.

(21) Appl. No.: 13/042,493

(22) Filed: Mar. 8, 2011

(65) Prior Publication Data

US 2011/0273776 A1 Nov. 10, 2011

(30) Foreign Application Priority Data

| Mar. 8, 2010 | (JP) | 2010-050798 |
| Mar. 8, 2010 | (JP) | 2010-050804 |
| Mar. 8, 2010 | (JP) | 2010-050835 |
| Mar. 8, 2010 | (JP) | 2010-050846 |
| Feb. 1, 2011 | (JP) | 2011-020123 |
| Feb. 1, 2011 | (JP) | 2011-020133 |

(51) Int. Cl.
*G02B 15/173* (2006.01)
*G02B 15/16* (2006.01)

(52) U.S. Cl.
CPC .............. *G02B 15/16* (2013.01); *G02B 15/173* (2013.01)
USPC ............................ 359/683; 359/676; 359/685

(58) Field of Classification Search
CPC ................................. G02B 5/173; G02B 5/16
USPC ........................................ 359/683–685, 676
See application file for complete search history.

(56) References Cited

U.S. PATENT DOCUMENTS

| 4,896,950 | A | * | 1/1990 | Endo et al. | 359/683 |
| 5,189,557 | A | * | 2/1993 | Endo | 359/683 |
| 5,847,882 | A | * | 12/1998 | Nakayama | 359/684 |
| 5,973,854 | A | | 10/1999 | Shimo | |
| 6,055,114 | A | * | 4/2000 | Ohtake | 359/676 |
| 6,324,018 | B1 | | 11/2001 | Kawamura | |
| 6,690,519 | B2 | | 2/2004 | Ozaki | |
| 6,791,762 | B2 | | 9/2004 | Yamada | |
| 6,867,925 | B1 | | 3/2005 | Sato | |
| 6,956,704 | B2 | | 10/2005 | Oomura et al. | |
| 7,068,428 | B2 | | 6/2006 | Misaka | |
| 7,136,231 | B2 | | 11/2006 | Ito et al. | |

(Continued)

FOREIGN PATENT DOCUMENTS

| JP | 61-138228 A | 6/1986 |
| JP | 61-286813 A | 12/1986 |

(Continued)

*Primary Examiner* — Zachary Wilkes
(74) *Attorney, Agent, or Firm* — Miles & Stockbridge P.C.

(57) ABSTRACT

In a zoom lens system, an optical apparatus, and a manufacturing method, there are provided, in order from an object side: a first lens group having positive power, a second lens group having negative power, a third lens group having positive power, a fourth lens group having negative power, a fifth group having positive power, and an aperture stop disposed to an image side of the second lens group. Upon zooming from a wide-angle end state to a telephoto end state, a distance between the first lens and second lens groups increases, a distance between the second and third lens groups decreases, a distance between the third and fourth lens groups varies, and a distance between the fourth and fifth lens groups varies. With given conditions being satisfied, high optical performance with suppressing variation in aberrations are achieved.

33 Claims, 49 Drawing Sheets

(56) References Cited

U.S. PATENT DOCUMENTS

| | | |
|---|---|---|
| 7,151,637 B2 | 12/2006 | Tochigi et al. |
| 7,190,520 B2 | 3/2007 | Misaka |
| 7,256,948 B2 * | 8/2007 | Tanaka et al. ............ 359/722 |
| 7,471,460 B2 | 12/2008 | Saruwatari |
| 7,515,353 B2 | 4/2009 | Kimura |
| 7,532,412 B2 | 5/2009 | Hatada |
| 7,554,745 B2 | 6/2009 | Muramatsu |
| 7,554,747 B2 | 6/2009 | Tomioka |
| 7,616,386 B2 | 11/2009 | Kimura |
| 7,636,201 B2 | 12/2009 | Sudoh et al. |
| 7,692,870 B2 | 4/2010 | Ohtake |
| 7,746,563 B2 | 6/2010 | Muramatsu et al. |
| 7,830,612 B2 | 11/2010 | Hagiwara |
| 7,864,443 B2 | 1/2011 | Sudoh et al. |
| 7,880,975 B2 | 2/2011 | Kusaka |
| 8,014,078 B2 | 9/2011 | Hankawa |
| 8,107,171 B2 | 1/2012 | Nanba |
| 8,130,451 B2 | 3/2012 | Saito |
| 8,238,038 B2 | 8/2012 | Arakawa et al. |
| 8,305,694 B2 | 11/2012 | Saori |
| 8,320,053 B2 | 11/2012 | Misaka |
| 8,400,715 B2 | 3/2013 | Arakawa et al. |
| 8,437,090 B2 | 5/2013 | Nanba |
| 8,498,059 B2 | 7/2013 | Li |
| 2003/0151828 A1 | 8/2003 | Ozaki |
| 2003/0156333 A1 | 8/2003 | Yamada |
| 2004/0169935 A1 | 9/2004 | Oomura et al. |
| 2005/0083584 A1 | 4/2005 | Ito et al. |
| 2005/0162751 A1 | 7/2005 | Tochigi et al. |
| 2005/0190447 A1 | 9/2005 | Misaka |
| 2006/0119939 A1 | 6/2006 | Misaka |
| 2007/0297067 A1 | 12/2007 | Muramatsu et al. |
| 2008/0198476 A1 | 8/2008 | Kimura |
| 2008/0212206 A1 | 9/2008 | Hatada |
| 2008/0247054 A1 | 10/2008 | Tomioka |
| 2008/0291547 A1 | 11/2008 | Saruwatari |
| 2009/0015939 A1 | 1/2009 | Muramatsu |
| 2009/0046374 A1 | 2/2009 | Ohtake |
| 2009/0109548 A1 | 4/2009 | Kimura |
| 2009/0135500 A1 | 5/2009 | Sudoh et al. |
| 2009/0147375 A1 | 6/2009 | Sudoh et al. |
| 2009/0251780 A1 | 10/2009 | Adachi et al. |
| 2009/0290232 A1 | 11/2009 | Hagiwara |
| 2009/0323198 A1 | 12/2009 | Kusaka |
| 2010/0033821 A1 | 2/2010 | Arakawa et al. |
| 2010/0296174 A1 | 11/2010 | Saori |
| 2010/0302651 A1 | 12/2010 | Misaka |
| 2010/0321546 A1 | 12/2010 | Hankawa |
| 2011/0032402 A1 | 2/2011 | Nanba |
| 2011/0032625 A1 | 2/2011 | Saito |
| 2011/0080650 A1 | 4/2011 | Nanba |
| 2011/0164325 A1 | 7/2011 | Arakawa et al. |
| 2011/0176224 A1 | 7/2011 | Sato et al. |
| 2012/0057234 A1 | 3/2012 | Li |

FOREIGN PATENT DOCUMENTS

| | | |
|---|---|---|
| JP | 63-266415 A | 11/1988 |
| JP | 01-154014 A | 6/1989 |
| JP | 04-146407 A | 5/1992 |
| JP | 07-043611 A | 2/1995 |
| JP | 10-161028 A | 6/1998 |
| JP | 11-258506 A | 9/1999 |
| JP | 11-352400 A | 12/1999 |
| JP | 2000-231050 A | 8/2000 |
| JP | 2000-275523 A | 10/2000 |
| JP | 2000-330016 A | 11/2000 |
| JP | 2000-347102 A | 12/2000 |
| JP | 2000-356704 A | 12/2000 |
| JP | 2001-033703 A | 2/2001 |
| JP | 2002-131642 A | 5/2002 |
| JP | 2003-066334 A | 3/2003 |
| JP | 2003-241097 A | 8/2003 |
| JP | 2003-287681 A | 10/2003 |
| JP | 2003-295060 A | 10/2003 |
| JP | 2004-264457 A | 9/2004 |
| JP | 2005-107280 A | 4/2005 |
| JP | 2005-189670 A | 7/2005 |
| JP | 2005-242015 A | 9/2005 |
| JP | 2006-099130 A | 4/2006 |
| JP | 2007-148340 A | 6/2007 |
| JP | 2007-193194 A | 8/2007 |
| JP | 2008-003195 A | 1/2008 |
| JP | 2008-203415 A | 9/2008 |
| JP | 2008-216440 A | 9/2008 |
| JP | 2008-216481 A | 9/2008 |
| JP | 2008-233585 A | 10/2008 |
| JP | 2008-292733 A | 12/2008 |
| JP | 2009-047785 A | 3/2009 |
| JP | 2009-098449 A | 5/2009 |
| JP | 2009-109630 A | 5/2009 |
| JP | 2009-128620 A | 6/2009 |
| JP | 2009-139770 A | 6/2009 |
| JP | 2009-175234 A | 8/2009 |
| JP | 2009-251280 A | 10/2009 |
| JP | 2009-265656 | 11/2009 |
| JP | 2009-282398 A | 12/2009 |
| JP | 2009-294513 A | 12/2009 |
| JP | 2010-032700 A | 2/2010 |
| JP | 2010-032701 A | 2/2010 |
| JP | 2010-032702 A | 2/2010 |
| JP | 2010-044103 A | 2/2010 |
| JP | 2010-160240 A | 7/2010 |
| JP | 2010-271362 A | 12/2010 |
| JP | 2010-277082 A | 12/2010 |
| JP | 2011-008234 A | 1/2011 |
| JP | 2011-039091 | 2/2011 |
| JP | 2011-075975 | 4/2011 |
| JP | 2011-248220 A | 12/2011 |

* cited by examiner

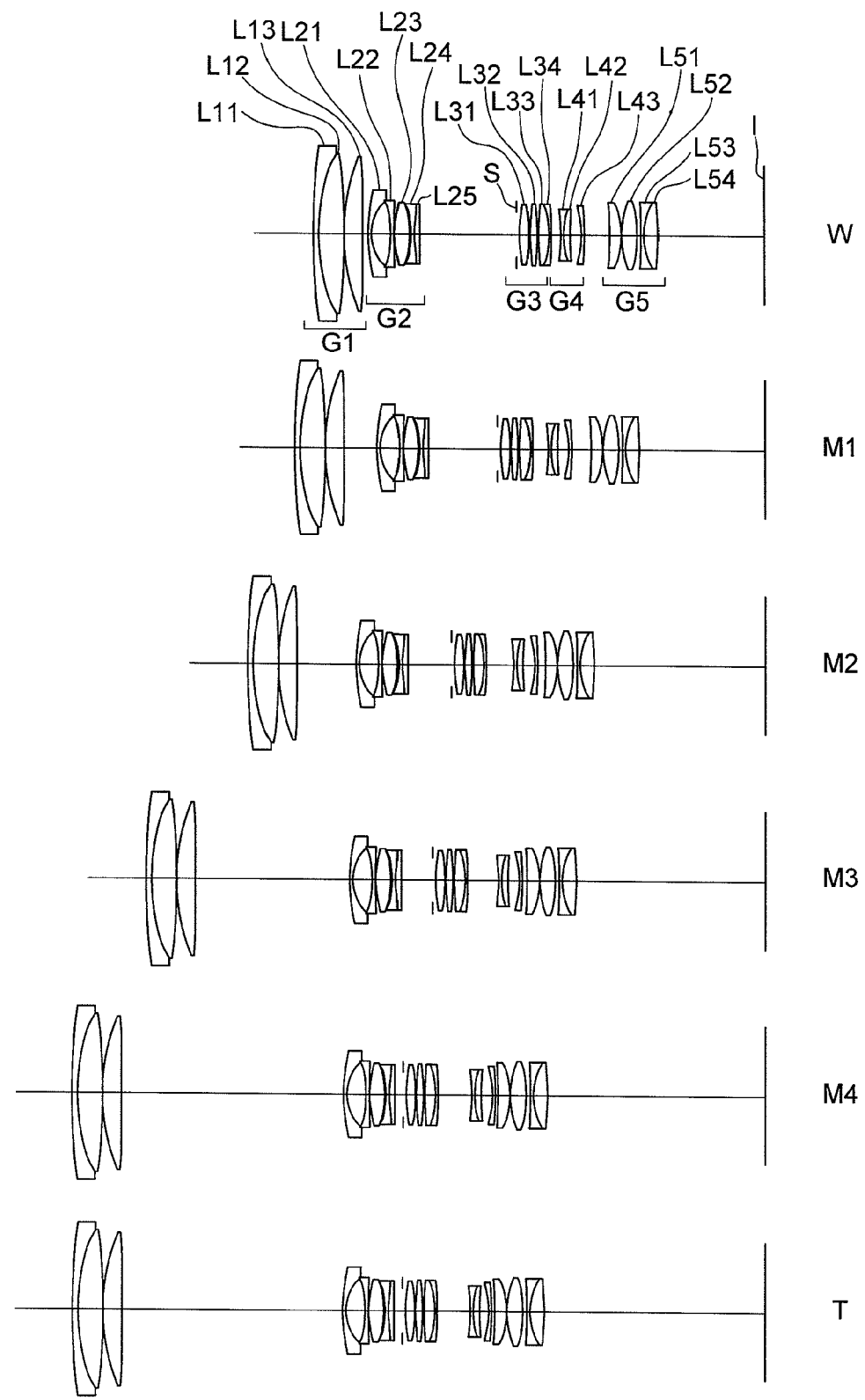

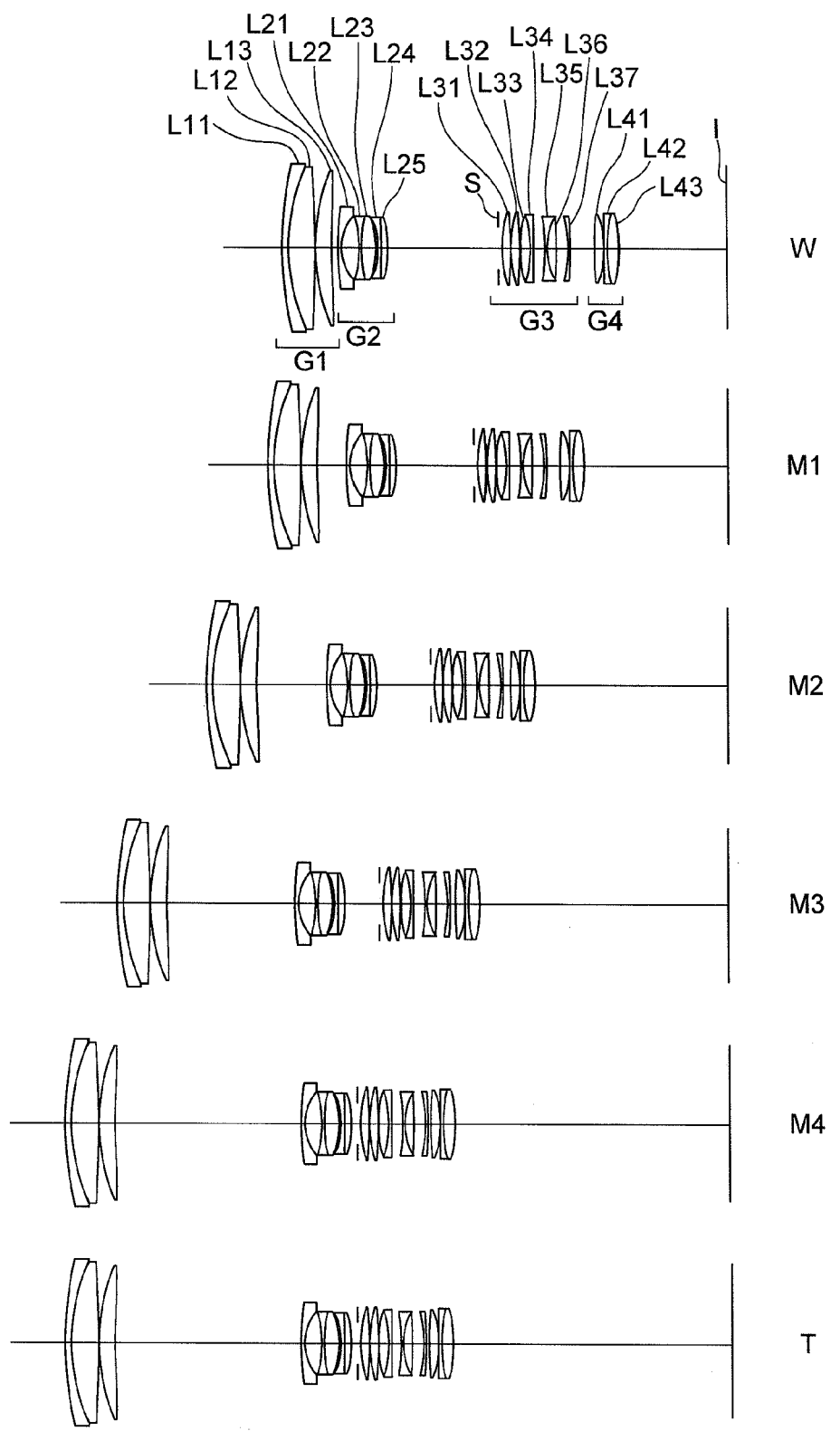

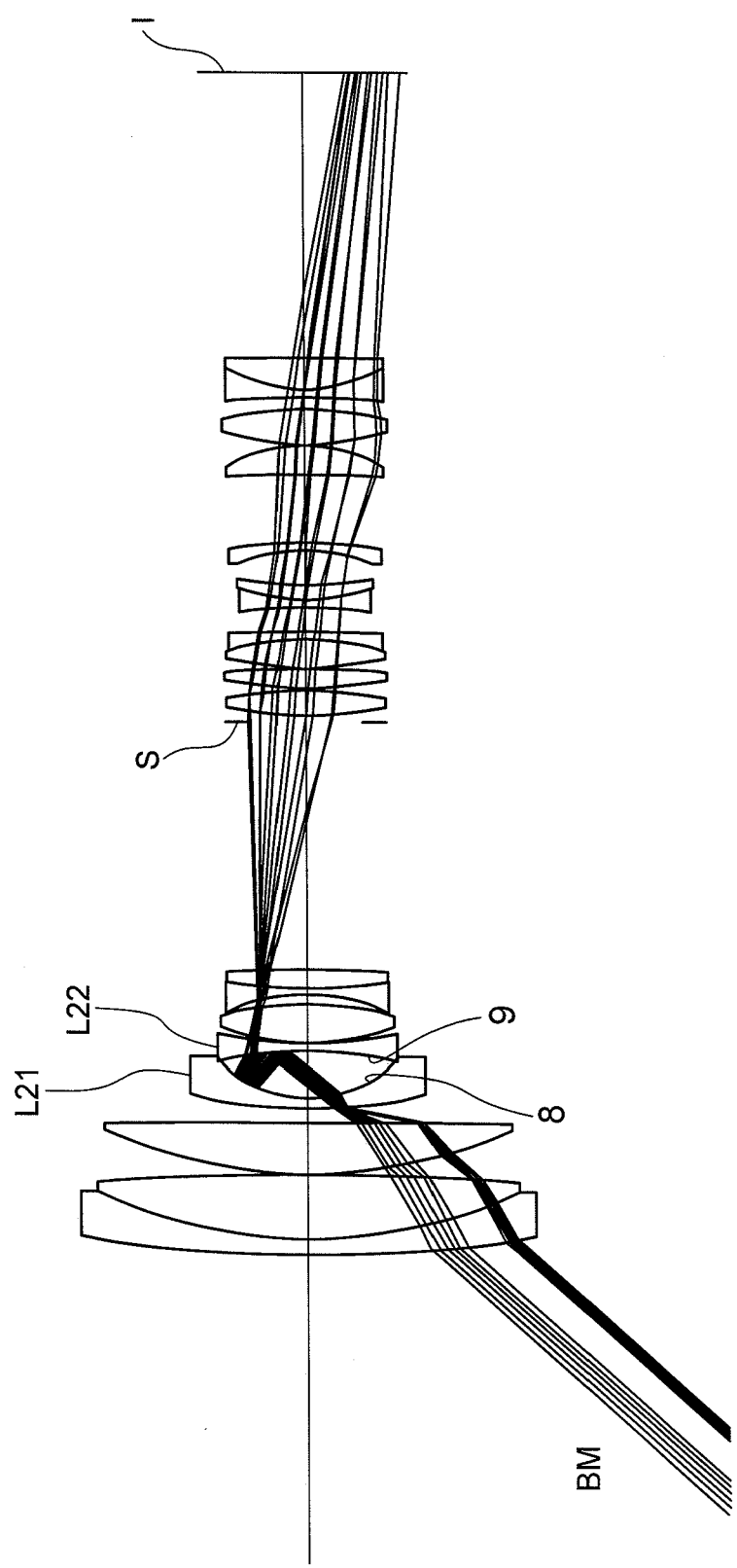

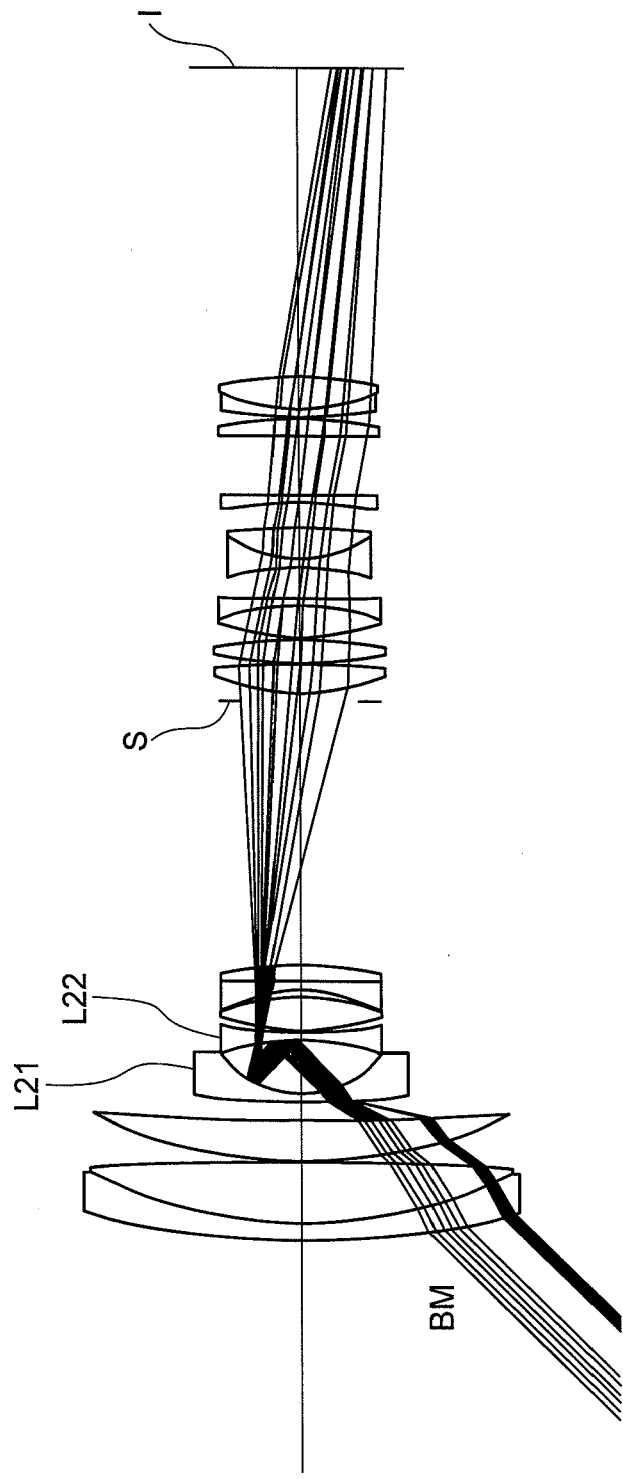

ZOOM LENS SYSTEM, OPTICAL APPARATUS AND METHOD FOR MANUFACTURING ZOOM LENS SYSTEM

The disclosure of the following priority applications are herein incorporated by reference:
Japanese Patent Application No. 2010-050798 filed on Mar. 8, 2010;
Japanese Patent Application No. 2010-050804 filed on Mar. 8, 2010;
Japanese Patent Application No. 2010-050835 filed on Mar. 8, 2010;
Japanese Patent Application No. 2010-050846 filed on Mar. 8, 2010;
Japanese Patent Application No. 2011-020123 filed on Feb. 1, 2011; and
Japanese Patent Application No. 2011-020133 filed on Feb. 1, 2011.

BACKGROUND OF THE INVENTION

1. Field of the Invention

The present invention relates to a zoom lens system, an optical apparatus equipped with the zoom lens system and a method for manufacturing the zoom lens system.

2. Related Background Art

There have been proposed zoom lens systems having a positive lens group disposed to the most object side used as an interchangeable lens for a single lens reflex camera and the like disclosed in such as a Japanese Patent Application Laid-Open No. 2008-003195. Further, over the recent years, increased strictness about ghost images and flare defined as one of factors, which affect not only aberration correction performance but also optical performance, has been requested of the zoom lens system. Therefore, a request for the higher performance is given also to an antireflection coating formed on a lens surface, and a multi-layered film design technique and a multi-layered film growth technique continue their developments (refer to, e.g., Japanese Patent Application Laid-Open No. 2000-356704).

However, the conventional zoom lens system has had a problem that when the zoom lens system is made to have a higher zoom ratio, variations in aberrations increase, so that sufficiently high optical performance has been difficult to be obtained upon zooming or upon correcting an image blur becomes large. At the same time, optical surfaces in such a zoom lens system tend to generate reflection light causing flare or ghost images.

SUMMARY OF THE INVENTION

The present invention is made in view of the above-described problems, and has an object to provide a zoom lens system capable of excellently suppressing variation in aberrations upon zooming and variation in aberrations upon correcting an image blur, an optical apparatus, and a method for manufacturing the zoom lens system.

According to a first aspect of the present invention, there is provided a zoom lens system comprising, in order from an object side along an optical axis: a first lens group having positive refractive power; a second lens group having negative refractive power; a third lens group having positive refractive power; a fourth lens group having negative refractive power; and a fifth lens group having positive refractive power, an aperture stop being disposed to an image side of the second lens group, upon zooming from a wide-angle end state to a telephoto end state, a distance between the first lens group and the second lens group increasing, a distance between the second lens group and the third lens group decreasing, a distance between the third lens group and the fourth lens group varying, and a distance between the fourth lens group and the fifth lens group varying, and the following conditional expressions (1) and (2) being satisfied:

$$0.17 < f1/fT < 0.60 \quad (1)$$

$$1.03 < \phi T/\phi W < 1.70 \quad (2)$$

where fT denotes a focal length of the zoom lens system in the telephoto end state, f1 denotes a focal length of the first lens group, $\phi W$ denotes the maximum diameter of the aperture stop in the wide-angle end state, and $\phi T$ denotes the maximum diameter of the aperture stop in the telephoto end state.

According to a second aspect of the present invention, there is provided an optical apparatus equipped with the zoom lens system according to the first aspect of the present invention.

According to a third aspect of the present invention, there is provided a zoom lens system comprising, in order from an object side along an optical axis: a first lens group having positive refractive power; a second lens group having negative refractive power; a third lens group having positive refractive power; and a fourth lens group, an aperture stop being disposed to an image side of the second lens group, upon zooming from a wide-angle end state to a telephoto end state, a distance between the first lens group and the second lens group increasing, a distance between the second lens group and the third lens group decreasing, and a distance between the third lens group and the fourth lens group varying, and the following conditional expressions (1) and (2) being satisfied:

$$0.17 < f1/fT < 0.60 \quad (1)$$

$$1.03 < \phi T/\phi W < 1.70 \quad (2)$$

where fT denotes a focal length of the zoom lens system in the telephoto end state, f1 denotes a focal length of the first lens group, $\phi W$ denotes the maximum diameter of the aperture stop in the wide-angle end state, and $\phi T$ denotes the maximum diameter of the aperture stop in the telephoto end state.

According to a fourth aspect of the present invention, there is provided an optical apparatus equipped with the zoom lens system according to the third aspect of the present invention.

According to a fifth aspect of the present invention, there is provided a zoom lens system comprising, in order from an object side along an optical axis: a first lens group having positive refractive power; a second lens group having negative refractive power; and a third lens group having positive refractive power, upon zooming from a wide-angle end state to a telephoto end state, a distance between the first lens group and the second lens group increasing, a distance between the second lens group and the third lens group decreasing, the third lens group including, in order from the object side along the optical axis, a first sub-lens group having positive refractive power, a second sub-lens group having negative refractive power, and a third sub-lens group, upon zooming from the wide-angle end state to the telephoto end state, a distance between the first sub-lens group and the second sub-lens group varying, and a distance between the second sub-lens group and the third sub-lens group varying, and the first sub-lens group including, in order from the object side along the optical axis, a first positive lens, a second positive lens and a cemented lens.

According to a sixth aspect of the present invention there is provided an optical apparatus equipped with the zoom lens system according to the fifth aspect of the present invention.

According to a seventh aspect of the present invention there is provided a zoom lens system comprising, in order from an object side along an optical axis: a first lens group having positive refractive power; a second lens group having negative refractive power; and a third lens group having positive refractive power, an aperture stop being disposed to an image side of the second lens group, upon zooming from a wide-angle end state to a telephoto end state, a distance between the first lens group and the second lens group increasing, a distance between the second lens group and the third lens group decreasing, and the following conditional expressions (1) and (2) being satisfied:

$$0.17 < f1/fT < 0.60 \quad (1)$$

$$1.03 < \phi T/\phi W < 1.70 \quad (2)$$

where fT denotes a focal length of the zoom lens system in the telephoto end state, f1 denotes a focal length of the first lens group, φW denotes the maximum diameter of the aperture stop in the wide-angle end state, and φT denotes the maximum diameter of the aperture stop in the telephoto end state.

According to an eighth aspect of the present invention there is provided a method for manufacturing a zoom lens system including, in order from an object along an optical axis, a first lens group having positive refractive power, a second lens group having negative refractive power, a third lens group having positive refractive power, a fourth lens group having negative refractive power, and a fifth lens group having positive refractive power, the method comprising steps of: disposing an aperture stop to an image side of the second lens group; disposing the first lens group, the second lens group, the third lens group, the fourth lens group and the fifth lens group such that upon zooming from a wide-angle end state to a telephoto end state, a distance between the first lens group and the second lens group increases, a distance between the second lens group and the third lens group decreases, a distance between the third lens group and the fourth lens group varies, and a distance between the fourth lens group and the fifth lens group varies, and satisfying the following conditional expressions (1) and (2):

$$0.17 < f1/fT < 0.60 \quad (1)$$

$$1.03 < \phi T/\phi W < 1.70 \quad (2)$$

where fT denotes a focal length of the zoom lens system in the telephoto end state, f1 denotes a focal length of the first lens group, φW denotes the maximum diameter of the aperture stop in the wide-angle end state, and φT denotes the maximum diameter of the aperture stop in the telephoto end state.

According to a ninth aspect of the present invention there is provided a method for manufacturing a zoom lens system including, in order from an object along an optical axis, a first lens group having positive refractive power, a second lens group having negative refractive power, a third lens group having positive refractive power, and a fourth lens group, the method comprising steps of: disposing an aperture stop to an image side of the second lens group; disposing the first lens group, the second lens group, the third lens group, and the fourth lens group such that upon zooming from a wide-angle end state to a telephoto end state, a distance between the first lens group and the second lens group increases, a distance between the second lens group and the third lens group decreases, and a distance between the third lens group and the fourth lens group varies, and satisfying the following conditional expressions (1) and (2):

$$0.17 < f1/fT < 0.60 \quad (1)$$

$$1.03 < \phi T/\phi W < 1.70 \quad (2)$$

where fT denotes a focal length of the zoom lens system in the telephoto end state, f1 denotes a focal length of the first lens group, φW denotes the maximum diameter of the aperture stop in the wide-angle end state, and φT denotes the maximum diameter of the aperture stop in the telephoto end state.

According to a tenth aspect of the present invention, there is provided a method for manufacturing a zoom lens system including, in order from an object side along an optical axis, a first lens group having positive refractive power, a second lens group having negative refractive power, and a third lens group having positive refractive power, the method comprising steps of: disposing the first lens group, the second lens group and the third lens group such that upon zooming from a wide-angle end state to a telephoto end state, a distance between the first lens group and the second lens group increases, and a distance between the second lens group and the third lens group decreases; disposing, in order from the object side along the optical axis, a first sub-lens group having positive refractive power, a second sub-lens group having negative refractive power, and a third sub-lens group into the third lens group such that upon zooming from a wide-angle end state to a telephoto end state, a distance between the first sub-lens group and the second sub-lens group varies, and a distance between the second sub-lens group and the third sub-lens group varies; and disposing, in order from the object side along the optical axis, a first positive lens, a second positive lens, and a cemented lens into the first sub-lens group.

According to an eleventh aspect of the present invention, there is provided a method for manufacturing a zoom lens system consisting of, in order from an object side along an optical axis, a first lens group having positive refractive power, a second lens group having negative refractive power, and a third lens group having positive refractive power, the method comprising steps of: disposing an aperture stop to an image side of the second lens group; disposing the first lens group, the second lens group and the third lens group such that upon zooming from a wide-angle end state to a telephoto end state, a distance between the first lens group and the second lens group increases, a distance between the second lens group and the third lens group decreases; and satisfying the following conditional expressions (1) and (2):

$$0.17 < f1/fT < 0.60 \quad (1)$$

$$1.03 < \phi T/\phi W < 1.70 \quad (2)$$

where fT denotes a focal length of the zoom lens system in the telephoto end state, f1 denotes a focal length of the first lens group, φW denotes the maximum diameter of the aperture stop in the wide-angle end state, and φT denotes the maximum diameter of the aperture stop in the telephoto end state.

The present invention makes it possible to provide a zoom lens system having excellent optical performance with suppressing variation in aberrations upon zooming and reducing flare and ghost images, an optical apparatus equipped with the zoom lens system, and a method for manufacturing the zoom lens system.

BRIEF DESCRIPTION OF THE DRAWINGS

FIG. 1 is a sectional view showing a configuration of a zoom lens system according to Example 1 of the first embodiment.

FIGS. 2A, 2B and 2C are graphs showing various aberrations of the zoom lens system according to Example 1 of the first embodiment and Example 10 of the third embodiment, in which FIG. 2A is in a wide-angle end state W, FIG. 2B is in a first intermediate focal length state M1, and FIG. 2C is in a second intermediate focal length state M2.

FIGS. 3A, 3B and 3C are graphs showing various aberrations of the zoom lens system according to Example 1 of the first embodiment and Example 10 of the third embodiment, in which FIG. 3A is in a third intermediate focal length state M3, FIG. 3B is in a fourth intermediate focal length state M4, and FIG. 3C is in a telephoto end state T.

FIGS. 5A, 5B and 5C are graphs showing various aberrations of the zoom lens system according to Example 2 of the first embodiment and Example 11 of the third embodiment, in which FIG. 5A is in a wide-angle end state W, FIG. 5B is in a first intermediate focal length state M1, and FIG. 5C is in a second intermediate focal length state M2.

FIGS. 6A, 6B and 6C are graphs showing various aberrations of the zoom lens system according to Example 2 of the first embodiment and Example 11 of the third embodiment, in which FIG. 6A is in a third intermediate focal length state M3, FIG. 6B is in a fourth intermediate focal length state M4, and FIG. 6C is in a telephoto end state T.

FIGS. 8A, 8B and 8C are graphs showing various aberrations of the zoom lens system according to Example 3 of the first embodiment and Example 12 of the third embodiment, in which FIG. 8A is in a wide-angle end state W, FIG. 8B is in a first intermediate focal length state M1, and FIG. 8C is in a second intermediate focal length state M2.

FIGS. 9A, 9B and 9C are graphs showing various aberrations of the zoom lens system according to Example 3 of the first embodiment and Example 12 of the third embodiment, in which FIG. 9A is in a third intermediate focal length state M3, FIG. 9B is in a fourth intermediate focal length state M4, and FIG. 9C is in a telephoto end state T.

FIGS. 11A, 11B and 11C are graphs showing various aberrations of the zoom lens system according to Example 4 of the first embodiment and Example 13 of the third embodiment, in which FIG. 11A is in a wide-angle end state W, FIG. 11B is in a first intermediate focal length state M1, and FIG. 11C is in a second intermediate focal length state M2.

FIGS. 12A, 12B and 12C are graphs showing various aberrations of the zoom lens system according to Example 4 of the first embodiment and Example 13 of the third embodiment, in which FIG. 12A is in a third intermediate focal length state M3, FIG. 12B is in a fourth intermediate focal length state M4, and FIG. 12C is in a telephoto end state T.

FIGS. 14A, 14B and 14C are graphs showing various aberrations of the zoom lens system according to Example 5 of the first embodiment and Example 14 of the third embodiment, in which FIG. 14A is in a wide-angle end state W, FIG. 14B is in a first intermediate focal length state M1, and FIG. 14C is in a second intermediate focal length state M2.

FIGS. 15A, 15B and 15C are graphs showing various aberrations of the zoom lens system according to Example 5 of the first embodiment and Example 14 of the third embodiment, in which FIG. 15A is in a third intermediate focal length state M3, FIG. 15B is in a fourth intermediate focal length state M4, and FIG. 15C is in a telephoto end state T.

FIGS. 17A, 17B and 17C are graphs showing various aberrations of the zoom lens system according to Example 6 of the second embodiment and Example 15 of a fourth embodiment, in which FIG. 17A is in a wide-angle end state W, FIG. 17B is in a first intermediate focal length state M1, and FIG. 17C is in a second intermediate focal length state M2.

FIGS. 18A, 18B and 28C are graphs showing various aberrations of the zoom lens system according to Example 6 of the second embodiment and Example 15 of the fourth embodiment, in which FIG. 18A is in a third intermediate focal length state M3, FIG. 18B is in a fourth intermediate focal length state M4.

FIGS. 20A, 20B and 20C are graphs showing various aberrations of the zoom lens system according to Example 7 of the second embodiment and Example 16 of the fourth embodiment, in which FIG. 20A is in a wide-angle end state W, FIG. 20B is in a first intermediate focal length state M1, and FIG. 20C is in a second intermediate focal length state M2.

FIGS. 21A, 21B and 21C are graphs showing various aberrations of the zoom lens system according to Example 7 of the second embodiment and Example 16 of the fourth embodiment, in which FIG. 21A is in a third intermediate focal length state M3, FIG. 21B is in a fourth intermediate focal length state M4, and FIG. 21C is in a telephoto end state T.

FIG. 22 is a sectional view showing a configuration of a zoom lens system according to Example 8 of the second embodiment.

FIGS. 23A, 23B and 23C are graphs showing various aberrations of the zoom lens system according to Example 8 of the second embodiment and Example 17 of the fourth embodiment, in which FIG. 23A is in a wide-angle end state W, FIG. 23B is in a first intermediate focal length state M1, and FIG. 23C is in a second intermediate focal length state M2.

FIGS. 24A, 24B and 24C are graphs showing various aberrations of the zoom lens system according to Example 8 of the second embodiment and Example 17 of the fourth embodiment, in which FIG. 24A is in a third intermediate focal length state M3, FIG. 24B is in a fourth intermediate focal length state M4, and FIG. 24C is in a telephoto end state T.

FIGS. 26A, 26B and 26C are graphs showing various aberrations of the zoom lens system according to Example 9 of the second embodiment and Example 18 of the fourth embodiment, in which FIG. 26A is in a wide-angle end state W, FIG. 26B is in a first intermediate focal length state M1, and FIG. 26C is in a second intermediate focal length state M2.

FIGS. 27A, 27B and 27C are graphs showing various aberrations of the zoom lens system according to Example 9 of the second embodiment and Example 18 of the fourth embodiment, in which FIG. 27A is in a third intermediate focal length state M3, FIG. 27B is in a fourth intermediate focal length state M4, and FIG. 27C is in a telephoto end state T.

FIG. 28 is a sectional view showing the configuration of the zoom lens system according to Example 1 of the first embodiment, illustrating one example of how incident light beams are reflected by a first ghost image generating surface and a second ghost image generating surface.

FIG. 29 is a sectional view showing the configuration of the zoom lens system according to Example 6 of the second embodiment, illustrating one example of how incident light beams are reflected by a first ghost image generating surface and a second ghost image generating surface.

DESCRIPTION OF THE MOST PREFERRED EMBODIMENT

First Embodiment

Figure 2A:
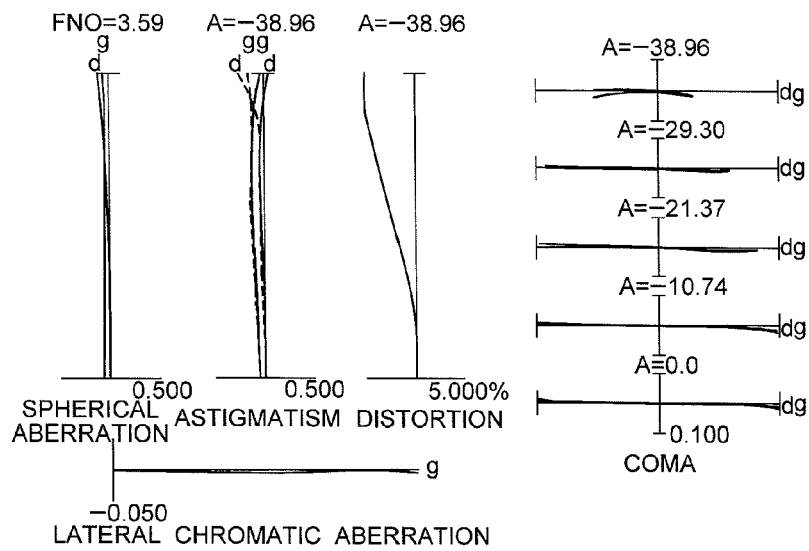

A zoom lens system according to a first embodiment of the present application is explained below.

A zoom lens system according to the first embodiment includes, in order from an object side along an optical axis, a first lens group having positive refractive power, a second lens group having negative refractive power, a third lens group having positive refractive power, a fourth lens group having negative refractive power, and a fifth lens group having positive refractive power. An aperture stop is disposed to an image side of the second lens group. Upon zooming from a wide-angle end state to a telephoto end state, a distance between the first lens group and the second lens group increases, a distance between the second lens group and the third lens group decreases, a distance between the third lens group and the fourth lens group varies, and a distance between the fourth lens group and the fifth lens group varies, thereby realizing an optical system capable of zooming and correcting distortion moderately from the wide-angle end state to the telephoto end state.

Moreover, a zoom lens system according to the first embodiment satisfies the following conditional expressions (1) and (2):

$$0.17 < f1/fT < 0.60 \quad (1)$$

$$1.03 < \phi T/\phi W < 1.70 \quad (2)$$

where fT denotes a focal length of the zoom lens system in the telephoto end state, f1 denotes a focal length of the first lens group, $\phi W$ denotes the maximum diameter of the aperture stop in the wide-angle end state, and $\phi T$ denotes the maximum diameter of the aperture stop in the telephoto end state.

Conditional expression (1) is for obtaining high optical performance with excellently correcting spherical aberration and curvature of field generated in the zoom lens system.

When the ratio f1/fT is equal to or falls below the lower limit of conditional expression (1), in other words, when refractive power of the first lens group becomes excessively large, negative spherical aberration in the telephoto end state and negative curvature of field in the wide-angle end state are largely generated, so that high optical performance cannot be obtained.

On the other hand, when the ratio f1/fT is equal to or exceeds the upper limit of conditional expression (1), in other words, when refractive power of the first lens group becomes excessively small, in order to secure the zoom ratio, the first lens group has to move largely with respect to the image plane, so that it becomes difficult to secure a light amount on the corner of the image in the telephoto end state. Moreover, positive spherical aberration generated in the second lens group in the telephoto end state becomes difficult to be corrected, so that high optical performance cannot be obtained.

In order to secure the effect of the first embodiment, it is preferable to set the lower limit of conditional expression (1) to 0.23. In order to further secure the effect of the first embodiment, it is preferable to set the lower limit of conditional expression (1) to 0.25. In order to still further secure the effect of the first embodiment, it is most preferable to set the lower limit of conditional expression (1) to 0.28.

In order to secure the effect of the first embodiment, it is preferable to set the upper limit of conditional expression (1) to 0.53. In order to further secure the effect of the first embodiment, it is preferable to set the upper limit of conditional expression (1) to 0.48. In order to still further secure the effect of the first embodiment, it is most preferable to set the upper limit of conditional expression (1) to 0.43.

Conditional expression (2) is for obtaining high optical performance with setting the f-number in the telephoto end state moderately small and excellently correcting spherical aberration and coma. With satisfying conditional expression (2), it becomes possible to suppress variation in spherical aberration and coma over entire zoom range with optimizing variation amount of f-number upon zooming from the wide-angle end state to the telephoto end state.

When the ratio $\phi T/\phi W$ is equal to or falls below the lower limit of conditional expression (2), the maximum diameter of the aperture stop in the telephoto end state becomes excessively small. Then, f-number in the telephoto end state becomes excessively large, so that spherical aberration and coma are largely generated in the wide-angle end state. Accordingly, high optical performance cannot be obtained.

On the other hand, when the ratio $\phi T/\phi W$ is equal to or exceeds the upper limit of conditional expression (2), spherical aberration and coma are largely generated in the telephoto end state, so that high optical performance cannot be obtained.

In order to secure the effect of the first embodiment, it is preferable to set the lower limit of conditional expression (2) to 1.05. In order to further secure the effect of the first embodiment, it is preferable to set the lower limit of conditional expression (2) to 1.08. In order to still further secure the effect of the first embodiment, it is most preferable to set the lower limit of conditional expression (2) to 1.12.

In order to secure the effect of the first embodiment, it is preferable to set the upper limit of conditional expression (2) to 1.58. In order to further secure the effect of the first embodiment, it is preferable to set the upper limit of conditional expression (2) to 1.45.

In a zoom lens system according to the first embodiment, the following conditional expression (3) is preferably satisfied:

$$1.02 < \phi M10/\phi W < 1.70 \qquad (3)$$

where $\phi M10$ denotes the maximum diameter of the aperture stop in an intermediate focal length state, in which the intermediate focal length of the zoom lens system is ten times or more of fW when fW denotes a focal length of the zoom lens system in the wide-angle end state.

Conditional expression (3) is for realizing high optical performance with letting the zoom lens system have a sufficient f-number in the intermediate focal length state where the focal length of the zoom lens system is ten times or more of the focal length thereof in the wide-angle end state (fW).

When the ratio $\phi M10/\phi W$ is equal to or falls below the lower limit of conditional expression (3), the maximum diameter of the aperture stop becomes too small in the zoom range where the intermediate focal length of the zoom lens system is ten times or more of fW. Then, the f-number in this range becomes excessively large, and spherical aberration and coma are largely generated in the wide-angle end state, so that high optical performance cannot be realized.

On the other hand, when the ratio $\phi M10/\phi W$ is equal to or exceeds the upper limit of conditional expression (3), spherical aberration and coma are largely generated in the zoom range where the intermediate focal length of the zoom lens system is ten times or more of fW, so that high optical performance cannot be realized.

In order to secure the effect of the first embodiment, it is preferable to set the lower limit of conditional expression (3) to 1.03. In order to further secure the effect of the first embodiment, it is most preferable to set the lower limit of conditional expression (3) to 1.06.

In order to secure the effect of the first embodiment, it is preferable to set the upper limit of conditional expression (3) to 1.60. In order to further secure the effect of the first embodiment, it is preferable to set the upper limit of conditional expression (3) to 1.55. In order to still further secure the effect of the first embodiment, it is most preferable to set the upper limit of conditional expression (3) to 1.40.

In a zoom lens system according to the first embodiment, the following conditional expression (4) is preferably satisfied:

$$1.02 < \phi M15/\phi W < 1.70 \qquad (4)$$

where $\phi M15$ denotes the maximum diameter of the aperture stop in an intermediate focal length state, in which the intermediate focal length of the zoom lens system is fifteen times or more of fW when fW denotes a focal length of the zoom lens system in the wide-angle end state.

Conditional expression (4) is for realize high optical performance with letting the zoom lens system have a sufficient f-number in the intermediate focal length state where the focal length of the zoom lens system is fifteen times or more of the focal length thereof in the wide-angle end state (fW).

When the ratio $\phi M15/\phi W$ is equal to or falls below the lower limit of conditional expression (4), the maximum diameter of the aperture stop becomes too small in the zoom range where the intermediate focal length of the zoom lens system is fifteen times or more of fW. Then, the f-number in this range becomes excessively large, and spherical aberration and coma are largely generated in the wide-angle end state, so that high optical performance cannot be realized.

On the other hand, when the ratio $\phi M15/\phi W$ is equal to or exceeds the upper limit of conditional expression (4), spherical aberration and coma are largely generated in the zoom range where the intermediate focal length of the zoom lens system is fifteen times or more of fW, so that high optical performance cannot be realized.

In order to secure the effect of the first embodiment, it is preferable to set the lower limit of conditional expression (4) to 1.04. In order to further secure the effect of the first embodiment, it is most preferable to set the lower limit of conditional expression (4) to 1.07.

In order to secure the effect of the first embodiment, it is preferable to set the upper limit of conditional expression (4) to 1.60. In order to further secure the effect of the first embodiment, it is preferable to set the upper limit of conditional expression (4) to 1.55. In order to still further secure the effect of the first embodiment, it is most preferable to set the upper limit of conditional expression (4) to 1.40.

In a zoom lens system according to the first embodiment, the following conditional expression (5) is preferably satisfied:

$$1.00 \leq \phi M5/\phi W < 1.40 \qquad (5)$$

where $\phi M5$ denotes the maximum diameter of the aperture stop in an intermediate focal length state, in which the intermediate focal length of the zoom lens system is five times or more and eight times or less of fW when fW denotes a focal length of the zoom lens system in the wide-angle end state.

Conditional expression (5) is for realize high optical performance in the intermediate focal length state where the focal length of the zoom lens system is five times or more and eight times or less of the focal length thereof in the wide-angle end state (fW).

When the ratio $\phi M5/\phi W$ falls below the lower limit of conditional expression (5), the maximum diameter of the aperture stop becomes too small in the zoom range where the intermediate focal length of the zoom lens system is five times or more and eight times or less of fW. Then, the f-number in this range becomes excessively large, and spherical aberration and coma are largely generated in the wide-angle end state, so that high optical performance cannot be realized.

On the other hand, when the ratio φM5/φW is equal to or exceeds the upper limit of conditional expression (5), spherical aberration and coma are largely generated in the zoom range where the intermediate focal length of the zoom lens system is five times or more and eight times or less of fW, so that high optical performance cannot be realized.

In order to secure the effect of the first embodiment, it is preferable to set the lower limit of conditional expression (5) to 1.01. In order to further secure the effect of the first embodiment, it is most preferable to set the lower limit of conditional expression (5) to 1.03.

In order to secure the effect of the first embodiment, it is preferable to set the upper limit of conditional expression (5) to 1.32. In order to further secure the effect of the first embodiment, it is most preferable to set the upper limit of conditional expression (5) to 1.25.

In a zoom lens system according to the first embodiment, upon zooming from the wide-angle end state to the telephoto end state, the diameter of the aperture stop keeps the maximum diameter of the wide-angle end state from the wide-angle end state to an intermediate focal length state, in which the focal length is fM, and the following conditional expression (6) is preferably satisfied:

$$1.50 < fM/fW < 15.00 \qquad (6)$$

where fW denotes a focal length of the zoom lens system in the wide-angle end state.

Conditional expression (6) is for realizing high optical performance in a given intermediate focal length state.

When the ratio fM/fW is equal to or falls below the lower limit of conditional expression (6), spherical aberration and coma are largely generated in the given intermediate focal length range, so that high optical performance cannot be obtained.

On the other hand, when the ratio fM/fW is equal to or exceeds the upper limit of conditional expression (6), the f-number in the given intermediate focal length range becomes excessively large, and spherical aberration and coma are largely generated in the wide-angle end state, so that high optical performance cannot be realized.

In order to secure the effect of the first embodiment, it is preferable to set the lower limit of conditional expression (6) to 1.80. In order to further secure the effect of the first embodiment, it is most preferable to set the lower limit of conditional expression (6) to 2.30.

In order to secure the effect of the first embodiment, it is preferable to set the upper limit of conditional expression (6) to 12.00. In order to further secure the effect of the first embodiment, it is most preferable to set the upper limit of conditional expression (6) to 8.50.

In a zoom lens system according to the first embodiment, upon zooming from the intermediate focal length state, in which the focal length of the zoom lens system is fM, to the telephoto end state, the maximum diameter of the aperture stop preferably increases monotonously. Incidentally, the maximum diameter of the aperture stop is the maximum value of the diameter of the aperture stop with respect to each focal length state.

With this configuration, mechanical construction of the zoom lens system can be simplified, and variation in spherical aberration can be suppressed in the zoom range from the intermediate focal length fM state to the telephoto end state, so that high optical performance can be obtained.

In a zoom lens system according to the first embodiment, the following conditional expression (7) is preferably satisfied:

$$0.032 < -f2/fT < 0.064 \qquad (7)$$

where f2 denotes a focal length of the second lens group.

Conditional expression (7) is for realizing high optical performance with suppressing variation in aberrations generated in the second lens group upon zooming from the wide-angle end state to the telephoto end state.

When the ratio −f2/fT is equal to or falls below the lower limit of conditional expression (7), refractive power of the second lens group becomes excessively large. Then, variation in spherical aberration and coma upon zooming from the wide-angle end state to the telephoto end state becomes large, so that high optical performance cannot be obtained.

On the other hand, when ratio −f2/fT is equal to or exceeds the upper limit of conditional expression (7), refractive power of the second lens group becomes excessively small, so that the moving amount of the second lens group increases. Then, upon zooming from the wide-angle end state to the telephoto end state, variation in spherical aberration and astigmatism cannot be suppressed, so that high optical performance cannot be obtained.

In order to secure the effect of the first embodiment, it is preferable to set the lower limit of conditional expression (7) to 0.038. In order to further secure the effect of the first embodiment, it is most preferable to set the lower limit of conditional expression (7) to 0.042.

In order to secure the effect of the first embodiment, it is preferable to set the upper limit of conditional expression (7) to 0.061. In order to further secure the effect of the first embodiment, it is most preferable to set the upper limit of conditional expression (7) to 0.057.

In a zoom lens system according to the first embodiment, an f-number of the zoom lens system preferably increases monotonously upon zooming from the wide-angle end state to the telephoto end state.

With this configuration, upon zooming from the wide-angle end state to the telephoto end state, the height of on-axis ray passing through a lens group in the vicinity of the aperture stop such as the third lens group is prevented from excessive increase. Accordingly, variation in aberrations such as spherical aberration can be suppressed, so that high optical performance can be obtained.

In a zoom lens system according to the first embodiment, upon zooming from the wide-angle end state to the telephoto end state, the first lens group is preferably moved to the object side with respect to the image plane.

With this configuration, the diameter of the first lens group can be downsized, and the height from the optical axis of the off-axis ray passing through the first lens group in the wide-angle end state can be suppressed, so that variation in curvature of field and astigmatism upon zooming can be suppressed.

In a zoom lens system according to the first embodiment, upon zooming from the wide-angle end state to the telephoto end state, the aperture stop is preferably moved integrally with at least a portion of the third lens group.

With this configuration, mechanical construction of the zoom lens system can be simplified, and variation in spherical aberration can be suppressed, so that high optical performance can be obtained.

In a zoom lens system according to the first embodiment, the aperture stop is preferably disposed to the object side of the third lens group.

With this configuration, the diameter of the first lens group can be downsized, and the height from the optical axis of the off-axis ray passing through the first lens group in the wide-angle end state can be suppressed, so that variation in curvature of field and astigmatism upon zooming can be suppressed.

In a zoom lens system according to the first embodiment, upon zooming from the wide-angle end state to the telephoto end state, the third lens group and the fifth lens group are preferably moved in a body.

With this configuration, the third lens group and the fifth lens group can be constructed in a body, a mutual decentering amount between the third lens group and the fifth lens group caused by manufacturing error can be suppressed, and generation of decentering coma generated between the third lens group and the fifth lens group can be suppressed, so that high optical performance can be realized.

Then, a zoom lens system seen from another point of view according to the first embodiment of the present application is explained below.

A zoom lens system seen from another point of view according to the s first embodiment includes, in order from an object side, a first lens group having positive refractive power, a second lens group having negative refractive power, a third lens group having positive refractive power, a fourth lens group having negative refractive power, and a fifth lens group having positive refractive power. An aperture stop is disposed to an image side of the second lens group. Upon zooming from a wide-angle end state to a telephoto end state, a distance between the first lens group and the second lens group increases, a distance between the second lens group and the third lens group decreases, a distance between the third lens group and the fourth lens group varies, and a distance between the fourth lens group and the fifth lens group varies, thereby realizing an optical system capable of zooming and correcting distortion moderately from the wide-angle end state to the telephoto end state.

Moreover, a zoom lens system seen from another point of view according to the first embodiment satisfies the following conditional expressions (1) and (2):

$$0.17 < f1/fT < 0.60 \quad (1)$$

$$1.03 < \phi T/\phi W < 1.70 \quad (2)$$

where fT denotes a focal length of the zoom lens system in the telephoto end state, f1 denotes a focal length of the first lens group, $\phi W$ denotes the maximum diameter of the aperture stop in the wide-angle end state, and $\phi T$ denotes the maximum diameter of the aperture stop in the telephoto end state.

Conditional expression (1) is for obtaining high optical performance with excellently correcting spherical aberration and curvature of field generated in the zoom lens system. However, conditional expression (1) has been already explained above, so that duplicated explanations are omitted.

Conditional expression (2) is for obtaining high optical performance with setting the f-number in the telephoto end state moderately small and excellently correcting spherical aberration and coma. However, conditional expression (2) has been already explained above, so that duplicated explanations are omitted.

In a zoom lens system seen from another point of view according to the first embodiment, at least one surface of the optical surfaces of the first lens group and the second lens group is provided with an antireflection coating, and this antireflection coating includes at least one layer formed by use of a wet process. With the configuration being thus made, the zoom lens seen from another point of view according to the first embodiment makes it possible to further reduce ghost images and flare caused by reflections of light from the object on the optical surfaces and attaining high optical performance.

In a zoom lens system seen from another point of view according to the first embodiment, it is desirable that the antireflection coating is a multi-layered film, and the layer formed by the wet process is a layer of the uppermost surface of the layers composing the multi-layered film. With this configuration, since a difference in refractive index from the air can be decreased, it is possible to further decrease light reflection and to reduce ghost images and flare as well.

In a zoom lens system seen from another point of view according to the first embodiment, let nd be a refractive index of a layer formed by use of the wet process, and it is desirable that the refractive index nd is equal to 1.30 or less. With this configuration, since the difference in refractive index from the air can be decreased, it is possible to further decrease light reflection and to reduce ghost images and flare as well.

In a zoom lens system seen from another point of view according to the first embodiment, among optical surfaces in the first lens group and the second lens group, it is desirable that the optical surface on which the antireflection coating is applied is a concave surface as viewed from the aperture stop. Since the concave surface as viewed from the aperture stop among optical surfaces in the first lens group and the second lens group tends to generate ghost images, the optical surface is formed with the antireflection coating, thereby enabling ghost images and flare to be effectively reduced.

In a zoom lens system seen from another point of view according to the first embodiment, it is desirable that, among the first lens group and the second lens group, the concave surface on which the antireflection coating is applied as viewed from the aperture stop is an image side lens surface. Since the concave surface as viewed from the aperture stop among optical surfaces in the first lens group and the second lens group tends to generate ghost images, the optical surface is formed with the antireflection coating, thereby enabling ghost images and flare to be effectively reduced.

In a zoom lens system seen from another point of view according to the first embodiment, it is desirable that, among the first lens group and the second lens group, the concave surface on which the antireflection coating is applied as viewed from the aperture stop is an object side lens surface. Since the concave surface as viewed from the aperture stop among optical surfaces in the first lens group and the second lens group tends to generate ghost images, the optical surface is formed with the antireflection coating, thereby enabling ghost images and flare to be effectively reduced.

In a zoom lens system seen from another point of view according to the first embodiment, among optical surfaces in the first lens group and the second lens group, it is desirable that the optical surface on which the antireflection coating is applied is a concave surface as viewed from the object. With this configuration, since the concave surface as viewed from the object among optical surfaces in the first lens group and the second lens, group tends to generate ghost images, the optical surface is formed with the antireflection coating, thereby enabling ghost images and flare to be effectively reduced.

In a zoom lens system seen from another point of view according to the first embodiment, among optical surfaces in the first lens group and the second lens group, it is desirable that the optical surface having the concave shape as viewed from the object on which the antireflection coating is applied is the image side lens surface of the image side second lens from the most object side of the first lens group. Since the concave surface as viewed from the object among optical surfaces in the first lens group tends to generate ghost images, the optical surface is formed with the antireflection coating, thereby enabling ghost images and flare to be effectively reduced.

In a zoom lens system seen from another point of view according to the first embodiment, among optical surfaces in the first lens group and the second lens group, it is desirable that the optical surface having the concave shape as viewed from the object on which the antireflection coating is applied is the object side lens surface of the image side second lens from the most object side of the second lens group. Since the concave surface as viewed from the object among optical surfaces in the second lens group tends to generate ghost images, the optical surface is formed with the antireflection coating, thereby enabling ghost images and flare to be effectively reduced.

In a zoom lens system seen from another point of view according to the first embodiment, among optical surfaces in the first lens group and the second lens group, it is desirable that the optical surface having the concave shape as viewed from the object on which the antireflection coating is applied is the image side lens surface of the image side third lens from the most object side of the second lens group. Since the concave surface as viewed from the object among optical surfaces in the second lens group tends to generate ghost images, the optical surface is formed with the antireflection coating, thereby enabling ghost images and flare to be effectively reduced.

In a zoom lens system seen from another point of view according to the first embodiment, among optical surfaces in the first lens group and the second lens group, it is desirable that the optical surface having the concave shape as viewed from the object on which the antireflection coating is applied is the object side lens surface of the image side fourth lens from the most object side of the second lens group. Since the concave surface as viewed from the object among optical surfaces in the second lens group tends to generate ghost images, the optical surface is formed with the antireflection coating, thereby enabling ghost images and flare to be effectively reduced.

In a zoom lens system seen from another point of view according to the first embodiment, the antireflection coating may also be formed by a dry process etc without being limited to the wet process. On this occasion, it is preferable that the antireflection coating contains at least one layer of which the refractive index is equal to or smaller than 1.30. Thus, the same effects as in the case of using the wet process can be obtained by forming the antireflection coating based on the dry process etc. Note that at this time the layer of which the refractive index is equal to or smaller than 1.30 is preferably the layer of the uppermost surface of the layers composing the multi-layered film.

In a zoom lens system seen from another point of view according to the first embodiment, the following conditional expression (3) is preferably satisfied:

$$1.02 < \phi M10/\phi W < 1.70 \tag{3}$$

where $\phi M10$ denotes the maximum diameter of the aperture stop in an intermediate focal length state, in which the intermediate focal length of the zoom lens system is ten times or more of fW when fW denotes a focal length of the zoom lens system in the wide-angle end state, $\phi W$ denotes the maximum diameter of the aperture stop in the wide-angle end state.

Conditional expression (3) is for realize high optical performance with letting the zoom lens system have a sufficient f-number in the intermediate focal length state where the focal length of the zoom lens system is ten times or more of the focal length thereof in the wide-angle end state (fW). However, conditional expression (3) has been already explained above, so that duplicated explanations are omitted.

In a zoom lens system seen from another point of view according to the first embodiment, the following conditional expression (4) is preferably satisfied:

$$1.02 < \phi M15/\phi W < 1.70 \tag{4}$$

where $\phi M15$ denotes the maximum diameter of the aperture stop in an intermediate focal length state, in which the intermediate focal length of the zoom lens system is fifteen times or more of fW when fW denotes a focal length of the zoom lens system in the wide-angle end state.

Conditional expression (4) is for realize high optical performance with letting the zoom lens system have a sufficient f-number in the intermediate focal length state where the focal length of the zoom lens system is fifteen times or more of the focal length thereof in the wide-angle end state (fW). However, conditional expression (4) has been already explained above, so that duplicated explanations are omitted.

In a zoom lens system seen from another point of view according to the first embodiment, the following conditional expression (5) is preferably satisfied:

$$1.00 \leq \phi M5/\phi W < 1.40 \tag{5}$$

where $\phi M5$ denotes the maximum diameter of the aperture stop in an intermediate focal length state, in which the intermediate focal length of the zoom lens system is five times or more and eight times or less of fW when fW denotes a focal length of the zoom lens system in the wide-angle end state.

Conditional expression (5) is for realize high optical performance in the intermediate focal length state where the focal length of the zoom lens system is five times or more and eight times or less of the focal length thereof in the wide-angle end state (fW). However, conditional expression (5) has been already explained above, so that duplicated explanations are omitted.

In a zoom lens system seen from another point of view according to the first embodiment, upon zooming from the wide-angle end state to the telephoto end state, the diameter of the aperture stop keeps the maximum diameter of the wide-angle end state from the wide-angle end state to an intermediate focal length state, in which the focal length is fM, and the following conditional expression (6) is preferably satisfied:

$$1.50 < fM/fW < 15.00 \tag{6}$$

where fW denotes a focal length of the zoom lens system in the wide-angle end state.

Conditional expression (6) is for realizing high optical performance in a given intermediate focal length state. However, conditional expression (6) has been already explained above, so that duplicated explanations are omitted.

In a zoom lens system seen from another point of view according to the first embodiment, upon zooming from the intermediate focal length state, in which the focal length of the zoom lens system is fM, to the telephoto end state, the maximum diameter of the aperture stop preferably increases monotonously. Incidentally, the maximum diameter of the aperture stop is the maximum value of the diameter of the aperture stop with respect to each focal length state.

With this configuration, mechanical construction of the zoom lens system can be simplified, and variation in spherical aberration can be suppressed in the zoom range from the intermediate focal length fM state to the telephoto end state, so that high optical performance can be obtained.

In a zoom lens system seen from another point of view according to the first embodiment, the following conditional expression (7) is preferably satisfied:

$$0.032 < -f2/fT < 0.064 \tag{7}$$

where f2 denotes a focal length of the second lens group.

Conditional expression (7) is for realizing high optical performance with suppressing variation in aberrations generated in the second lens group upon zooming from the wide-angle end state to the telephoto end state. However, conditional expression (7) has been already explained above, so that duplicated explanations are omitted.

In a zoom lens system seen from another point of view according to the first embodiment, an f-number of the zoom lens system preferably increases monotonously upon zooming from the wide-angle end state to the telephoto end state.

With this configuration, upon zooming from the wide-angle end state to the telephoto end state, the height of on-axis ray passing through a lens group in the vicinity of the aperture stop such as the third lens group is prevented from excessive increase. Accordingly, variation in aberrations such as spherical aberration can be suppressed, so that high optical performance can be obtained.

In a zoom lens system seen from another point of view according to the first embodiment, upon zooming from the wide-angle end state to the telephoto end state, the first lens group is preferably moved to the object side with respect to the image plane.

With this configuration, the diameter of the first lens group can be downsized, and the height from the optical axis of the off-axis ray passing through the first lens group in the wide-angle end state can be suppressed, so that variation in curvature of field and astigmatism upon zooming can be suppressed.

In a zoom lens system seen from another point of view according to the first embodiment, upon zooming from the wide-angle end state to the telephoto end state, the aperture stop is preferably moved integrally with at least a portion of the third lens group.

With this configuration, mechanical construction of the zoom lens system can be simplified, and variation in spherical aberration can be suppressed, so that high optical performance can be obtained.

In a zoom lens system seen from another point of view according to the first embodiment, the aperture stop is preferably disposed to the object side of the third lens group.

With this configuration, the diameter of the first lens group can be downsized, and the height from the optical axis of the off-axis ray passing through the first lens group in the wide-angle end state can be suppressed, so that variation in curvature of field and astigmatism upon zooming can be suppressed.

In a zoom lens system seen from another point of view according to the first embodiment, upon zooming from the wide-angle end state to the telephoto end state, the third lens group and the fifth lens group are preferably moved in a body.

With this configuration, the third lens group and the fifth lens group can be constructed in a body, a mutual decentering amount between the third lens group and the fifth lens group caused by manufacturing error can be suppressed, and generation of decentering coma generated between the third lens group and the fifth lens group can be suppressed, so that high optical performance can be realized.

Then, each Example according to the first embodiment is explained below with reference to accompanying drawings.

Example 1

FIG. 1 is a sectional view showing a configuration of a zoom lens system according to Example 1 of the first embodiment.

As shown in FIG. 1, the zoom lens system according to Example 1 of the first embodiment is composed of, in order from an object side, a first lens group G1 having positive refractive power, a second lens group G2 having negative refractive power, a third lens group G3 having positive refractive power, a fourth lens group G4 having negative refractive power, and a fifth lens group G5 having positive refractive power.

Upon zooming from a wide-angle end state W to a telephoto end state T, the first lens group G1 is moved monotonously to the object side, the second lens group G2 is moved to the image side from the wide-angle end state W to a first intermediate focal length state M1, and to the object side from the first intermediate focal length state M1 to the telephoto end state T, and the third lens group G3 is moved monotonously to the object side with respect to the image plane I such that a distance between the first lens group G1 and the second lens group G2 increases, and a distance between the second lens group G2 and the third lens group G3 decreases. Moreover, the fourth lens group G4 and the fifth lens group G5 are moved monotonously to the object side with respect to the image plane I such that a distance between the third lens group G3 and the fourth lens group G4 increases, and a distance between the fourth lens group G4 and the fifth lens group G5 decreases. Moreover, the third lens group G3 and the fifth lens group G5 are moved in a body with respect to the image plane I.

An aperture stop S is disposed to the most object side of the third lens group G3, which is disposed to the image side of the second lens group G2, and constructed integrally with the third lens group G3. Moreover, upon zooming from the wide-angle end state W to the telephoto end state T, the aperture stop S keeps the maximum diameter of the wide-angle end state W from the wide-angle end state W to a second intermediate focal length state M2, and increases the maximum diameter monotonously from the second intermediate focal length state M2 to the telephoto end state T.

The first lens group G1 is composed of, in order from the object side along an optical axis, a cemented lens constructed by a negative meniscus lens L11 having a convex surface facing the object side cemented with a biconvex positive lens L12, and a biconvex positive lens L13.

The second lens group G2 is composed of, in order from the object side along the optical axis, a negative meniscus lens L21 having a convex surface facing the object side, a biconcave negative lens L22, a biconvex positive lens L23, and a cemented lens constructed by a biconcave negative lens L24 cemented with a biconvex positive lens L25. The negative meniscus lens L21 disposed to the most object side in the second lens group G2 is a compound type aspherical lens in which an aspherical surface is formed by a resin layer provided on the object side lens surface.

The third lens group G3 is composed of, in order from the object side along the optical axis, a biconvex positive lens L31, a biconvex positive lens L32, and a cemented lens constructed by a biconvex positive lens L33 cemented with a negative meniscus lens L34 having a concave surface facing the object side.

The fourth lens group G4 is composed of, in order from the object side along the optical axis, a cemented lens constructed by a biconcave negative lens L41 cemented with a positive meniscus lens L42 having a convex surface facing the object side, and a negative meniscus lens L43 having a concave surface facing the object side. The biconcave negative lens L41 disposed to the most object side in the fourth lens group G4 is a glass-mold type aspherical lens in which an aspherical surface is formed on the object side lens surface.

The fifth lens group G5 is composed of, in order from the object side along the optical axis, a positive meniscus lens L51 having a concave surface facing the object side, a biconvex positive lens L52, and a cemented lens constructed by a biconcave negative lens L53 cemented with a biconvex positive lens L54. The positive meniscus lens L51 disposed to the most object side in the fifth lens group G5 is a glass mold type aspherical lens, in which an aspherical surface is formed on the object side lens surface. Light rays come out from the biconvex positive lens L54 form an image on the image plane I.

The image plane I is formed on an unillustrated imaging device, in which the imaging device is constructed by a CCD, a CMOS, and the like. This is the same in the following Examples.

In the zoom lens system according to Example 1 of the first embodiment, each of the image side lens surface of the negative meniscus lens L21 and the object side lens surface of the biconcave negative lens L22 are formed with an antireflection coating explained later.

The following Table 1 shows values of various items of data of the zoom lens system according to Example 1.

In (Lens Data), a surface number "i" represents an order of the lens surface counted from the object side, "r" denotes a radius of curvature of each optical surface, a distance "d" indicates a distance along an optical axis from each optical surface to the next optical surface, and a refractive index "nd" and an Abbe number "vd" represent values with respect to the d-line (wavelength $\lambda$=587.6 nm). Incidentally, the radius of curvature "r=∞" indicates a plane surface, and the refractive index "nd=1.00000" of the air is omitted.

In (Aspherical Surface Data), an aspherical surface is expressed by the following expression when y is a height in the direction vertical to the optical axis, S(y) is a distance (sag quantity) along the optical axis from a tangent plane of a vertex of each aspherical surface at the height y up to each aspherical surface, r is a radius of curvature (paraxial radius of curvature) of the reference sphere, k is a conical coefficient and An is an n-th order aspherical surface coefficient. Note that [E-n] represents [×10$^{-n}$] such that "1.234 E-05" denotes "1.234×10$^{-5}$" in the subsequent Examples:

$$S(y)=(y^2/r)/[1+(1-ky^2/r^2)^{1/2}]+A4 \times y^4+A6 \times y^6+A8 \times y^8+A10 \times y^{10}.$$

It should be noted that a second order aspherical surface coefficient A2 is "0" in each of Examples. Further, the aspherical surface is attached with a mark "*" on the right side of a surface number in the Table of each Example.

In (Various Data), the zoom ratio denotes a zoom ratio of a zoom lens system, W denotes a wide-angle end state, M1 denotes a first intermediate focal length state, M2 denotes a second intermediate focal length state, M3 denotes a third intermediate focal length state, M4 denotes a fourth intermediate focal length state, and T denotes a telephoto end state. Moreover, f denotes a focal length of a zoom lens system, FNO denotes an f-number, ω denotes a half angle of view (unit: degree), Y denotes an image height, TL denotes a total lens length which is a distance between the most object side lens surface of the first lens group G1 upon focusing on infinity and an image plane I, Bf denotes a back focal length, φ denotes the maximum diameter of the aperture stop, and di denotes a variable distance with respect to the surface number "i". The fourth intermediate focal length state M4 has a focal length of fifteen times of the focal length of the wide-angle end state W or more.

In (Lens Group Data), a start surface number I, and a focal length of each lens group are shown.

In (Values for Conditional Expressions), values with respect to respective conditional expressions are shown.

The focal length, the radius of curvature, the surface distance and other items of data described in the following various items of whole data involve using generally [mm] as a unit of the length, however, the optical system acquires the equal optical performance even when proportionally enlarged or reduced and is not therefore limited to this unit. Note that the descriptions of the reference numerals and symbols and the various items of data are the same in the subsequent Examples, and their explanations in the subsequent working examples are omitted.

TABLE 1

(Lens Data)

| i | r | d | nd | vd |
|---|---|---|---|---|
| 1 | 205.09180 | 2.00000 | 1.882997 | 40.76 |
| 2 | 67.52420 | 9.07190 | 1.456000 | 91.20 |
| 3 | −361.42710 | 0.10000 | | |
| 4 | 70.10040 | 6.86700 | 1.603001 | 65.46 |
| 5 | −2470.83790 | (d5) | | |
| 6* | 84.76870 | 0.15000 | 1.553890 | 38.09 |
| 7 | 73.93750 | 1.20000 | 1.834807 | 42.72 |
| 8 | 17.03670 | 6.46970 | | |
| 9 | −49.48220 | 1.00000 | 1.816000 | 46.62 |
| 10 | 52.14060 | 0.15000 | | |
| 11 | 31.61490 | 5.45080 | 1.761820 | 26.56 |
| 12 | −44.44820 | 1.19350 | | |
| 13 | −25.13580 | 1.00000 | 1.816000 | 46.62 |
| 14 | 64.50360 | 2.42190 | 1.808090 | 22.79 |
| 15 | −166.54310 | (d15) | | |
| 16 | ∞ | 1.00000 | Aperture Stop S | |
| 17 | 63.10220 | 3.49130 | 1.593190 | 67.87 |
| 18 | −50.22150 | 0.10000 | | |
| 19 | 58.68260 | 2.72200 | 1.487490 | 70.41 |
| 20 | −121.43450 | 0.10000 | | |
| 21 | 48.64320 | 4.10420 | 1.487490 | 70.41 |
| 22 | −34.50080 | 1.00000 | 1.808090 | 22.79 |
| 23 | −205.15990 | (d23) | | |
| 24* | −66.96860 | 1.00000 | 1.693501 | 53.20 |
| 25 | 26.57120 | 2.15810 | 1.761820 | 26.56 |
| 26 | 63.33840 | 4.78730 | | |
| 27 | −24.70410 | 1.00000 | 1.729157 | 54.66 |
| 28 | −74.86360 | (d28) | | |
| 29* | −569.79420 | 3.96090 | 1.589130 | 61.16 |
| 30 | −23.53500 | 0.10000 | | |
| 31 | 37.14850 | 5.00600 | 1.487490 | 70.41 |
| 32 | −45.19690 | 1.71640 | | |
| 33 | −107.03630 | 1.00000 | 1.882997 | 40.76 |
| 34 | 23.36210 | 4.50160 | 1.548141 | 45.79 |
| 35 | −637.55850 | (Bf) | | |

(Aspherical Surface Data)

Surface number = 6

κ = 1.0000
A4 = 3.61880E−06
A6 = −6.10680E−09
A8 = −4.67380E−12
A10 = 5.77660E−14

Surface number = 24

κ = 1.0000
A4 = 3.81940E−06
A6 = −1.72450E−09
A8 = 0.00000E+00
A10 = 0.00000E+00

Surface number = 29

κ = 1.0000
A4 = −1.63630E−05
A6 = 8.94380E−09
A8 = −2.98150E−11
A10 = 2.87630E−14

TABLE 1-continued (Various Data)
zoom ratio = 15.71

| | f | FNO | ω | Y | TL | Bf |
|---|---|---|---|---|---|---|
| W = | 18.56080 | 3.60018 | 38.95554 | 14.20 | 163.30 | 39.15242 |
| M1 = | 27.61236 | 4.14587 | 26.62942 | 14.20 | 170.24 | 46.48061 |
| M2 = | 50.16122 | 5.56795 | 15.36461 | 14.20 | 188.45 | 63.58078 |
| M3 = | 104.15546 | 5.60084 | 7.45367 | 14.20 | 255.60 | 70.61280 |
| M4 = | 280.42469 | 5.86110 | 2.81770 | 14.20 | 252.27 | 82.17689 |
| T = | 291.57422 | 5.87404 | 2.71157 | 14.20 | 252.97 | 82.77641 |

| | φ | d5 | d15 | d23 | d28 |
|---|---|---|---|---|---|
| W = | 16.20 | 2.14670 | 34.33830 | 3.38750 | 9.44940 |
| M1 = | 16.20 | 11.21590 | 24.88030 | 5.60850 | 7.22840 |
| M2 = | 16.20 | 21.46790 | 15.73730 | 9.43760 | 3.39920 |
| M3 = | 18.00 | 55.86030 | 11.46250 | 10.66930 | 2.16760 |
| M4 = | 19.80 | 79.96320 | 2.46860 | 11.77830 | 1.05860 |
| T = | 19.90 | 80.53690 | 2.00000 | 11.83690 | 1.00000 |

(Lens Group Data)

| Group | I | focal length |
|---|---|---|
| 1 | 1 | 122.10406 |
| 2 | 6 | -15.86654 |
| 3 | 16 | 26.56694 |
| 4 | 24 | -24.00147 |
| 5 | 29 | 33.81791 |

(Values for Conditional Expressions)

(1) f1/fT = 0.419
(2) φT/φW = 1.228
(3) φM10/φW = 1.222 (φM10 is a value in M4)
(4) φM15/φW = 1.222 (φM15 is a value in M4)
(5) φM5/φW = 1.111 (φM5 is a value in M3)
(6) fM/fW = 2.703 (fM is a value in M2)
(7) −f2/fT = 0.0544

Figure 2B:
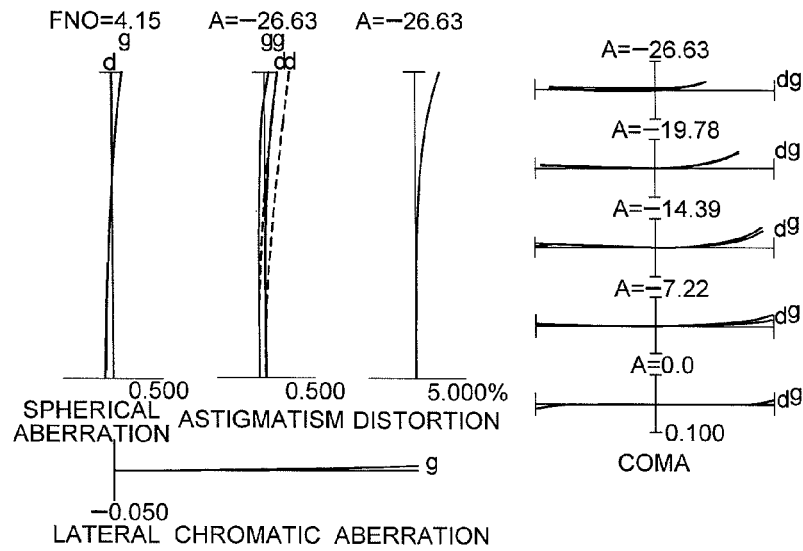
Figure 2C:
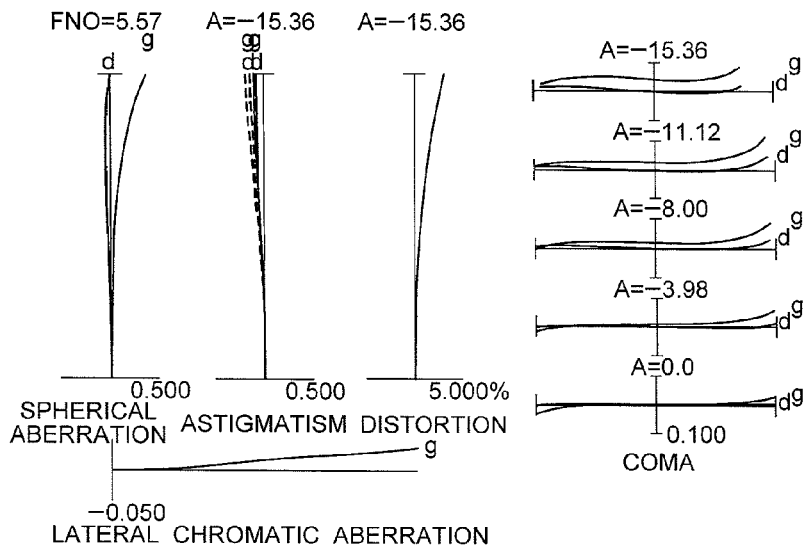

FIGS. 2A, 2B and 2C are graphs showing various aberrations of the zoom lens system according to Example 1 of the first embodiment, in which FIG. 2A is in a wide-angle end state W, FIG. 2B is in a first intermediate focal length state M1, and FIG. 2C is in a second intermediate focal length state M2.

Figure 3A:
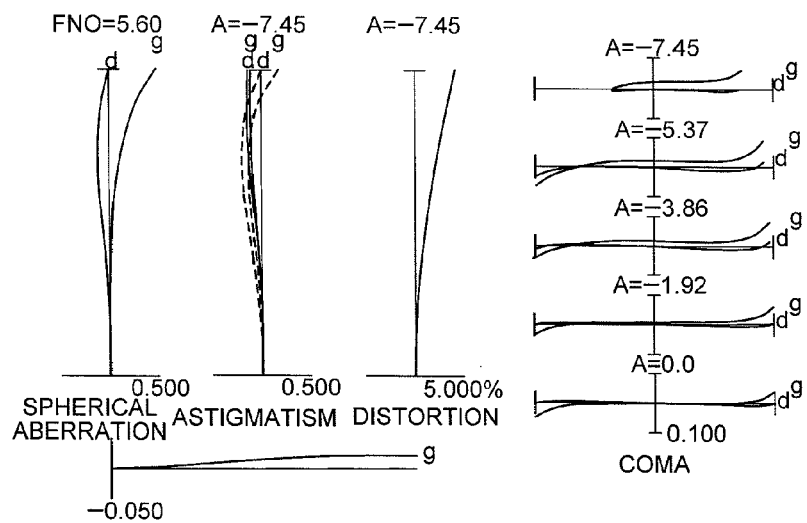
Figure 3B:
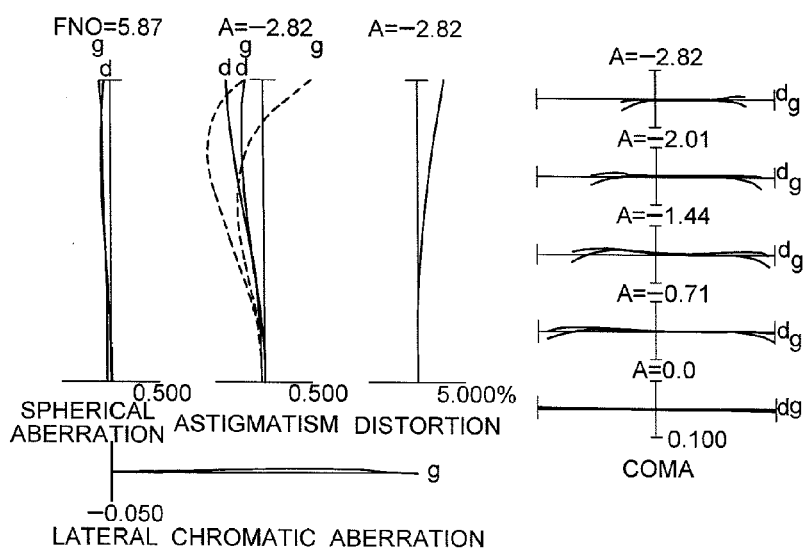
Figure 3C:
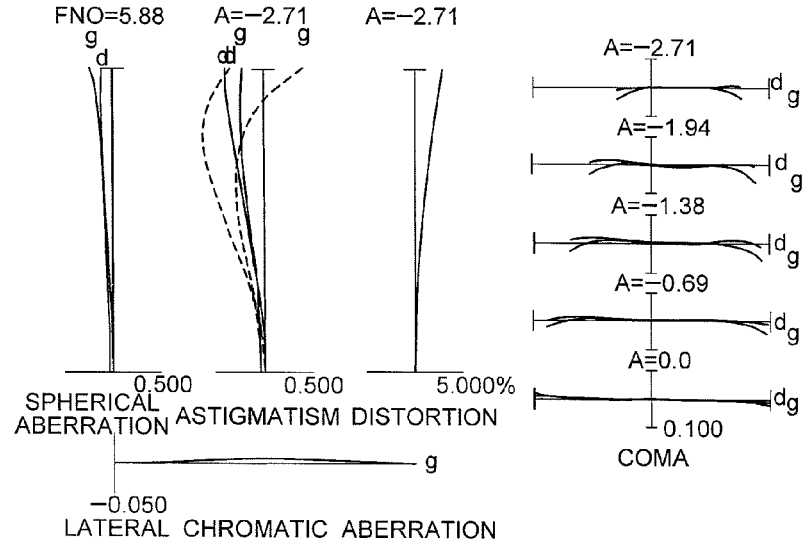

FIGS. 3A, 3B and 3C are graphs showing various aberrations of the zoom lens system according to Example 1 of the first embodiment, in which FIG. 3A is in a third intermediate focal length state M3, FIG. 3B is in a fourth intermediate focal length state M4, and FIG. 3C is in a telephoto end state T.

In each diagram, FNO denotes an f-number, A denotes a half angle of view (unite: degree), d indicates an aberration curve with respect to d-line (λ=587.6 nm) and g indicates an aberration curve with respect to the g-line (λ=435.8 nm), respectively, and an aberration curve without specified shows an aberration with respect to d-line. In respective graphs showing astigmatism, a solid line indicates a sagittal image plane, and a broken line indicates a meridional image plane. Note that the descriptions of these aberration diagrams are the same with the subsequent Examples.

As is apparent from the respective graphs, the zoom lens according to Example 1 of the first embodiment shows superb optical performance as a result of good corrections to various aberrations from the wide-angle end state through the telephoto end state.

FIG. 28 is a sectional view showing the configuration of the zoom lens system according to Example 1 of the first embodiment, illustrating one example of how incident light beams are reflected by a first ghost image generating surface and a second ghost image generating surface.

In FIG. 28, when the light rays BM coming from the object side is incident on the zoom lens system, the light rays BM are reflected by an object side lens surface (a first ghost-image-generating surface having a surface number "9") of the biconcave negative lens L22, and the reflected light rays are again reflected by an image side lens surface (a second ghost-image-generating surface having a surface number "8") of the negative meniscus lens L21 and reach the image plane I, resulting in the generation of the ghost images. Note that the first ghost-image-generating surface of the surface number "9" is a concave surface viewed from the object side, and the second ghost-image-generating surface of the surface number "8" is a concave surface viewed from the aperture stop S side. These surfaces are formed with the antireflection coating corresponding to a wide incident angle in a broader wavelength range, thereby enabling ghost images to be effectively reduced.

Example 2

Figure 4:
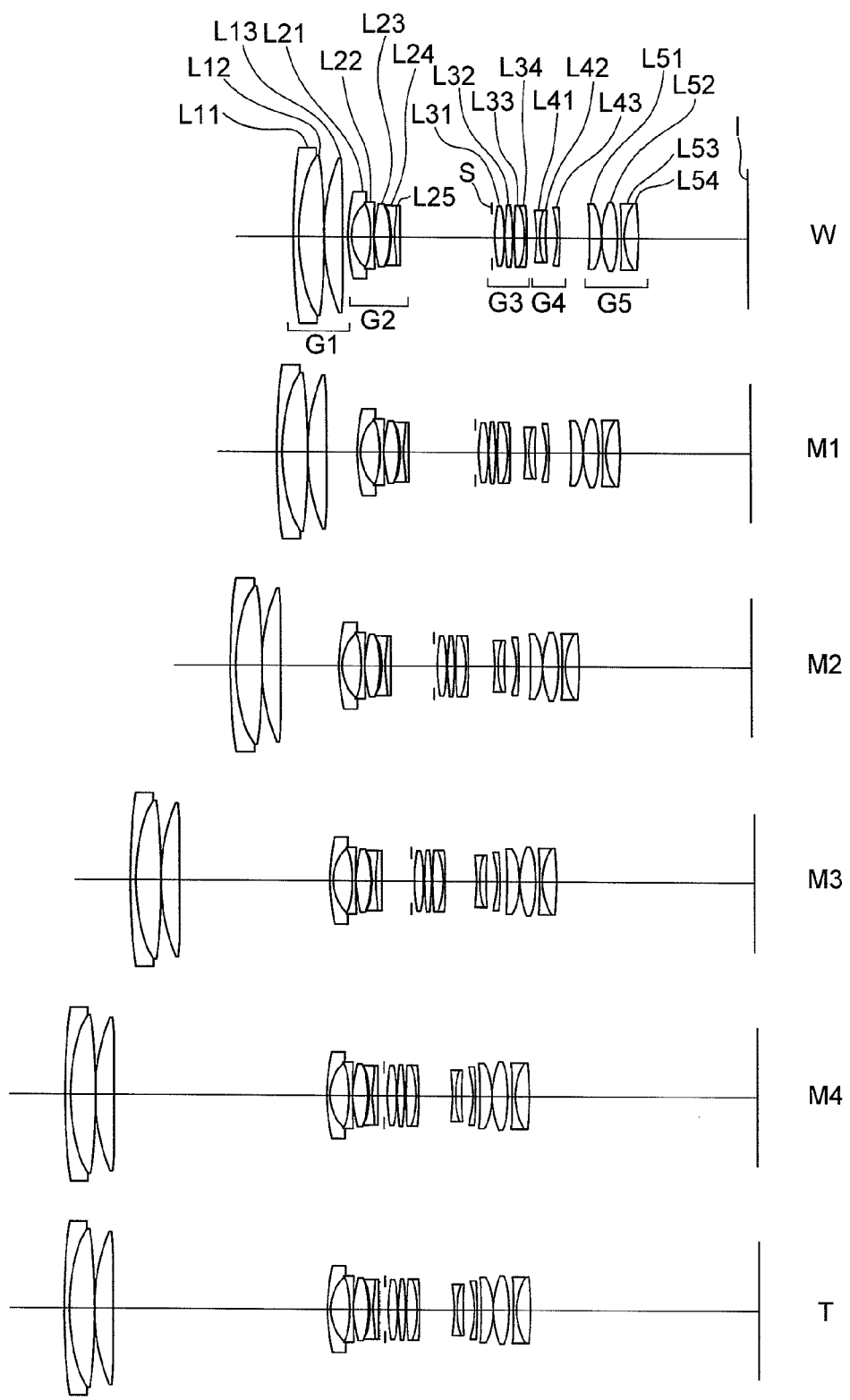
FIG. 4 is a sectional view showing a configuration of a zoom lens system according to Example 2 of the first embodiment.

FIG. 4 is a sectional view showing a configuration of a zoom lens system according to Example 2 of the first embodiment.

As shown in FIG. 4, the zoom lens system according to Example 2 of the first embodiment is composed of, in order from an object side, a first lens group G1 having positive refractive power, a second lens group G2 having negative refractive power, a third lens group G3 having positive refractive power, a fourth lens group G4 having negative refractive power, and a fifth lens group G5 having positive refractive power.

Upon zooming from a wide-angle end state W to a telephoto end state T, the first lens group G1 is moved monotonously to the object side, the second lens group G2 is moved to the image side from the wide-angle end state W to a first intermediate focal length state M1, and to the object side from the first intermediate focal length state M1 to the telephoto end state T, and the third lens group G3 is moved monotonously to the object side with respect to the image plane I such that a distance between the first lens group G1 and the second lens group G2 increases, and a distance between the second lens group G2 and the third lens group G3 decreases. Moreover, the fourth lens group G4 and the fifth lens group G5 are moved monotonously to the object side with respect to the image plane I such that a distance between the third lens group G3 and the fourth lens group G4 increases, and a distance between the fourth lens group G4 and the fifth lens group G5 decreases. Moreover, the third lens group G3 and the fifth lens group G5 are moved in a body with respect to the image plane I.

An aperture stop S is disposed to the most object side of the third lens group G3, which is disposed to the image side of the second lens group G2, and constructed integrally with the third lens group G3. Moreover, upon zooming from the wide-angle end state W to the telephoto end state T, the aperture stop S keeps the maximum diameter of the wide-angle end state W from the wide-angle end state W to a second intermediate focal length state M2, and increases the maximum diameter monotonously from the second intermediate focal length state M2 to the telephoto end state T.

The first lens group G1 is composed of, in order from the object side along an optical axis, a cemented lens constructed by a negative meniscus lens L11 having a convex surface facing the object side cemented with a biconvex positive lens L12, and a positive meniscus lens L13 having a convex surface facing the object side.

The second lens group G2 is composed of, in order from the object side along the optical axis, a negative meniscus lens L21 having a convex surface facing the object side, a biconcave negative lens L22, a biconvex positive lens L23, and a cemented lens constructed by a biconcave negative lens L24 cemented with a biconvex positive lens L25. The negative meniscus lens L21 disposed to the most object side in the second lens group G2 is a compound type aspherical lens in which an aspherical surface is formed by a resin layer provided on the object side lens surface.

The third lens group G3 is composed of, in order from the object side along the optical axis, a biconvex positive lens L31, a biconvex positive lens L32, and a cemented lens constructed by a biconvex positive lens L33 cemented with a negative meniscus lens L34 having a concave surface facing the object side.

The fourth lens group G4 is composed of, in order from the object side along the optical axis, a cemented lens constructed by a biconcave negative lens L41 cemented with a positive meniscus lens L42 having a convex surface facing the object side, and a negative meniscus lens L43 having a concave surface facing the object side. The biconcave negative lens L41 disposed to the most object side in the fourth lens group G4 is a compound type aspherical lens in which an aspherical surface is formed by a resin layer on the object side lens surface.

The fifth lens group G5 is composed of, in order from the object side along the optical axis, a positive meniscus lens L51 having a concave surface facing the object side, a biconvex positive lens L52, and a cemented lens constructed by a biconcave negative lens L53 cemented with a biconvex positive lens L54. The positive meniscus lens L51 disposed to the most object side in the fifth lens group G5 is a glass mold type aspherical lens, in which an aspherical surface is formed on the object side lens surface. Light rays come out from the biconvex positive lens L54 form an image on the image plane I.

In a zoom lens system according to Example 2 of the first embodiment, each of the object side lens surface of the positive meniscus lens L13 in the first lens group G1 and the image side lens surface of the biconvex positive lens L23 in the second lens group G2 is applied with an antireflection coating explained later.

The following Table 2 shows values of various items of data of the zoom lens system according to Example 2.

TABLE 2

(Lens Data)

| i | r | d | nd | vd |
|---|---|---|---|---|
| 1 | 186.59960 | 2.20000 | 1.834000 | 37.17 |
| 2 | 69.08900 | 8.80000 | 1.497820 | 82.56 |
| 3 | −494.44545 | 0.10000 | | |
| 4 | 73.40222 | 6.45000 | 1.593190 | 67.87 |
| 5 | 2016.71160 | (d5) | | |
| 6* | 84.85000 | 0.10000 | 1.553890 | 38.09 |
| 7 | 74.02192 | 1.20000 | 1.834810 | 42.72 |
| 8 | 17.09747 | 6.95000 | | |
| 9 | −37.97970 | 1.00000 | 1.816000 | 46.63 |
| 10 | 77.67127 | 0.15000 | | |
| 11 | 36.26557 | 5.30000 | 1.784720 | 25.68 |
| 12 | −36.26557 | 0.80000 | | |
| 13 | −25.69642 | 1.00000 | 1.816000 | 46.63 |
| 14 | 66.08300 | 2.05000 | 1.808090 | 22.79 |
| 15 | −666.70366 | (d15) | | |
| 16 | ∞ | 1.00000 | Aperture Stop S | |
| 17 | 68.30727 | 3.40000 | 1.593190 | 67.87 |
| 18 | −47.99596 | 0.10000 | | |
| 19 | 68.52367 | 2.45000 | 1.487490 | 70.45 |
| 20 | −136.98392 | 0.10000 | | |
| 21 | 46.52671 | 4.20000 | 1.487490 | 70.45 |
| 22 | −36.16400 | 1.00000 | 1.808090 | 22.79 |
| 23 | −202.95328 | (d23) | | |
| 24* | −55.09840 | 0.20000 | 1.553890 | 38.09 |
| 25 | −57.24715 | 0.90000 | 1.696800 | 55.52 |
| 26 | 28.15100 | 2.15000 | 1.728250 | 28.46 |
| 27 | 87.70856 | 4.35000 | | |
| 28 | −26.69877 | 1.00000 | 1.729160 | 54.66 |
| 29 | −76.47707 | (d29) | | |
| 30* | −333.89500 | 4.65000 | 1.589130 | 61.18 |
| 31 | −24.64395 | 0.10000 | | |
| 32 | 31.19625 | 5.85000 | 1.487490 | 70.45 |
| 33 | −43.38887 | 1.45000 | | |
| 34 | −109.71645 | 1.00000 | 1.883000 | 40.77 |
| 35 | 20.29920 | 5.30000 | 1.548140 | 45.79 |
| 36 | −808.81321 | (Bf) | | |

(Aspherical Surface Data)

Surface number = 6

κ = 1.0000
A4 = 3.13350E−06
A6 = 4.73080E−10
A8 = −3.40500E−11
A10 = 1.16620E−13

Surface number = 24

κ = 1.0000
A4 = 5.24030E−06
A6 = −2.00730E−09
A8 = 0.00000E+00
A10 = 0.00000E+00

Surface number = 30

κ = 1.0000
A4 = −1.54020E−05
A6 = 1.69500E−09
A8 = 1.34490E−11
A10 = −2.07220E−13

(Various Data)
zoom ratio = 15.72

| | f | FNO | ω | Y | TL | Bf |
|---|---|---|---|---|---|---|
| W = | 18.52363 | 3.60558 | 38.89095 | 14.20 | 164.74 | 39.44250 |
| M1 = | 27.14081 | 4.11071 | 26.92688 | 14.20 | 171.75 | 46.21988 |
| M2 = | 48.93259 | 5.47222 | 15.68138 | 14.20 | 188.90 | 62.15925 |
| M3 = | 104.52143 | 5.69344 | 7.41882 | 14.20 | 225.49 | 71.57530 |
| M4 = | 279.97293 | 5.89216 | 2.81880 | 14.20 | 250.78 | 82.59962 |
| T = | 291.21725 | 5.89616 | 2.71146 | 14.20 | 251.39 | 83.10134 |

| | φ | d5 | d15 | d23 | d29 |
|---|---|---|---|---|---|
| W = | 15.80 | 2.15700 | 33.80140 | 3.45650 | 10.58680 |
| M1 = | 15.80 | 11.18630 | 24.99560 | 5.73730 | 8.30600 |
| M2 = | 15.80 | 21.31960 | 16.07940 | 9.97480 | 4.06850 |
| M3 = | 17.50 | 53.25650 | 11.31350 | 11.60170 | 2.44160 |
| M4 = | 19.50 | 76.35561 | 2.48461 | 12.99717 | 1.04613 |
| T = | 19.60 | 76.94960 | 2.00000 | 13.04330 | 1.00000 |

(Lens Group Data)

| Group | I | focal length |
|---|---|---|
| 1 | 1 | 118.96910 |
| 2 | 6 | −15.62542 |
| 3 | 16 | 27.17463 |
| 4 | 24 | −25.41506 |
| 5 | 30 | 34.39022 |

(Values for Conditional Expressions)

(1) f1/fT = 0.409
(2) φT/φW = 1.241
(3) φM10/φW = 1.234 (φM10 is a value in M4)
(4) φM15/φW = 1.234 (φM15 is a value in M4)

TABLE 2-continued (5) φM5/φW = 1.108 (φM5 is a value in M3)
(6) fM/fW = 2.642 (fM is a value in M2)
(7) −f2/fT = 0.0537

Figure 5A:
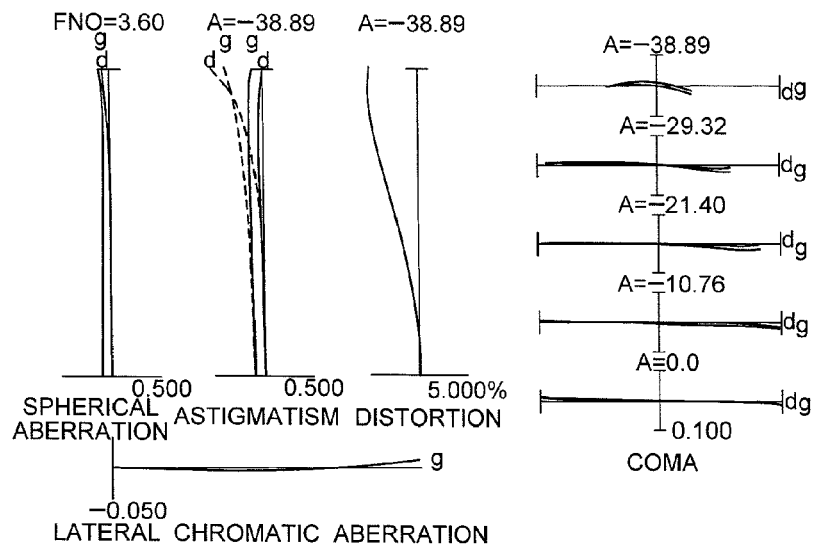
Figure 5B:
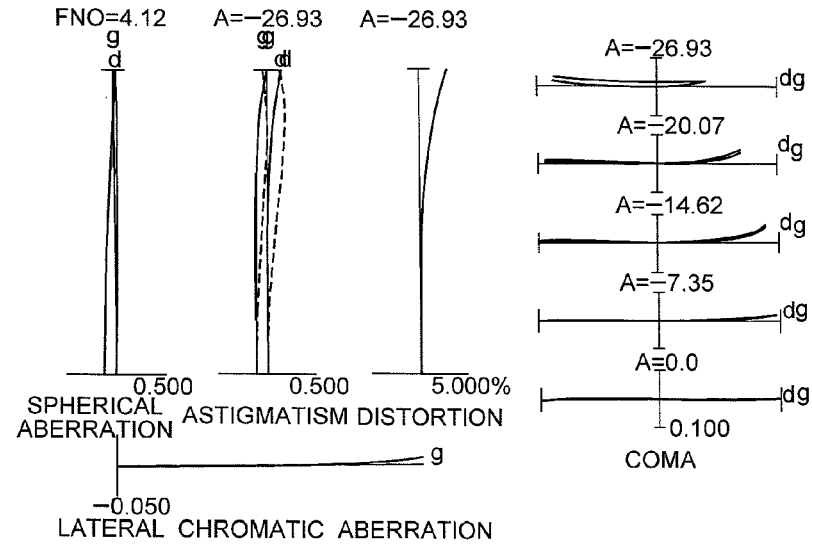
Figure 5C:
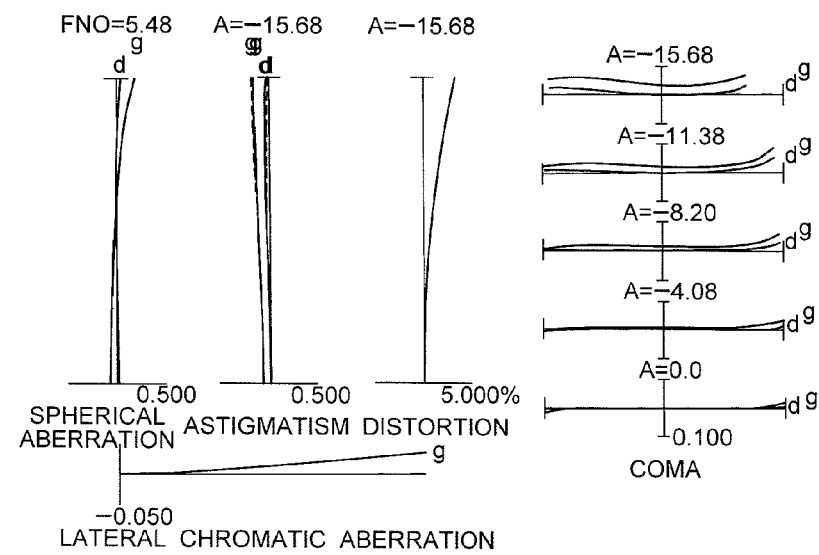

FIGS. 5A, 5B and 5C are graphs showing various aberrations of the zoom lens system according to Example 2 of the first embodiment, in which FIG. 5A is in a wide-angle end state W, FIG. 5B is in a first intermediate focal length state M1, and FIG. 5C is in a second intermediate focal length state M2.

Figure 6A:
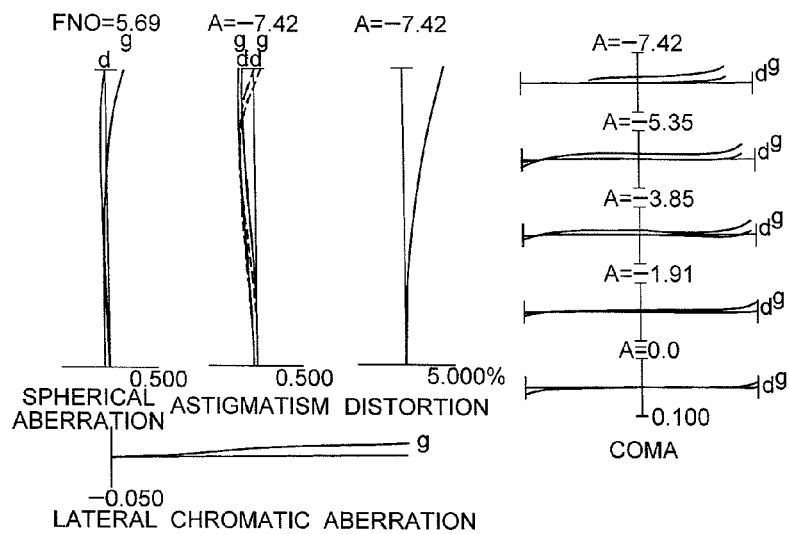
Figure 6B:
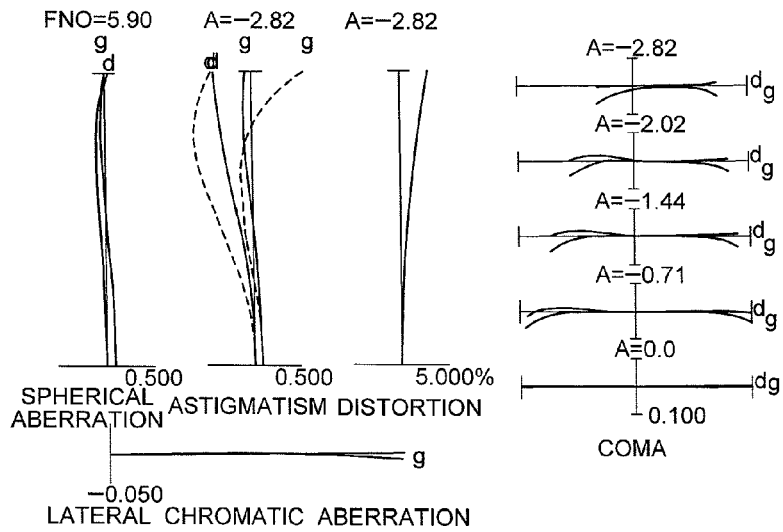
Figure 6C:
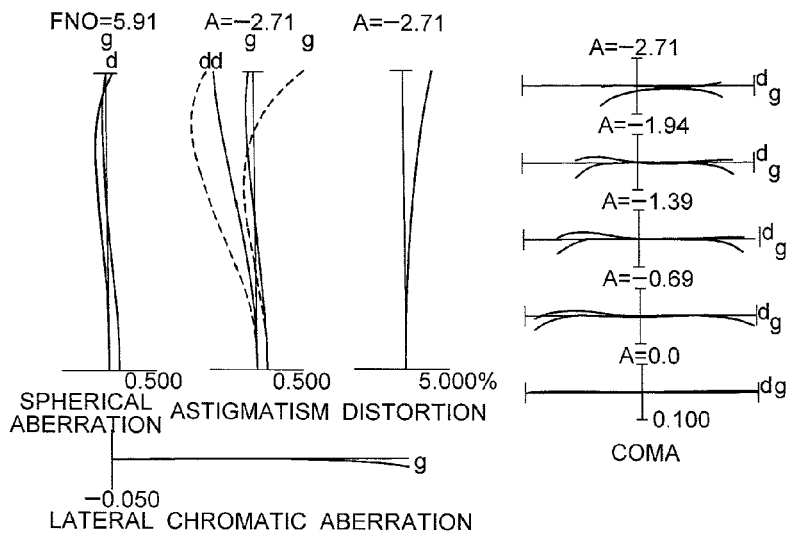

FIGS. 6A, 6B and 6C are graphs showing various aberrations of the zoom lens system according to Example 2 of the first embodiment, in which FIG. 6A is in a third intermediate focal length state M3, FIG. 6B is in a fourth intermediate focal length state M4, and FIG. 6C is in a telephoto end state T.

As is apparent from the respective graphs, the zoom lens according to Example 2 of the first embodiment shows superb optical performance as a result of good corrections to various aberrations from the wide-angle end state through the telephoto end state.

Example 3

Figure 7:
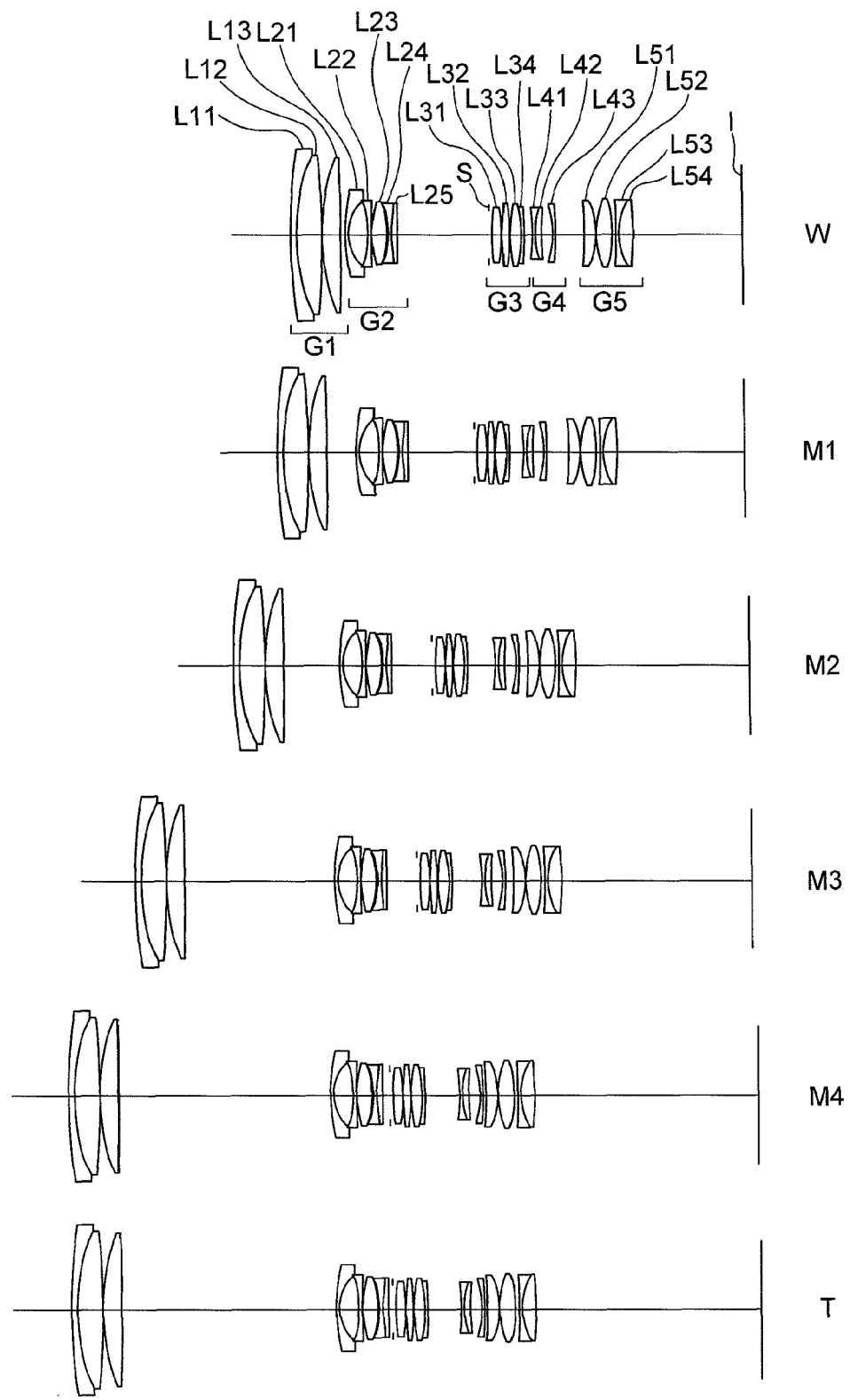
FIG. 7 is a sectional view showing a configuration of a zoom lens system according to Example 3 of the first embodiment.

FIG. 7 is a sectional view showing a configuration of a zoom lens system according to Example 3 of the first embodiment.

As shown in FIG. 7, the zoom lens system according to Example 3 of the first embodiment is composed of, in order from an object side, a first lens group G1 having positive refractive power, a second lens group G2 having negative refractive power, a third lens group G3 having positive refractive power, a fourth lens group G4 having negative refractive power, and a fifth lens group G5 having positive refractive power.

Upon zooming from a wide-angle end state W to a telephoto end state T, the first lens group G1 is moved monotonously to the object side, the second lens group G2 is moved to the image side from the wide-angle end state W to a first intermediate focal length state M1, and to the object side from the first intermediate focal length state M1 to the telephoto end state T, and the third lens group G3 is moved monotonously to the object side with respect to the image plane I such that a distance between the first lens group G1 and the second lens group G2 increases, and a distance between the second lens group G2 and the third lens group G3 decreases. Moreover, the fourth lens group G4 and the fifth lens group G5 are moved monotonously to the object side with respect to the image plane I such that a distance between the third lens group G3 and the fourth lens group G4 increases, and a distance between the fourth lens group G4 and the fifth lens group G5 decreases. Moreover, the third lens group G3 and the fifth lens group G5 are moved in a body with respect to the image plane I.

An aperture stop S is disposed to the most object side of the third lens group G3, which is disposed to the image side of the second lens group G2, and constructed integrally with the third lens group G3. Moreover, upon zooming from the wide-angle end state W to the telephoto end state T, the aperture stop S keeps the maximum diameter of the wide-angle end state W from the wide-angle end state W to a third intermediate focal length state M3, and increases the maximum diameter monotonously from the third intermediate focal length state M3 to the telephoto end state T.

The first lens group G1 is composed of, in order from the object side along an optical axis, a cemented lens constructed by a negative meniscus lens L11 having a convex surface facing the object side cemented with a biconvex positive lens L12, and a positive meniscus lens L13 having a convex surface facing the object side.

The second lens group G2 is composed of, in order from the object side along the optical axis, a negative meniscus lens L21 having a convex surface facing the object side, a biconcave negative lens L22, a biconvex positive lens L23, and a cemented lens constructed by a biconcave negative lens L24 cemented with a biconvex positive lens L25. The negative meniscus lens L21 disposed to the most object side in the second lens group G2 is a compound type aspherical lens in which an aspherical surface is formed by a resin layer provided on the object side lens surface.

The third lens group G3 is composed of, in order from the object side along the optical axis, a biconvex positive lens L31, a biconvex positive lens L32, and a cemented lens constructed by a biconvex positive lens L33 cemented with a negative meniscus lens L34 having a concave surface facing the object side.

The fourth lens group G4 is composed of, in order from the object side along the optical axis, a cemented lens constructed by a biconcave negative lens L41 cemented with a positive meniscus lens L42 having a convex surface facing the object side, and a negative meniscus lens L43 having a concave surface facing the object side. The positive meniscus lens L42 disposed to the center of the fourth lens group G4 is a glass mold type aspherical lens in which an aspherical surface is formed on the image side lens surface.

The fifth lens group G5 is composed of, in order from the object side along the optical axis, a positive meniscus lens L51 having a concave surface facing the object side, a biconvex positive lens L52, and a cemented lens constructed by a biconcave negative lens L53 cemented with a biconvex positive lens L54. The positive meniscus lens L51 disposed to the most object side in the fifth lens group G5 is a glass mold type aspherical lens, in which an aspherical surface is formed on the object side lens surface. Light rays come out from the biconvex positive lens L54 form an image on the image plane I.

In a zoom lens system according to Example 3 of the first embodiment, each of the object side lens surface of the positive meniscus lens L13 in the first lens group and the object side lens surface of the biconcave negative lens L24 in the second lens group is applied with an antireflection coating explained later.

The following Table 3 shows values of various items of data of the zoom lens system according to Example 3.

TABLE 3

(Lens Data)

| i | r | d | nd | vd |
|---|---|---|---|---|
| 1 | 192.86460 | 2.20000 | 1.834000 | 37.16 |
| 2 | 71.04740 | 9.00410 | 1.497820 | 82.52 |
| 3 | −459.57820 | 0.10000 | | |
| 4 | 73.87410 | 6.67930 | 1.593190 | 67.87 |
| 5 | 1334.48060 | (d5) | | |
| 6* | 84.76870 | 0.10000 | 1.553890 | 38.09 |
| 7 | 73.93750 | 1.25000 | 1.834807 | 42.72 |
| 8 | 16.85860 | 6.41100 | | |
| 9 | −43.47510 | 1.00000 | 1.816000 | 46.62 |
| 10 | 57.52320 | 0.15000 | | |
| 11 | 33.20000 | 5.23710 | 1.784723 | 25.68 |
| 12 | −42.33520 | 1.08530 | | |
| 13 | −25.03850 | 1.00000 | 1.816000 | 46.62 |
| 14 | 74.32200 | 2.14790 | 1.808090 | 22.79 |
| 15 | −196.76990 | (d15) | | |

TABLE 3-continued

| 16 | ∞ | 1.00000 | Aperture Stop S | |
|---|---|---|---|---|
| 17 | 70.66380 | 3.23230 | 1.593190 | 67.87 |
| 18 | −52.37330 | 0.10000 | | |
| 19 | 73.76600 | 2.71810 | 1.487490 | 70.41 |
| 20 | −83.31450 | 0.10000 | | |
| 21 | 45.54460 | 4.17150 | 1.487490 | 70.41 |
| 22 | −35.11250 | 1.00000 | 1.808090 | 22.79 |
| 23 | −188.15270 | (d23) | | |
| 24 | −63.85980 | 1.00000 | 1.696797 | 55.52 |
| 25 | 31.67440 | 1.86210 | 1.804855 | 24.73 |
| 26* | 64.32250 | 4.66290 | | |
| 27 | −26.08000 | 1.00000 | 1.729157 | 54.66 |
| 28 | −73.30510 | (d28) | | |
| 29* | −227.36510 | 4.17540 | 1.589130 | 61.16 |
| 30 | −24.31080 | 0.10000 | | |
| 31 | 31.50890 | 5.72340 | 1.487490 | 70.41 |
| 32 | −46.90920 | 1.38940 | | |
| 33 | −141.28220 | 1.00000 | 1.882997 | 40.76 |
| 34 | 20.03510 | 5.37700 | 1.548141 | 45.79 |
| 35 | −602.91670 | (Bf) | | |

(Aspherical Surface Data)

Surface number = 6

κ = 1.0000
A4 = 3.84520E−06
A6 = −3.19400E−09
A8 = −2.44510E−11
A10 = 1.16080E−13
Surface number = 26

κ = 1.0000
A4 = −3.46580E−06
A6 = 6.73460E−10
A8 = 0.00000E+00
A10 = 0.00000E+00
Surface number = 29

κ = 1.0000
A4 = −1.44010E−05
A6 = 5.94450E−09
A8 = −3.11020E−11
A10 = −4.07130E−14

(Various Data)
zoom ratio = 15.72

| | f | FNO | ω | Y | TL | Bf |
|---|---|---|---|---|---|---|
| W = | 18.53645 | 3.48547 | 39.03040 | 14.20 | 163.55 | 39.23508 |
| M1 = | 27.58219 | 4.01900 | 26.66707 | 14.20 | 170.26 | 46.33384 |
| M2 = | 49.59390 | 5.38724 | 15.52780 | 14.20 | 187.72 | 63.02959 |
| M3 = | 104.29638 | 5.99810 | 7.42798 | 14.20 | 224.86 | 70.07809 |
| M4 = | 280.11936 | 6.59072 | 2.81545 | 14.20 | 250.69 | 81.49952 |
| T = | 291.48464 | 6.59436 | 2.70726 | 14.20 | 251.38 | 82.08045 |

| | φ | d5 | d15 | d23 | d28 |
|---|---|---|---|---|---|
| W = | 16.40 | 2.13850 | 33.51210 | 3.41920 | 10.26360 |
| M1 = | 16.40 | 10.94060 | 24.32490 | 5.91090 | 7.77190 |
| M2 = | 16.40 | 20.49340 | 15.53470 | 10.06530 | 3.61750 |
| M3 = | 16.40 | 54.83910 | 11.28210 | 11.33700 | 2.34580 |
| M4 = | 17.20 | 78.05500 | 2.48000 | 12.63700 | 1.04580 |
| T = | 17.30 | 78.64320 | 2.00000 | 12.68280 | 1.00000 |

(Lens Group Data)

| Group | I | focal length |
|---|---|---|
| 1 | 1 | 120.82876 |
| 2 | 6 | −15.52570 |
| 3 | 16 | 26.72858 |
| 4 | 24 | −25.10440 |
| 5 | 29 | 34.49933 |

(Values for Conditional Expressions)

(1) f1/fT = 0.415
(2) φT/φW = 1.055
(3) φM10/φW = 1.049 (φM10 is a value in M4)
(4) φM15/φW = 1.049 (φM15 is a value in M4)
(5) φM5/φW = 1.000 (φM5 is a value in M3)
(6) fM/fW = 5.627 (fM is a value in M3)
(7) −f2/fT = 0.0533

Figure 8A:
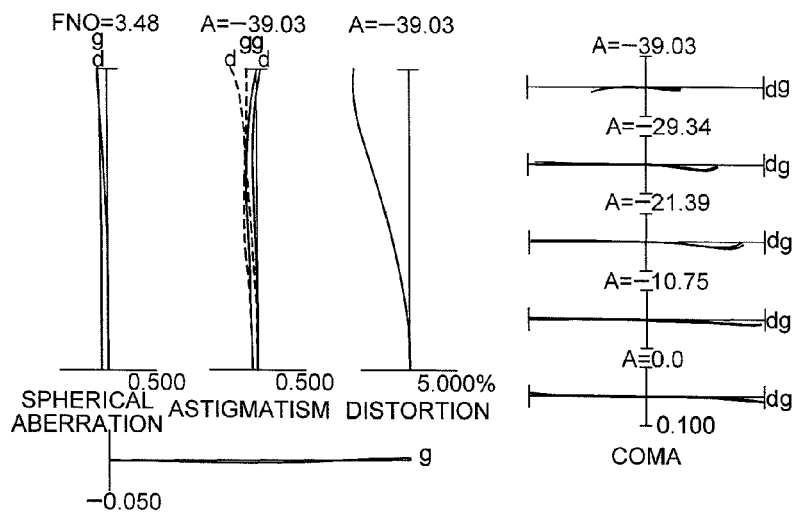
Figure 8B:
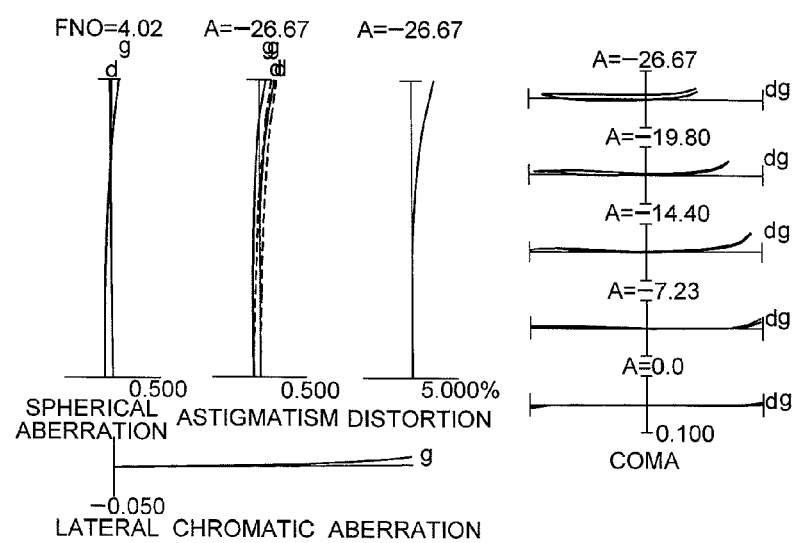
Figure 8C:
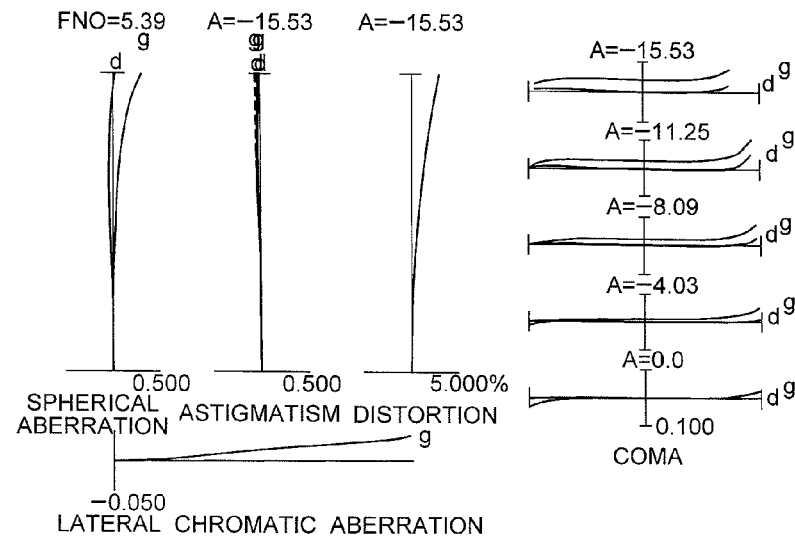

FIGS. 8A, 8B and 8C are graphs showing various aberrations of the zoom lens system according to Example 3 of the first embodiment, in which FIG. 8A is in a wide-angle end state W, FIG. 8B is in a first intermediate focal length state M1, and FIG. 8C is in a second intermediate focal length state M2.

Figure 9A:
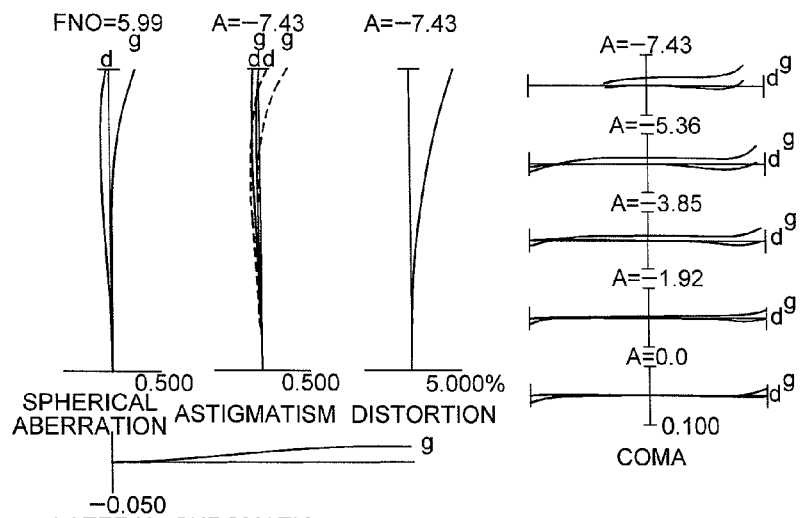
Figure 9B:
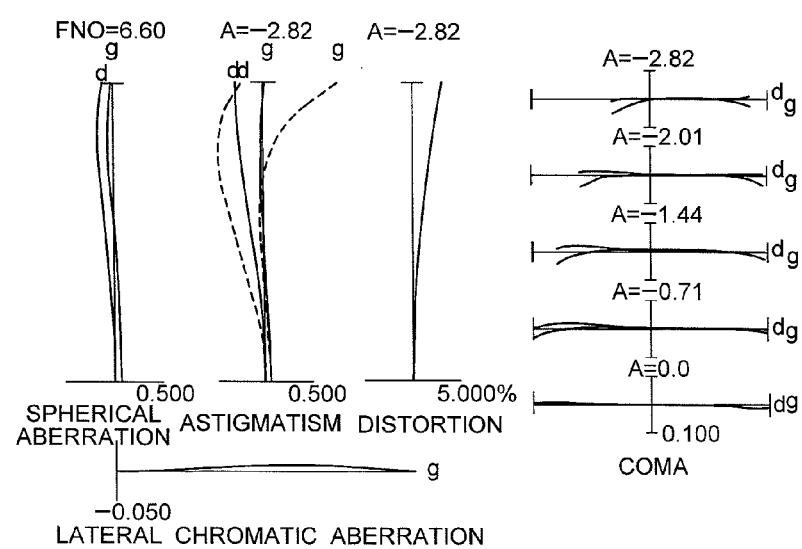
Figure 9C:
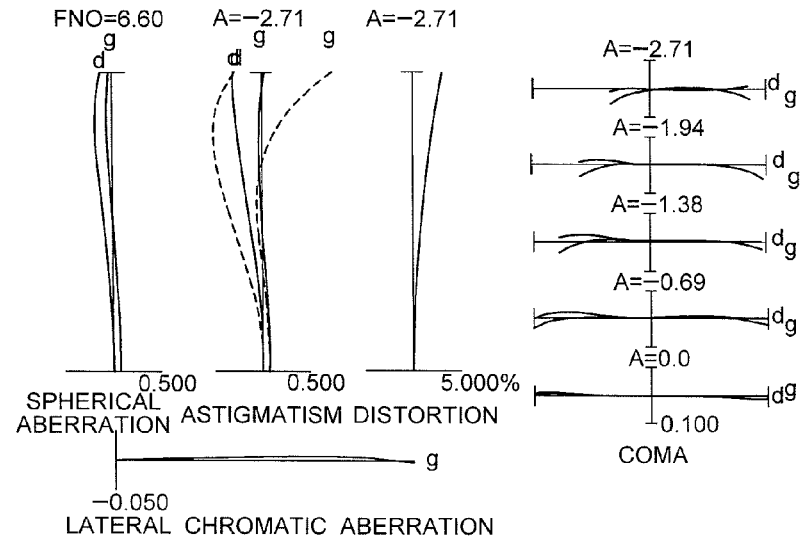

FIGS. 9A, 9B and 9C are graphs showing various aberrations of the zoom lens system according to Example 3 of the second embodiment, in which FIG. 9A is in a third intermediate focal length state M3, FIG. 9B is in a fourth intermediate focal length state M4, and FIG. 9C is in a telephoto end state T.

As is apparent from the respective graphs, the zoom lens according to Example 3 of the first embodiment shows superb optical performance as a result of good corrections to various aberrations from the wide-angle end state through the telephoto end state.

Example 4

Figure 10:
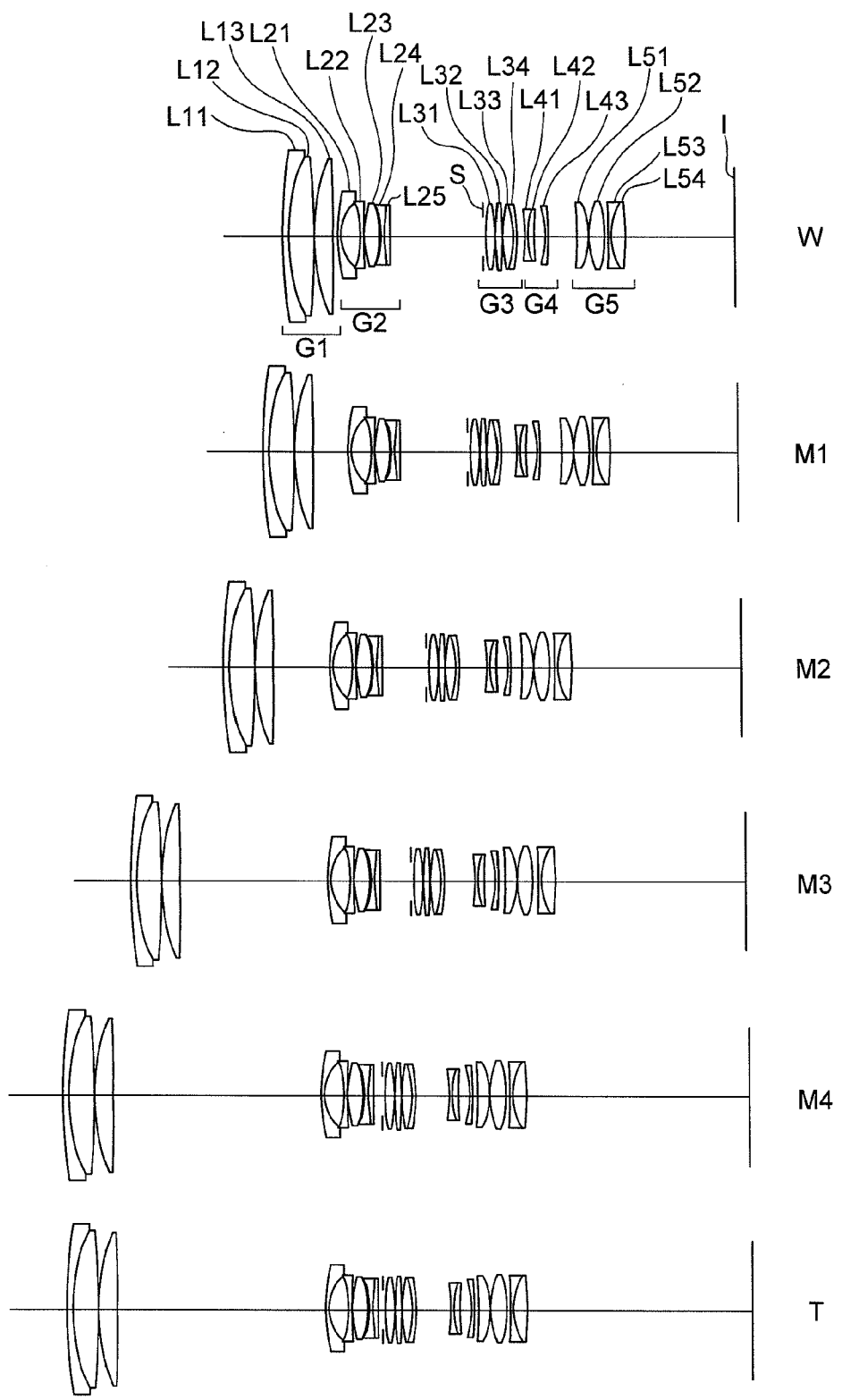
FIG. 10 is a sectional view showing a configuration of a zoom lens system according to Example 4 of the first embodiment.

FIG. 10 is a sectional view showing a configuration of a zoom lens system according to Example 4 of the first embodiment.

As shown in FIG. 10, the zoom lens system according to Example 4 of the first embodiment is composed of, in order from an object side, a first lens group G1 having positive refractive power, a second lens group G2 having negative refractive power, a third lens group G3 having positive refractive power, a fourth lens group G4 having negative refractive power, and a fifth lens group G5 having positive refractive power.

Upon zooming from a wide-angle end state W to a telephoto end state T, the first lens group G1 is moved monotonously to the object side, the second lens group G2 is moved to the image side from the wide-angle end state W to a first intermediate focal length state M1, and to the object side from the first intermediate focal length state M1 to the telephoto end state T, and the third lens group G3 is moved monotonously to the object side with respect to the image plane I such that a distance between the first lens group G1 and the second lens group G2 increases, and a distance between the second lens group G2 and the third lens group G3 decreases. Moreover, the fourth lens group G4 and the fifth lens group G5 are moved monotonously to the object side with respect to the image plane I such that a distance between the third lens group G3 and the fourth lens group G4 increases, and a distance between the fourth lens group G4 and the fifth lens group G5 decreases. Moreover, the third lens group G3 and the fifth lens group G5 are moved in a body with respect to the image plane I.

An aperture stop S is disposed to the most object side of the third lens group G3, which is disposed to the image side of the second lens group G2, and constructed integrally with the third lens group G3. Moreover, upon zooming from the wide-angle end state W to the telephoto end state T, the aperture stop S keeps the maximum diameter of the wide-angle end state W from the wide-angle end state W to a first intermediate focal length state M1, and increases the maximum diameter monotonously from the first intermediate focal length state M1 to the telephoto end state T.

The first lens group G1 is composed of, in order from the object side along an optical axis, a cemented lens constructed by a negative meniscus lens L11 having a convex surface facing the object side cemented with a biconvex positive lens L12, and a positive meniscus lens L13 having a convex surface facing the object side.

The second lens group G2 is composed of, in order from the object side along the optical axis, a negative meniscus lens L21 having a convex surface facing the object side, a biconcave negative lens L22, a biconvex positive lens L23, and a cemented lens constructed by a biconcave negative lens L24 cemented with a biconvex positive lens L25. The negative meniscus lens L21 disposed to the most object side in the second lens group G2 is a compound type aspherical lens in which an aspherical surface is formed by a resin layer provided on the object side lens surface.

The third lens group G3 is composed of, in order from the object side along the optical axis, a biconvex positive lens L31, a biconvex positive lens L32, and a cemented lens constructed by a biconvex positive lens L33 cemented with a negative meniscus lens L34 having a concave surface facing the object side.

The fourth lens group G4 is composed of, in order from the object side along the optical axis, a cemented lens constructed by a biconcave negative lens L41 cemented with a positive meniscus lens L42 having a convex surface facing the object side, and a negative meniscus lens L43 having a concave surface facing the object side. The biconcave negative lens L41 disposed to the most object side of the fourth lens group G4 is a glass mold type aspherical lens in which an aspherical surface is formed on the object side lens surface.

The fifth lens group G5 is composed of, in order from the object side along the optical axis, a positive meniscus lens L51 having a concave surface facing the object side, a biconvex positive lens L52, and a cemented lens constructed by a biconcave negative lens L53 cemented with a biconvex positive lens L54. The positive meniscus lens L51 disposed to the most object side in the fifth lens group G5 is a glass mold type aspherical lens, in which an aspherical surface is formed on the object side lens surface. Light rays come out from the biconvex positive lens L54 form an image on the image plane I.

In a zoom lens system according to Example 4 of the first embodiment, each of the image side lens surface of the biconvex positive lens L12 in the first lens group and the image side lens surface of the negative meniscus lens L21 in the second lens group is applied with an antireflection coating explained later.

The following Table 4 shows values of various items of data of the zoom lens system according to Example 4.

TABLE 4

(Lens Data)

| i | r | d | nd | νd |
|---|---|---|---|---|
| 1 | 185.24410 | 2.20000 | 1.834000 | 37.16 |
| 2 | 68.75480 | 8.80000 | 1.497820 | 82.52 |
| 3 | −497.29190 | 0.10000 | | |
| 4 | 71.28350 | 6.45000 | 1.593190 | 67.87 |
| 5 | 1172.32230 | (d5) | | |
| 6* | 84.76870 | 0.10000 | 1.553890 | 38.09 |
| 7 | 73.93750 | 1.20000 | 1.834807 | 42.72 |
| 8 | 16.75000 | 6.90150 | | |
| 9 | −39.27190 | 1.00000 | 1.816000 | 46.62 |
| 10 | 66.81930 | 0.15000 | | |

TABLE 4-continued

| 11 | 34.96200 | 5.30000 | 1.784723 | 25.68 |
|---|---|---|---|---|
| 12 | −38.10160 | 0.85100 | | |
| 13 | −25.92810 | 1.00000 | 1.816000 | 46.62 |
| 14 | 73.51020 | 2.05000 | 1.808090 | 22.79 |
| 15 | −287.76490 | (d15) | | |
| 16 | ∞ | 1.00000 | Aperture Stop S | |
| 17 | 67.56430 | 3.40000 | 1.593190 | 67.87 |
| 18 | −48.87440 | 0.10000 | | |
| 19 | 67.50290 | 2.45000 | 1.487490 | 70.41 |
| 20 | −148.37490 | 0.10000 | | |
| 21 | 48.80470 | 4.10000 | 1.487490 | 70.41 |
| 22 | −34.96390 | 1.00000 | 1.808090 | 22.79 |
| 23 | −151.08370 | (d23) | | |
| 24* | −60.11270 | 1.00000 | 1.693500 | 53.31 |
| 25 | 28.34580 | 2.15000 | 1.728250 | 28.46 |
| 26 | 78.30380 | 4.62360 | | |
| 27 | −25.31330 | 1.00000 | 1.729157 | 54.66 |
| 28 | −74.02640 | (d28) | | |
| 29* | −258.20790 | 4.30000 | 1.589130 | 61.18 |
| 30 | −24.20710 | 0.10000 | | |
| 31 | 31.58110 | 5.85000 | 1.487490 | 70.41 |
| 32 | −43.77790 | 1.99120 | | |
| 33 | −117.57770 | 1.00000 | 1.882997 | 40.76 |
| 34 | 20.29060 | 5.20000 | 1.548141 | 45.79 |
| 35 | −725.37280 | (Bf) | | |

(Aspherical Surface Data)

Surface number = 6

κ = 1.0000
A4 = 3.04550E−06
A6 = −3.32430E−09
A8 = −1.97490E−11
A10 = 7.65670E−14

Surface number = 24

κ = 1.0000
A4 = 3.99640E−06
A6 = −1.46410E−09
A8 = 0.00000E+00
A10 = 0.00000E+00

Surface number = 29

κ = 1.0000
A4 = −1.52760E−05
A6 = 3.24870E−09
A8 = −4.79200E−12
A10 = −1.47520E−13

(Various Data)
zoom ratio = 15.72

| | f | FNO | ω | Y | TL | Bf |
|---|---|---|---|---|---|---|
| W = | 18.53407 | 4.19822 | 39.09871 | 14.20 | 163.83 | 39.11654 |
| M1 = | 28.28311 | 4.84518 | 25.91447 | 14.20 | 172.73 | 46.29035 |
| M2 = | 49.61061 | 5.60962 | 15.52706 | 14.20 | 188.63 | 62.64242 |
| M3 = | 104.44333 | 5.63139 | 7.44054 | 14.20 | 224.05 | 69.74259 |
| M4 = | 280.42014 | 5.64795 | 2.81841 | 14.20 | 249.11 | 81.54926 |
| T = | 291.31408 | 5.65065 | 2.71459 | 14.20 | 249.82 | 82.19687 |

| | φ | d5 | d15 | d23 | d28 |
|---|---|---|---|---|---|
| W = | 13.60 | 2.15320 | 33.72460 | 3.38090 | 9.98840 |
| M1 = | 13.60 | 13.04850 | 24.55710 | 5.75490 | 7.61440 |
| M2 = | 15.70 | 21.16970 | 15.98250 | 9.65610 | 3.71320 |
| M3 = | 17.60 | 53.87340 | 11.59370 | 11.06770 | 2.30160 |
| M4 = | 20.35 | 76.26610 | 2.46300 | 12.30820 | 1.06110 |
| T = | 20.50 | 76.78310 | 2.00000 | 12.36930 | 1.00000 |

(Lens Group Data)

| Group | I | focal length |
|---|---|---|
| 1 | 1 | 118.41983 |
| 2 | 6 | −15.62139 |
| 3 | 16 | 27.10600 |

TABLE 4-continued

| | | |
|---|---|---|
| 4 | 24 | −24.65991 |
| 5 | 29 | 33.56757 |

(Values for Conditional Expressions)

(1) f1/fT = 0.407
(2) φT/φW = 1.507
(3) φM10/φW = 1.496 (φM10 is a value in M4)
(4) φM15/φW = 1.496 (φM15 is a value in M4)
(5) φM5/φW = 1.294 (φM5 is a value in M3)
(6) fM/fW = 1.526 (fM is a value in M1)
(7) −f2/fT = 0.0536

Figure 11A:
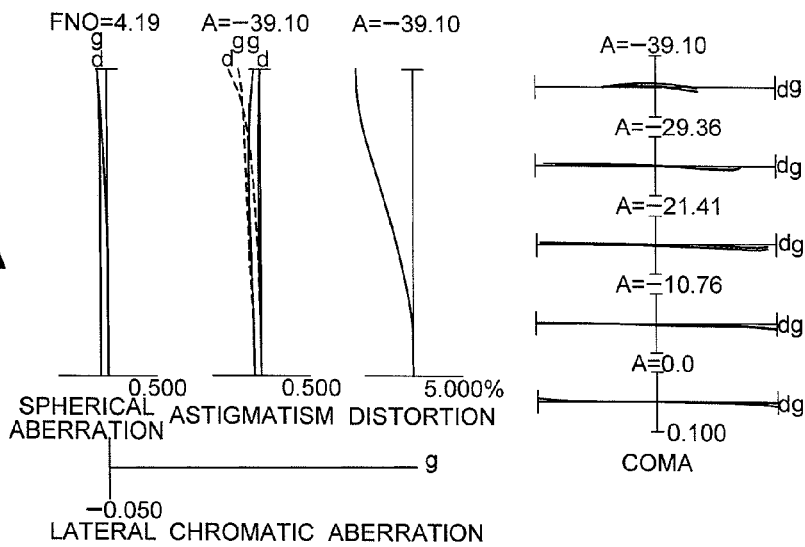
Figure 11B:
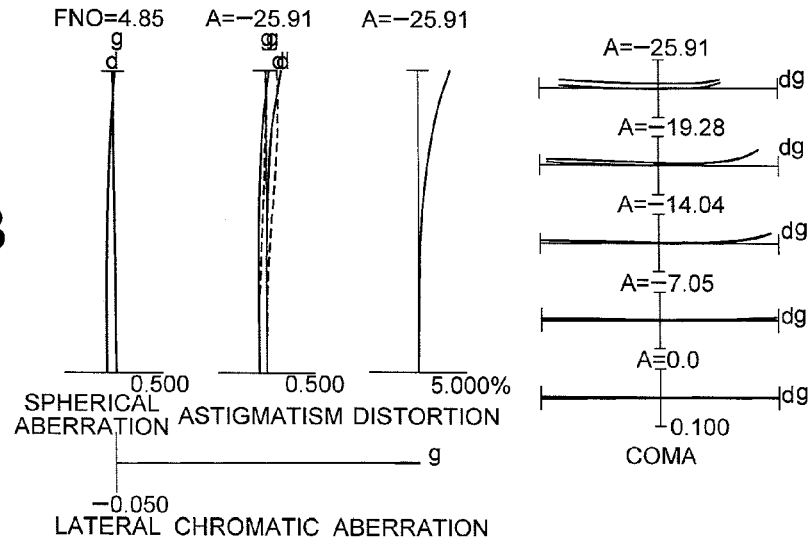
Figure 11C:
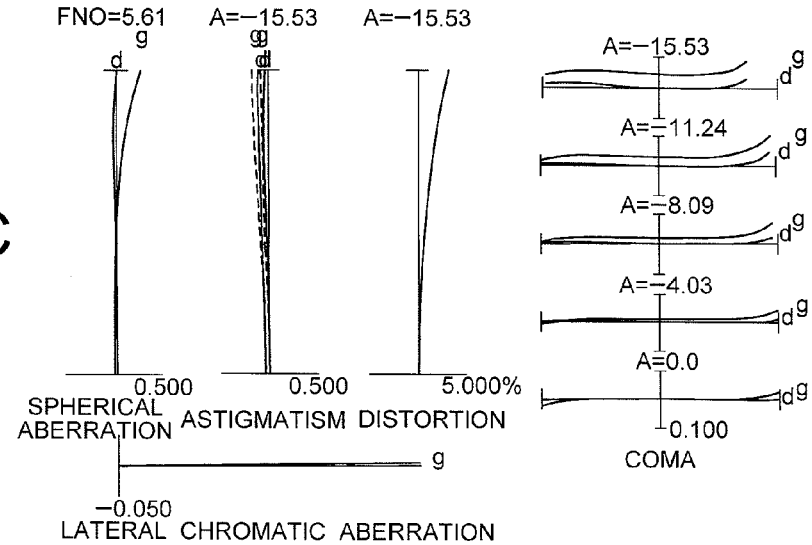

FIGS. 11A, 11B and 11C are graphs showing various aberrations of the zoom lens system according to Example 4 of the first embodiment, in which FIG. 11A is in a wide-angle end state W, FIG. 11B is in a first intermediate focal length state M1, and FIG. 11C is in a second intermediate focal length state M2.

Figure 12A:
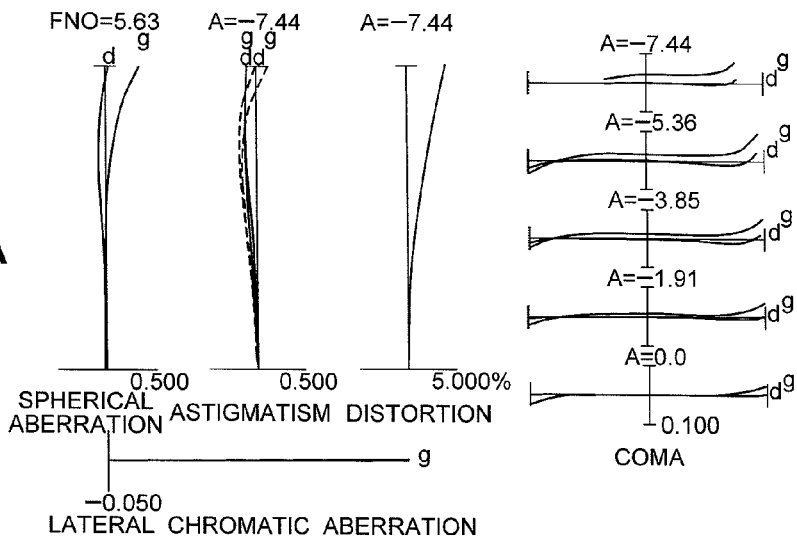
Figure 12B:
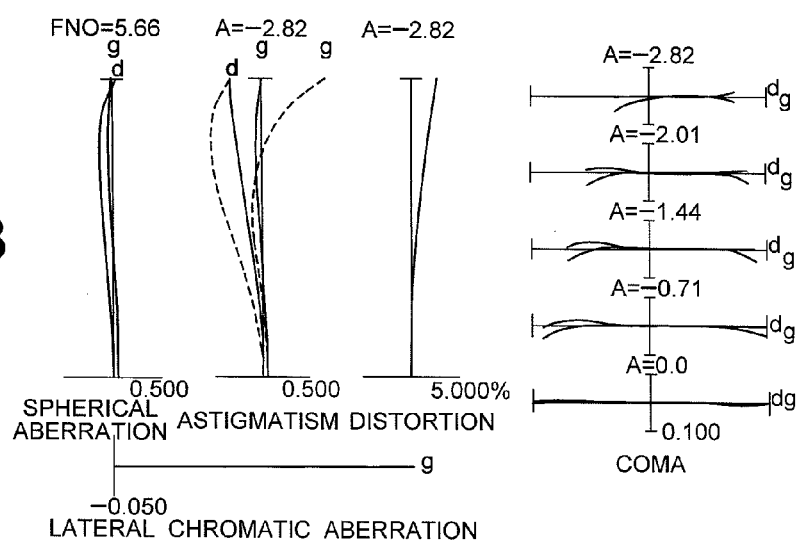
Figure 12C:
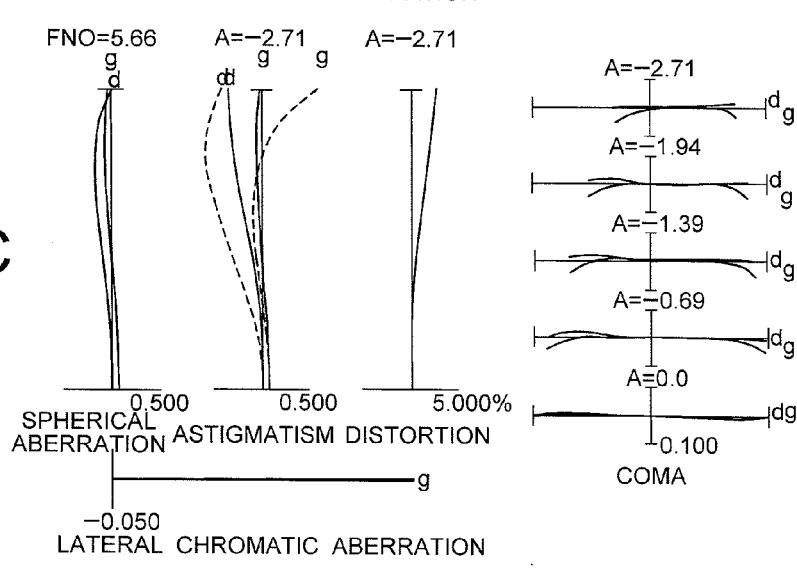

FIGS. 12A, 12B and 12C are graphs showing various aberrations of the zoom lens system according to Example 4 of the first embodiment, in which FIG. 12A is in a third intermediate focal length state M3, FIG. 12B is in a fourth intermediate focal length state M4, and FIG. 12C is in a telephoto end state T.

As is apparent from the respective graphs, the zoom lens according to Example 4 of the first embodiment shows superb optical performance as a result of good corrections to various aberrations from the wide-angle end state through the telephoto end state.

Example 5

Figure 13:
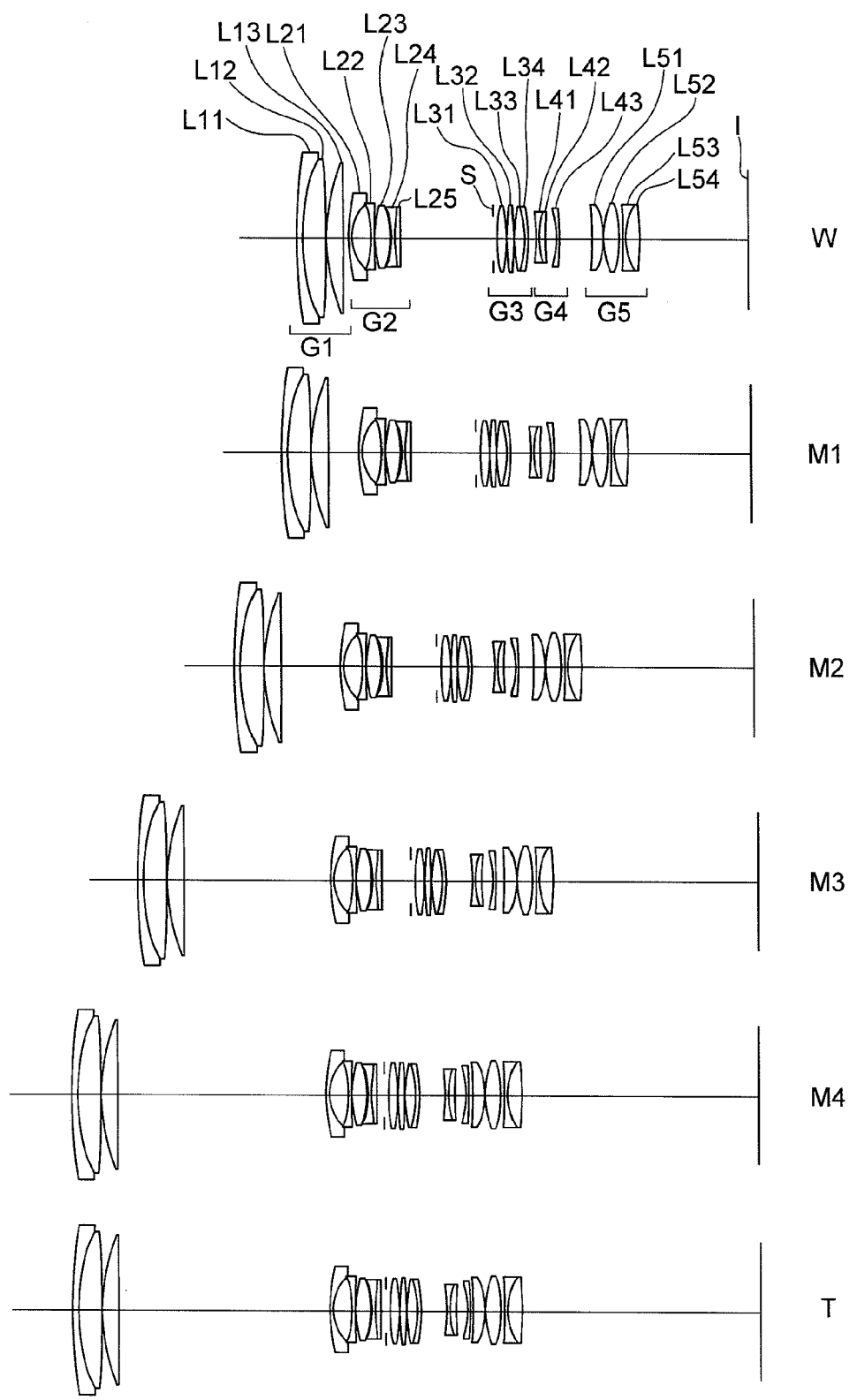
FIG. 13 is a sectional view showing a configuration of a zoom lens system according to Example 5 of the first embodiment.

FIG. 13 is a sectional view showing a configuration of a zoom lens system according to Example 5 of the first embodiment.

As shown in FIG. 13, the zoom lens system according to Example 5 of the first embodiment is composed of, in order from an object side, a first lens group G1 having positive refractive power, a second lens group G2 having negative refractive power, a third lens group G3 having positive refractive power, a fourth lens group G4 having negative refractive power, and a fifth lens group G5 having positive refractive power.

Upon zooming from a wide-angle end state W to a telephoto end state T, the first lens group G1 is moved monotonously to the object side, the second lens group G2 is moved to the image side from the wide-angle end state W to a first intermediate focal length state M1, and to the object side from the first intermediate focal length state M1 to the telephoto end state T, and the third lens group G3 is moved monotonously to the object side with respect to the image plane I such that a distance between the first lens group G1 and the second lens group G2 increases, and a distance between the second lens group G2 and the third lens group G3 decreases. Moreover, the fourth lens group G4 and the fifth lens group G5 are moved monotonously to the object side with respect to the image plane I such that a distance between the third lens group G3 and the fourth lens group G4 increases, and a distance between the fourth lens group G4 and the fifth lens group G5 decreases.

An aperture stop S is disposed to the most object side of the third lens group G3, which is disposed to the image side of the second lens group G2, and constructed integrally with the third lens group G3. Moreover, upon zooming from the wide-angle end state W to the telephoto end state T, the aperture stop S keeps the maximum diameter of the wide-angle end state W from the wide-angle end state W to a second intermediate focal length state M2, and increases the maximum diameter monotonously from the second intermediate focal length state M2 to the telephoto end state T.

The first lens group G1 is composed of, in order from the object side along an optical axis, a cemented lens constructed by a negative meniscus lens L11 having a convex surface facing the object side cemented with a biconvex positive lens L12, and a positive meniscus lens L13 having a convex surface facing the object side.

The second lens group G2 is composed of, in order from the object side along the optical axis, a negative meniscus lens L21 having a convex surface facing the object side, a biconcave negative lens L22, a biconvex positive lens L23, and a cemented lens constructed by a biconcave negative lens L24 cemented with a biconvex positive lens L25. The negative meniscus lens L21 disposed to the most object side in the second lens group G2 is a compound type aspherical lens in which an aspherical surface is formed by a resin layer provided on the object side lens surface.

The third lens group G3 is composed of, in order from the object side along the optical axis, a biconvex positive lens L31, a biconvex positive lens L32, and a cemented lens constructed by a biconvex positive lens L33 cemented with a negative meniscus lens L34 having a concave surface facing the object side.

The fourth lens group G4 is composed of, in order from the object side along the optical axis, a cemented lens constructed by a biconcave negative lens L41 cemented with a positive meniscus lens L42 having a convex surface facing the object side, and a negative meniscus lens L43 having a concave surface facing the object side. The biconcave negative lens L41 disposed to the most object side of the fourth lens group G4 is a compound type aspherical lens in which an aspherical surface is formed by a resin layer provided on the object side lens surface.

The fifth lens group G5 is composed of, in order from the object side along the optical axis, a biconvex positive lens L51, a biconvex positive lens L52, and a cemented lens constructed by a biconcave negative lens L53 cemented with a biconvex positive lens L54. The positive meniscus lens L51 disposed to the most object side in the fifth lens group G5 is a glass mold type aspherical lens, in which an aspherical surface is formed on the object side lens surface. Light rays come out from the biconvex positive lens L54 form an image on the image plane I.

In a zoom lens system according to Example 5 of the first embodiment, each of the image side lens surface of the biconvex positive lens L12 in the first lens group G1 and the image side lens surface of the biconvex positive lens L23 in the second lens group G2 is applied with an antireflection coating explained later.

The following Table 5 shows values of various items of data of the zoom lens system according to Example 5.

TABLE 5

(Lens Data)

| i | r | d | nd | vd |
|---|---|---|---|---|
| 1 | 175.60560 | 2.20000 | 1.834000 | 37.16 |
| 2 | 67.43020 | 8.80000 | 1.497820 | 82.52 |
| 3 | −587.78480 | 0.10000 | | |
| 4 | 72.27100 | 6.45000 | 1.593190 | 67.87 |
| 5 | 1826.13880 | (d5) | | |
| 6* | 84.76870 | 0.10000 | 1.553890 | 38.09 |
| 7 | 73.93750 | 1.20000 | 1.834807 | 42.72 |

TABLE 5-continued

| | | | | |
|---|---|---|---|---|
| 8 | 17.18730 | 6.95000 | | |
| 9 | −36.98220 | 1.00000 | 1.816000 | 46.62 |
| 10 | 77.92630 | 0.15000 | | |
| 11 | 36.63460 | 5.30000 | 1.784723 | 25.68 |
| 12 | −36.63460 | 0.80000 | | |
| 13 | −26.19910 | 1.00000 | 1.816000 | 46.62 |
| 14 | 63.73960 | 2.05000 | 1.808090 | 22.79 |
| 15 | −643.27060 | (d15) | | |
| 16 | ∞ | 1.00000 | Aperture Stop S | |
| 17 | 65.83650 | 3.40000 | 1.593190 | 67.87 |
| 18 | −50.15460 | 0.10000 | | |
| 19 | 65.68170 | 2.45000 | 1.487490 | 70.41 |
| 20 | −154.97430 | 0.10000 | | |
| 21 | 46.73330 | 4.20000 | 1.487490 | 70.41 |
| 22 | −35.78330 | 1.00000 | 1.808090 | 22.79 |
| 23 | −191.93180 | (d23) | | |
| 24* | −57.29660 | 0.20000 | 1.553890 | 38.09 |
| 25 | −59.72500 | 0.90000 | 1.696797 | 55.52 |
| 26 | 28.51000 | 2.15000 | 1.728250 | 28.46 |
| 27 | 91.99760 | 4.14020 | | |
| 28 | −32.89540 | 1.00000 | 1.729157 | 54.66 |
| 29 | −144.33150 | (d29) | | |
| 30* | 6427.19190 | 4.65000 | 1.589130 | 61.18 |
| 31 | −27.38180 | 0.10000 | | |
| 32 | 31.47760 | 5.85000 | 1.487490 | 70.41 |
| 33 | −43.75390 | 1.45000 | | |
| 34 | −113.58970 | 1.00000 | 1.882997 | 40.76 |
| 35 | 20.34810 | 5.30000 | 1.548141 | 45.79 |
| 36 | −709.14530 | (Bf) | | |

(Aspherical Surface Data)

Surface number = 6

κ = 1.0000
A4 = 2.88220E−06
A6 = −2.29350E−11
A8 = −2.35280E−11
A10 = 9.21570E−14

Surface number = 24

κ = 1.0000
A4 = 4.32780E−06
A6 = 1.88460E−09
A8 = 0.00000E+00
A10 = 0.00000E+00

Surface number = 30

κ = 1.0000
A4 = −1.36170E−05
A6 = −3.55860E−10
A8 = 1.83080E−11
A10 = −1.86790E−13

(Various Data)
zoom ratio = 15.70

| | f | FNO | ω | Y | TL | Bf |
|---|---|---|---|---|---|---|
| W = | 18.56060 | 3.57565 | 38.80191 | 14.20 | 164.76 | 38.84705 |
| M1 = | 27.94799 | 4.13253 | 26.18802 | 14.20 | 171.03 | 44.06807 |
| M2 = | 48.95245 | 5.36204 | 15.68652 | 14.20 | 189.45 | 62.50183 |
| M3 = | 104.65150 | 5.62482 | 7.44205 | 14.20 | 225.29 | 73.57929 |
| M4 = | 280.18763 | 5.80434 | 2.82863 | 14.20 | 249.99 | 86.00428 |
| T = | 291.42454 | 5.81064 | 2.72113 | 14.20 | 250.61 | 86.64770 |

| | φ | d5 | d15 | d23 | d29 |
|---|---|---|---|---|---|
| W = | 15.80 | 2.15700 | 33.36360 | 3.46820 | 11.83830 |
| M1 = | 15.80 | 11.13190 | 23.94380 | 7.42730 | 9.36420 |
| M2 = | 15.80 | 22.22690 | 15.96870 | 8.95240 | 4.70680 |
| M3 = | 17.50 | 53.01000 | 11.30360 | 9.64300 | 2.66290 |
| M4 = | 19.50 | 75.67850 | 2.48130 | 9.67390 | 1.06600 |
| T = | 19.60 | 76.25220 | 2.00000 | 9.62460 | 1.00000 |

TABLE 5-continued (Lens Group Data)

| Group | I | focal length |
|---|---|---|
| 1 | 1 | 117.72937 |
| 2 | 6 | −15.60945 |
| 3 | 16 | 27.35473 |
| 4 | 24 | −26.50041 |
| 5 | 30 | 35.20423 |

(Values for Conditional Expressions)

(1) f1/fT = 0.404
(2) φT/φW = 1.241
(3) φM10/φW = 1.234 (φM10 is a value in M4)
(4) φM15/φW = 1.234 (φM15 is a value in M4)
(5) φM5/φW = 1.108 (φM5 is a value in M3)
(6) fM/fW = 2.637 (fM is a value in M2)
(7) −f2/fT = 0.0536

Figure 14A:
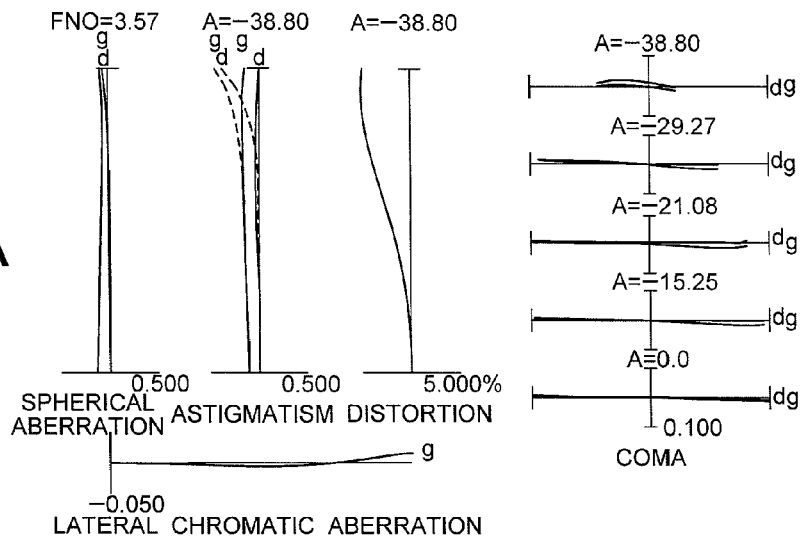
Figure 14B:
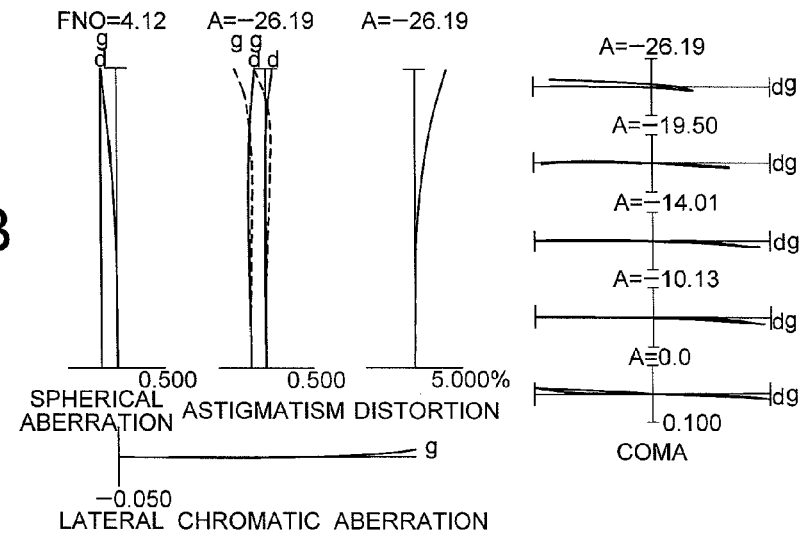
Figure 14C:
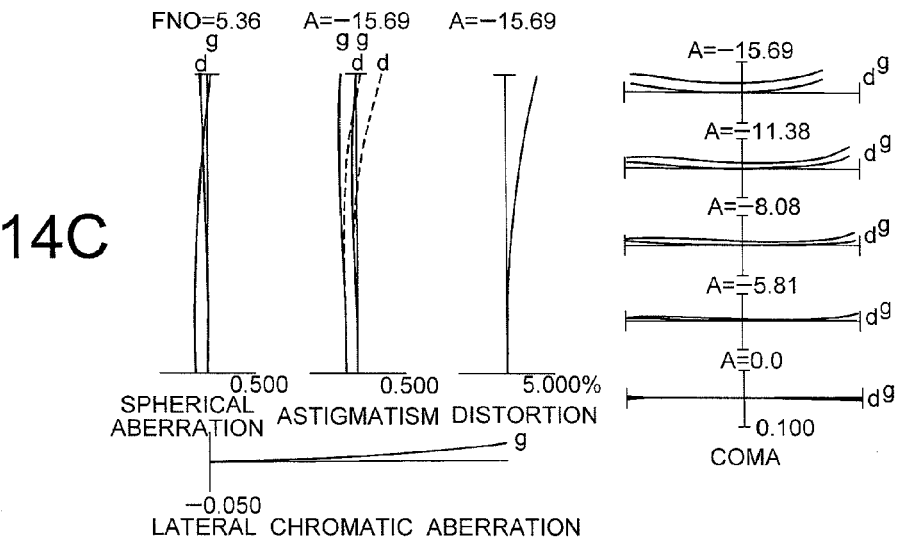

FIGS. 14A, 14B and 14C are graphs showing various aberrations of the zoom lens system according to Example 5 of the first embodiment, in which FIG. 14A is in a wide-angle end state W, FIG. 14B is in a first intermediate focal length state M1, and FIG. 14C is in a second intermediate focal length state M2.

Figure 15A:
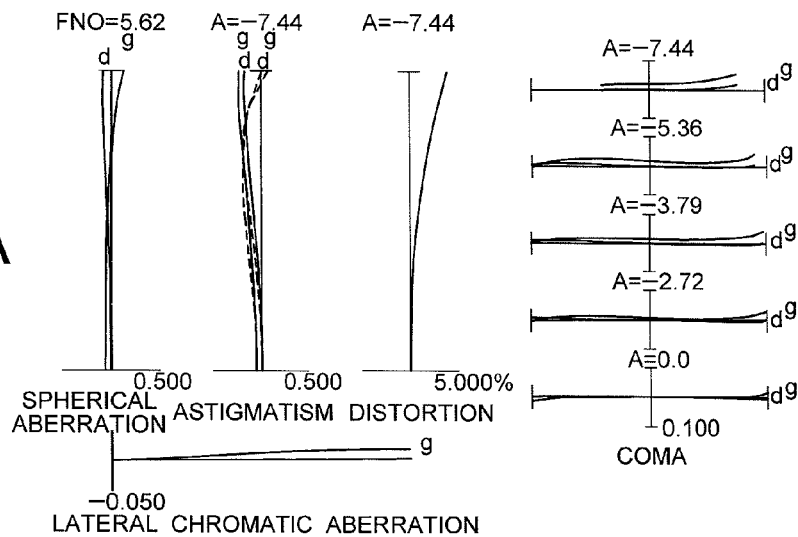
Figure 15B:
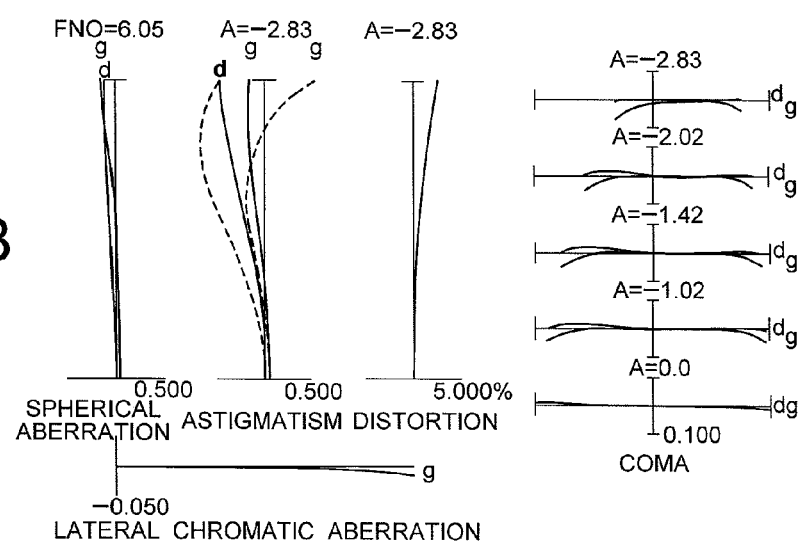
Figure 15C:
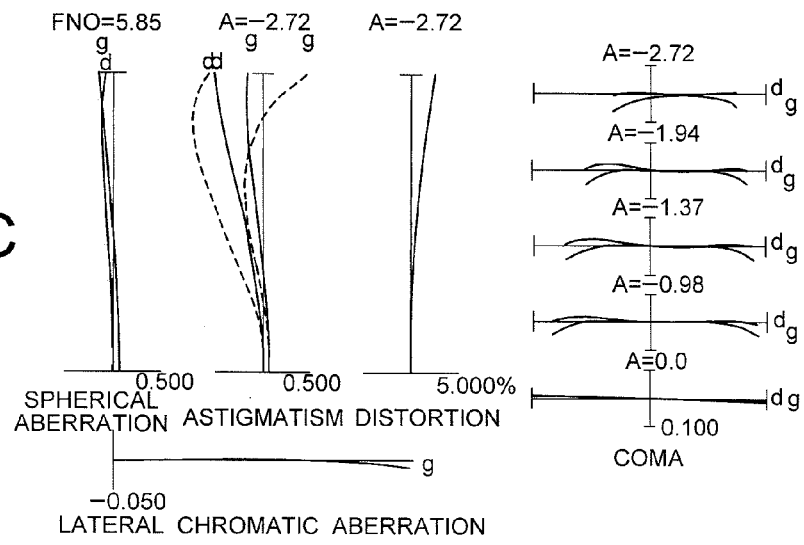

FIGS. 15A, 15B and 15C are graphs showing various aberrations of the zoom lens system according to Example 5 of the first embodiment, in which FIG. 15A is in a third intermediate focal length state M3, FIG. 15B is in a fourth intermediate focal length state M4, and FIG. 15C is in a telephoto end state T.

As is apparent from the respective graphs, the zoom lens according to Example 5 of the first embodiment shows superb optical performance as a result of good corrections to various aberrations from the wide-angle end state through the telephoto end state.

As described above, the first embodiment makes it possible to provide a zoom lens system having high optical performance with suppressing variation in aberrations.

Figure 39:
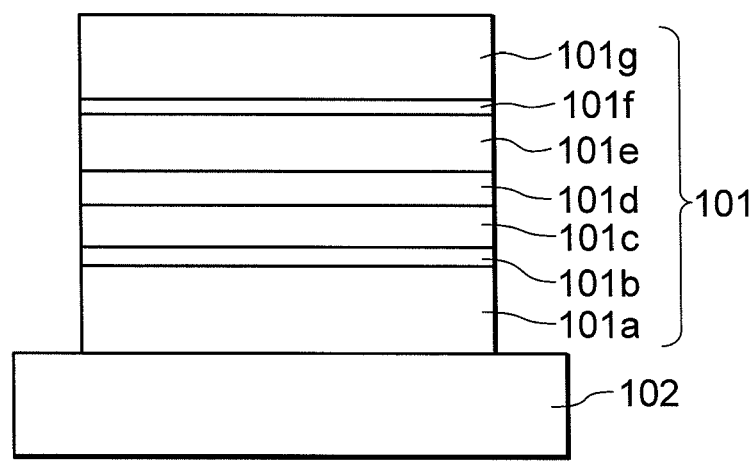
FIG. 39 is an explanatory view showing a configuration of an antireflection coating used in a zoom lens system according to the present application.

Then, an antireflection coating (which is also referred to as a multi-layered broadband antireflection coating) used for zoom lens systems according to present application will be described. FIG. 39 is a view showing one example of a film structure of an antireflection coating. This antireflection coating 101 is a 7-layered film formed on an optical surface of an optical member 102 such as a lens. A first layer 101a is composed of aluminum oxide that is vapor-deposited by a vacuum evaporation method. A second layer 101b composed of a mixture of titanium oxide and zirconium oxide that are vapor-deposited by the vacuum evaporation method, is further formed on the first layer 101a. Moreover, a third layer 101c composed of the aluminum oxide that is vapor-deposited by the vacuum evaporation method is formed on the second layer 101b, and a fourth layer 101d composed of the mixture of titanium oxide and zirconium oxide that are vapor-deposited by the vacuum evaporation method, is further formed on the third layer 101c. Still further, a fifth layer 101e composed of aluminum oxide that is vapor-deposited by the vacuum evaporation method is formed on the fourth layer 101d, and a sixth layer 101f composed of the mixture of titanium oxide and zirconium oxide that are vapor-deposited by the vacuum evaporation method, is further formed on the fifth layer 101e.

Then, a seventh layer 101g composed of a mixture of magnesium fluoride and silica is formed by a wet process on the thus-formed sixth layer 101f, thus forming the antireflection coating 101 according to the present embodiment. The formation of the seventh layer 101g involves using a sol-gel process classified as one type of the wet process. The sol-gel process is a process of transforming a sol acquired by mixing a material into a gel having no fluidity through hydrolyzing condensation polymerization reaction and acquiring a product by heat-decomposing this gel. In manufacturing an optical thin film, the film may be generated by coating a material sol of the optical thin film over the optical surface of the optical member and dry-solidifying the sol into a gel film. Note that the wet process may involve using, without being limited to the sol-gel process, a process of acquiring a solid-state film through none of the gel state.

Thus, the first layer 101a through the sixth layer 101f of the antireflection coating 101 are formed by electron beam evaporation defined as a dry process, and the uppermost seventh layer 101g is formed in the following procedures by the wet process using a sol liquid prepared by a hydrogen fluoride/acetic acid magnesium process. To begin with, an aluminum oxide layer serving as the first layer 101a, a titanium oxide-zirconium oxide mixture layer serving as the second layer 101b, an aluminum oxide layer serving as the third layer 101c, a titanium oxide-zirconium oxide mixture layer serving as the fourth layer 101d, an aluminum oxide layer serving as the fifth layer 101e and a titanium oxide-zirconium oxide mixture layer serving as the sixth layer 101f, are formed beforehand in this sequence on a lens film growth surface (the optical surface of the optical member 102 described above) by using a vacuum evaporation apparatus. Then, after taking the optical member 102 out of the evaporation apparatus, the layer composed of a mixture of magnesium fluoride and silica is formed as the seventh layer 101g by coating silicon alkoxide-added sol liquid prepared by the hydrogen fluoride/acetic acid magnesium process in a way that uses a spin coating method. The formula (a) given below is a reaction formula on the occasion of being prepared by the hydrogen fluoride/acetic acid magnesium process:

$$2HF+Mg(CH3COO)2 \rightarrow MgF2+2CH3COOH \quad (a).$$

The sol liquid used for this film growth, after mixing the materials and after conducting a high-temperature pressurization maturing process at 140° C. for 24 hours in an autoclave, is used for growing the film. The optical member 102, after finishing the film growth of the seventh layer 101g, undergoes a heating process at 160° C. for one hour in the atmospheric air and is thus completed. With the use of the sol-gel process, particles on the order of several nanometers (nm) to several dozens nanometers (nm) in particle size are deposited while the air gaps remain, thereby forming the seventh layer 101g.

Optical performance of the optical member including the thus-formed antireflection coating 101 will hereinafter be described by using spectral characteristics shown in FIG. 40.

The optical member (lens) including the antireflection coating according to the present embodiment is formed under the conditions shown in the following Table 19. Herein, the Table 19 shows respective optical film thicknesses of the layers 101a (the first layer) through 101g (the seventh layer) of the antireflection coating 101, which are obtained under such conditions that λ denotes a reference wavelength and the refractive index of the substrate (optical member) is set to 1.62, 1.74 and 1.85. Note that the Table 19 shows $Al_2O_3$ expressed as the aluminum oxide, $ZrO_2+TiO_2$ expressed as the mixture of titanium oxide and zirconium oxide and $MgF_2+SiO_2$ expressed as the mixture of magnesium fluoride and silica.

Figure 40:
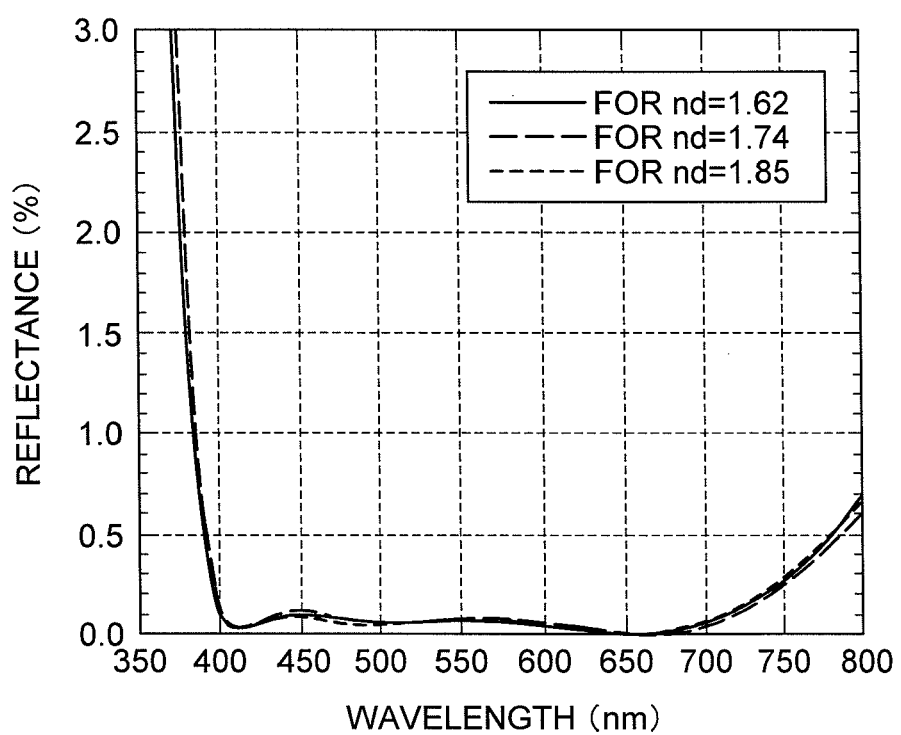
FIG. 40 is a graph showing spectral reflectance of an antireflection coating used in a zoom lens system according to the present application.

FIG. 40 shows the spectral characteristics when the light beams vertically get incident on the optical member in which the optical film thickness of each of the layers of the antireflection coating 101 is designed, with the reference wavelength λ set to 550 nm in the Table 19.

It is understood from FIG. 40 that the optical member including the antireflection coating 101 designed with the reference wavelength λ set to 550 nm can restrain the reflectance down to 0.2% or less over the entire range in which the wavelengths of the light beams are 420 nm through 720 nm. Further, in the Table 19, even the optical member including the antireflection coating 101, in which each optical film thickness is designed with the reference wavelength λ set to the d-line (wavelength 587.6 nm), has substantially the same spectral characteristics as in the case where the reference wavelength λ shown in FIG. 40 is 550 nm in a way that affects substantially none of the spectral characteristics thereof.

TABLE 19

| layer | material | n | thicknesses of layers | | |
|---|---|---|---|---|---|
| | medium air | 1 | | | |
| 7 | MgF2 + SiO2 | 1.26 | 0.268λ | 0.271λ | 0.269λ |
| 6 | ZrO2 + TiO2 | 2.12 | 0.057λ | 0.054λ | 0.059λ |
| 5 | Al2O3 | 1.65 | 0.171λ | 0.178λ | 0.162λ |
| 4 | ZrO2 + TiO2 | 2.12 | 0.127λ | 0.13λ | 0.158λ |
| 3 | Al2O3 | 1.65 | 0.122λ | 0.107λ | 0.08λ |
| 2 | ZrO2 + TiO2 | 2.12 | 0.059λ | 0.075λ | 0.105λ |
| 1 | Al2O3 | 1.65 | 0.257λ | 0.03λ | 0.03λ |
| n | (substrate) | | 1.62 | 1.74 | 1.85 |

Next, a modified example of the antireflection coating will be explained. The antireflection coating is a 5-layered film, and, similarly to the Table 19, the optical film thickness of each layer with respect to the reference wavelength λ is designed under conditions shown in the following Table 20. In this modified example, the formation of the fifth layer involves using the sol-gel process described above.

Figure 41:
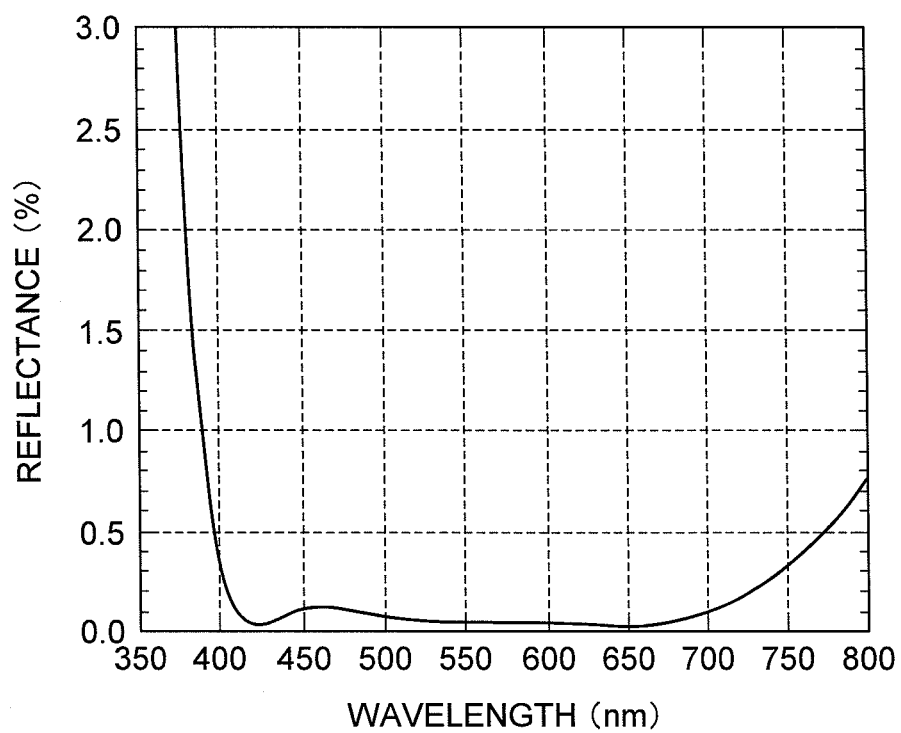
FIG. 41 is a graph showing spectral reflectance of a variation of an antireflection coating used in a zoom lens system according to the present application.

FIG. 41 shows the spectral characteristics when the light beams vertically get incident on the optical member in which the optical film thickness of each of the layers is designed, with the substrate refractive index set to 1.52 and the reference wavelength λ set to 550 nm in the Table 20. It is understood from FIG. 41 that the antireflection coating in the modified example can restrain the reflectance down to 0.2% or less over the entire range in which the wavelengths of the light beams are 420 nm-720 nm. Note that in the Table 20, even the optical member including the antireflection coating, in which each optical film thickness is designed with the reference wavelength λ set to the d-line (wavelength 587.6 nm), has substantially the same spectral characteristics as the spectral characteristics shown in FIG. 41 in a way that affects substantially none of the spectral characteristics thereof.

Figure 42:
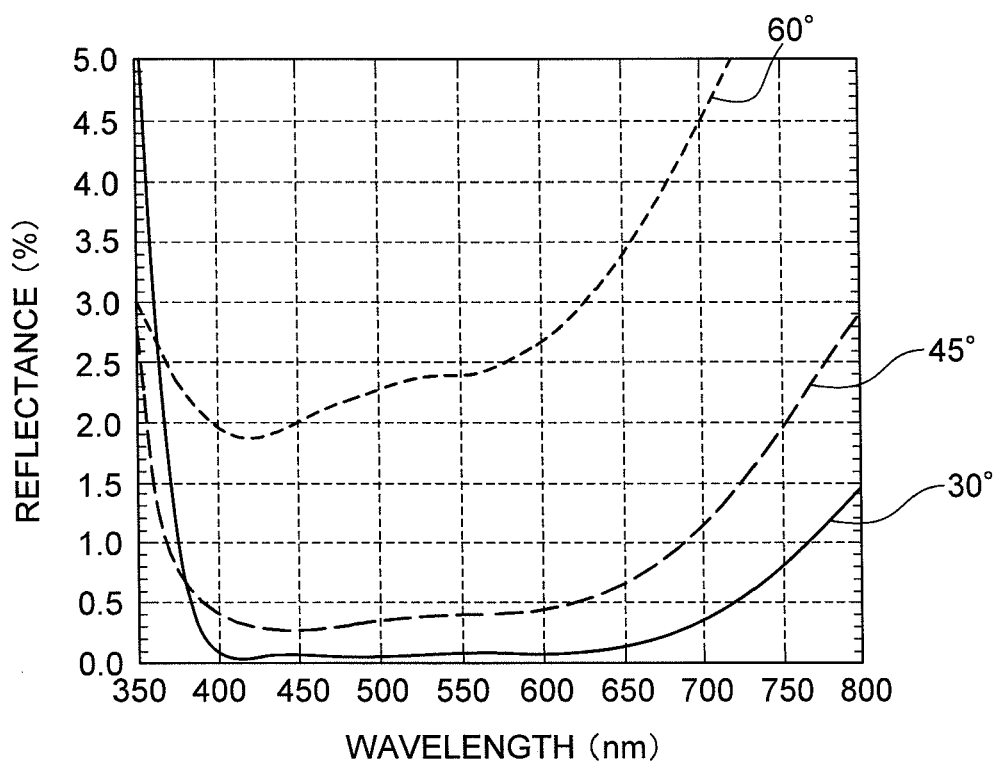
FIG. 42 is a graph showing angular dependence of spectral reflectance of a variation of an antireflection coating used in a zoom lens system according to the present application.

FIG. 42 shows the spectral characteristics in such a case that the incident angles of the light beams upon the optical member having the spectral characteristics shown in FIG. 41 are 30 degrees, 45 degrees and 60 degrees, respectively. Note that FIGS. 41 and 42 do not illustrate the spectral characteristics of the optical member including the antireflection coating shown in Table 20 in which the substrate refractive index is 1.46, however, it is understood that the optical member has substantially the same spectral characteristics such as the substrate refractive index being 1.52.

TABLE 20

| layer | material | n | thicknesses of layers | |
|---|---|---|---|---|
| | medium air | 1 | | |
| 5 | MgF2 + SiO2 | 1.26 | 0.275λ | 0.269λ |
| 4 | ZrO2 + TiO2 | 2.12 | 0.045λ | 0.043λ |
| 3 | Al2O3 | 1.65 | 0.212λ | 0.217λ |
| 2 | ZrO2 + TiO2 | 2.12 | 0.077λ | 0.066λ |
| 1 | Al2O3 | 1.65 | 0.288λ | 0.290λ |
| n | (substrate) | | 1.46 | 1.52 |

Figure 43:
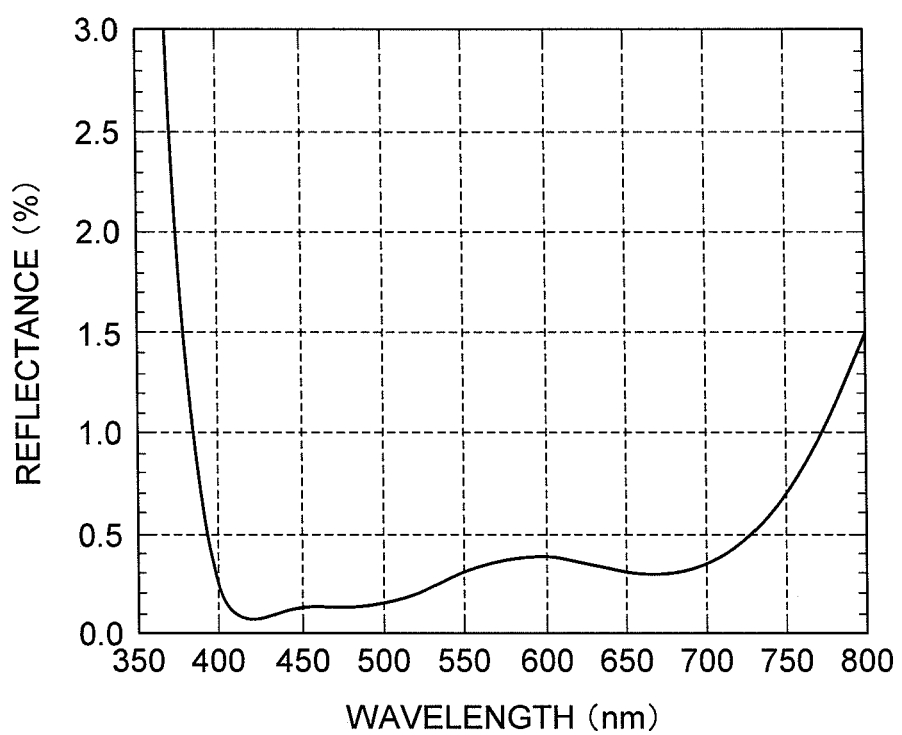
FIG. 43 is a graph showing spectral reflectance of an antireflection coating according to a conventional example.

Furthermore, FIG. 43 shows one example of the antireflection coating grown by only the dry process such as the conventional vacuum evaporation method by way of a comparison. FIG. 43 shows the spectral characteristics when the light beams get incident on the optical member in which to design the antireflection coating structured under the conditions shown in the following Table 21, with the substrate refractive index set to 1.52 in the same way as in the Table 6. Moreover, FIG. 44 shows the spectral characteristics in such a case that the incident angles of the light beams upon the optical member having the spectral characteristics shown in FIG. 43 are 30 degrees, 45 degrees and 60 degrees, respectively.

TABLE 21

| layer | material | n | thicknesses of layers |
|---|---|---|---|
| | medium air | 1 | |
| 7 | MgF2 | 1.39 | 0.243λ |
| 6 | ZrO2 + TiO2 | 2.12 | 0.119λ |
| 5 | Al2O3 | 1.65 | 0.057λ |
| 4 | ZrO2 + TiO2 | 2.12 | 0.220λ |
| 3 | Al2O3 | 1.65 | 0.064λ |
| 2 | ZrO2 + TiO2 | 2.12 | 0.057λ |
| 1 | Al2O3 | 1.65 | 0.193λ |
| refractive index of substrate | | | 1.52 |

Figure 44:
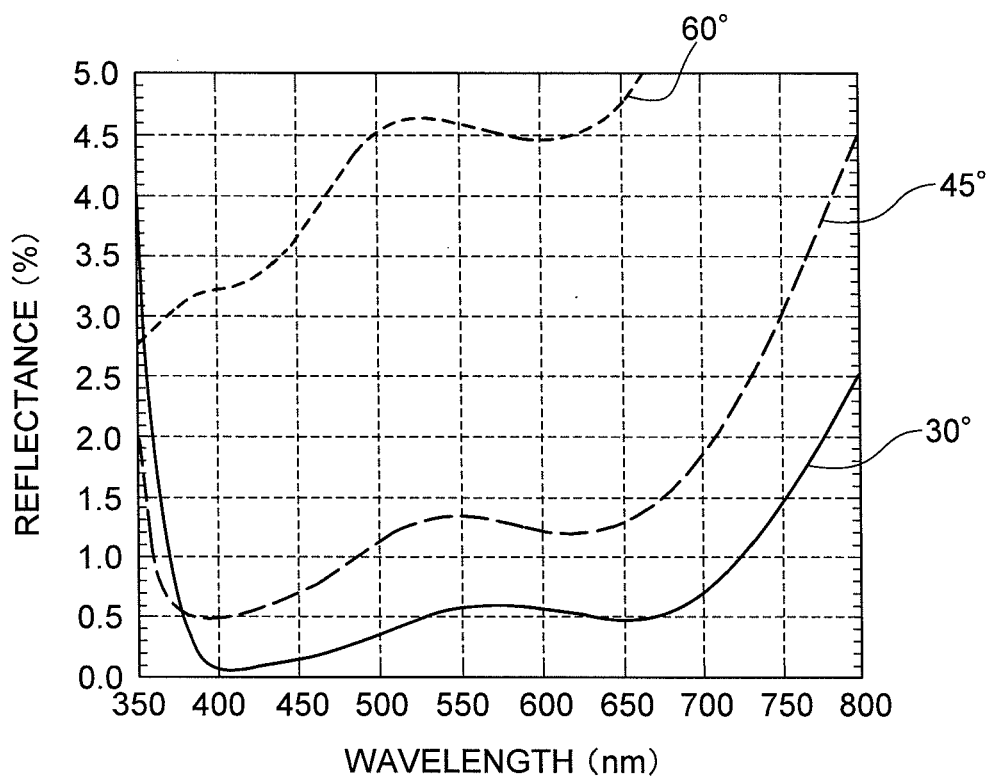
FIG. 44 is a graph showing angular dependence of spectral reflectance of an antireflection coating according to a conventional example.

To compare the spectral characteristics of the optical member including the antireflection coating according to the present embodiment illustrated in FIGS. 40 through 42 with the spectral characteristics in the conventional examples shown in FIGS. 43 and 44, it is well understood that the present antireflection coating has the much lower reflectance at any incident angles and, besides, has the low reflectance in the broader band.

Explained next is an example of applying the antireflection coating shown in the Tables 19 and 20 to Examples 1 through 5 discussed above.

In the zoom lens system according to Example 1, as shown in the Table 1, the refractive index nd of the negative meniscus lens L21 of the second lens group G2 is 1.834807 (nd=1.834807), and the refractive index nd of the biconcave negative lens L22 of the second lens group G2 is 1.816000 (nd=1.816000), whereby it is feasible to reduce the reflected light from each lens surface and to reduce ghost images and flare as well by applying the antireflection coating 101 (see Table 19) corresponding to 1.85 as the substrate refractive index to the image side lens surface of the negative meniscus lens L21 and applying the antireflection coating (see Table 19) corresponding to 1.85 as the substrate refractive index to the object side lens surface of the biconcave negative lens L22.

In the zoom lens system according to Example 2, as shown in the Table 2, the refractive index nd of the positive meniscus lens L13 of the first lens group G1 is 1.593190 (nd=1.593190), and the refractive index nd of the biconvex positive lens L23 of the second lens group G2 is 1.784720 (nd=1.784720), whereby it is feasible to reduce the reflected light from each lens surface and to reduce ghost images and flare as well by applying the antireflection coating 101 (see Table 19) corresponding to 1.62 as the substrate refractive index to the object side lens surface of the positive meniscus lens L13 and applying the antireflection coating (see Table 19) corresponding to 1.74 as the substrate refractive index to the image side lens surface of the biconvex positive lens L23.

In the zoom lens system according to Example 3, as shown in the Table 3, the refractive index nd of the positive meniscus lens L13 of the first lens group G1 is 1.593190 (nd=1.593190), and the refractive index nd of the biconcave negative lens L24 of the second lens group G2 is 1.816000 (nd=1.816000), whereby it is feasible to reduce the reflected light from each lens surface and to reduce ghost images and flare as well by applying the antireflection coating 101 (see Table 19) corresponding to 1.62 as the substrate refractive index to the object side lens surface of the positive meniscus lens L13 and applying the antireflection coating (see Table 19) corresponding to 1.85 as the substrate refractive index to the object side lens surface of the biconcave negative lens L24.

In the zoom lens system according to Example 4, as shown in the Table 4, the refractive index nd of the biconvex positive lens L12 of the first lens group G1 is 1.497820 (nd=1.497820), and the refractive index nd of the negative meniscus lens L21 of the second lens group G2 is 1.834807 (nd=1.834807), whereby it is feasible to reduce the reflected light from each lens surface and to reduce ghost images and flare as well by applying the antireflection coating 101 (see Table 20) corresponding to 1.52 as the substrate refractive index to the image side lens surface of the biconvex positive lens L12 and applying the antireflection coating (see Table 19) corresponding to 1.85 as the substrate refractive index to the image side lens surface of the negative meniscus lens L21.

In the zoom lens system according to Example 5, as shown in the Table 5, the refractive index nd of the biconvex positive lens L12 of the first lens group G1 is 1.497820 (nd=1.497820), and the refractive index nd of the biconvex positive lens L23 of the second lens group G2 is 1.784723 (nd=1.784723), whereby it is feasible to reduce the reflected light from each lens surface and to reduce ghost images and flare as well by applying the antireflection coating 101 (see Table 20) corresponding to 1.52 as the substrate refractive index to the image side lens surface of the biconvex positive lens L12 and applying the antireflection coating (see Table 19) corresponding to 1.74 as the substrate refractive index to the image side lens surface of the biconvex positive lens L23.

Then, an outline of a method for manufacturing a zoom lens system according to the first embodiment of the present application is described below.

Figure 45:
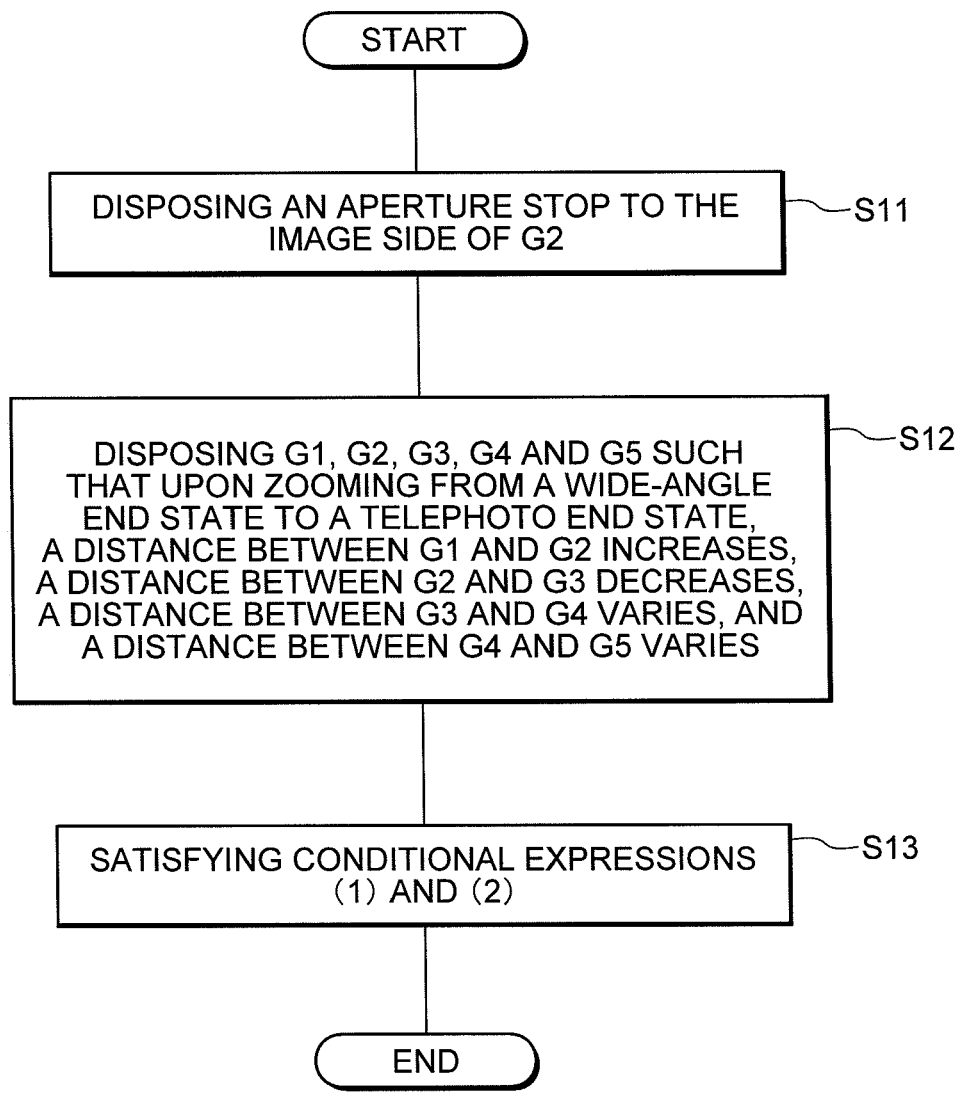
FIG. 45 is a flowchart showing a method for manufacturing a zoom lens system according to the first embodiment.

FIG. 45 is a flowchart showing a method for manufacturing a zoom lens system according to the first embodiment of the present application.

The method for manufacturing a zoom lens system according to the first embodiment is a method for manufacturing a zoom lens system including, in order from an object side along an optical axis, a first lens group having positive refractive power, a second lens group having negative refractive power, a third lens group having positive refractive power, a fourth lens group having negative refractive power, and a fifth lens group having positive refractive power, and the method includes the following steps of S11, S12 and S13 as shown in FIG. 45.

Step S11: disposing an aperture stop to the image side of the second lens group.

Step S12: disposing the first lens group, the second lens group, the third lens group, the fourth lens group and the fifth lens group such that upon zooming from a wide-angle end state to a telephoto end state, a distance between the first lens group and the second lens group increases, a distance between the second lens group and the third lens group decreases, a distance between the third lens group and the fourth lens group varies, and a distance between the fourth lens group and the fifth lens group varies.

Step S13: satisfying the following conditional expressions (1) and (2):

$$0.17 < f1/fT < 0.60 \quad (1)$$

$$1.03 < \phi T/\phi W < 1.70 \quad (2)$$

where fT denotes a focal length of the zoom lens system in the telephoto end state, f1 denotes a focal length of the first lens group, $\phi W$ denotes the maximum diameter of the aperture stop in the wide-angle end state, and $\phi T$ denotes the maximum diameter of the aperture stop in the telephoto end state.

The method for manufacturing a zoom lens system according to the first embodiment of the present application makes it possible to manufacture a zoom lens system having high optical performance with suppressing variation in aberrations and further suppressing ghost images and flare.

In a zoom lens system according to the first embodiment, the first lens group preferably includes two positive lens components. Moreover, the first lens group preferably disposes these lens components, in order from the object side, positive-positive with disposing an air space between them.

In a zoom lens system according to the first embodiment, the second lens group preferably includes one positive lens component and three negative lens components. Moreover, the second lens group preferably disposes these lens components, in order from the object side, negative-negative-positive-negative with an air space between each of them.

In a zoom lens system according to the first embodiment, the third lens group preferably includes three positive lens components.

In a zoom lens system according to the first embodiment, the fourth lens group preferably includes two negative lens components.

In a zoom lens system according to the first embodiment, the fifth lens group preferably includes two positive lens components. The fifth lens group preferably disposes these lens components, in order from the object side, positive-positive with an air space between them.

Second Embodiment

A zoom lens system according to a second embodiment of the present application is explained below.

A zoom lens system according to the second embodiment includes, in order from an object side along an optical axis, a first lens group having positive refractive power, a second lens group having negative refractive power, a third lens group having positive refractive power, and a fourth lens group. An aperture stop is disposed to an image side of the second lens group. Upon zooming from a wide-angle end state to a telephoto end state, a distance between the first lens group and the second lens group increases, a distance between the second lens group and the third lens group decreases, and a distance between the third lens group and the fourth lens group varies. With this configuration, it becomes possible to realize a zoom lens system and to properly correct distortion from the wide-angle end state to the telephoto end state.

In a zoom lens system according to the second embodiment, the following conditional expressions (1) and (2) are satisfied:

$$0.17 < f1/fT < 0.60 \quad (1)$$

$$1.03 < \phi T/\phi W < 1.70 \quad (2)$$

where fT denotes a focal length of the zoom lens system in the telephoto end state, f1 denotes a focal length of the first lens group, $\phi W$ denotes the maximum diameter of the aperture stop in the wide-angle end state, and $\phi T$ denotes the maximum diameter of the aperture stop in the telephoto end state.

Conditional expression (1) is for obtaining high optical performance with excellently correcting spherical aberration and curvature of field generated in the zoom lens system. However, conditional expression (1) has been already explained above, so that duplicated explanations are omitted.

Conditional expression (2) is for obtaining high optical performance with setting the f-number in the telephoto end state moderately small and excellently correcting spherical aberration and coma. However, conditional expression (2) has been already explained above, so that duplicated explanations are omitted.

In a zoom lens system according to the second embodiment, the following conditional expression (3) is preferably satisfied:

$$1.02 < \phi M10/\phi W < 1.70 \quad (3)$$

where $\phi M10$ denotes the maximum diameter of the aperture stop in an intermediate focal length state, in which the intermediate focal length of the zoom lens system is ten times or more of fW when fW denotes a focal length of the zoom lens system in the wide-angle end state.

Conditional expression (3) is for realize high optical performance with letting the zoom lens system have a sufficient f-number in the intermediate focal length state where the focal length of the zoom lens system is ten times or more of the focal length thereof in the wide-angle end state (fW). However, conditional expression (3) has been already explained above, so that duplicated explanations are omitted.

In a zoom lens system according to the second embodiment, the following conditional expression (4) is preferably satisfied:

$$1.02 < \phi M15/\phi W < 1.70 \quad (4)$$

where $\phi M15$ denotes the maximum diameter of the aperture stop in an intermediate focal length state, in which the intermediate focal length of the zoom lens system is fifteen times or more of fW when fW denotes a focal length of the zoom lens system in the wide-angle end state.

Conditional expression (4) is for realize high optical performance with letting the zoom lens system have a sufficient f-number in the intermediate focal length state where the focal length of the zoom lens system is fifteen times or more of the focal length thereof in the wide-angle end state (fW). However, conditional expression (4) has been already explained above, so that duplicated explanations are omitted.

In a zoom lens system according to the second embodiment, the following conditional expression (5) is preferably satisfied:

$$1.00 \leq \phi M5/\phi W < 1.40 \quad (5)$$

where $\phi M5$ denotes the maximum diameter of the aperture stop in an intermediate focal length state, in which the intermediate focal length of the zoom lens system is five times or more and eight times or less of fW when fW denotes a focal length of the zoom lens system in the wide-angle end state.

Conditional expression (5) is for realize high optical performance in the intermediate focal length state where the focal length of the zoom lens system is five times or more and eight times or less of the focal length thereof in the wide-angle end state (fW). However, conditional expression (5) has been already explained above, so that duplicated explanations are omitted.

In a zoom lens system according to the second embodiment, upon zooming from the wide-angle end state to the telephoto end state, the diameter of the aperture stop keeps the maximum diameter of the wide-angle end state from the wide-angle end state to an intermediate focal length state, in which the focal length is fM, and the following conditional expression (6) is preferably satisfied:

$$1.50 < fM/fW < 15.00 \tag{6}$$

where fW denotes a focal length of the zoom lens system in the wide-angle end state.

Conditional expression (6) is for realizing high optical performance in a given intermediate focal length state. However, conditional expression (6) has been already explained above, so that duplicated explanations are omitted.

In a zoom lens system according to the second embodiment, upon zooming from the intermediate focal length state, in which the focal length of the zoom lens system is fM, to the telephoto end state, the maximum diameter of the aperture stop preferably increases monotonously. Incidentally, the maximum diameter of the aperture stop is the maximum value of the diameter of the aperture stop with respect to each focal length state.

With this configuration, mechanical construction of the zoom lens system can be simplified, and variation in spherical aberration can be suppressed in the zoom range from the intermediate focal length fM state to the telephoto end state, so that high optical performance can be obtained.

In a zoom lens system according to the second embodiment, the following conditional expression (7) is preferably satisfied:

$$0.032 < -f2/fT < 0.064 \tag{7}$$

where f2 denotes a focal length of the second lens group.

Conditional expression (7) is for realizing high optical performance with suppressing variation in aberrations generated in the second lens group upon zooming from the wide-angle end state to the telephoto end state. However, conditional expression (7) has been already explained above, so that duplicated explanations are omitted.

In a zoom lens system according to the second embodiment, an f-number of the zoom lens system preferably increases monotonously upon zooming from the wide-angle end state to the telephoto end state.

With this configuration, upon zooming from the wide-angle end state to the telephoto end state, the height of on-axis ray passing through a lens group in the vicinity of the aperture stop such as the third lens group is prevented from an excessive increase. Accordingly, variation in aberrations such as spherical aberration can be suppressed, so that high optical performance can be obtained.

In a zoom lens system according to the second embodiment, upon zooming from the wide-angle end state to the telephoto end state, the first lens group is preferably moved to the object side with respect to the image plane.

With this configuration, the diameter of the first lens group can be downsized, and the height from the optical axis of the off-axis ray passing through the first lens group in the wide-angle end state can be suppressed, so that variation in curvature of field and astigmatism upon zooming can be suppressed.

In a zoom lens system according to the second embodiment, upon zooming from the wide-angle end state to the telephoto end state, the aperture stop is preferably moved integrally with at least a portion of the third lens group.

With this configuration, mechanical construction of the zoom lens system can be simplified, and variation in spherical aberration can be suppressed, so that high optical performance can be obtained.

In a zoom lens system according to the second embodiment, the aperture stop is preferably disposed to the object side of the third lens group.

With this configuration, the diameter of the first lens group can be downsized, and the height from the optical axis of the off-axis ray passing through the first lens group in the wide-angle end state can be suppressed, so that variation in curvature of field and astigmatism upon zooming can be suppressed.

In a zoom lens system according to the second embodiment, the fourth lens group preferably has positive refractive power.

With this configuration, zooming ability can be effectively increased in the zoom lens system, so that the zoom lens system can be downsized. Moreover, variation in spherical aberration and astigmatism generated in the third lens group upon zooming from the wide-angle end state to the telephoto end state can be suppressed, so that high optical performance can be obtained.

Then, a zoom lens system seen from another point of view according to the second embodiment of the present application is explained below.

A zoom lens system seen from another point of view according to the second embodiment includes, in order from an object side along an optical axis, a first lens group having positive refractive power, a second lens group having negative refractive power, a third lens group having positive refractive power and a fourth lens group. An aperture stop is disposed to an image side of the second lens group. Upon zooming from a wide-angle end state to a telephoto end state, a distance between the first lens group and the second lens group increases, a distance between the second lens group and the third lens group decreases, and a distance between the third lens group and the fourth lens group varies. With this configuration, it becomes possible to realize a zoom lens system and to properly correct distortion from the wide-angle end state to the telephoto end state.

In a zoom lens system seen from another point of view according to the second embodiment, the following conditional expressions (1) and (2) are satisfied:

$$0.17 < f1/fT < 0.60 \tag{1}$$

$$1.03 < \phi T/\phi W < 1.70 \tag{2}$$

where fT denotes a focal length of the zoom lens system in the telephoto end state, f1 denotes a focal length of the first lens group, $\phi W$ denotes the maximum diameter of the aperture stop in the wide-angle end state, and $\phi T$ denotes the maximum diameter of the aperture stop in the telephoto end state.

Conditional expression (1) is for obtaining high optical performance with excellently correcting spherical aberration and curvature of field generated in the zoom lens system. However, conditional expression (1) has been already explained above, so that duplicated explanations are omitted.

Conditional expression (2) is for obtaining high optical performance with setting the f-number in the telephoto end state moderately small and excellently correcting spherical aberration and coma. However, conditional expression (2) has been already explained above, so that duplicated explanations are omitted.

In a zoom lens system seen from another point of view according to the second embodiment, at least one surface of the optical surfaces of the first lens group and the second lens group is provided with an antireflection coating, and this antireflection coating includes at least one layer formed by use of a wet process. With the configuration, the zoom lens seen from another point of view according to the second embodiment makes it possible to further reduce ghost images and flare caused by reflection of light from the object on the optical surfaces and attaining high optical performance.

In a zoom lens system seen from another point of view according to the second embodiment, it is desirable that the antireflection coating is a multi-layered film, and the layer formed by the wet process is a layer of the uppermost surface of the layers composing the multi-layered film. With this configuration, since a difference in refractive index from the air can be decreased, it is possible to further decrease light reflection and to reduce ghost images and flare as well.

In a zoom lens system seen from another point of view according to the second embodiment, let nd be a refractive index of a layer formed by use of the wet process, and it is desirable that the refractive index nd is equal to 1.30 or less. With this configuration, since the difference in refractive index from the air can be decreased, it is possible to further decrease light reflection and to reduce ghost images and flare as well.

In a zoom lens system seen from another point of view according to the second embodiment, among optical surfaces in the first lens group and the second lens group, it is desirable that the optical surface on which the antireflection coating is applied is a concave surface as viewed from the aperture stop. Since the concave surface as viewed from the aperture stop among optical surfaces in the first lens group and the second lens group tends to generate reflection, the optical surface is formed with the antireflection coating, thereby enabling ghost images and flare to be effectively reduced.

In a zoom lens system seen from another point of view according to the second embodiment, it is desirable that, among optical surfaces in the first lens group and the second lens group, the concave surface as viewed from the aperture stop on which the antireflection coating is applied is an image side lens surface. Since the image side lens surface having a concave shape as viewed from the aperture stop among optical surfaces in the first lens group and the second lens group tends to generate reflection, the optical surface is formed with the antireflection coating, thereby enabling ghost images and flare to be effectively reduced.

In a zoom lens system seen from another point of view according to the second embodiment, it is desirable that, among optical surfaces in the first lens group and the second lens group, the concave surface on which the antireflection coating is applied as viewed from the aperture stop is an object side lens surface. Since the object side lens surface having a concave shape as viewed from the aperture stop among optical surfaces in the first lens group and the second lens group tends to generate reflection, the optical surface is formed with the antireflection coating, thereby enabling ghost images and flare to be effectively reduced.

In a zoom lens system seen from another point of view according to the second embodiment, among optical surfaces in the first lens group and the second lens group, it is desirable that the optical surface on which the antireflection coating is applied is a concave surface as viewed from the object. Since the concave surface as viewed from the object among optical surfaces in the first lens group and the second lens group tends to generate reflection, the optical surface is formed with the antireflection coating, thereby enabling ghost images and flare to be effectively reduced.

In a zoom lens system seen from another point of view according to the second embodiment, among optical surfaces in the first lens group and the second lens group, it is desirable that the optical surface having the concave shape as viewed from the object on which the antireflection coating is applied is the image side lens surface of the image side second lens from the most object side of the first lens group. Since the image side lens surface of the image side second lens from the most object side of the first lens group tends to generate reflection, the optical surface is formed with the antireflection coating, thereby enabling ghost images and flare to be effectively reduced.

In a zoom lens system seen from another point of view according to the second embodiment, among optical surfaces in the first lens group and the second lens group, it is desirable that the optical surface having the concave shape as viewed from the object on which the antireflection coating is applied is the object side lens surface of the image side second lens from the most object side of the second lens group. Since the object side lens surface of the image side second lens from the most object side of the second lens group tends to generate reflection, the optical surface is formed with the antireflection coating, thereby enabling ghost images and flare to be effectively reduced.

In a zoom lens system seen from another point of view according to the second embodiment, among optical surfaces in the first lens group and the second lens group, it is desirable that the optical surface having the concave shape as viewed from the object on which the antireflection coating is applied is the image side lens surface of the image side third lens from the most object side of the second lens group. Since the image side lens surface of the image side third lens from the most object side of the second lens group tends to generate reflection, the optical surface is formed with the antireflection coating, thereby enabling ghost images and flare to be effectively reduced.

In a zoom lens system seen from another point of view according to the second embodiment, among optical surfaces in the first lens group and the second lens group, it is desirable that the optical surface having the concave shape as viewed from the object on which the antireflection coating is applied is the object side lens surface of the image side fourth lens from the most object side of the second lens group. Since the object side lens surface of the image side fourth lens from the most object side of the second lens group tends to generate reflection, the optical surface is formed with the antireflection coating, thereby enabling ghost images and flare to be effectively reduced.

In a zoom lens system seen from another point of view according to the second embodiment, the antireflection coating may also be formed by a dry process etc without being limited to the wet process. On this occasion, it is preferable that the antireflection coating contains at least one layer of which the refractive index is equal to or smaller than 1.30. Thus, the same effects as in the case of using the wet process can be obtained by forming the antireflection coating based on the dry process etc. Note that at this time the layer of which the refractive index is equal to or smaller than 1.30 is preferably the layer of the uppermost surface of the layers composing the multi-layered film.

In a zoom lens system seen from another point of view according to the second embodiment, the following conditional expression (3) is preferably satisfied:

$$1.02 < \phi M10/\phi W < 1.70 \qquad (3)$$

where φM10 denotes the maximum diameter of the aperture stop in an intermediate focal length state, in which the intermediate focal length of the zoom lens system is ten times or more of fW when fW denotes a focal length of the zoom lens system in the wide-angle end state, and φW denotes the maximum diameter of the aperture stop in the wide-angle end state.

Conditional expression (3) is for realizing high optical performance with letting the zoom lens system have a sufficient f-number in the intermediate focal length state where the focal length of the zoom lens system is ten times or more of the focal length thereof in the wide-angle end state (fW). However, conditional expression (3) has been already explained above, so that duplicated explanations are omitted.

In a zoom lens system seen from another point of view according to the second embodiment, the following conditional expression (4) is preferably satisfied:

$$1.02 < \phi M15/\phi W < 1.70 \qquad (4)$$

where φM15 denotes the maximum diameter of the aperture stop in an intermediate focal length state, in which the intermediate focal length of the zoom lens system is fifteen times or more of fW when fW denotes a focal length of the zoom lens system in the wide-angle end state, and φW denotes the maximum diameter of the aperture stop in the wide-angle end state.

Conditional expression (4) is for realize high optical performance with letting the zoom lens system have a sufficient f-number in the intermediate focal length state where the focal length of the zoom lens system is fifteen times or more of the focal length thereof in the wide-angle end state (fW). However, conditional expression (4) has been already explained above, so that duplicated explanations are omitted.

In a zoom lens system seen from another point of view according to the second embodiment, the following conditional expression (5) is preferably satisfied:

$$1.00 \leq \phi M5/\phi W < 1.40 \qquad (5)$$

where φM5 denotes the maximum diameter of the aperture stop in an intermediate focal length state, in which the intermediate focal length of the zoom lens system is five times or more and eight times or less of fW when fW denotes a focal length of the zoom lens system in the wide-angle end state, and φW denotes the maximum diameter of the aperture stop in the wide-angle end state.

Conditional expression (5) is for realize high optical performance in the intermediate focal length state where the focal length of the zoom lens system is five times or more and eight times or less of the focal length thereof in the wide-angle end state (fW). However, conditional expression (5) has been already explained above, so that duplicated explanations are omitted.

In a zoom lens system seen from another point of view according to the second embodiment, upon zooming from the wide-angle end state to the telephoto end state, the diameter of the aperture stop keeps the maximum diameter of the wide-angle end state from the wide-angle end state to an intermediate focal length state, in which the focal length is fM, and the following conditional expression (6) is preferably satisfied:

$$1.50 < fM/fW < 15.00 \qquad (6)$$

where fW denotes a focal length of the zoom lens system in the wide-angle end state.

Conditional expression (6) is for realizing high optical performance in a given intermediate focal length state. However, conditional expression (6) has been already explained above, so that duplicated explanations are omitted.

In a zoom lens system seen from another point of view according to the second embodiment, upon zooming from the intermediate focal length state, in which the focal length of the zoom lens system is fM, to the telephoto end state, the maximum diameter of the aperture stop preferably increases monotonously. Incidentally, the maximum diameter of the aperture stop is the maximum value of the diameter of the aperture stop with respect to each focal length state.

With this configuration, mechanical construction of the zoom lens system can be simplified, and variation in spherical aberration can be suppressed in the zoom range from the intermediate focal length fM state to the telephoto end state, so that high optical performance can be obtained.

In a zoom lens system seen from another point of view according to the second embodiment, the following conditional expression (7) is preferably satisfied:

$$0.032 < -f2/fT < 0.064 \qquad (7)$$

where f2 denotes a focal length of the second lens group, and fT denotes a focal length of the zoom lens system in the telephoto end state.

Conditional expression (7) is for realizing high optical performance with suppressing variation in aberrations generated in the second lens group upon zooming from the wide-angle end state to the telephoto end state. However, conditional expression (7) has been already explained above, so that duplicated explanations are omitted.

In a zoom lens system seen from another point of view according to the second embodiment, an f-number of the zoom lens system preferably increases monotonously upon zooming from the wide-angle end state to the telephoto end state.

With this configuration, upon zooming from the wide-angle end state to the telephoto end state, the height of on-axis ray passing through a lens group in the vicinity of the aperture stop such as the third lens group is prevented from excessive increase. Accordingly, variation in aberrations such as spherical aberration can be suppressed, so that high optical performance can be obtained.

In a zoom lens system seen from another point of view according to the second embodiment, upon zooming from the wide-angle end state to the telephoto end state, the first lens group is preferably moved to the object side with respect to the image plane.

With this configuration, the diameter of the first lens group can be downsized, and the height from the optical axis of the off-axis ray passing through the first lens group in the wide-angle end state can be suppressed, so that variation in curvature of field and astigmatism upon zooming can be suppressed.

In a zoom lens system seen from another point of view according to the second embodiment, upon zooming from the wide-angle end state to the telephoto end state, the aperture stop is preferably moved integrally with at least a portion of the third lens group.

With this configuration, mechanical construction of the zoom lens system can be simplified, and variation in spherical aberration can be suppressed, so that high optical performance can be obtained.

In a zoom lens system seen from another point of view according to the second embodiment, the aperture stop is preferably disposed to the object side of the third lens group.

With this configuration, the diameter of the first lens group can be downsized, and the height from the optical axis of the off-axis ray passing through the first lens group in the wide-angle end state can be suppressed, so that variation in curvature of field and astigmatism upon zooming can be suppressed.

In a zoom lens system seen from another point of view according to the second embodiment, the fourth lens group preferably has positive refractive power.

With this configuration, it becomes possible to effectively increase zooming ability in the whole system, so that the zoom lens system can be downsized. Moreover, upon zooming from the wide-angle end state to the telephoto end state, variation in spherical aberration and astigmatism generated in the third lens group can be suppressed, so that high optical performance can be obtained.

Then, each Example according to the second embodiment of the present application is explained below with reference to accompanying drawings.

Example 6

Figure 16:
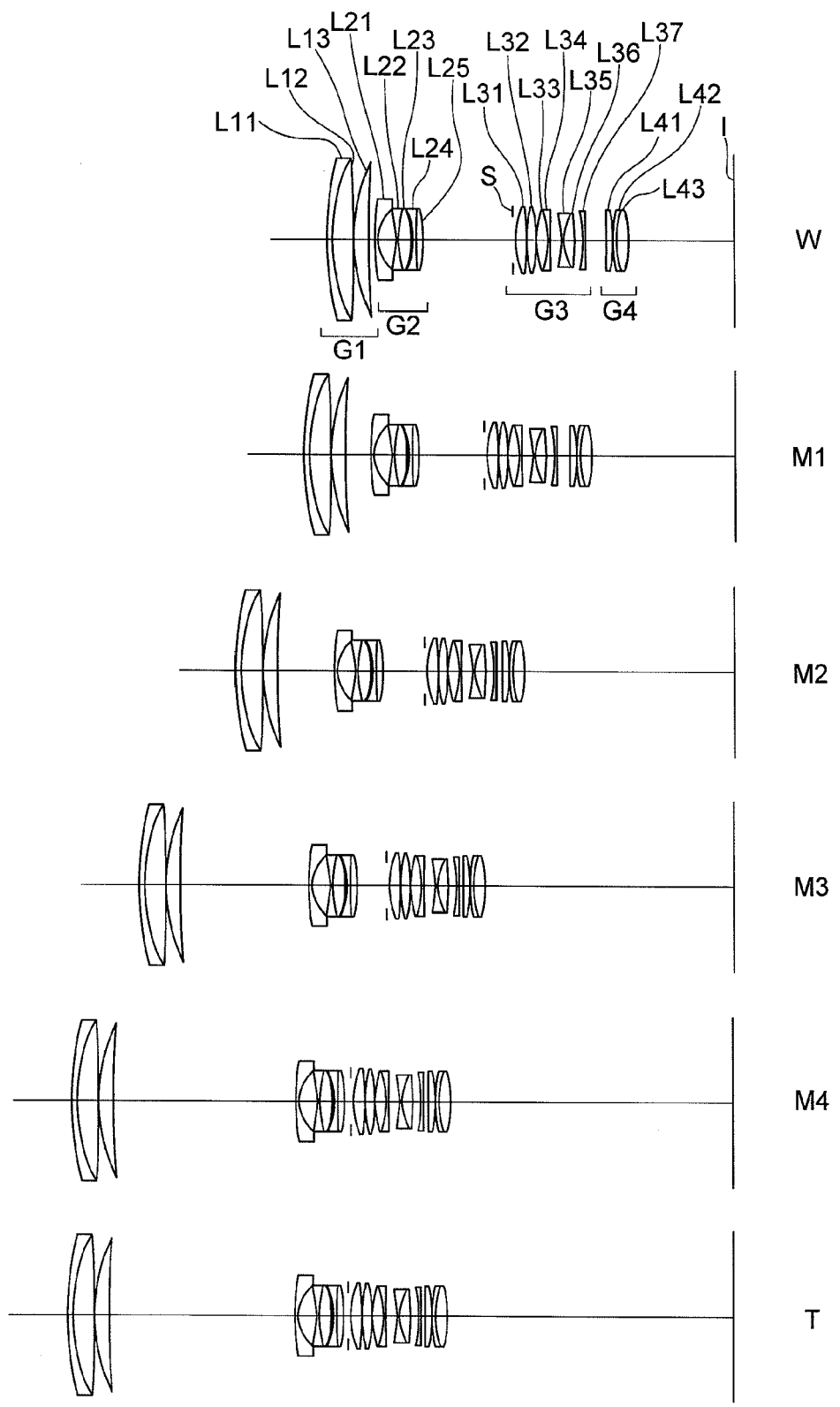
FIG. 16 is a sectional view showing a configuration of a zoom lens system according to Example 6 of a second embodiment.

FIG. 16 is a sectional view showing a configuration of a zoom lens system according to Example 6 of the second embodiment.

The zoom lens system according to Example 6 of the second embodiment is composed of, in order from an object along an optical axis, a first lens group G1 having positive refractive power, a second lens group G2 having negative refractive power, a third lens group G3 having positive refractive power, and a fourth lens group G4 having positive refractive power.

Upon zooming from a wide-angle end state W to a telephoto end state T, the first lens group G1 moves monotonously to the object side, the second lens group G2 moves to the object side, the third lens group G3 moves monotonously to the object side, and the fourth lens group G4 moves monotonously to the object side with respect to the image plane I such that a distance between the first lens group G1 and the second lens group G2 increases, a distance between the second lens group G2 and the third lens group G3 decreases, and a distance between the third G3 group and the fourth lens group G4 decreases.

An aperture stop S is disposed to the most object side of the third lens group G3, which is disposed to the image side of the second lens group G2, and constructed in a body with the third lens group G3. Moreover, upon zooming from the wide-angle end state W to the telephoto end state T, the aperture stop S keeps the maximum diameter of the wide-angle end state W from the wide-angle end state W to a second intermediate focal length state M2, and increases the maximum diameter monotonously from the second intermediate focal length state M2 to the telephoto end state T.

The first lens group G1 is composed of, in order from the object side along the optical axis, a cemented lens constructed by a negative meniscus lens L11 having a convex surface facing the object side cemented with a biconvex positive lens L12, and a positive meniscus lens L13 having a convex surface facing the object side.

The second lens group G2 is composed of, in order from the object side along the optical axis, a negative meniscus lens L21 having a convex surface facing the object side, a biconcave negative lens L22, a biconvex positive lens L23, and a cemented lens constructed by a negative meniscus lens L24 having a convex surface facing an image side cemented with a positive meniscus lens L25 having a convex surface facing the image side. The negative meniscus lens L21 disposed to the most object side in the second lens group G2 is a compound type aspherical lens in which an aspherical surface is formed by a resin layer provided on the object side lens surface.

The third lens group G3 is composed of, in order from the object side along the optical axis, a biconvex positive lens L31, a biconvex positive lens L32, a cemented lens constructed by a biconvex positive lens L33 cemented with a biconcave negative lens L34, a cemented lens constructed by a biconcave negative lens L35 cemented with a biconvex positive lens L36, and a negative meniscus lens L37 having a concave surface facing the object side. The biconcave negative lens L35 is a glass mold type aspherical lens in which an aspherical surface is formed on the object side surface.

The fourth lens group G4 is composed of, in order from the object side along the optical axis, a biconvex positive lens L41 and a cemented lens constructed by a negative meniscus lens L42 having a convex surface facing the object side cemented with a biconvex positive lens L43. The biconvex positive lens L41 disposed to the most object side of the fourth lens group G4 is a glass mold type aspherical lens in which an aspherical surface is formed on the object side surface. Light rays come out from the biconvex positive lens L43 form an image on the image plane I.

In the zoom lens system according to Example 6, each surface of the image side lens surface of the negative meniscus lens L21 in the second lens group G2 and the object side lens surface of the biconcave negative lens L22 in the second lens group G2 is applied with an antireflection coating described later.

The following Table 6 shows values of various items of data of the zoom lens system according to Example 6 of the second embodiment.

TABLE 6

| (Lens Data) | | | | |
|---|---|---|---|---|
| i | r | d | nd | vd |
| 1 | 127.9445 | 2.0000 | 1.850260 | 32.35 |
| 2 | 66.5460 | 7.8500 | 1.497820 | 82.52 |
| 3 | −596.2307 | 0.1000 | | |
| 4 | 67.4403 | 5.4000 | 1.593190 | 67.87 |
| 5 | 436.1899 | (d5) | | |
| 6* | 135.2961 | 0.1500 | 1.553890 | 38.09 |
| 7 | 107.2597 | 1.0000 | 1.804000 | 46.58 |
| 8 | 15.2626 | 6.7000 | | |
| 9 | −34.5499 | 1.0000 | 1.834807 | 42.72 |
| 10 | 51.8990 | 0.1000 | | |
| 11 | 34.0967 | 4.5000 | 1.784723 | 25.68 |
| 12 | −32.1245 | 0.9000 | | |
| 13 | −21.1157 | 1.0000 | 1.882997 | 40.76 |
| 14 | −2390.2062 | 2.1000 | 1.922860 | 20.50 |
| 15 | −67.6125 | (d15) | | |
| 16 | ∞ | 1.0000 | Aperture Stop S | |
| 17 | 31.6133 | 3.6500 | 1.593190 | 67.87 |
| 18 | −218.5545 | 0.1000 | | |
| 19 | 49.1304 | 3.2000 | 1.487490 | 70.41 |
| 20 | −63.6210 | 0.1000 | | |
| 21 | 35.3573 | 4.2500 | 1.487490 | 70.41 |
| 22 | −34.0783 | 1.0000 | 1.846660 | 23.78 |
| 23 | 659.9606 | 3.9000 | | |
| 24* | −35.0367 | 1.0000 | 1.756998 | 47.82 |
| 25 | 17.5822 | 3.9000 | 1.698947 | 30.13 |
| 26 | −95.2623 | 3.3500 | | |
| 27 | −55.5200 | 1.0000 | 1.882997 | 40.76 |
| 28 | −585.5172 | (d28) | | |
| 29* | 439.7935 | 2.2000 | 1.589130 | 61.16 |
| 30 | −53.2069 | 0.1000 | | |

TABLE 6-continued

| 31 | 65.1340 | 1.0000 | 1.834000 | 37.16 |
|---|---|---|---|---|
| 32 | 27.7296 | 4.1000 | 1.487490 | 70.41 |
| 33 | −58.1329 | (Bf) | | |

(Aspherical Surface Data)

Surface number = 6

κ = 4.3350
A4 = 9.45630E−06
A6 = −1.51470E−08
A8 = −1.16860E−12
A10 = 1.65790E−13
Surface number = 24

κ = −0.3009
A4 = 6.23810E−06
A6 = 8.96820E−09
A8 = 0.00000E+00
A10 = 0.00000E+00
Surface number = 29

κ = −20.0000
A4 = −1.92960E−05
A6 = 5.96200E−09
A8 = −1.65600E−10
A10 = 4.18100E−13

(Various Data)
zoom ratio = 15.698

| | f | FNO | ω | Y | TL | Bf |
|---|---|---|---|---|---|---|
| W = | 18.53928 | 3.60631 | 39.00856 | 14.20 | 148.79923 | 39.00067 |
| M1 = | 27.99917 | 4.19068 | 26.78890 | 14.20 | 157.22054 | 52.54373 |
| M2 = | 49.99950 | 5.39086 | 15.55965 | 14.20 | 181.95557 | 76.57450 |
| M3 = | 105.00169 | 5.76130 | 7.48510 | 14.20 | 217.34659 | 91.11965 |
| M4 = | 278.75308 | 5.78421 | 2.85557 | 14.20 | 241.72065 | 104.16125 |
| T = | 291.02949 | 5.78825 | 2.73699 | 14.20 | 242.82932 | 105.34665 |

| | φ | d5 | d15 | d28 |
|---|---|---|---|---|
| W = | 17.20 | 2.10000 | 33.50310 | 7.54546 |
| M1 = | 17.20 | 9.42195 | 24.00476 | 4.60010 |
| M2 = | 17.20 | 20.39318 | 15.75155 | 2.58634 |
| M3 = | 18.40 | 46.65937 | 10.98454 | 1.93303 |
| M4 = | 20.40 | 66.86210 | 2.49980 | 1.54750 |
| T = | 20.59 | 67.33267 | 2.00000 | 1.50000 |

(Lens Group Data)

| Group | I | focal length |
|---|---|---|
| 1 | 1 | 104.30654 |
| 2 | 6 | −13.81152 |
| 3 | 16 | 39.54020 |
| 4 | 29 | 48.03635 |

(Values for Conditional Expressions)

(1) f1/fT = 0.358
(2) φT/φW = 1.197
(3) φM10/φW = 1.186 (φM10 is a value in M4)
(4) φM15/φW = 1.186 (φM15 is a value in M4)
(5) φM5/φW = 1.070 (φM5 is a value in M3)
(6) fM/fW = 2.70 (fM is a value in M2)
(7) −f2/fT = 0.0475

Figure 17A:
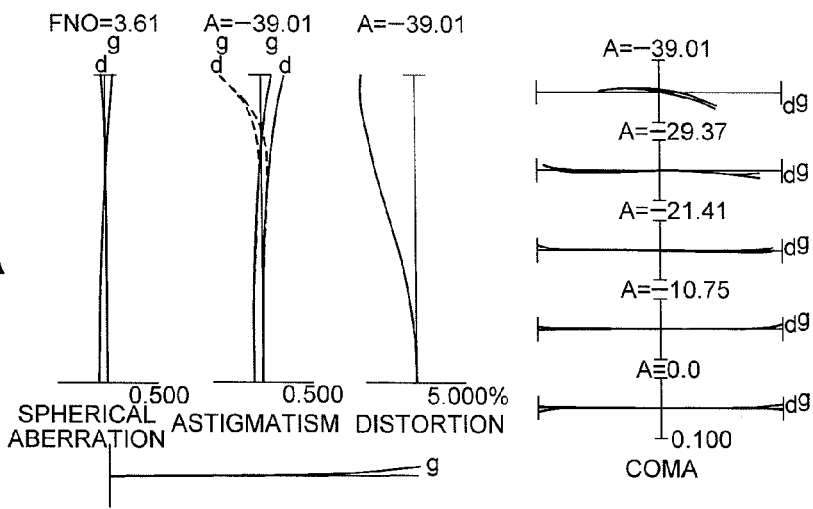
Figure 17B:
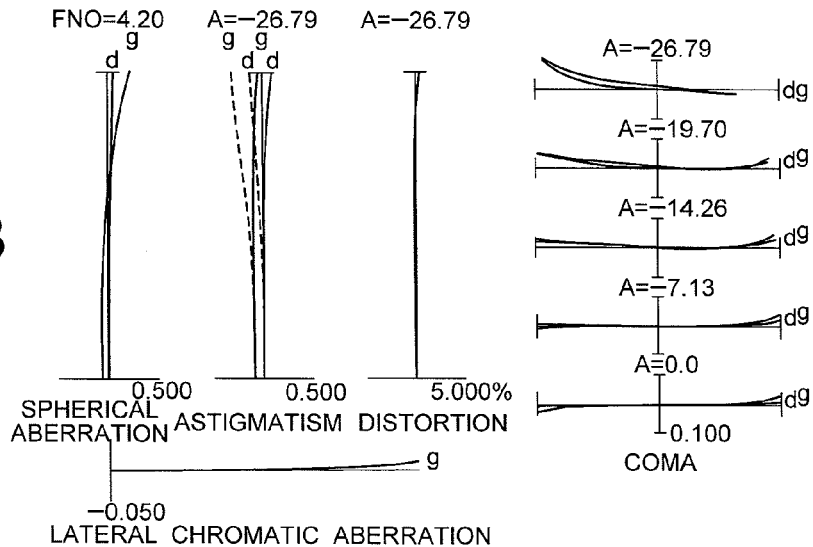
Figure 17C:
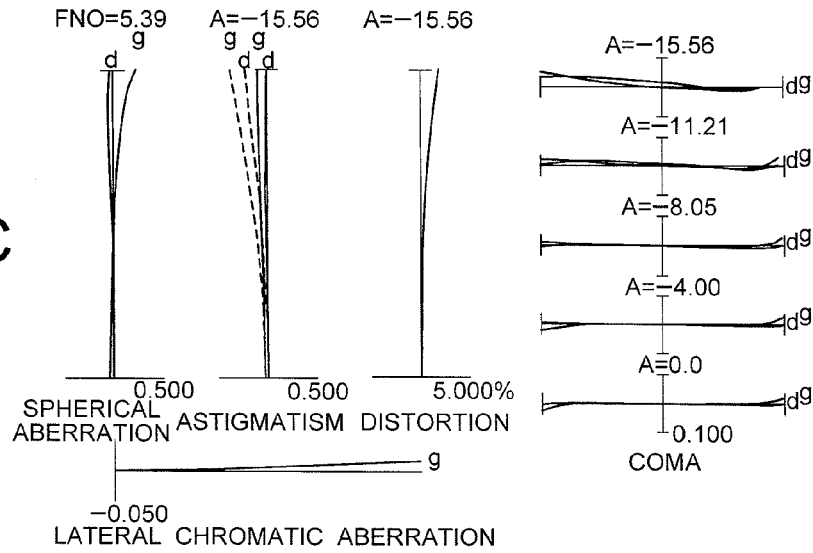

FIGS. 17A, 17B and 17C are graphs showing various aberrations of the zoom lens system according to Example 6 of the second embodiment, in which FIG. 17A is in a wide-angle end state W, FIG. 17B is in a first intermediate focal length state M1, and FIG. 17C is in a second intermediate focal length state M2.

Figure 18A:
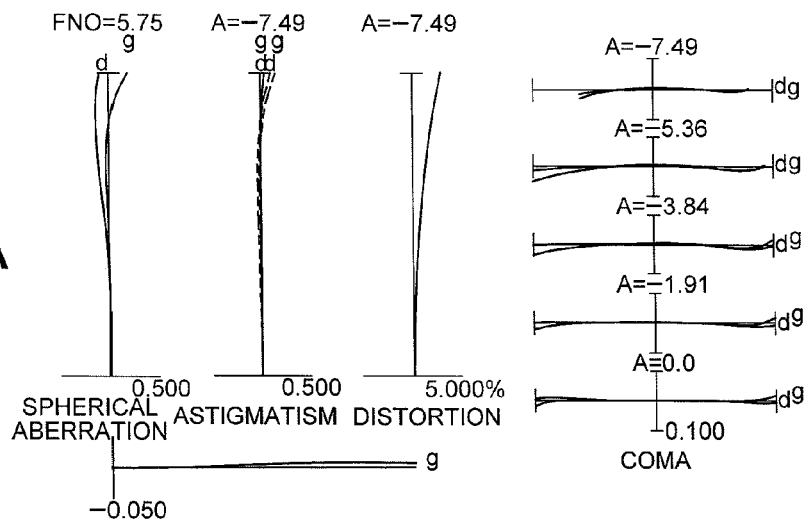
Figure 18B:
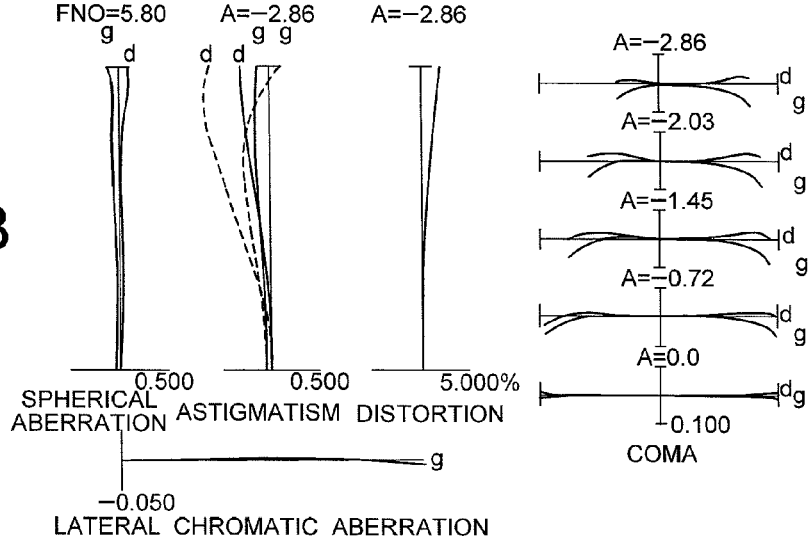
Figure 18C:
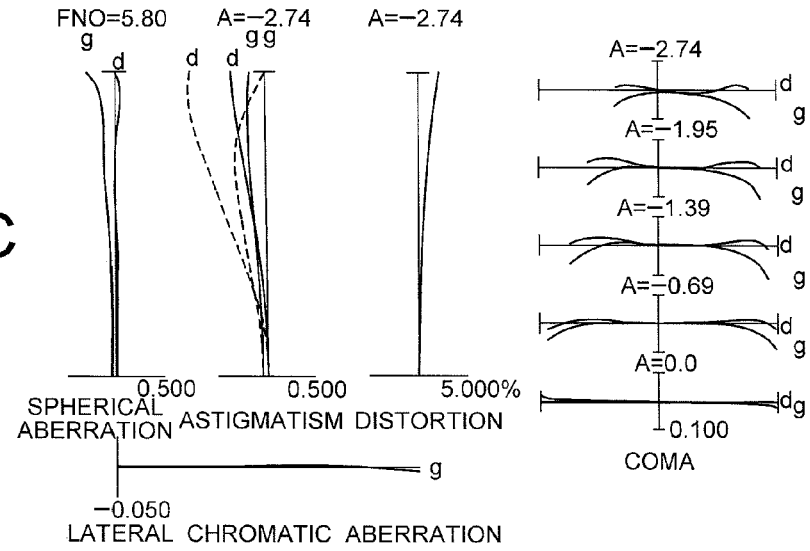
FIG. 18C is in a telephoto end state T.

FIGS. 18A, 18B and 18C are graphs showing various aberrations of the zoom lens system according to Example 6 of the second embodiment, in which FIG. 18A is in a third intermediate focal length state M3, FIG. 18B is in a fourth intermediate focal length state M4, and FIG. 18C is in a telephoto end state T.

As is apparent from the respective graphs, the zoom lens according to Example 6 of the second embodiment shows superb optical performance as a result of good corrections to various aberrations from the wide-angle end state through the telephoto end state.

FIG. 29 is a sectional view showing a zoom lens system according to Example 6 of the second embodiment in which ghost images are generated by the light rays BM incident from the object side. In FIG. 29, when the light rays BM coming from the object side is incident on the zoom lens system, the light rays BM are reflected by an object side lens surface (a first ghost-image-generating surface having a surface number "9") of the biconcave negative lens L22, and the reflected light rays are again reflected by an image side lens surface (a second ghost-image-generating surface having a surface number "8") of the negative meniscus lens L21 and reach the image plane I, resulting in the generation of the ghost images. Note that the first ghost-image-generating surface of the surface number "9" is a concave surface viewed from the object side, and the second ghost-image-generating surface of the surface number "8" is a concave surface viewed from the aperture stop S side. These surfaces are formed with the antireflection coating corresponding to a wide incident angle in a broader wavelength range, thereby enabling ghost images to be effectively reduced.

Example 7

Figure 19:
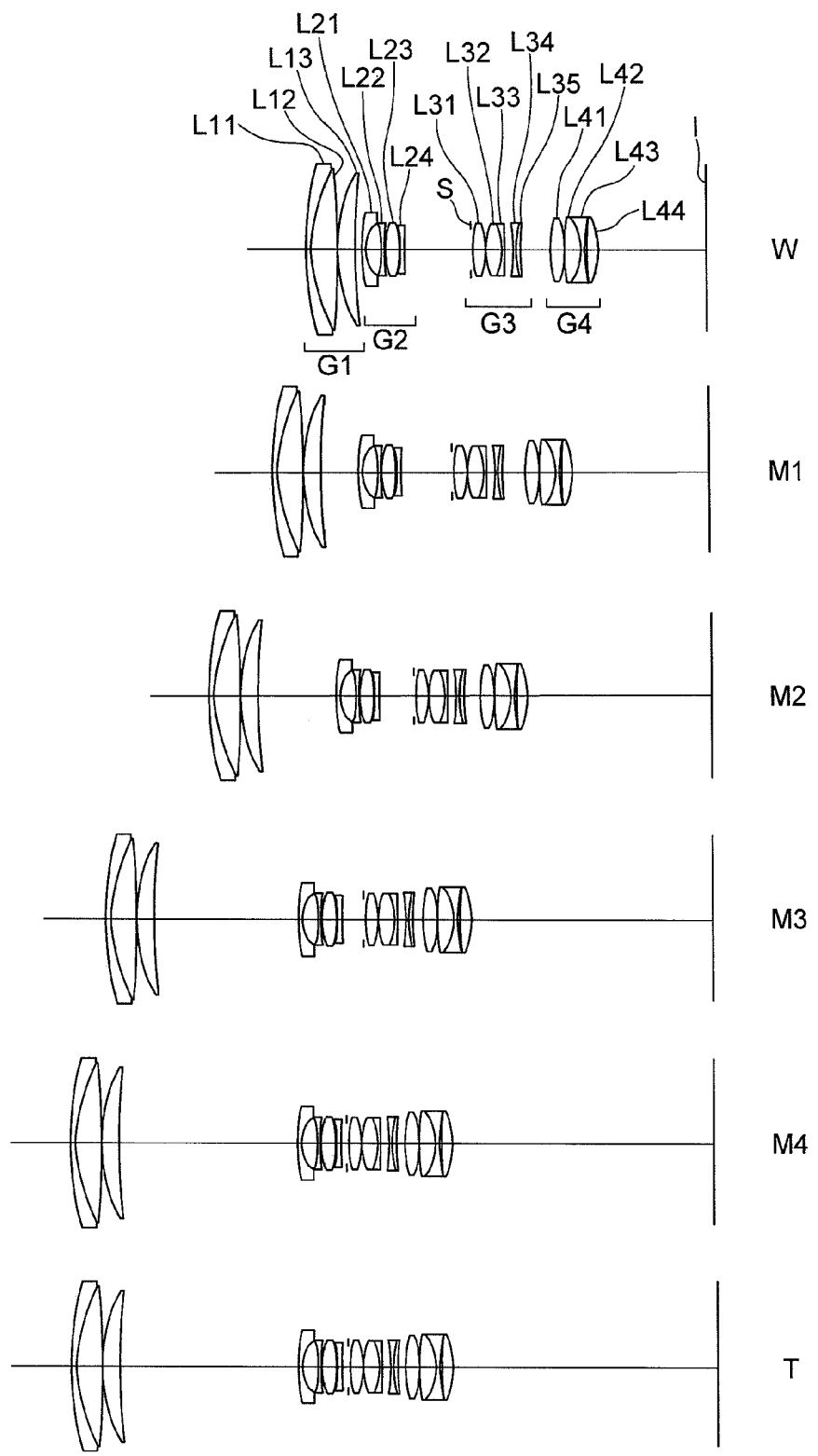
FIG. 19 is a sectional view showing a configuration of a zoom lens system according to Example 7 of the second embodiment.

FIG. 19 is a sectional view showing a configuration of a zoom lens system according to Example 7 of the second embodiment.

The zoom lens system according to Example 7 of the second embodiment is composed of, in order from an object along an optical axis, a first lens group G1 having positive refractive power, a second lens group G2 having negative refractive power, a third lens group G3 having positive refractive power, and a fourth lens group G4 having positive refractive power.

Upon zooming from a wide-angle end state W to a telephoto end state T, the first lens group G1 moves monotonously to the object side, the second lens group G2 moves to the object side, the third lens group G3 moves monotonously to the object side, and the fourth lens group G4 moves to the object side monotonously with respect to the image plane I such that a distance between the first lens group G1 and the second lens group G2 increases, a distance between the second lens group G2 and the third lens group G3 decreases, and a distance between the third lens group G3 and the fourth lens group G4 decreases.

An aperture stop S is disposed to the most object side of the third lens group G3, which is disposed to the image side of the second lens group G2, and constructed in a body with the third lens group G3. Moreover, upon zooming from the wide-angle end state W to the telephoto end state T, the aperture stop S keeps the maximum diameter of the wide-angle end state W from the wide-angle end state W to a third intermediate focal length state M3, and increases the maximum diameter monotonously from the third intermediate focal length state M3 to the telephoto end state T.

The first lens group G1 is composed of, in order from the object side along the optical axis, a cemented lens constructed by a negative meniscus lens L11 having a convex surface facing the object side cemented with a biconvex positive lens L12, and a positive meniscus lens L13 having a convex surface facing the object side.

The second lens group G2 is composed of, in order from the object side along the optical axis, a negative meniscus lens L21 having a convex surface facing the object side, a biconcave negative lens L22, a biconvex positive lens L23, and a biconcave negative lens L24. The negative meniscus lens L21 disposed to the most object side in the second lens group G2 is a compound type aspherical lens in which an aspherical surface is formed by a resin layer provided on the object side lens surface.

The third lens group G3 is composed of, in order from the object side along the optical axis, a biconvex positive lens L31, a cemented lens constructed by a biconvex positive lens L32 cemented with a negative meniscus lens L33 having a concave surface facing the object side, and a cemented lens constructed by a biconcave negative lens L34 cemented with a positive meniscus lens L35 having a convex surface facing the object side. The biconcave negative lens L34 is a compound type aspherical lens in which an aspherical surface is formed by a resin layer provided on the object side surface.

The fourth lens group G4 is composed of, in order from the object side along the optical axis, a biconvex positive lens L41, a cemented lens constructed by a biconvex positive lens L42 cemented with a biconcave negative lens L43, and a biconvex positive lens L44. The biconvex positive lens L41 disposed to the most object side of the fourth lens group G4 is a glass mold type aspherical lens in which an aspherical surface is formed on the object side surface. Light rays come out from the biconvex positive lens L44 form an image on the image plane I.

In Example 7, each of the object side lens surface of the positive meniscus lens L13 in the first lens group G1, and the image side lens surface of the biconvex positive lens L23 in the second lens group G2 is provided with an antireflection coating described later.

The following Table 7 shows values of various items of data of the zoom lens system according to Example 7 of the second embodiment.

TABLE 7

(Lens Data)

| i | r | d | nd | vd |
|---|---|---|---|---|
| 1 | 107.0206 | 1.8000 | 1.903658 | 31.31 |
| 2 | 61.2968 | 9.0132 | 1.456500 | 90.27 |
| 3 | −505.7797 | 0.1000 | | |
| 4 | 56.5708 | 6.5660 | 1.603001 | 65.44 |
| 5 | 263.1448 | (d5) | | |
| 6* | 107.6633 | 0.1500 | 1.553890 | 38.09 |
| 7 | 79.4357 | 1.2000 | 1.816000 | 46.62 |
| 8 | 12.5498 | 5.8961 | | |
| 9 | −28.1361 | 1.0000 | 1.816000 | 46.62 |
| 10 | 76.8103 | 0.1000 | | |
| 11 | 29.0330 | 5.0805 | 1.846660 | 23.78 |
| 12 | −28.2941 | 0.7021 | | |
| 13 | −20.3234 | 1.0000 | 1.788001 | 47.37 |
| 14 | 328.3222 | (d14) | | |
| 15 | ∞ | 0.5000 | Aperture Stop S | |
| 16 | 38.5144 | 4.3804 | 1.527510 | 66.72 |
| 17 | −31.0868 | 0.1000 | | |
| 18 | 24.8278 | 5.7092 | 1.497000 | 81.64 |
| 19 | −22.4849 | 1.0000 | 1.850260 | 32.35 |
| 20 | −1199.4167 | 3.0000 | | |
| 21* | −52.5575 | 0.1000 | 1.553890 | 38.09 |
| 22 | −56.7769 | 1.0000 | 1.772499 | 49.60 |
| 23 | 32.9354 | 1.9482 | 1.805181 | 25.42 |
| 24 | 83.4259 | (d24) | | |
| 25* | 38.1701 | 5.1517 | 1.677900 | 54.89 |

TABLE 7-continued

| 26 | −30.3075 | 0.1000 | | |
|---|---|---|---|---|
| 27 | 119.1216 | 5.7937 | 1.511790 | 49.72 |
| 28 | −16.9262 | 1.0000 | 1.878780 | 41.73 |
| 29 | 40.2625 | 0.7994 | | |
| 30 | 88.7687 | 4.0188 | 1.497970 | 53.26 |
| 31 | −31.8725 | (Bf) | | |

(Aspherical Surface Data)

Surface number = 6

κ = 1.0000
A4 = 8.23600E−06
A6 = 2.68070E−08
A8 = −2.85680E−10
A10 = 8.96110E−13

Surface number = 21

κ = 1.0000
A4 = 8.39680E−06
A6 = 4.90050E−09
A8 = 0.00000E+00
A10 = 0.00000E+00

Surface number = 25

κ = 1.0000
A4 = −1.05940E−05
A6 = 2.60370E−08
A8 = 0.00000E+00
A10 = 0.00000E+00

(Various Data)
zoom ratio = 15.666

| | f | FNO | ω | Y | TL | Bf |
|---|---|---|---|---|---|---|
| W = | 18.57581 | 3.58467 | 38.75301 | 14.20 | 141.06118 | 38.02328 |
| M1 = | 27.79158 | 4.09252 | 26.53439 | 14.20 | 153.60481 | 48.03831 |
| M2 = | 50.03219 | 5.03317 | 15.40656 | 14.20 | 176.97503 | 64.55253 |
| M3 = | 134.79308 | 6.30198 | 5.90773 | 14.20 | 214.13726 | 85.33826 |
| M4 = | 281.38675 | 6.35021 | 2.83943 | 14.20 | 226.92995 | 92.38485 |
| T = | 291.01598 | 6.35739 | 2.74550 | 14.20 | 227.18745 | 92.60805 |

| | φ | d5 | d14 | d24 |
|---|---|---|---|---|
| W = | 15.40 | 2.12080 | 23.69130 | 10.01650 |
| M1 = | 15.40 | 12.45490 | 18.40230 | 7.50000 |
| M2 = | 15.40 | 26.91570 | 13.31350 | 4.98400 |
| M3 = | 15.40 | 50.67230 | 7.80730 | 3.11010 |
| M4 = | 16.20 | 62.28300 | 2.14860 | 2.90420 |
| T = | 16.20 | 62.67010 | 1.80000 | 2.90000 |

(Lens Group Data)

| Group | I | focal length |
|---|---|---|
| 1 | 1 | 95.68946 |
| 2 | 6 | −11.46195 |
| 3 | 15 | 42.77504 |
| 4 | 25 | 40.12768 |

(Values for Conditional Expressions)

(1) f1/fT = 0.329
(2) φT/φW = 1.052
(3) φM10/φW = 1.052 (φM10 is a value in M4)
(4) φM15/φW = 1.052 (φM15 is a value in M4)
(5) φM5/φW = 1.000 (φM5 is a value in M3)
(6) fM/fW = 7.256 (fM is a value in M3)
(7) −f2/fT = 0.0394

Figure 20A:
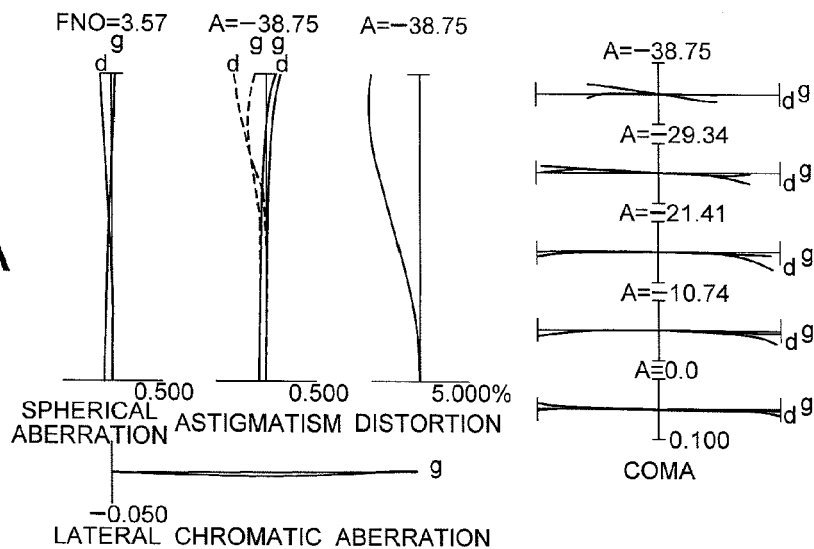
Figure 20B:
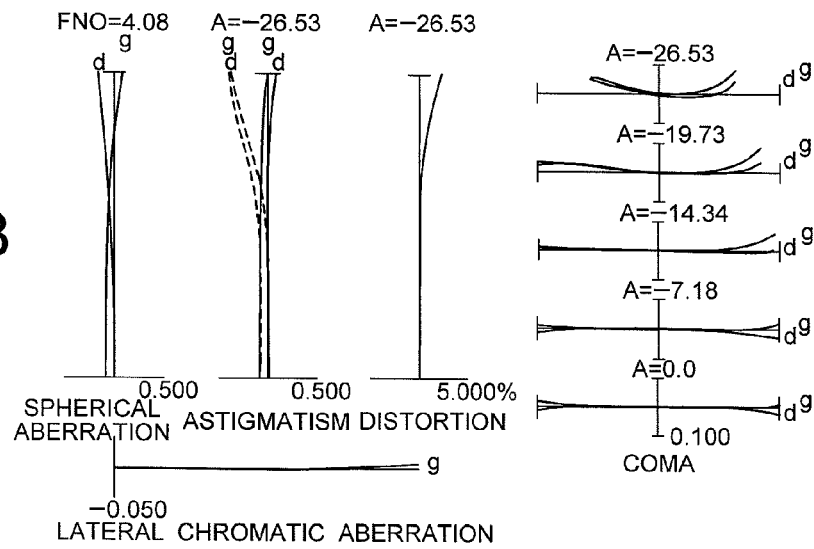
Figure 20C:
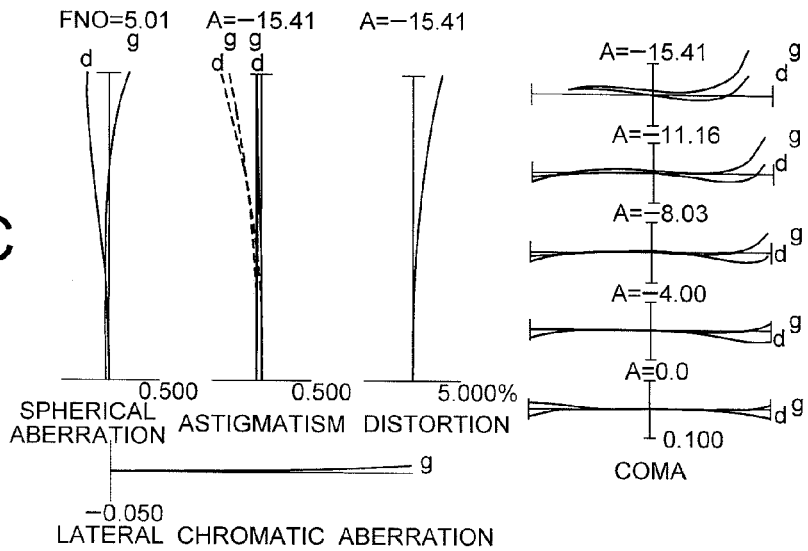

FIGS. 20A, 20B and 20C are graphs showing various aberrations of the zoom lens system according to Example 7 of the second embodiment, in which FIG. 20A is in a wide-angle end state W, FIG. 20B is in a first intermediate focal length state M1, and FIG. 20C is in a second intermediate focal length state M2.

Figure 21A:
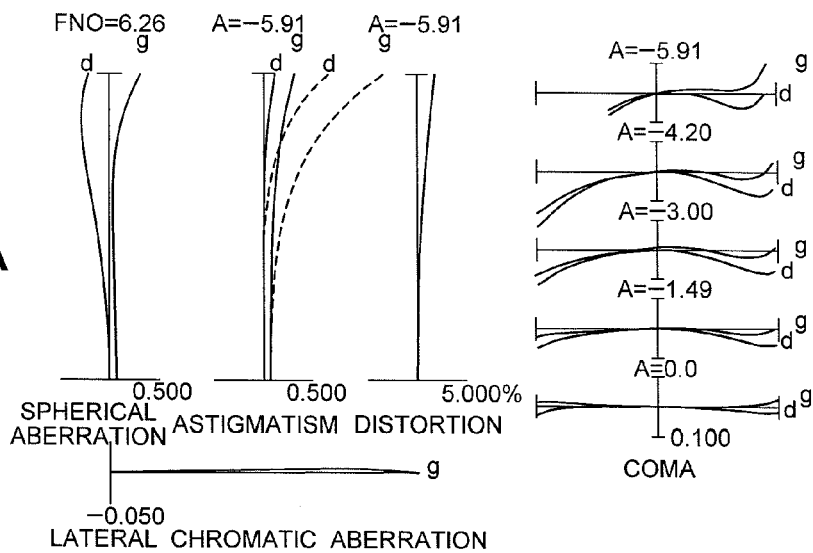
Figure 21B:
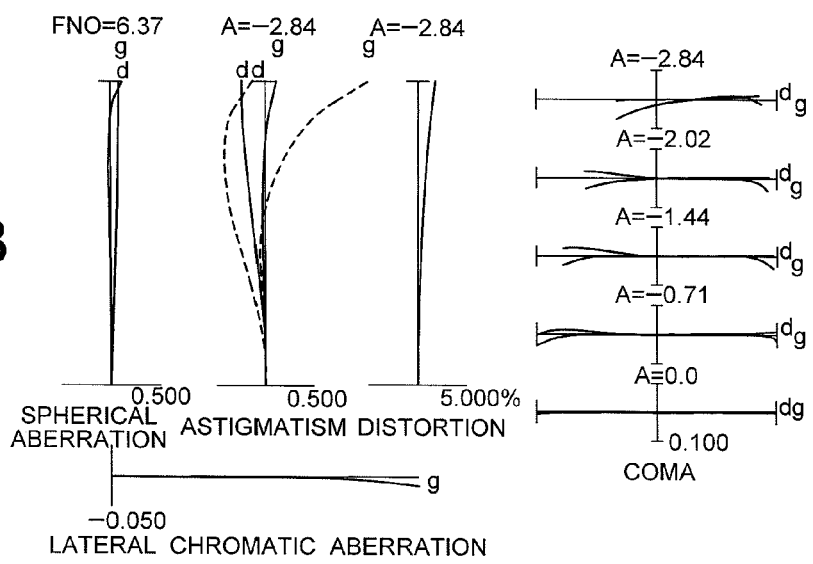
Figure 21C:
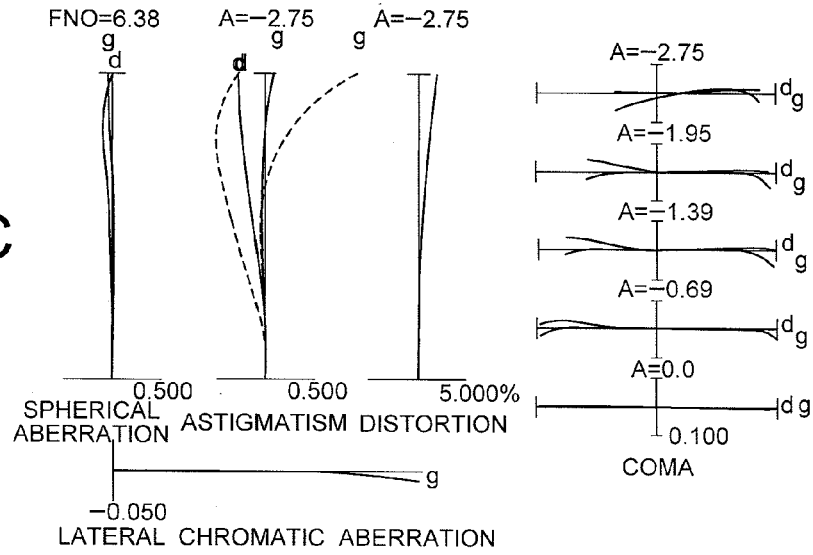

FIGS. 21A, 21B and 21C are graphs showing various aberrations of the zoom lens system according to Example 7 of the second embodiment, in which FIG. 21A is in a third intermediate focal length state M3, FIG. 21B is in a fourth intermediate focal length state M4, and FIG. 21C is in a telephoto end state T.

As is apparent from the respective graphs, the zoom lens according to Example 7 of the second embodiment shows superb optical performance as a result of good corrections to various aberrations from the wide-angle end state through the telephoto end state.

Example 8

FIG. 22 is a sectional view showing a configuration of a zoom lens system according to Example 8 of the second embodiment.

The zoom lens system according to Example 8 of the second embodiment is composed of, in order from an object along an optical axis, a first lens group G1 having positive refractive power, a second lens group G2 having negative refractive power, a third lens group G3 having positive refractive power, and a fourth lens group G4 having positive refractive power.

Upon zooming from a wide-angle end state W to a telephoto end state T, the first lens group G1 moves monotonously to the object side, the second lens group G2 moves to the image side up to a first intermediate focal length state M1 and to the object side from the first intermediate focal length state M1 to the telephoto end state T, the third lens group G3 moves monotonously to the object side, and the fourth lens group G4 moves monotonously to the object side with respect to the image plane I such that a distance between the first lens group G1 and the second lens group G2 increases, a distance between the second lens group G2 and the third lens group G3 decreases, and a distance between the third lens group G3 and the fourth lens group G4 decreases.

An aperture stop S is disposed to the most object side of the third lens group G3, which is disposed to the image side of the second lens group G2, and constructed in a body with the third lens group G3. Moreover, upon zooming from the wide-angle end state W to the telephoto end state T, the aperture stop S keeps the maximum diameter of the wide-angle end state W from the wide-angle end state W to the first intermediate focal length state M1, and increases the maximum diameter monotonously from the first intermediate focal length state M1 to the telephoto end state T.

The first lens group G1 is composed of, in order from the object side along the optical axis, a cemented lens constructed by a negative meniscus lens L11 having a convex surface facing the object side cemented with a biconvex positive lens L12, and a positive meniscus lens L13 having a convex surface facing the object side.

The second lens group G2 is composed of, in order from the object side along the optical axis, a negative meniscus lens L21 having a convex surface facing the object side, a biconcave negative lens L22, a biconvex positive lens L23, and a cemented lens constructed by a negative meniscus lens L24 having a convex surface facing an image side cemented with a positive meniscus lens L25 having a convex surface facing the image side. The negative meniscus lens L21 disposed to the most object side in the second lens group G2 is a compound type aspherical lens in which an aspherical surface is formed by a resin layer provided on the object side lens surface.

The third lens group G3 is composed of, in order from the object side along the optical axis, a biconvex positive lens L31, a biconvex positive lens L32, a cemented lens constructed by a biconvex positive lens L33 cemented with a biconcave negative lens L34, a cemented lens constructed by a biconcave negative lens L35 cemented with a positive meniscus lens L36 having a convex surface facing the object side, and a negative meniscus lens L37 having a concave surface facing the object side. The biconcave negative lens L35 is a glass mold type aspherical lens in which an aspherical surface is formed on the object side surface.

The fourth lens group G4 is composed of, in order from the object side along the optical axis, a biconvex positive lens L41, and a cemented lens constructed by a biconcave negative lens L42 cemented with a biconvex positive lens L43. The biconvex positive lens L41 disposed to the most object side of the fourth lens group G4 is a glass mold type aspherical lens in which an aspherical surface is formed on the object side surface. Light rays come out from the biconvex positive lens L43 form an image on the image plane I.

In the zoom lens system according to Example 8 of the second embodiment, each surface of the object side lens surface of the positive meniscus lens L13 of the first lens group G1 and the object side lens surface of the negative meniscus lens L24 of the second lens group G2 is applied with an antireflection coating described later.

The following Table 8 shows values of various items of data of the zoom lens system according to Example 8 of the second embodiment.

TABLE 8

(Lens Data)

| i | r | d | nd | vd |
|---|---|---|---|---|
| 1 | 123.9595 | 2.0000 | 1.850260 | 32.35 |
| 2 | 65.8189 | 9.3000 | 1.497820 | 82.52 |
| 3 | −679.8190 | 0.1000 | | |
| 4 | 66.6349 | 6.2000 | 1.593190 | 67.87 |
| 5 | 419.9308 | (d5) | | |
| 6* | 162.3242 | 0.1500 | 1.553890 | 38.09 |
| 7 | 146.0754 | 1.0000 | 1.834807 | 42.72 |
| 8 | 16.1304 | 6.5500 | | |
| 9 | −35.2760 | 1.0000 | 1.882997 | 40.76 |
| 10 | 60.4450 | 0.1000 | | |
| 11 | 37.3723 | 5.2000 | 1.846660 | 23.78 |
| 12 | −32.7279 | 0.8214 | | |
| 13 | −23.9463 | 1.0000 | 1.882997 | 40.76 |
| 14 | −252.4150 | 2.0000 | 1.808090 | 22.79 |
| 15 | −72.4479 | (d15) | | |
| 16 | ∞ | 1.0000 | Aperture Stop S | |
| 17 | 36.7222 | 3.3000 | 1.593190 | 67.87 |
| 18 | −118.1963 | 0.1000 | | |
| 19 | 41.3768 | 3.1500 | 1.487490 | 70.41 |
| 20 | −92.3429 | 0.1000 | | |
| 21 | 42.3403 | 3.8000 | 1.487490 | 70.41 |
| 22 | −41.0036 | 1.0000 | 1.805181 | 25.43 |
| 23 | 259.3609 | 3.8191 | | |
| 24* | −63.6485 | 1.0000 | 1.806100 | 40.94 |
| 25 | 22.0000 | 2.9000 | 1.805181 | 25.43 |
| 26 | 150.5781 | 4.2000 | | |
| 27 | −45.8244 | 1.0000 | 1.882997 | 40.76 |
| 28 | −215.9895 | (d28) | | |
| 29* | 77.1794 | 3.1500 | 1.589130 | 61.16 |
| 30 | −37.1187 | 0.1000 | | |
| 31 | −261.2949 | 1.0000 | 1.882997 | 40.76 |
| 32 | 39.9808 | 4.4000 | 1.518229 | 58.93 |
| 33 | −48.5209 | (Bf) | | |

(Aspherical Surface Data)

Surface number = 6

κ = −5.7774
A4 = 6.79980E−06
A6 = −2.52730E−08
A8 = 8.26150E−11
A10 = −1.02860E−13

TABLE 8-continued

Surface number = 24

κ = 2.8196
A4 = 4.59750E−06
A6 = 4.28350E−09
A8 = 0.00000E+00
A10 = 0.00000E+00

Surface number = 29

κ = −6.5363
A4 = −1.95310E−05
A6 = 1.79050E−08
A8 = −1.55070E−10
A10 = 4.13770E−13

(Various Data)
zoom ratio = 15.696

|  | f | FNO | ω | Y | TL | Bf |
|---|---|---|---|---|---|---|
| W = | 18.53979 | 4.10702 | 38.99845 | 14.20 | 160.00885 | 39.11693 |
| M1 = | 27.99960 | 4.69307 | 26.65869 | 14.20 | 165.81325 | 51.53459 |
| M2 = | 49.99905 | 5.38961 | 15.38789 | 14.20 | 187.27349 | 69.40178 |
| M3 = | 104.99746 | 5.39973 | 7.50128 | 14.20 | 218.99165 | 89.39051 |
| M4 = | 281.99442 | 5.39860 | 2.82458 | 14.20 | 237.63297 | 98.87896 |
| T = | 290.99204 | 5.39939 | 2.73812 | 14.20 | 237.79997 | 99.16649 |

|  | φ | d5 | d15 | d28 |
|---|---|---|---|---|
| W = | 15.60 | 2.15153 | 40.45482 | 8.84506 |
| M1 = | 15.60 | 10.22614 | 29.25621 | 5.35580 |
| M2 = | 16.50 | 25.00000 | 20.27964 | 3.15156 |
| M3 = | 20.00 | 45.02627 | 13.14016 | 1.99420 |
| M4 = | 21.72 | 65.29400 | 2.48000 | 1.53950 |
| T = | 21.78 | 65.69297 | 2.00000 | 1.50000 |

(Lens Group Data)

| Group | I | focal length |
|---|---|---|
| 1 | 1 | 103.25223 |
| 2 | 6 | −15.13084 |
| 3 | 16 | 44.76649 |
| 4 | 29 | 47.36030 |

(Values for Conditional Expressions)

(1) f1/fT = 0.355
(2) φT/φW = 1.396
(3) φM10/φW = 1.392 (φM10 is a value in M4)
(4) φM15/φW = 1.392 (φM15 is a value in M4)
(5) φM5/φW = 1.282 (φM5 is a value in M3)
(6) fM/fW = 1.510 (fM is a value in M1)
(7) −f2/fT = 0.0520

Figure 23A:
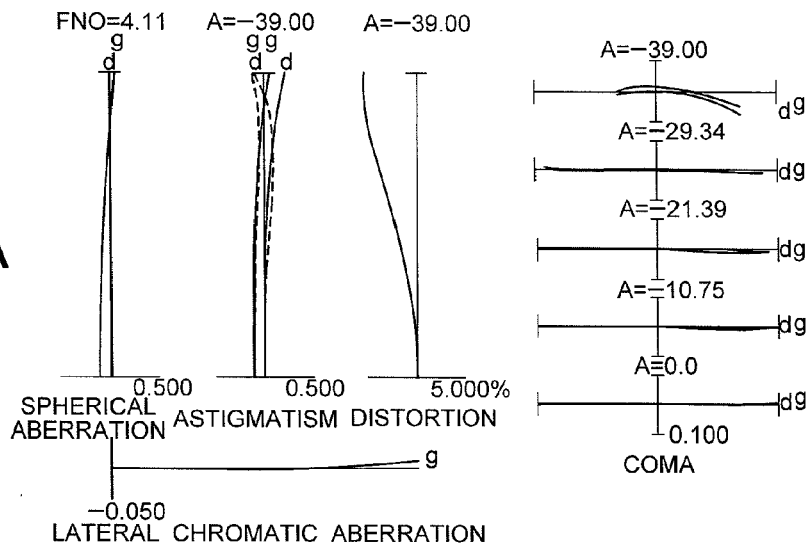
Figure 23B:
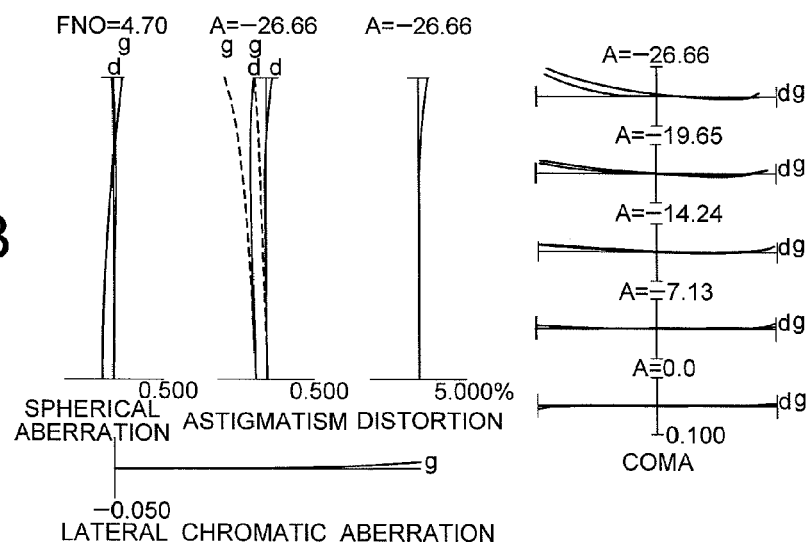
Figure 23C:
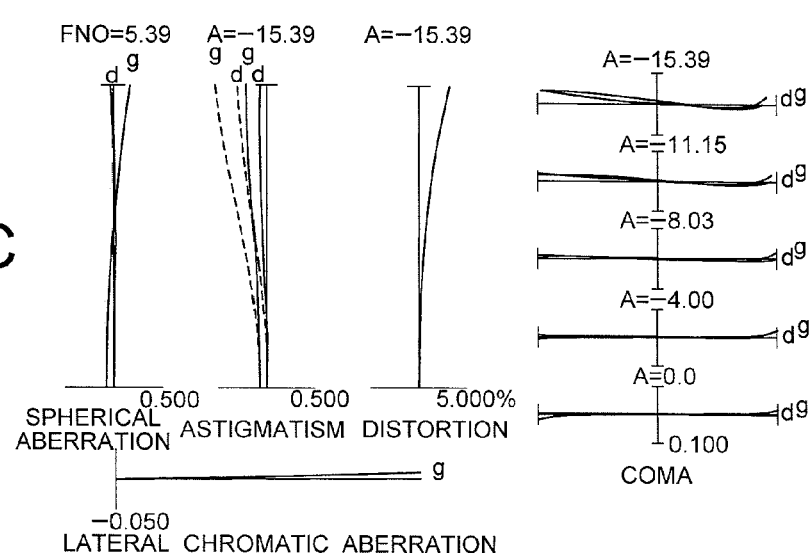

FIGS. 23A, 23B and 23C are graphs showing various aberrations of the zoom lens system according to Example 8 of the second embodiment, in which FIG. 23A is in a wide-angle end state W, FIG. 23B is in a first intermediate focal length state M1, and FIG. 23C is in a second intermediate focal length state M2.

Figure 24A:
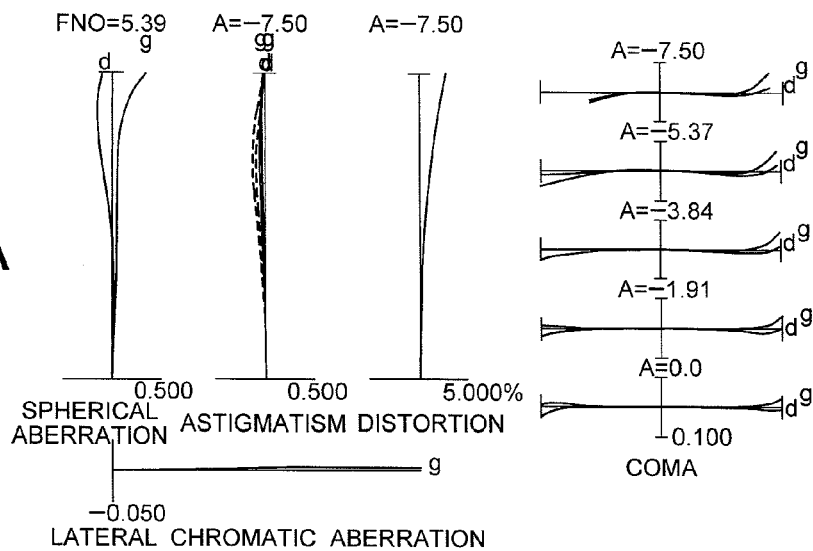
Figure 24B:
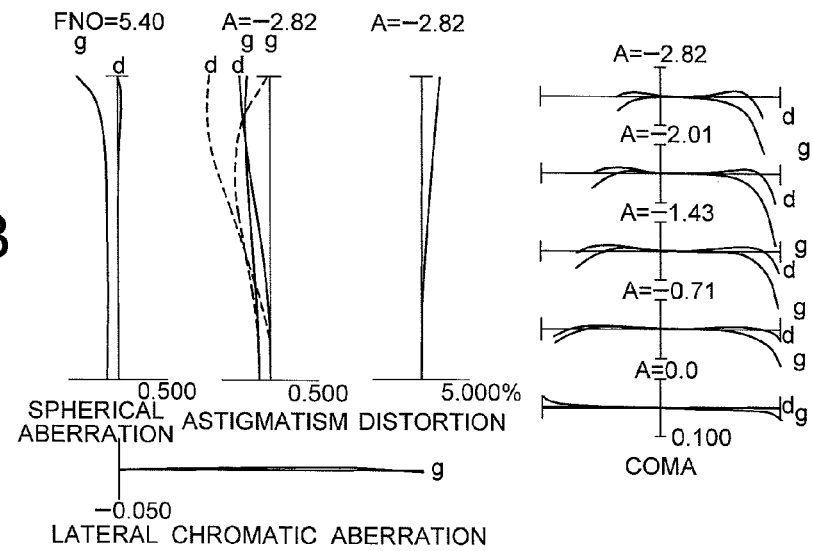
Figure 24C:
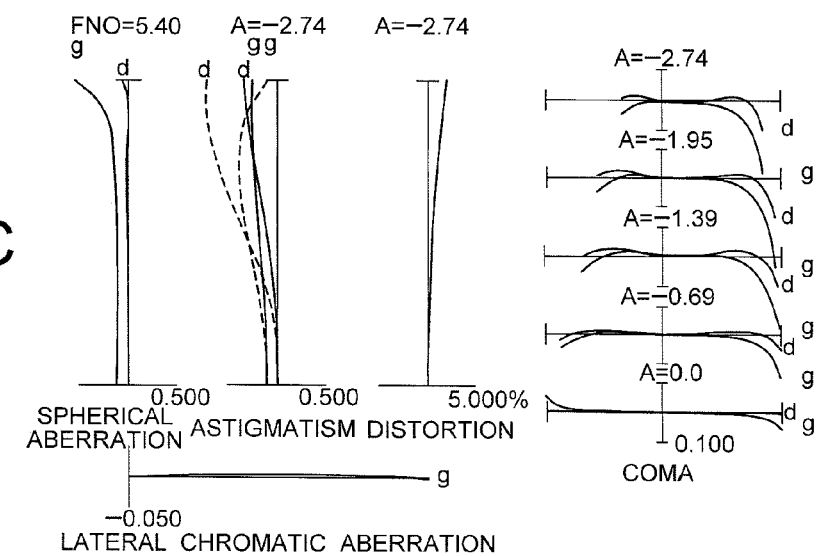

FIGS. 24A, 24B and 24C are graphs showing various aberrations of the zoom lens system according to Example 8 of the second embodiment, in which FIG. 24A is in a third intermediate focal length state M3, FIG. 24B is in a fourth intermediate focal length state M4, and FIG. 24C is in a telephoto end state T.

As is apparent from the respective graphs, the zoom lens according to Example 8 of the second embodiment shows superb optical performance as a result of good corrections to various aberrations from the wide-angle end state through the telephoto end state.

Example 9

Figure 25:
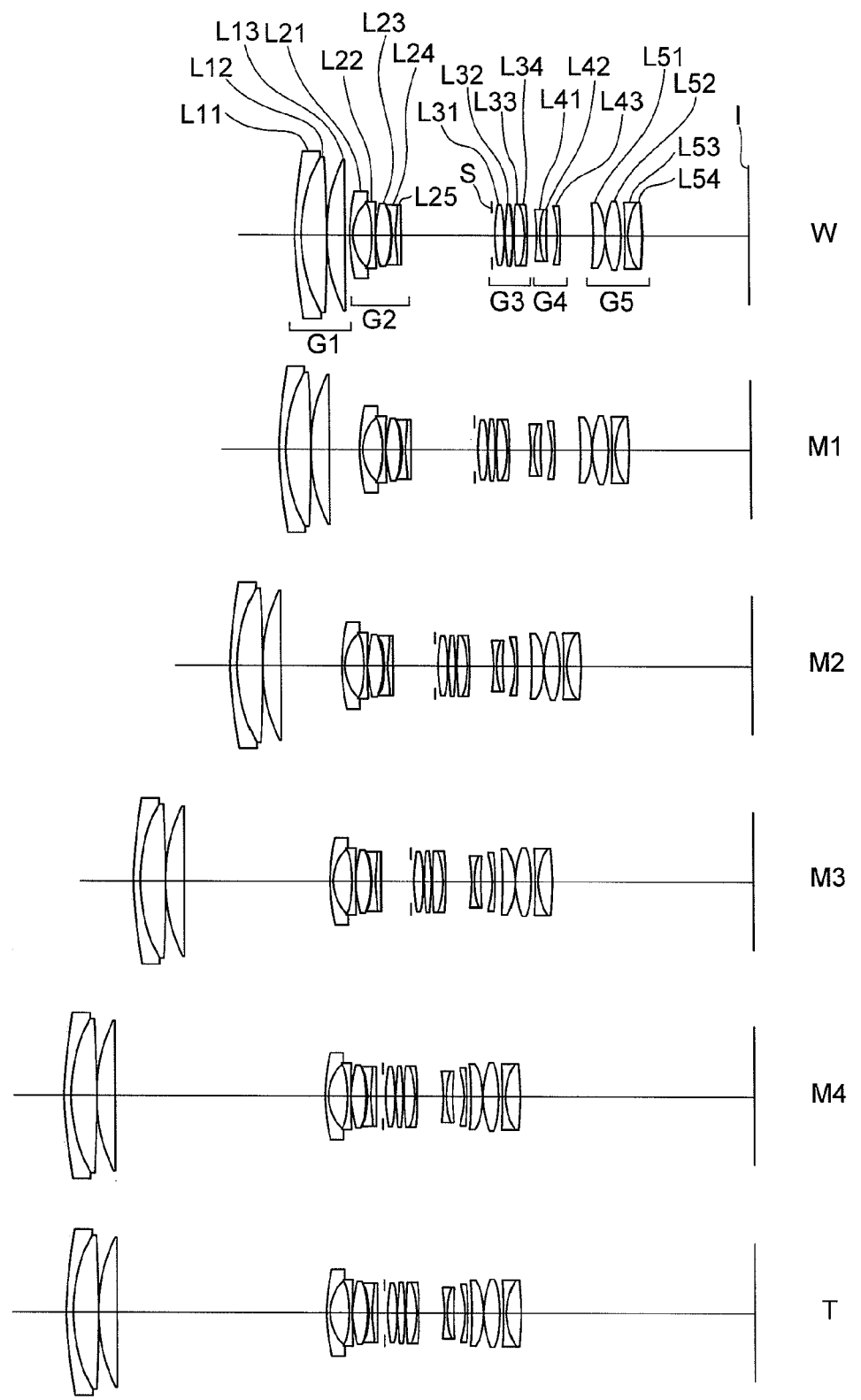
FIG. 25 is a sectional view showing a configuration of a zoom lens system according to Example 9 of the second embodiment.

FIG. 25 is a sectional view showing a configuration of a zoom lens system according to Example 9 of the second embodiment.

The zoom lens system according to Example 9 of the second embodiment is composed of, in order from an object along an optical axis, a first lens group G1 having positive refractive power, a second lens group G2 having negative refractive power, a third lens group G3 having positive refractive power, a fourth lens group G4 having negative refractive power, and a fifth lens group G5 having positive refractive power.

Upon zooming from a wide-angle end state W to a telephoto end state T, the first lens group G1 moves monotonously to the object side, the second lens group G2 moves to the image side up to a first intermediate focal length state M1 and to the object side from the first intermediate focal length state M1 to the telephoto end state T, the third lens group G3 moves monotonously to the object side, the fourth lens group G4 moves monotonously to the object side, and the fifth lens group G5 moves monotonously to the object side with respect to the image plane I such that a distance between the first lens group G1 and the second lens group G2 increases, a distance between the second lens group G2 and the third lens group G3 decreases, a distance between the third lens group G3 and the fourth lens group G4 increases, and a distance between the fourth lens group G4 and the fifth lens group G5 decreases.

An aperture stop S is disposed to the most object side of the third lens group G3, which is disposed to the image side of the second lens group G2, and constructed in a body with the third lens group G3. Moreover, upon zooming from the wide-angle end state W to the telephoto end state T, the aperture stop S keeps the maximum diameter of the wide-angle end state W from the wide-angle end state W to the second intermediate focal length state M2, and increases the maximum diameter monotonously from the second intermediate focal length state M2 to the telephoto end state T.

The first lens group G1 is composed of, in order from the object side along the optical axis, a cemented lens constructed by a negative meniscus lens L11 having a convex surface facing the object side cemented with a biconvex positive lens L12, and a positive meniscus lens L13 having a convex surface facing the object side.

The second lens group G2 is composed of, in order from the object side along the optical axis, a negative meniscus lens L21 having a convex surface facing the object side, a biconcave negative lens L22, a biconvex positive lens L23, and a cemented lens constructed by a biconcave negative lens L24 cemented with a biconvex positive lens L25. The negative meniscus lens L21 disposed to the most object side in the second lens group G2 is a compound type aspherical lens in which an aspherical surface is formed by a resin layer provided on the object side lens surface.

The third lens group G3 is composed of, in order from the object side along the optical axis, a biconvex positive lens L31, a biconvex positive lens L32, a cemented lens constructed by a biconvex positive lens L33 cemented with a negative meniscus lens L34 having a concave surface facing the object side.

The fourth lens group G4 is composed of, in order from the object side along the optical axis, a cemented lens constructed by a biconcave negative lens L41 cemented with a positive meniscus lens L42 having a convex surface facing the object side, and a negative meniscus lens L43 having a concave surface facing the object side. The biconcave negative lens L41 disposed to the most object side of the fourth lens group G4 is a compound type aspherical lens in which an aspherical surface is formed by a resin layer provided on the object side surface.

The fifth lens group G5 is composed of, in order from the object side along the optical axis, a biconvex positive lens L51, a biconvex positive lens L52, and a cemented lens constructed by a biconcave negative lens L53 cemented with a biconvex positive lens L54. The biconvex positive lens L51 disposed to the most object side of the fifth lens group G5 is a glass mold type aspherical lens in which an aspherical surface is formed on the object side surface. Light rays come out from the biconvex positive lens L54 form an image on the image plane I.

In the zoom lens system according to Example 9 of the second embodiment, each surface of the image side lens surface of the biconvex positive lens L12 of the first lens group G1 and the image side lens surface of the negative meniscus lens L21 of the second lens group G2 is applied with an antireflection coating described later.

The following Table 9 shows values of various items of data of the zoom lens system according to Example 9 of the second embodiment.

TABLE 9

(Lens Data)

| i | r | d | nd | νd |
|---|---|---|---|---|
| 1 | 175.6056 | 2.2000 | 1.834000 | 37.16 |
| 2 | 67.4302 | 8.8000 | 1.497820 | 82.52 |
| 3 | −587.7848 | 0.1000 | | |
| 4 | 72.2710 | 6.4500 | 1.593190 | 67.87 |
| 5 | 1826.1388 | (d5) | | |
| 6* | 84.7687 | 0.1000 | 1.553890 | 38.09 |
| 7 | 73.9375 | 1.2000 | 1.834807 | 42.72 |
| 8 | 17.1873 | 6.9500 | | |
| 9 | −36.9822 | 1.0000 | 1.816000 | 46.62 |
| 10 | 77.9263 | 0.1500 | | |
| 11 | 36.6346 | 5.3000 | 1.784723 | 25.68 |
| 12 | −36.6346 | 0.8000 | | |
| 13 | −26.1991 | 1.0000 | 1.816000 | 46.62 |
| 14 | 63.7396 | 2.0500 | 1.808090 | 22.79 |
| 15 | −643.2706 | (d15) | | |
| 16 | ∞ | 1.0000 | Aperture Stop S | |
| 17 | 65.8365 | 3.4000 | 1.593190 | 67.87 |
| 18 | −50.1546 | 0.1000 | | |
| 19 | 65.6817 | 2.4500 | 1.487490 | 70.41 |
| 20 | −154.9743 | 0.1000 | | |
| 21 | 46.7333 | 4.2000 | 1.487490 | 70.41 |
| 22 | −35.7833 | 1.0000 | 1.808090 | 22.79 |
| 23 | −191.9318 | (d23) | | |
| 24* | −57.2966 | 0.2000 | 1.553890 | 38.09 |
| 25 | −59.7250 | 0.9000 | 1.696797 | 55.52 |
| 26 | 28.5100 | 2.1500 | 1.728250 | 28.46 |
| 27 | 91.9976 | 4.1402 | | |
| 28 | −32.8954 | 1.0000 | 1.729157 | 54.66 |
| 29 | −144.3315 | (d29) | | |
| 30* | 6427.1919 | 4.6500 | 1.589130 | 61.18 |
| 31 | −27.3818 | 0.1000 | | |
| 32 | 31.4776 | 5.8500 | 1.487490 | 70.41 |
| 33 | −43.7539 | 1.4500 | | |
| 34 | −113.5897 | 1.0000 | 1.882997 | 40.76 |
| 35 | 20.3481 | 5.3000 | 1.548141 | 45.79 |
| 36 | −709.1453 | (Bf) | | |

(Aspherical Surface Data)

Surface number = 6

κ = 1.0000
A4 = 2.88220E−06
A6 = −2.29350E−11
A8 = −2.35280E−11
A10 = 9.21570E−14

TABLE 9-continued

Surface number = 24

κ = 1.0000
A4 = 4.32780E−06
A6 = 1.88460E−09
A8 = 0.00000E+00
A10 = 0.00000E+00

Surface number = 30

κ = 1.0000
A4 = −1.36170E−05
A6 = −3.55860E−10
A8 = 1.83080E−11
A10 = −1.86790E−13

(Various Data)
zoom ratio = 15.701

| | f | FNO | ω | Y | TL | Bf |
|---|---|---|---|---|---|---|
| W = | 18.56060 | 3.57565 | 38.80191 | 14.20 | 164.76435 | 38.84705 |
| M1 = | 27.94799 | 4.13253 | 26.18802 | 14.20 | 171.02547 | 44.06807 |
| M2 = | 48.95245 | 5.36204 | 15.68652 | 14.20 | 189.44683 | 62.50183 |
| M3 = | 104.65150 | 5.62482 | 7.44205 | 14.20 | 225.28899 | 73.57929 |
| M4 = | 280.18763 | 5.80434 | 2.82863 | 14.20 | 249.99418 | 86.00428 |
| T = | 291.42454 | 5.81064 | 2.72113 | 14.20 | 250.61470 | 86.64770 |

| | φ | d5 | d15 | d23 | d29 |
|---|---|---|---|---|---|
| W = | 15.80 | 2.15700 | 33.36360 | 3.46820 | 11.83830 |
| M1 = | 15.80 | 11.13190 | 23.94380 | 7.42730 | 9.36420 |
| M2 = | 15.80 | 22.22690 | 15.96870 | 8.95240 | 4.70680 |
| M3 = | 17.50 | 53.01000 | 11.30360 | 9.64300 | 2.66290 |
| M4 = | 19.50 | 75.67850 | 2.48130 | 9.67390 | 1.06600 |
| T = | 19.60 | 76.25220 | 2.00000 | 9.62460 | 1.00000 |

(Lens Group Data)

| Group | I | focal length |
|---|---|---|
| 1 | 1 | 117.72937 |
| 2 | 6 | −15.60945 |
| 3 | 16 | 27.35473 |
| 4 | 24 | −26.50041 |
| 5 | 30 | 35.20423 |

(Values for Conditional Expressions)

(1) f1/fT = 0.404
(2) φT/φW = 1.241
(3) φM10/φW = 1.234 (φM10 is a value in M4)
(4) φM15/φW = 1.234 (φM15 is a value in M4)
(5) φM5/φW = 1.108 (φM5 is a value in M3)
(6) fM/fW = 2.637 (fM is a value in M2)
(7) −f2/fT = 0.0536

Figure 26A:
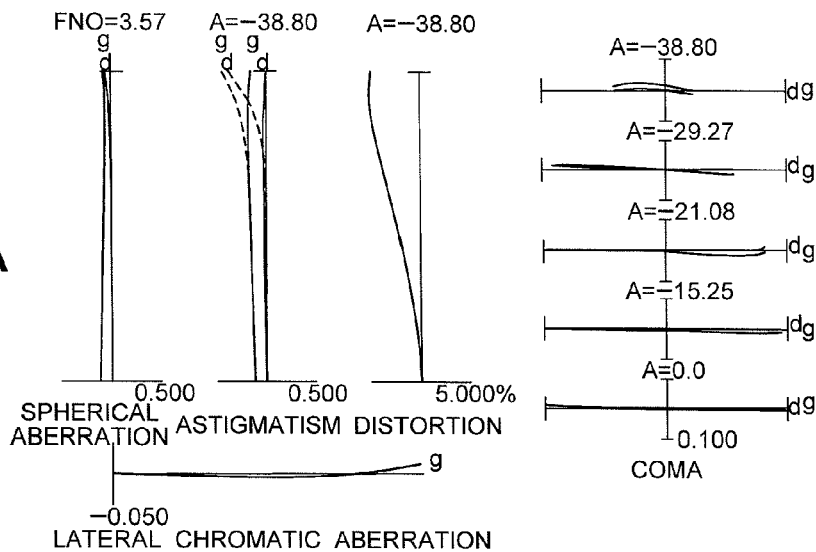
Figure 26B:
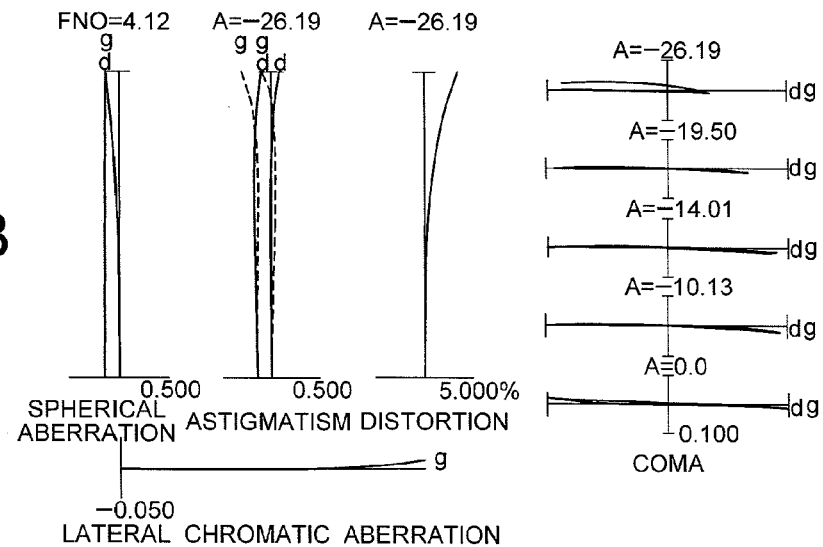
Figure 26C:
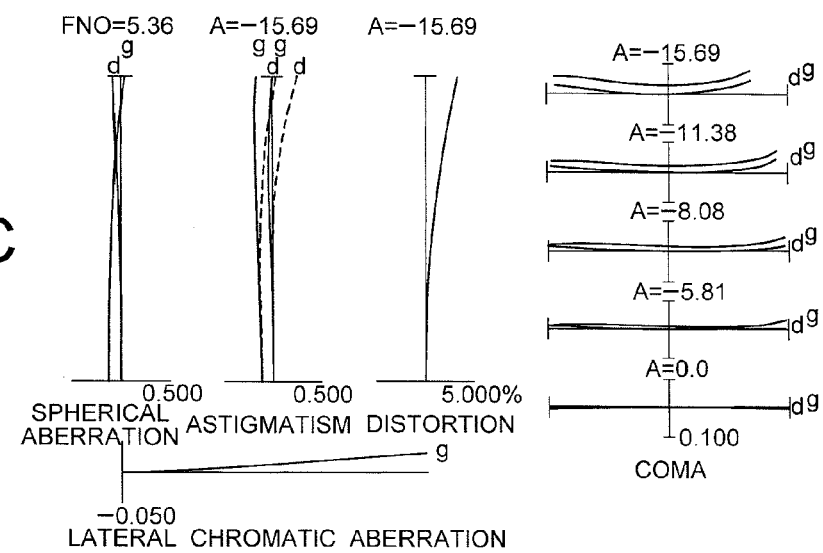

FIGS. 26A, 26B and 26C are graphs showing various aberrations of the zoom lens system according to Example 9 of the second embodiment, in which FIG. 26A is in a wide-angle end state W, FIG. 26B is in a first intermediate focal length state M1, and FIG. 26C is in a second intermediate focal length state M2.

Figure 27A:
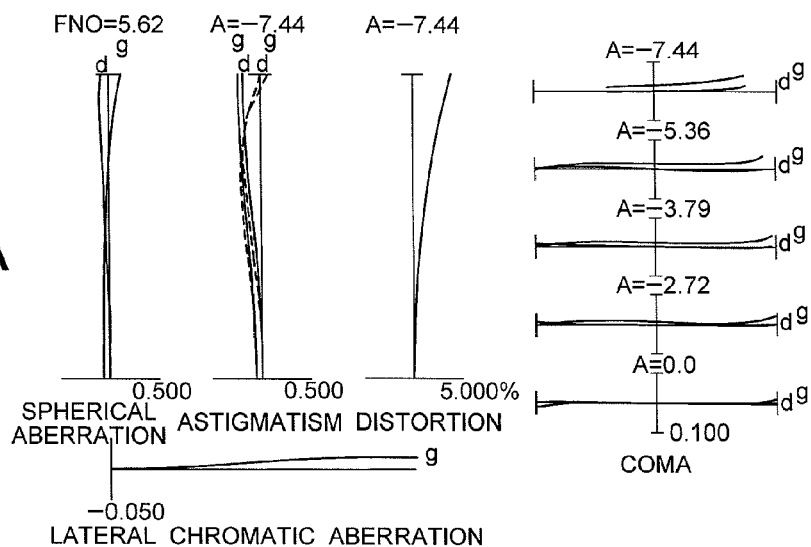
Figure 27B:
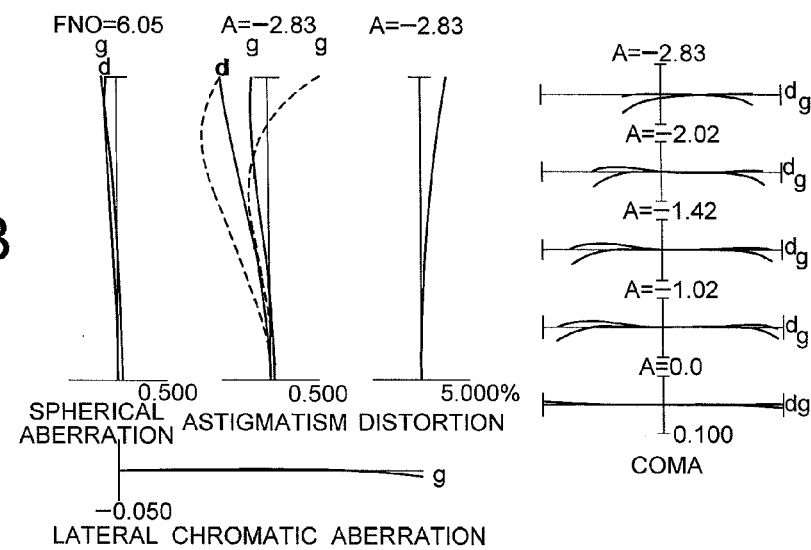
Figure 27C:
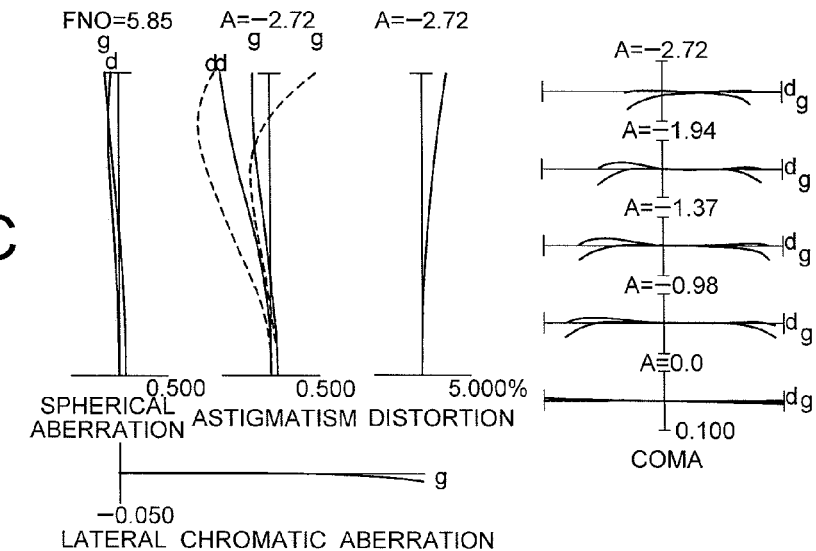

FIGS. 27A, 27B and 27C are graphs showing various aberrations of the zoom lens system according to Example 9 of the second embodiment, in which FIG. 27A is in a third intermediate focal length state M3, FIG. 27B is in a fourth intermediate focal length state M4, and FIG. 27C is in a telephoto end state T.

As is apparent from the respective graphs, the zoom lens according to Example 9 of the second embodiment shows superb optical performance as a result of good corrections to various aberrations from the wide-angle end state through the telephoto end state.

As described above, the second embodiment makes it possible to provide a zoom lens system having high optical performance with suppressing variation in aberrations.

Then, an antireflection coating used for zoom lens systems according to second embodiment has already been described above, so that duplicated explanations are omitted.

Explained next is an example of applying the antireflection coating shown in Tables 19 and 20 to Examples 6 through 9 discussed above.

In the zoom lens system according to Example 6, as shown in the Table 6, the refractive index nd of the negative meniscus lens L21 of the second lens group G2 is 1.804000 (nd=1.804000), and the refractive index nd of the biconcave negative lens L22 of the second lens group G2 is 1.834807 (nd=1.834807), whereby it is feasible to reduce the reflected light from each lens surface and to reduce ghost images and flare as well by applying the antireflection coating 101 (see Table 19) corresponding to 1.85 as the substrate refractive index to the image side lens surface of the negative meniscus lens L21 and applying the antireflection coating (see Table 19) corresponding to 1.85 as the substrate refractive index to the object side lens surface of the biconcave negative lens L22.

In the zoom lens system according to Example 7, as shown in the Table 7, the refractive index nd of the positive meniscus lens L13 of the first lens group G1 is 1.603001 (nd=1.603001), and the refractive index nd of the biconvex positive lens L23 of the second lens group G2 is 1.846660 (nd=1.846660), whereby it is feasible to reduce the reflected light from each lens surface and to reduce ghost images and flare as well by applying the antireflection coating 101 (see Table 19) corresponding to 1.62 as the substrate refractive index to the object side lens surface of the positive meniscus lens L13 and applying the antireflection coating (see Table 19) corresponding to 1.85 as the substrate refractive index to the image side lens surface of the biconvex positive lens L23.

In the zoom lens system according to Example 8, as shown in the Table 8, the refractive index nd of the positive meniscus lens L13 of the first lens group G1 is 1.593190 (nd=1.593190), and the refractive index nd of the negative meniscus lens L24 of the second lens group G2 is 1.882997 (nd=1.882997), whereby it is feasible to reduce the reflected light from each lens surface and to reduce ghost images and flare as well by applying the antireflection coating 101 (see Table 19) corresponding to 1.62 as the substrate refractive index to the object side lens surface of the positive meniscus lens L13 and applying the antireflection coating (see Table 19) corresponding to 1.85 as the substrate refractive index to the object side lens surface of the negative meniscus lens L24.

In the zoom lens system according to Example 9, as shown in the Table 9, the refractive index nd of the biconvex positive lens L12 of the first lens group G1 is 1.497820 (nd=1.497820), and the refractive index nd of the negative meniscus lens L21 of the second lens group G2 is 1.834807 (nd=1.834807), whereby it is feasible to reduce the reflected light from each lens surface and to reduce ghost images and flare as well by applying the antireflection coating 101 (see Table 20) corresponding to 1.52 as the substrate refractive index to the image side lens surface of the biconvex positive lens L12 and applying the antireflection coating (see Table 19) corresponding to 1.85 as the substrate refractive index to the image side lens surface of the negative meniscus lens L21.

Then, an outline of a method for manufacturing a zoom lens system according to the second embodiment of the present application is described below.

Figure 46:
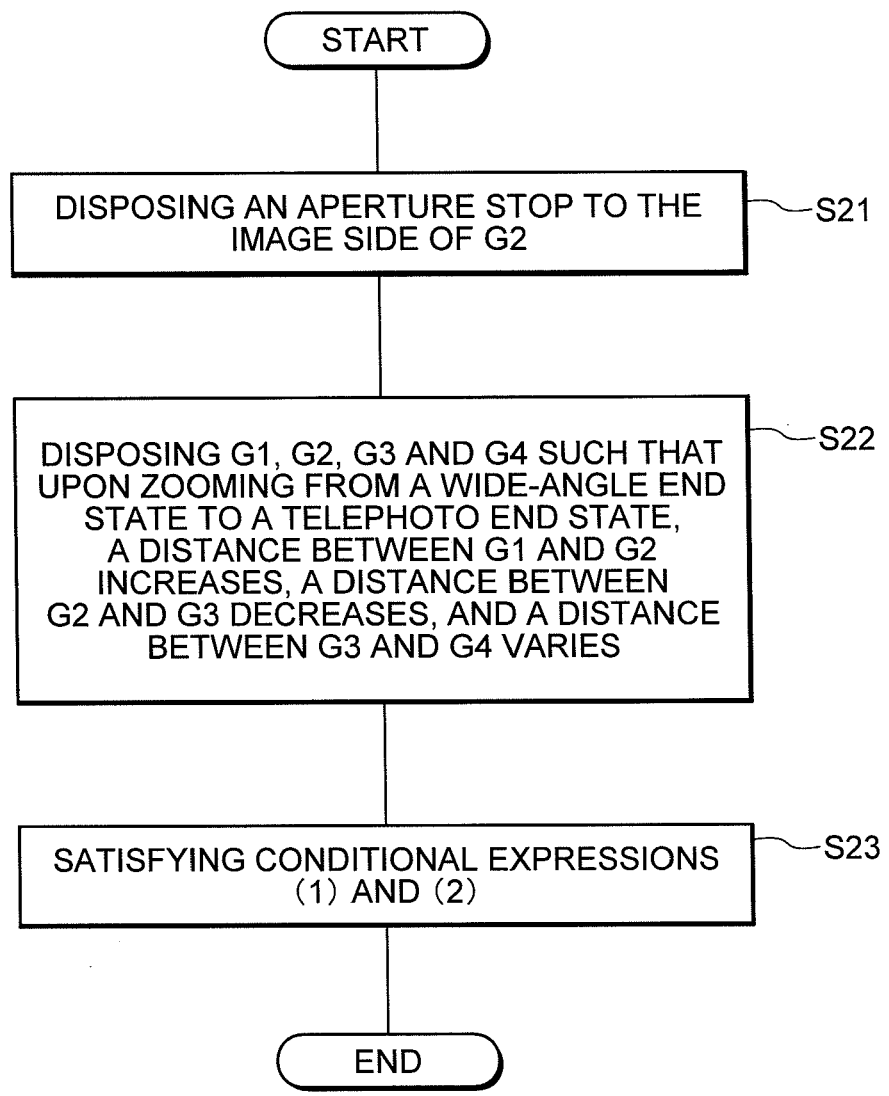
FIG. 46 is a flowchart showing a method for manufacturing a zoom lens system according to the second embodiment.

FIG. 46 is a flowchart showing a method for manufacturing a zoom lens system according to the second embodiment of the present application.

The method for manufacturing a zoom lens system according to the second embodiment is a method for manufacturing a zoom lens system including, in order from an object side along an optical axis, a first lens group having positive refractive power, a second lens group having negative refractive power, a third lens group having positive refractive power, and a fourth lens group having negative refractive power, and the method includes the following steps of S21, S22 and S23 as shown in FIG. 46.

Step S21: disposing an aperture stop to the image side of the second lens group.

Step S22: disposing the first lens group, the second lens group, the third lens group, and the fourth lens group such that upon zooming from a wide-angle end state to a telephoto end state, a distance between the first lens group and the second lens group increases, a distance between the second lens group and the third lens group decreases, and a distance between the third lens group and the fourth lens group varies.

Step S23: satisfying the following conditional expressions (1) and (2):

$$0.17 < f1/fT < 0.60 \quad (1)$$

$$1.03 < \phi T/\phi W < 1.70 \quad (2)$$

where fT denotes a focal length of the zoom lens system in the telephoto end state, f1 denotes a focal length of the first lens group, $\phi W$ denotes the maximum diameter of the aperture stop in the wide-angle end state, and $\phi T$ denotes the maximum diameter of the aperture stop in the telephoto end state.

The method for manufacturing a zoom lens system according to the second embodiment of the present application makes it possible to manufacture a zoom lens system having high optical performance with suppressing variation in aberrations and further suppressing ghost images and flare.

In the zoom lens system according to the second embodiment, the first lens group preferably includes two positive lens components. Moreover, the first lens group preferably disposes these lens components, in order from the object side, positive-positive with disposing an air space between them.

In a zoom lens system according to the second embodiment, the second lens group preferably includes one positive lens component and three negative lens components. Moreover, the second lens group preferably disposes these lens components, in order from the object side, negative-negative-positive-negative with an air space between each of them.

In a zoom lens system according to the second embodiment, the third lens group preferably includes two positive lens components and one negative lens component.

In a zoom lens system according to the second embodiment, the fourth lens group preferably includes one positive lens component.

Third Embodiment

A zoom lens system according to a third embodiment of the present application is explained below.

A zoom lens system according to the third embodiment includes, in order from an object side, a first lens group having positive refractive power, a second lens group having negative refractive power, and a third lens group having positive refractive power. Upon zooming from a wide-angle end state to a telephoto end state, a distance between the first lens group and the second lens group increases, and a distance between the second lens group and the third lens group decreases, thereby realizing a zoom optical system and suppressing variation in distortion upon zooming.

In a zoom lens system according to the third embodiment, the third lens group includes, in order from the object side, a first sub-lens group having positive refractive power, a second sub-lens group having negative refractive power, and a third sub-lens group. Upon zooming from the wide-angle end state to the telephoto end state, a distance between the first sub-lens group and the second sub-lens group varies, and a distance between the second sub-lens group and the third sub-lens group varies. With this configuration, zooming efficiency of the third lens group can be higher than a case that the third lens group is moved in a body, and a higher optical performance can be realized with suppressing variation in spherical aberration, coma and astigmatism.

Moreover, in a zoom lens system according to the third embodiment, the first sub-lens group includes, in order from the object side along an optical axis, a first positive lens, a second positive lens, and a cemented lens. With this configuration, let the first sub-lens group have a given positive refractive power necessary for zooming and have at least three positive lenses, so that refractive power of each lens can be weakened. Accordingly, with suppressing generation of decentering coma and spherical aberration caused by a manufacturing error such as decentering of lenses and surface distance deviation and with suppressing generation of negative spherical aberration generated in the positive lenses, high optical performance can be obtained.

In a zoom lens system according to the third embodiment, the cemented lens preferably includes, in order from the object side, the third positive lens and the negative lens.

With this configuration, chromatic difference in spherical aberration can be excellently corrected.

In a zoom lens system according to the third embodiment, the following conditional expression (8) is preferably satisfied:

$$35.0 < (vd31 + vd32 + vd33)/3 - vd34 \quad (8)$$

where vd31 denotes an Abbe number of the first positive lens at d-line, vd32 denotes an Abbe number of the second positive lens at d-line, vd33 denotes an Abbe number of the third positive lens at d-line, and vd34 denotes an Abbe number of the negative lens at d-line.

Conditional expression (8) is for obtaining high optical performance with correcting longitudinal chromatic aberration with good balance.

When the value (vd31+vd32+vd33)/3−vd34 is equal to or falls below the lower limit of conditional expression (8), it becomes difficult to correct longitudinal chromatic aberration and spherical aberration in the telephoto end state, so that high optical performance cannot be obtained.

In order to secure the effect of the present embodiment, it is preferable to set the lower limit of conditional expression (8) to 38.0. In order to further secure the effect of the present embodiment, it is preferable to set the lower limit of conditional expression (8) to 41.0.

In order to secure the effect of the present embodiment, it is preferable to set the upper limit of conditional expression (8) to 70.0. When the value (vd31+vd32+vd33)/3−vd34 is equal to or exceeds the upper limit of conditional expression (8), second order longitudinal chromatic aberration and chromatic difference in spherical aberration in the telephoto end state becomes overcorrected in existing optical materials. Accordingly, chromatic aberration is generated, so that high optical performance cannot be obtained. In order to secure the effect of the present embodiment, it is preferable to set the upper limit of conditional expression (8) to 65.0.

In a zoom lens system according to the third embodiment, the following conditional expression (9) is preferably satisfied:

$$35.0 < vd31 - vd34 \quad (9)$$

where vd31 denotes an Abbe number of the first positive lens at d-line, and vd34 denotes an Abbe number of the negative lens at d-line.

Conditional expression (9) is for obtaining high optical performance with correcting longitudinal chromatic aberration with good balance by optimizing chromatic-aberration-correction state of the first positive lens and the negative lens.

When the value vd31-vd34 is equal to or falls below the lower limit of conditional expression (9), it becomes difficult to correct longitudinal chromatic aberration and chromatic difference in spherical aberration in the telephoto end state, so that high optical performance cannot be obtained.

In order to secure the effect of the present embodiment, it is preferable to set the lower limit of conditional expression (9) to 40.0. In order to further secure the effect of the present embodiment, it is most preferable to set the lower limit of conditional expression (9) to 44.0.

Moreover, in order to secure the effect of the present embodiment, it is preferable to set the upper limit of conditional expression (9) to 70.0. When the value vd31-vd34 is equal to or exceeds the upper limit of conditional expression (9), second order longitudinal chromatic aberration and chromatic difference in spherical aberration in the telephoto end state becomes overcorrected in existing optical materials. Accordingly, chromatic aberration is generated, so that high optical performance cannot be obtained. In order to secure the effect of the present embodiment, it is preferable to set the upper limit of conditional expression (9) to 65.0.

In a zoom lens system according to the third embodiment, the following conditional expression (10) is preferably satisfied:

$$35.0 < vd32 - vd34 \quad (10)$$

where vd32 denotes an Abbe number of the second positive lens at d-line, and vd34 denotes an Abbe number of the negative lens at d-line.

Conditional expression (10) is for obtaining high optical performance with correcting longitudinal chromatic aberration with good balance by optimizing chromatic-aberration-correction state of the second positive lens and the negative lens.

When the value vd32-vd34 is equal to or falls below the lower limit of conditional expression (10), it becomes difficult to correct longitudinal chromatic aberration and chromatic difference in spherical aberration in the telephoto end state, so that high optical performance cannot be obtained.

In order to secure the effect of the present embodiment, it is preferable to set the lower limit of conditional expression (10) to 40.0. In order to further secure the effect of the present embodiment, it is most preferable to set the lower limit of conditional expression (10) to 44.0.

Moreover, in order to secure the effect of the present embodiment, it is preferable to set the upper limit of conditional expression (10) to 70.0. When the value vd32-vd34 is equal to or exceeds the upper limit of conditional expression (10), second order longitudinal chromatic aberration and chromatic difference in spherical aberration in the telephoto end state becomes overcorrected in existing optical materials. Accordingly, chromatic aberration is generated, so that high optical performance cannot be obtained. In order to secure the effect of the present embodiment, it is preferable to set the upper limit of conditional expression (10) to 65.0.

In a zoom lens system according to the third embodiment, the following conditional expression (11) is preferably satisfied:

$$35.0 < vd33 - vd34 \quad (11)$$

where vd33 denotes an Abbe number of the third positive lens at d-line, and vd34 denotes an Abbe number of the negative lens at d-line.

Conditional expression (11) is for obtaining high optical performance with correcting longitudinal chromatic aberration with good balance by optimizing chromatic-aberration-correction state of the third positive lens and the negative lens.

When the value vd33-vd34 is equal to or falls below the lower limit of conditional expression (11), it becomes difficult to correct longitudinal chromatic aberration and chromatic difference in spherical aberration in the telephoto end state, so that high optical performance cannot be obtained.

In order to secure the effect of the present embodiment, it is preferable to set the lower limit of conditional expression (11) to 40.0. In order to further secure the effect of the present embodiment, it is most preferable to set the lower limit of conditional expression (11) to 44.0.

Moreover, in order to secure the effect of the present embodiment, it is preferable to set the upper limit of conditional expression (11) to 70.0. When the value vd33-vd34 is equal to or exceeds the upper limit of conditional expression (11), second order longitudinal chromatic aberration and chromatic difference in spherical aberration in the telephoto end state becomes overcorrected in existing optical materials. Accordingly, chromatic aberration is generated, so that high optical performance cannot be obtained. In order to secure the effect of the present embodiment, it is preferable to set the upper limit of conditional expression (11) to 65.0.

In a zoom lens system according to the third embodiment, the following conditional expression (12) is preferably satisfied:

$$0.80 < f3A/(-f3B) < 1.30 \quad (12)$$

where f3A denotes a focal length of the first sub-lens group, and f3B denotes a focal length of the second sub-lens group.

Conditional expression (12) is for obtaining high optical performance over entire zooming range by defining an appropriate range of the focal length of the second sub-lens group with respect to the focal length of the first sub-lens group.

When the ratio f3A/(-f3B) is equal to or falls below the lower limit of conditional expression (12), the focal length of the first sub-lens group becomes relatively too small with respect to the focal length of the second sub-lens group, so that negative spherical aberration generated in the first sub-lens group in the wide-angle end state becomes difficult to be corrected. Accordingly, high optical performance cannot be obtained.

On the other hand, when the ratio f3A/(-f3B) is equal to or exceeds the upper limit of conditional expression (12), the focal length of the second sub-lens group becomes relatively too small with respect to the focal length of the first sub-lens group, so that positive spherical aberration generated in the second sub-lens group in the telephoto end state becomes difficult to be corrected. Accordingly, high optical performance cannot be obtained.

In order to secure the effect of the present embodiment, it is preferable to set the lower limit of conditional expression (12) to 0.90.

In order to secure the effect of the present embodiment, it is preferable to set the upper limit of conditional expression (12) to 1.20.

In a zoom lens system according to the third embodiment, the following conditional expression (13) is preferably satisfied:

$$0.50 < f32/f31 < 10.00 \quad (13)$$

where f31 denotes a focal length of the first positive lens, and f32 denotes a focal length of the second positive lens.

Conditional expression (13) defines an appropriate range of the focal length of the second positive lens with respect to the focal length of the first positive lens, thereby realizing high optical performance over entire zooming range.

When the ratio f32/f31 is equal to or falls below the lower limit of conditional expression (13), the focal length of the second positive lens becomes relatively too small with respect to the focal length of the first positive lens, and negative spherical aberration generated in the second positive lens becomes difficult to be corrected, so that high optical performance cannot be obtained.

On the other hand, when the ratio f32/f31 is equal to or exceeds the upper limit of conditional expression (13), the focal length of the first positive lens becomes relatively too small with respect to the focal length of the second positive lens, and negative spherical aberration generated in the first positive lens becomes difficult to be corrected, so that high optical performance cannot be obtained.

In order to secure the effect of the present embodiment, it is preferable to set the lower limit of conditional expression (13) to 0.67.

In order to secure the effect of the present embodiment, it is preferable to set the upper limit of conditional expression (13) to 6.50.

In a zoom lens system according to the third embodiment, the following conditional expression (13) is preferably satisfied:

$$0.50 < r32a/r31a < 10.00 \quad (14)$$

where r31a denotes a radius of curvature of the object side surface of the first positive lens, and r32a denotes a radius of curvature of the object side surface of the second positive lens.

Conditional expression (14) defines an appropriate range of the radius of curvature of the object side surface of the second positive lens with respect to the radius of curvature of the object side surface of the first positive lens, thereby realizing high optical performance over entire zooming range.

When the ratio r32a/r31a is equal to or falls below the lower limit of conditional expression (14), negative spherical aberration generated in the object side surface of the second positive lens becomes too large to be corrected in the third lens group, so that high optical performance cannot be obtained.

On the other hand, when the ratio r32a/r31a is equal to or exceeds the upper limit of conditional expression (14), negative spherical aberration generated in the object side surface of the first positive lens becomes too large to be corrected in the third lens group, so that high optical performance cannot be obtained.

In order to secure the effect of the present embodiment, it is preferable to set the lower limit of conditional expression (14) to 0.65.

In order to secure the effect of the present embodiment, it is preferable to set the upper limit of conditional expression (14) to 6.50.

In a zoom lens system according to the third embodiment, the first positive lens preferably has a biconvex shape.

With this configuration, it becomes possible to suppress negative spherical aberration generated in the first positive lens and to suppress generation of decentering coma and spherical aberration caused by a manufacturing error such as decentering of lenses and surface distance deviation in the first sub-lens group, and high optical performance can be obtained.

In a zoom lens system according to the third embodiment, the second positive lens preferably has a biconvex shape.

With this configuration, it becomes possible to suppress negative spherical aberration generated in the second positive lens and to suppress generation of decentering coma and spherical aberration caused by a manufacturing error such as decentering of lenses and surface distance deviation in the first sub-lens group, and high optical performance can be obtained.

In a zoom lens system according to the third embodiment, it is preferable that the third positive lens has a biconvex shape, and the negative lens has a negative meniscus shape.

With this configuration, it becomes possible to suppress negative spherical aberration and overcorrection of chromatic difference in spherical aberration generated in the cemented lens including the third positive lens and the negative lens, so that high optical performance can be obtained.

In a zoom lens system according to the third embodiment, it is preferable that upon zooming from the wide-angle end state to the telephoto end state, the distance between the first sub-lens group and the second sub-lens group increases, and the distance between the second sub-lens group and the third sub-lens group decreases.

With this configuration, since a position of the principal point of the third lens group can be moved nearer to the object side in the telephoto end state than in the wide-angle end state, it becomes possible to zoom effectively, so that high optical performance can be obtained.

In a zoom lens system according to the third embodiment, the third sub-lens group preferably has positive refractive power.

With this configuration, a position of the principal point of the third lens group can be moved nearer to the object side in the telephoto end state than in the wide-angle end state, it becomes possible to zoom effectively. Moreover, positive refractive power of the third lens group can be divided by the first sub-lens group and the third sub-lens group, so that negative spherical aberration generated in the first sub-lens group can suppressed. Accordingly, variation in spherical aberration can be suppressed over entire zooming range, so that high optical performance can be obtained.

In a zoom lens system according to the third embodiment, an aperture is preferably disposed to the image side of the second lens group.

With this configuration, increase in the diameter of the third lens group can be suppressed, and variation in distortion upon zooming from the wide-angle end state to the telephoto end state can be suppressed, so that high optical performance can be obtained.

In a zoom lens system according to the third embodiment, an aperture stop is preferably disposed between the second lens group and the third lens group.

With this configuration, increase in the diameters of the first lens group and the second lens group can be suppressed, and variation in distortion upon zooming from the wide-angle end state to the telephoto end state can be suppressed, so that high optical performance can be obtained.

It is preferable that a zoom lens system according to the third embodiment includes an aperture stop, and the aperture stop is moved in a body with the first sub-lens group upon zooming from the wide-angle end state to the telephoto end state.

With this configuration, upon zooming from the wide-angle end state to the telephoto end state, variation in the off-axis ray passing through the third lens group can be suppressed, and variation in coma, curvature of field and astigmatism can be suppressed, so that high optical performance can be obtained.

Each example according to the third embodiment is explained below with reference to accompanying drawings.

Example 10

Figure 30:
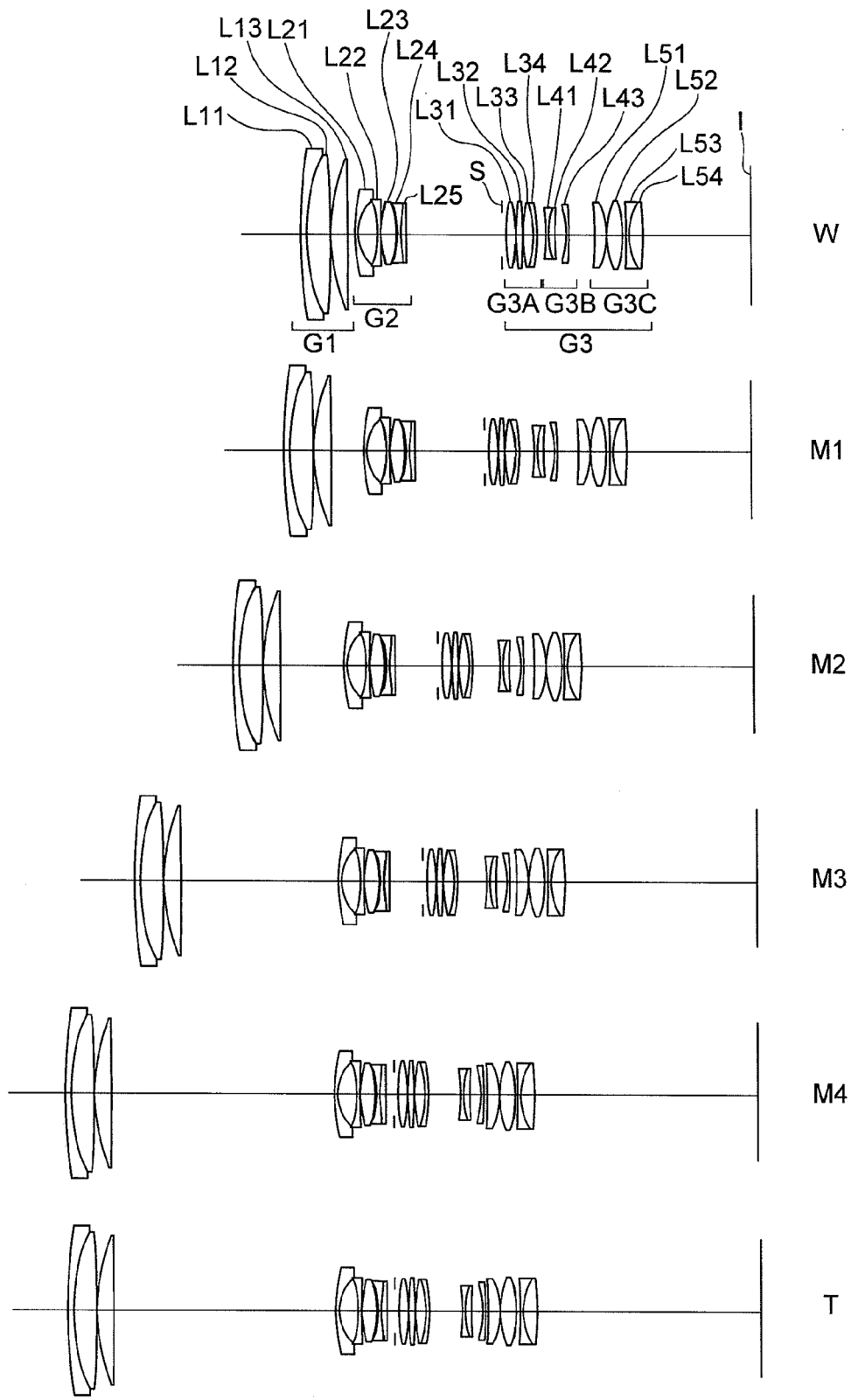
FIG. 30 is a sectional view showing a configuration of a zoom lens system according to Example 10 of a third embodiment.

FIG. 30 is a sectional view showing a configuration of a zoom lens system according to Example 10 of the third embodiment.

As shown in FIG. 30, the zoom lens system according to Example 10 of the third embodiment is composed of, in order from an object side along an optical axis, a first lens group G1 having positive refractive power, a second lens group G2 having negative refractive power, and a third lens group G3 having positive refractive power. The third lens group G3 is composed of a first sub-lens group G3A having positive refractive power, a second sub-lens group G3B having negative refractive power, and a third sub-lens group G3C having positive refractive power.

Upon zooming from a wide-angle end state W to a telephoto end state T, the first lens group G1 is moved monotonously to the object side, the second lens group G2 is moved with respect to the image plane I to an image side from the wide-angle end state W to a first intermediate focal length state M1, and to the object side from the first intermediate focal length state M1 to the telephoto end state T such that a distance between the first lens group G1 and the second lens group G2 increases, and a distance between the second lens group G2 and the third lens group G3 decreases. Moreover, the first sub-lens group G3A, the second sub-lens group G3B and the third sub-lens group G3C are moved monotonously to the object side with respect to the image plane I such that a distance between the first sub-lens group G3A and the second sub-lens group G3B increases, and a distance between the second sub-lens group G3B and the third sub-lens group G3C decreases. Moreover, the first sub-lens group G3A and the third sub-lens group G3C are moved in a body with respect to the image plane I.

An aperture stop S is disposed to the most object side of the third lens group G3, which is disposed to the image side of the second lens group G2, and constructed in a body with the first sub-lens group G3A.

The first lens group G1 is composed of, in order from the object side along the optical axis, a cemented lens constructed be a negative meniscus lens L11 having a convex surface facing the object side cemented with a biconvex positive lens L12, and a biconvex positive lens L13.

The second lens group G2 is composed of, in order from the object side along the optical axis, a negative meniscus lens L21 having a convex surface facing the object side, a biconcave negative lens L22, a biconvex positive lens L23, and a cemented lens constructed by a biconcave negative lens L24 cemented with a biconvex positive lens L25. The negative meniscus lens L21 disposed to the most object side in the second lens group G2 is a compound type aspherical lens in which an aspherical surface is formed by a resin layer provided on the object side lens surface.

The first sub-lens group G3A is composed of, in order from the object side along the optical axis, a biconvex positive lens L31, a biconvex positive lens L32, and a cemented lens constructed by a biconvex positive lens L33 cemented with a negative meniscus lens L34 having a concave surface facing the object side.

The second sub-lens group G3B is composed of, in order from the object side along the optical axis, a cemented lens constructed by a biconcave negative lens L41 cemented with a positive meniscus lens L42 having a convex surface facing the object side, and a negative meniscus lens L43 having a concave surface facing the object side. The biconcave negative lens L41 disposed to the most object side in the second sub-lens group G3B is a glass-mold type aspherical lens in which an aspherical surface is formed on the object side lens surface.

The third sub-lens group G3C is composed of, in order from the object side along the optical axis, a positive meniscus lens L51 having a concave surface facing the object side, a biconvex positive lens L52, and a cemented lens constructed by a biconcave negative lens L53 cemented with a biconvex positive lens L54. The positive meniscus lens L51 disposed to the most object side in the third sub-lens group G3C is a glass mold type aspherical lens, in which an aspherical surface is formed on the object side lens surface. Light rays come out from the biconvex positive lens L54 form an image on the image plane I.

The following Table 10 shows values of various items of data of the zoom lens system according to Example 10 of the third embodiment.

TABLE 10

(Lens Data)

| i | r | d | nd | vd |
|---|---|---|----|----|
| 1 | 205.09180 | 2.00000 | 1.882997 | 40.76 |
| 2 | 67.52420 | 9.07190 | 1.456000 | 91.20 |
| 3 | −361.42710 | 0.10000 | | |
| 4 | 70.10040 | 6.86700 | 1.603001 | 65.46 |
| 5 | −2470.83790 | (d5) | | |
| 6* | 84.76870 | 0.15000 | 1.553890 | 38.09 |
| 7 | 73.93750 | 1.20000 | 1.834807 | 42.72 |
| 8 | 17.03670 | 6.46970 | | |
| 9 | −49.48220 | 1.00000 | 1.816000 | 46.62 |
| 10 | 52.14060 | 0.15000 | | |
| 11 | 31.61490 | 5.45080 | 1.761820 | 26.56 |
| 12 | −44.44820 | 1.19350 | | |
| 13 | −25.13580 | 1.00000 | 1.816000 | 46.62 |
| 14 | 64.50360 | 2.42190 | 1.808090 | 22.79 |
| 15 | −166.54310 | (d15) | | |
| 16 | ∞ | 1.00000 | | |
| 17 | 63.10220 | 3.49130 | 1.593190 | 67.87 |
| 18 | −50.22150 | 0.10000 | | |
| 19 | 58.68260 | 2.72200 | 1.487490 | 70.41 |
| 20 | −121.43450 | 0.10000 | | |
| 21 | 48.64320 | 4.10420 | 1.487490 | 70.41 |
| 22 | −34.50080 | 1.00000 | 1.808090 | 22.79 |
| 23 | −205.15990 | (d23) | | |
| 24* | −66.96860 | 1.00000 | 1.693501 | 53.20 |
| 25 | 26.57120 | 2.15810 | 1.761820 | 26.56 |
| 26 | 63.33840 | 4.78730 | | |
| 27 | −24.70410 | 1.00000 | 1.729157 | 54.66 |
| 28 | −74.86360 | (d28) | | |
| 29* | −569.79420 | 3.96090 | 1.589130 | 61.16 |
| 30 | −23.53500 | 0.10000 | | |
| 31 | 37.14850 | 5.00600 | 1.487490 | 70.41 |
| 32 | −45.19690 | 1.71640 | | |
| 33 | −107.03630 | 1.00000 | 1.882997 | 40.76 |
| 34 | 23.36210 | 4.50160 | 1.548141 | 45.79 |
| 35 | −637.55850 | (Bf) | | |

(Aspherical Surface Data)

Surface number = 6

κ = 1.0000
A4 = 3.61880E−06
A6 = −6.10680E−09
A8 = −4.67380E−12
A10 = 5.77660E−14

TABLE 10-continued

Surface number = 24

κ = 1.0000
A4 = 3.81940E−06
A6 = −1.72450E−09
A8 = 0.00000E+00
A10 = 0.00000E+00

Surface number = 29

κ = 1.0000
A4 = −1.63630E−05
A6 = 8.94380E−09
A8 = −2.98150E−11
A10 = 2.87630E−14

(Various Data)
zoom ratio = 15.71

| | f | FNO | ω | Y | TL | Bf |
|---|---|---|---|---|---|---|
| W = | 18.56080 | 3.60018 | 38.95554 | 14.20 | 163.30 | 39.15242 |
| M1 = | 27.61236 | 4.14587 | 26.62942 | 14.20 | 170.24 | 46.48061 |
| M2 = | 50.16122 | 5.56795 | 15.36461 | 14.20 | 188.45 | 63.58078 |
| M3 = | 104.15546 | 5.60084 | 7.45367 | 14.20 | 255.60 | 70.61280 |
| M4 = | 280.42469 | 5.86110 | 2.81770 | 14.20 | 252.27 | 82.17689 |
| T = | 291.57422 | 5.87404 | 2.71157 | 14.20 | 252.97 | 82.77641 |

| | φ | d5 | d15 | d23 | d28 |
|---|---|---|---|---|---|
| W = | 16.20 | 2.14670 | 34.33830 | 3.38750 | 9.44940 |
| M1 = | 16.20 | 11.21590 | 24.88030 | 5.60850 | 7.22840 |
| M2 = | 16.20 | 21.46790 | 15.73730 | 9.43760 | 3.39920 |
| M3 = | 18.00 | 55.86030 | 11.46250 | 10.66930 | 2.16760 |
| M4 = | 19.80 | 79.96320 | 2.46860 | 11.77830 | 1.05860 |
| T = | 19.90 | 80.53690 | 2.00000 | 11.83690 | 1.00000 |

(Lens Group Data)

| Group | I | focal length |
|---|---|---|
| 1 | 1 | 122.10406 |
| 2 | 6 | −15.86654 |
| 3 | 16 | 39.50539 (W) |
| | | 38.07702 (M1) |
| | | 34.51367 (M2) |
| | | 33.18380 (M3) |
| | | 31.94773 (M4) |
| | | 31.88175 (T) |
| 3A | 16 | 26.56694 |
| 3B | 24 | −24.00147 |
| 3C | 29 | 33.81791 |

(Values for Conditional Expressions)

(8) (vd31 + vd32 + vd33)/3 − vd34 = 46.77
(9) vd31 − vd34 = 45.08
(10) vd32 − vd34 = 47.62
(11) vd33 − vd34 = 47.62
(12) f3A/(−f3B) = 1.107
(13) f32/f31 = 1.710
(14) r32a/r31a = 0.930

FIGS. 2A, 2B and 2C are graphs showing various aberrations of the zoom lens system according to Example 10 of the third embodiment, in which FIG. 2A is in a wide-angle end state W, FIG. 2B is in a first intermediate focal length state M1, and FIG. 2C is in a second intermediate focal length state M2.

FIGS. 3A, 3B and 3C are graphs showing various aberrations of the zoom lens system according to Example 10 of the third embodiment, in which FIG. 3A is in a third intermediate focal length state M3, FIG. 3B is in a fourth intermediate focal length state M4, and FIG. 3C is in a telephoto end state T.

As is apparent from the respective graphs, the zoom lens according to Example 10 of the third embodiment shows superb optical performance as a result of good corrections to various aberrations from the wide-angle end state through the telephoto end state.

Example 11

Figure 31:
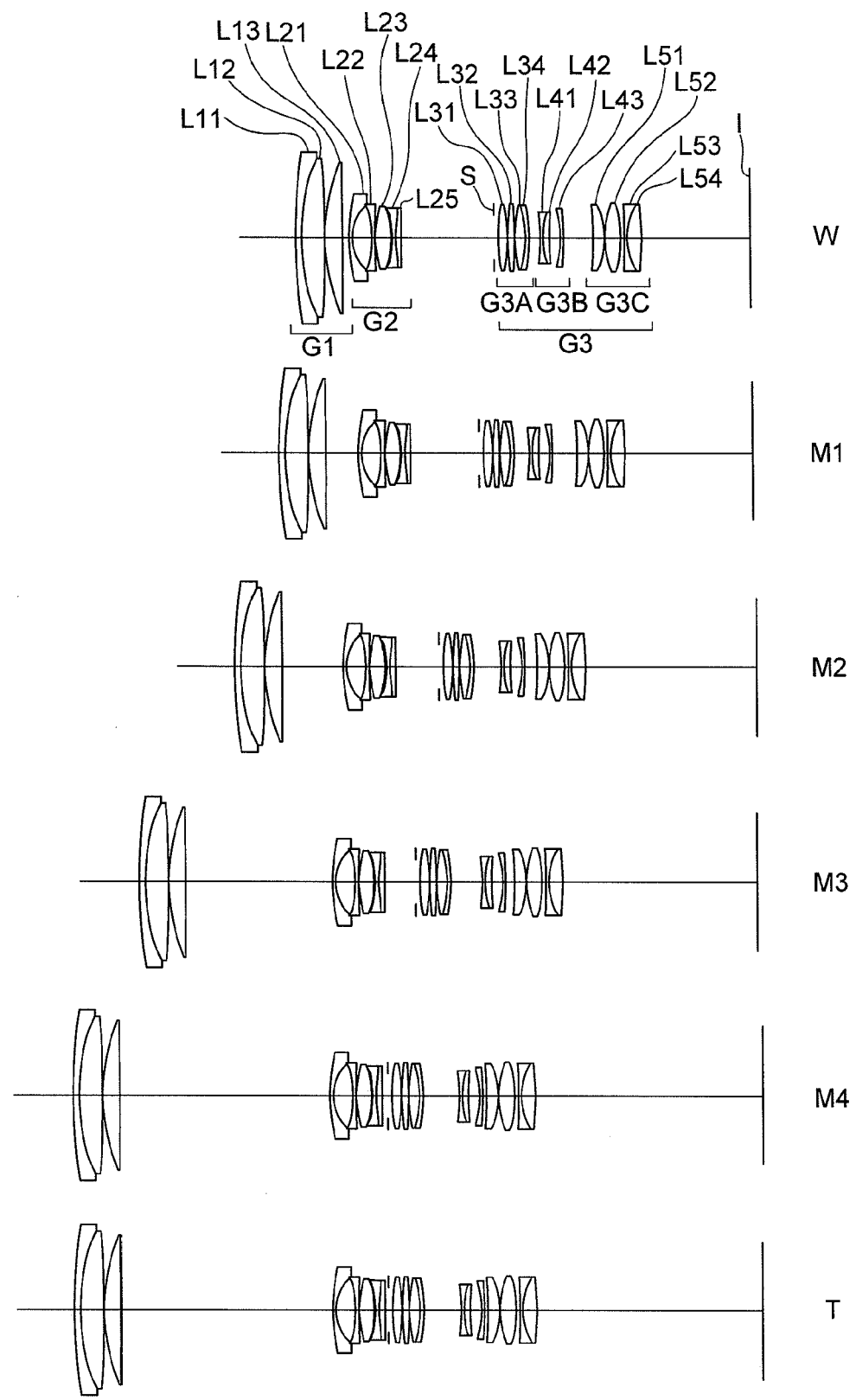
FIG. 31 is a sectional view showing a configuration of a zoom lens system according to Example 11 of the third embodiment.

FIG. 31 is a sectional view showing a configuration of a zoom lens system according to Example 11 of the third embodiment.

As shown in FIG. 31, the zoom lens system according to Example 11 of the third embodiment is composed of, in order from an object side along an optical axis, a first lens group G1 having positive refractive power, a second lens group G2 having negative refractive power, and a third lens group G3 having positive refractive power. The third lens group G3 is composed of a first sub-lens group G3A having positive refractive power, a second sub-lens group G3B having negative refractive power, and a third sub-lens group G3C having positive refractive power.

Upon zooming from a wide-angle end state W to a telephoto end state T, the first lens group G1 is moved monotonously to the object side, the second lens group G2 is moved to an image side from the wide-angle end state W to a first intermediate focal length state M1, and to the object side from the first intermediate focal length state M1 to the telephoto end state T with respect to the image plane I such that a distance between the first lens group G1 and the second lens group G2 increases, and a distance between the second lens group G2 and the third lens group G3 decreases. Moreover, the first sub-lens group G3A, the second sub-lens group G3B and the third sub-lens group G3C are moved monotonously to the object side with respect to the image plane I such that a distance between the first sub-lens group G3A and the second sub-lens group G3B increases, and a distance between the second sub-lens group G3B and the third sub-lens group G3C decreases. Moreover, the first sub-lens group G3A and the third sub-lens group G3C are moved in a body with respect to the image plane I.

An aperture stop S is disposed to the most object side of the third lens group G3, which is disposed to the image side of the second lens group G2, and constructed in a body with the first sub-lens group G3A.

The first lens group G1 is composed of, in order from the object side along the optical axis, a cemented lens constructed be a negative meniscus lens L11 having a convex surface facing the object side cemented with a biconvex positive lens L12, and a positive meniscus lens L13 having a convex surface facing the object side.

The second lens group G2 is composed of, in order from the object side along the optical axis, a negative meniscus lens L21 having a convex surface facing the object side, a biconcave negative lens L22, a biconvex positive lens L23, and a cemented lens constructed by a biconcave negative lens L24 cemented with a biconvex positive lens L25. The negative meniscus lens L21 disposed to the most object side in the second lens group G2 is a compound type aspherical lens in which an aspherical surface is formed by a resin layer provided on the object side lens surface.

The first sub-lens group G3A is composed of, in order from the object side along the optical axis, a biconvex positive lens L31, a biconvex positive lens L32, and a cemented lens constructed by a biconvex positive lens L33 cemented with a negative meniscus lens L34 having a concave surface facing the object side.

The second sub-lens group G3B is composed of, in order from the object side along the optical axis, a cemented lens constructed by a biconcave negative lens L41 cemented with a positive meniscus lens L42 having a convex surface facing the object side, and a negative meniscus lens L43 having a concave surface facing the object side. The biconcave negative lens L41 disposed to the most object side in the second sub-lens group G3B is a compound type aspherical lens in which an aspherical surface is formed by a resin layer provided on the object side lens surface.

The third sub-lens group G3C is composed of, in order from the object side along the optical axis, a positive meniscus lens L51 having a concave surface facing the object side, a biconvex positive lens L52, and a cemented lens constructed by a biconcave negative lens L53 cemented with a biconvex positive lens L54. The positive meniscus lens L51 disposed to the most object side in the third sub-lens group G3C is a glass mold type aspherical lens, in which an aspherical surface is formed on the object side lens surface. Light rays come out from the biconvex positive lens L54 form an image on the image plane I.

The following Table 11 shows values of various items of data of the zoom lens system according to Example 11 of the third embodiment.

TABLE 11

(Lens Data)

| i | r | d | nd | vd |
|---|---|---|---|---|
| 1 | 186.59960 | 2.20000 | 1.834000 | 37.17 |
| 2 | 69.08900 | 8.80000 | 1.497820 | 82.56 |
| 3 | −494.44545 | 0.10000 | | |
| 4 | 73.40222 | 6.45000 | 1.593190 | 67.87 |
| 5 | 2016.71160 | (d5) | | |
| 6* | 84.85000 | 0.10000 | 1.553890 | 38.09 |
| 7 | 74.02192 | 1.20000 | 1.834810 | 42.72 |
| 8 | 17.09747 | 6.95000 | | |
| 9 | −37.97970 | 1.00000 | 1.816000 | 46.63 |
| 10 | 77.67127 | 0.15000 | | |
| 11 | 36.26557 | 5.30000 | 1.784720 | 25.68 |
| 12 | −36.26557 | 0.80000 | | |
| 13 | −25.69642 | 1.00000 | 1.816000 | 46.63 |
| 14 | 66.08300 | 2.05000 | 1.808090 | 22.79 |
| 15 | −666.70366 | (d15) | | |
| 16 | ∞ | 1.00000 | Aperture Stop S | |
| 17 | 68.30727 | 3.40000 | 1.593190 | 67.87 |
| 18 | −47.99596 | 0.10000 | | |
| 19 | 68.52367 | 2.45000 | 1.487490 | 70.45 |
| 20 | −136.98392 | 0.10000 | | |
| 21 | 46.52671 | 4.20000 | 1.487490 | 70.45 |
| 22 | −36.16400 | 1.00000 | 1.808090 | 22.79 |
| 23 | −202.95328 | (d23) | | |
| 24* | −55.09840 | 0.20000 | 1.553890 | 38.09 |
| 25 | −57.24715 | 0.90000 | 1.696800 | 55.52 |
| 26 | 28.15100 | 2.15000 | 1.728250 | 28.46 |
| 27 | 87.70856 | 4.35000 | | |
| 28 | −26.69877 | 1.00000 | 1.729160 | 54.66 |
| 29 | −76.47707 | (d29) | | |
| 30* | −333.89500 | 4.65000 | 1.589130 | 61.18 |
| 31 | −24.64395 | 0.10000 | | |
| 32 | 31.19625 | 5.85000 | 1.487490 | 70.45 |
| 33 | −43.38887 | 1.45000 | | |
| 34 | −109.71645 | 1.00000 | 1.883000 | 40.77 |
| 35 | 20.29920 | 5.30000 | 1.548140 | 45.79 |
| 36 | −808.81321 | (Bf) | | |

(Aspherical Surface Data)

Surface number = 6

κ = 1.0000
A4 = 3.13350E−06
A6 = 4.73080E−10
A8 = −3.40500E−11
A10 = 1.16620E−13

TABLE 11-continued

Surface number = 24

κ = 1.0000
A4 = 5.24030E−06
A6 = −2.00730E−09
A8 = 0.00000E+00
A10 = 0.00000E+00

Surface number = 30

κ = 1.0000
A4 = −1.54020E−05
A6 = 1.69500E−09
A8 = 1.34490E−11
A10 = −2.07220E−13

(Various Data)
zoom ratio = 15.72

| | f | FNO | ω | Y | TL | Bf |
|---|---|---|---|---|---|---|
| W = | 18.52363 | 3.60558 | 38.89095 | 14.20 | 164.74 | 39.44250 |
| M1 = | 27.14081 | 4.11071 | 26.92688 | 14.20 | 171.75 | 46.21988 |
| M2 = | 48.93259 | 5.47222 | 15.68138 | 14.20 | 188.90 | 62.15925 |
| M3 = | 104.52143 | 5.69344 | 7.41882 | 14.20 | 225.49 | 71.57530 |
| M4 = | 279.97293 | 5.89216 | 2.81880 | 14.20 | 250.78 | 82.59962 |
| T = | 291.21725 | 5.89616 | 2.71146 | 14.20 | 251.39 | 83.10134 |

| | φ | d5 | d15 | d23 | d29 |
|---|---|---|---|---|---|
| W = | 15.80 | 2.15700 | 33.80140 | 3.45650 | 10.58680 |
| M1 = | 15.80 | 11.18630 | 24.99560 | 5.73730 | 8.30600 |
| M2 = | 15.80 | 21.31960 | 16.07940 | 9.97480 | 4.06850 |
| M3 = | 17.50 | 53.25650 | 11.31350 | 11.60170 | 2.44160 |
| M4 = | 19.50 | 76.35561 | 2.48461 | 12.99717 | 1.04613 |
| T = | 19.60 | 76.94960 | 2.00000 | 13.04330 | 1.00000 |

(Lens Group Data)

| Group | I | focal length |
|---|---|---|
| 1 | 1 | 118.96910 |
| 2 | 6 | −15.62542 |
| 3 | 16 | 40.08868 (W) |
| | | 38.97852 (M1) |
| | | 35.53907 (M2) |
| | | 33.90635 (M3) |
| | | 32.43302 (M4) |
| | | 32.38356 (T) |
| 3A | 16 | 27.17463 |
| 3B | 24 | −25.41506 |
| 3C | 30 | 34.39022 |

(Values for Conditional Expressions)

(8) (vd31 + vd32 + vd33)/3 − vd34 = 46.80
(9) vd31 − vd34 = 45.08
(10) vd32 − vd34 = 47.66
(11) vd33 − vd34 = 47.66
(12) f3A/(−f3B) = 1.069
(13) f32/f31 = 1.958
(14) r32a/r31a = 1.003

FIGS. 5A, 5B and 5C are graphs showing various aberrations of the zoom lens system according to Example 11 of the third embodiment, in which FIG. 5A is in a wide-angle end state W, FIG. 5B is in a first intermediate focal length state M1, and FIG. 5C is in a second intermediate focal length state M2.

FIGS. 6A, 6B and 6C are graphs showing various aberrations of the zoom lens system according to Example 11 of the third embodiment, in which FIG. 6A is in a third intermediate focal length state M3, FIG. 6B is in a fourth intermediate focal length state M4, and FIG. 6C is in a telephoto end state T.

As is apparent from the respective graphs, the zoom lens according to Example 11 of the third embodiment shows superb optical performance as a result of good corrections to various aberrations from the wide-angle end state through the telephoto end state.

Example 12

Figure 32:
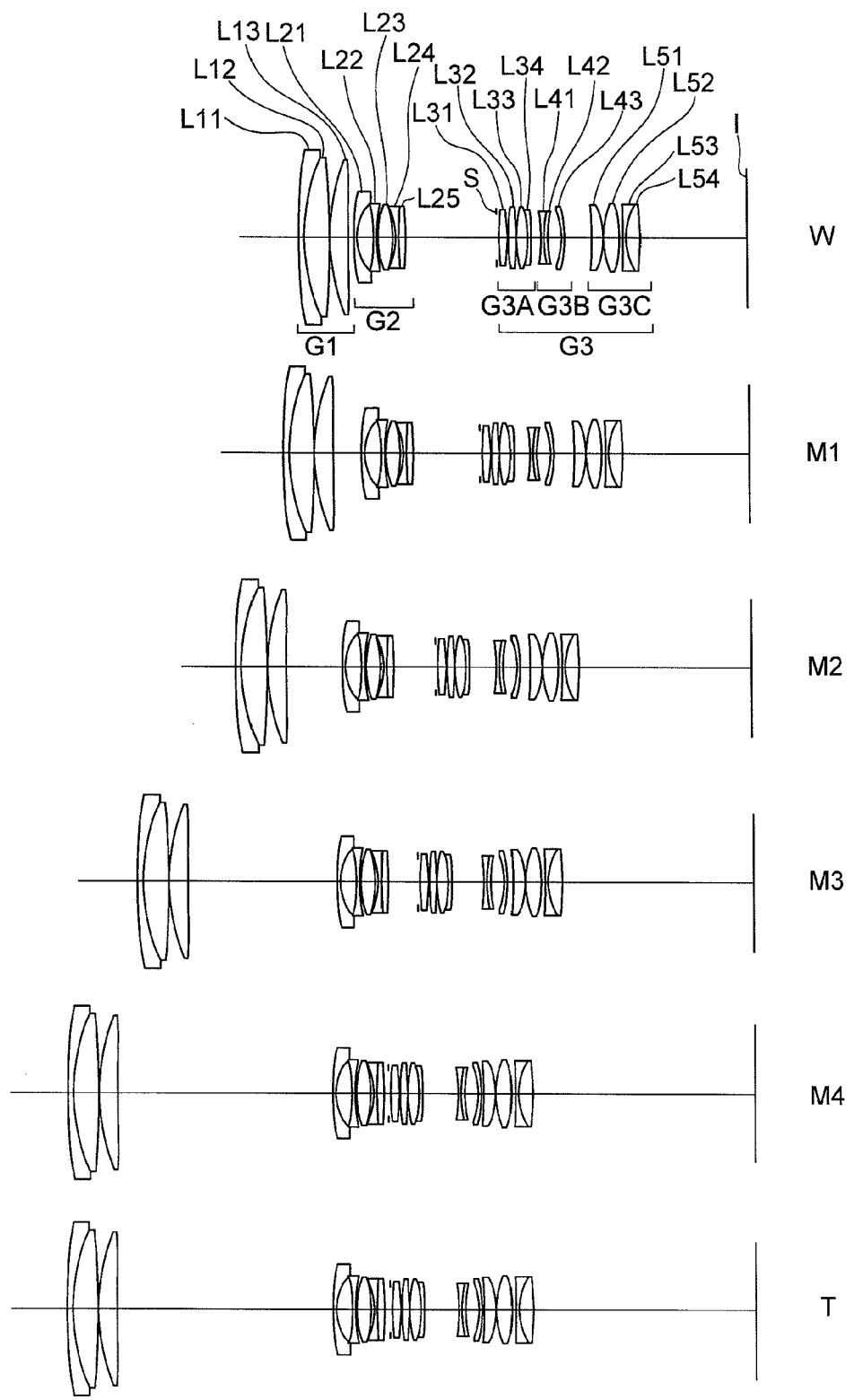
FIG. 32 is a sectional view showing a configuration of a zoom lens system according to Example 12 of the third embodiment.

FIG. 32 is a sectional view showing a configuration of a zoom lens system according to Example 12 of the third embodiment.

As shown in FIG. 32, the zoom lens system according to Example 12 of the third embodiment is composed of, in order from an object side along an optical axis, a first lens group G1 having positive refractive power, a second lens group G2 having negative refractive power, and a third lens group G3 having positive refractive power. The third lens group G3 is composed of a first sub-lens group G3A having positive refractive power, a second sub-lens group G3B having negative refractive power, and a third sub-lens group G3C having positive refractive power.

Upon zooming from a wide-angle end state W to a telephoto end state T, the first lens group G1 is moved monotonously to the object side, the second lens group G2 is moved to an image side from the wide-angle end state W to a first intermediate focal length state M1, and to the object side from the first intermediate focal length state M1 to the telephoto end state T with respect to the image plane I such that a distance between the first lens group G1 and the second lens group G2 increases, and a distance between the second lens group G2 and the third lens group G3 decreases. Moreover, the first sub-lens group G3A, the second sub-lens group G3B and the third sub-lens group G3C are moved monotonously to the object side with respect to the image plane I such that a distance between the first sub-lens group G3A and the second sub-lens group G3B increases, and a distance between the second sub-lens group G3B and the third sub-lens group G3C decreases. Moreover, the first sub-lens group G3A and the third sub-lens group G3C are moved in a body with respect to the image plane I.

An aperture stop S is disposed to the most object side of the third lens group G3, which is disposed to the image side of the second lens group G2, and constructed in a body with the first sub-lens group G3A.

The first lens group G1 is composed of, in order from the object side along the optical axis, a cemented lens constructed be a negative meniscus lens L11 having a convex surface facing the object side cemented with a biconvex positive lens L12, and a positive meniscus lens L13 having a convex surface facing the object side.

The second lens group G2 is composed of, in order from the object side along the optical axis, a negative meniscus lens L21 having a convex surface facing the object side, a biconcave negative lens L22, a biconvex positive lens L23, and a cemented lens constructed by a biconcave negative lens L24 cemented with a biconvex positive lens L25. The negative meniscus lens L21 disposed to the most object side in the second lens group G2 is a compound type aspherical lens in which an aspherical surface is formed by a resin layer provided on the object side lens surface.

The first sub-lens group G3A is composed of, in order from the object side along the optical axis, a biconvex positive lens L31, a biconvex positive lens L32, and a cemented lens constructed by a biconvex positive lens L33 cemented with a negative meniscus lens L34 having a concave surface facing the object side.

The second sub-lens group G3B is composed of, in order from the object side along the optical axis, a cemented lens constructed by a biconcave negative lens L41 cemented with a positive meniscus lens L42 having a convex surface facing the object side, and a negative meniscus lens L43 having a concave surface facing the object side. The positive meniscus lens L42 disposed to the center of the second sub-lens group G3B is a glass mold type aspherical lens, in which an aspherical surface is formed on the image side lens surface.

The third sub-lens group G3C is composed of, in order from the object side along the optical axis, a positive meniscus lens L51 having a concave surface facing the object side, a biconvex positive lens L52, and a cemented lens constructed by a biconcave negative lens L53 cemented with a biconvex positive lens L54. The positive meniscus lens L51 disposed to the most object side in the third sub-lens group G3C is a glass mold type aspherical lens, in which an aspherical surface is formed on the object side lens surface. Light rays come out from the biconvex positive lens L54 form an image on the image plane I.

The following Table 12 shows values of various items of data of the zoom lens system according to Example 12 of the third embodiment.

TABLE 12

(Lens Data)

| i | r | d | nd | vd |
|---|---|---|---|---|
| 1 | 192.86460 | 2.20000 | 1.834000 | 37.16 |
| 2 | 71.04740 | 9.00410 | 1.497820 | 82.52 |
| 3 | −459.57820 | 0.10000 | | |
| 4 | 73.87410 | 6.67930 | 1.593190 | 67.87 |
| 5 | 1334.48060 | (d5) | | |
| 6* | 84.76870 | 0.10000 | 1.553890 | 38.09 |
| 7 | 73.93750 | 1.25000 | 1.834807 | 42.72 |
| 8 | 16.85860 | 6.41100 | | |
| 9 | −43.47510 | 1.00000 | 1.816000 | 46.62 |
| 10 | 57.52320 | 0.15000 | | |
| 11 | 33.20000 | 5.23710 | 1.784723 | 25.68 |
| 12 | −42.33520 | 1.08530 | | |
| 13 | −25.03850 | 1.00000 | 1.816000 | 46.62 |
| 14 | 74.32200 | 2.14790 | 1.808090 | 22.79 |
| 15 | −196.76990 | (d15) | | |
| 16 | ∞ | 1.00000 | Aperture Stop S | |
| 17 | 70.66380 | 3.23230 | 1.593190 | 67.87 |
| 18 | −52.37330 | 0.10000 | | |
| 19 | 73.76600 | 2.71810 | 1.487490 | 70.41 |
| 20 | −83.31450 | 0.10000 | | |
| 21 | 45.54460 | 4.17150 | 1.487490 | 70.41 |
| 22 | −35.11250 | 1.00000 | 1.808090 | 22.79 |
| 23 | −188.15270 | (d23) | | |
| 24 | −63.85980 | 1.00000 | 1.696797 | 55.52 |
| 25 | 31.67440 | 1.86210 | 1.804855 | 24.73 |
| 26* | 64.32250 | 4.66290 | | |
| 27 | −26.08000 | 1.00000 | 1.729157 | 54.66 |
| 28 | −73.30510 | (d28) | | |
| 29* | −227.36510 | 4.17540 | 1.589130 | 61.16 |
| 30 | −24.31080 | 0.10000 | | |
| 31 | 31.50890 | 5.72340 | 1.487490 | 70.41 |
| 32 | −46.90920 | 1.38940 | | |
| 33 | −141.28220 | 1.00000 | 1.882997 | 40.76 |
| 34 | 20.03510 | 5.37700 | 1.548141 | 45.79 |
| 35 | −602.91670 | (Bf) | | |

(Aspherical Surface Data)

Surface number = 6

κ = 1.0000
A4 = 3.84520E−06
A6 = −3.19400E−09
A8 = −2.44510E−11
A10 = 1.16080E−13

Surface number = 26

κ = 1.0000
A4 = −3.46580E−06
A6 = 6.73460E−10

TABLE 12-continued

A8 = 0.00000E+00
A10 = 0.00000E+00

Surface number = 29

κ = 1.0000
A4 = −1.44010E−05
A6 = 5.94450E−09
A8 = −3.11020E−11
A10 = −4.07130E−14

(Various Data)
zoom ratio = 15.72

| | f | FNO | ω | Y | TL | Bf |
|---|---|---|---|---|---|---|
| W = | 18.53645 | 3.48547 | 39.03040 | 14.20 | 163.55 | 39.23508 |
| M1 = | 27.58219 | 4.01900 | 26.66707 | 14.20 | 170.26 | 46.33384 |
| M2 = | 49.59390 | 5.38724 | 15.52780 | 14.20 | 187.72 | 63.02959 |
| M3 = | 104.29638 | 5.99810 | 7.42798 | 14.20 | 224.86 | 70.07809 |
| M4 = | 280.11936 | 6.59072 | 2.81545 | 14.20 | 250.69 | 81.49952 |
| T = | 291.48464 | 6.59436 | 2.70726 | 14.20 | 251.38 | 82.08045 |

| | φ | d5 | d15 | d23 | d28 |
|---|---|---|---|---|---|
| W = | 16.40 | 2.13850 | 33.51210 | 3.41920 | 10.26360 |
| M1 = | 16.40 | 10.94060 | 24.32490 | 5.91090 | 7.77190 |
| M2 = | 16.40 | 20.49340 | 15.53470 | 10.06530 | 3.61750 |
| M3 = | 16.40 | 54.83910 | 11.28210 | 11.33700 | 2.34580 |
| M4 = | 17.20 | 78.05500 | 2.48000 | 12.63700 | 1.04580 |
| T = | 17.30 | 78.64320 | 2.00000 | 12.68280 | 1.00000 |

(Lens Group Data)

| Group | I | focal length |
|---|---|---|
| 1 | 1 | 120.82876 |
| 2 | 6 | −15.52570 |
| 3 | 16 | 39.66938 (W) |
| | | 38.28864 (M1) |
| | | 34.69117 (M2) |
| | | 33.38573 (M3) |
| | | 32.00045 (M4) |
| | | 31.95102 (T) |
| 3A | 16 | 26.72858 |
| 3B | 24 | −25.10440 |
| 3C | 29 | 34.49933 |

(Values for Conditional Expressions)

(8) (vd31 + vd32 + vd33)/3 − vd34 = 46.77
(9) vd31 − vd34 = 45.08
(10) vd32 − vd34 = 47.62
(11) vd33 − vd34 = 47.62
(12) f3A/(−f3B) = 1.065
(13) f32/f31 = 1.576
(14) r32a/r31a = 1.044

FIGS. 8A, 8B and 8C are graphs showing various aberrations of the zoom lens system according to Example 12 of the third embodiment, in which FIG. 8A is in a wide-angle end state W, FIG. 8B is in a first intermediate focal length state M1, and FIG. 8C is in a second intermediate focal length state M2.

FIGS. 9A, 9B and 9C are graphs showing various aberrations of the zoom lens system according to Example 12 of the third embodiment, in which FIG. 9A is in a third intermediate focal length state M3, FIG. 9B is in a fourth intermediate focal length state M4, and FIG. 9C is in a telephoto end state T.

As is apparent from the respective graphs, the zoom lens according to Example 12 of the third embodiment shows superb optical performance as a result of good corrections to various aberrations from the wide-angle end state through the telephoto end state.

Example 13

Figure 33:
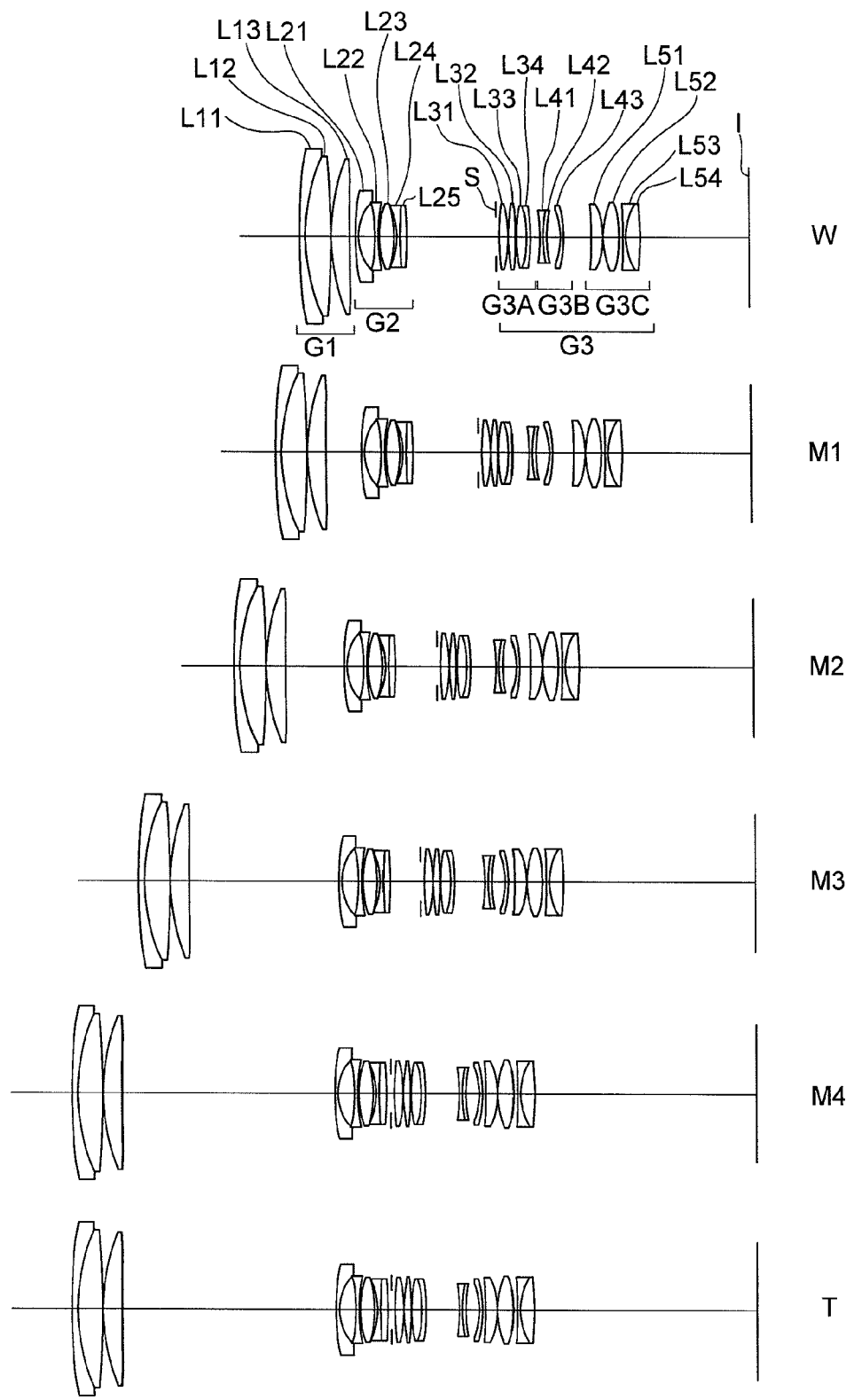
FIG. 33 is a sectional view showing a configuration of a zoom lens system according to Example 13 of the third embodiment.

FIG. 33 is a sectional view showing a configuration of a zoom lens system according to Example 13 of the third embodiment.

As shown in FIG. 33, the zoom lens system according to Example 13 of the third embodiment is composed of, in order from an object side along an optical axis, a first lens group G1 having positive refractive power, a second lens group G2 having negative refractive power, and a third lens group G3 having positive refractive power. The third lens group G3 is composed of a first sub-lens group G3A having positive refractive power, a second sub-lens group G3B having negative refractive power, and a third sub-lens group G3C having positive refractive power.

Upon zooming from a wide-angle end state W to a telephoto end state T, the first lens group G1 is moved monotonously to the object side, the second lens group G2 is moved to an image side from the wide-angle end state W to a first intermediate focal length state M1, and to the object side from the first intermediate focal length state M1 to the telephoto end state T with respect to the image plane I such that a distance between the first lens group G1 and the second lens group G2 increases, and a distance between the second lens group G2 and the third lens group G3 decreases. Moreover, the first sub-lens group G3A, the second sub-lens group G3B and the third sub-lens group G3C are moved monotonously to the object side with respect to the image plane I such that a distance between the first sub-lens group G3A and the second sub-lens group G3B increases, and a distance between the second sub-lens group G3B and the third sub-lens group G3C decreases. Moreover, the first sub-lens group G3A and the third sub-lens group G3C are moved in a body with respect to the image plane I.

An aperture stop S is disposed to the most object side of the third lens group G3, which is disposed to the image side of the second lens group G2, and constructed in a body with the first sub-lens group G3A.

The first lens group G1 is composed of, in order from the object side along the optical axis, a cemented lens constructed be a negative meniscus lens L11 having a convex surface facing the object side cemented with a biconvex positive lens L12, and a positive meniscus lens L13 having a convex surface facing the object side.

The second lens group G2 is composed of, in order from the object side along the optical axis, a negative meniscus lens L21 having a convex surface facing the object side, a biconcave negative lens L22, a biconvex positive lens L23, and a cemented lens constructed by a biconcave negative lens L24 cemented with a biconvex positive lens L25. The negative meniscus lens L21 disposed to the most object side in the second lens group G2 is a compound type aspherical lens in which an aspherical surface is formed by a resin layer provided on the object side lens surface.

The first sub-lens group G3A is composed of, in order from the object side along the optical axis, a biconvex positive lens L31, a biconvex positive lens L32, and a cemented lens constructed by a biconvex positive lens L33 cemented with a negative meniscus lens L34 having a concave surface facing the object side.

The second sub-lens group G3B is composed of, in order from the object side along the optical axis, a cemented lens constructed by a biconcave negative lens L41 cemented with a positive meniscus lens L42 having a convex surface facing the object side, and a negative meniscus lens L43 having a concave surface facing the object side. The biconcave negative lens L41 disposed to the most object side of the second sub-lens group G3B is a glass mold type aspherical lens, in which an aspherical surface is formed on the object side lens surface.

The third sub-lens group G3C is composed of, in order from the object side along the optical axis, a positive meniscus lens L51 having a concave surface facing the object side, a biconvex positive lens L52, and a cemented lens constructed by a biconcave negative lens L53 cemented with a biconvex positive lens L54. The positive meniscus lens L51 disposed to the most object side in the third sub-lens group G3C is a glass mold type aspherical lens, in which an aspherical surface is formed on the object side lens surface. Light rays come out from the biconvex positive lens L54 form an image on the image plane I.

The following Table 13 shows values of various items of data of the zoom lens system according to Example 13 of the third embodiment.

TABLE 13

(Lens Data)

| i | r | d | nd | vd |
|---|---|---|---|---|
| 1 | 185.24410 | 2.20000 | 1.834000 | 37.16 |
| 2 | 68.75480 | 8.80000 | 1.497820 | 82.52 |
| 3 | −497.29190 | 0.10000 | | |
| 4 | 71.28350 | 6.45000 | 1.593190 | 67.87 |
| 5 | 1172.32230 | (d5) | | |
| 6* | 84.76870 | 0.10000 | 1.553890 | 38.09 |
| 7 | 73.93750 | 1.20000 | 1.834807 | 42.72 |
| 8 | 16.75000 | 6.90150 | | |
| 9 | −39.27190 | 1.00000 | 1.816000 | 46.62 |
| 10 | 66.81930 | 0.15000 | | |
| 11 | 34.96200 | 5.30000 | 1.784723 | 25.68 |
| 12 | −38.10160 | 0.85100 | | |
| 13 | −25.92810 | 1.00000 | 1.816000 | 46.62 |
| 14 | 73.51020 | 2.05000 | 1.808090 | 22.79 |
| 15 | −287.76490 | (d15) | | |
| 16 | ∞ | 1.00000 | Aperture Stop S | |
| 17 | 67.56430 | 3.40000 | 1.593190 | 67.87 |
| 18 | −48.87440 | 0.10000 | | |
| 19 | 67.50290 | 2.45000 | 1.487490 | 70.41 |
| 20 | −148.37490 | 0.10000 | | |
| 21 | 48.80470 | 4.10000 | 1.487490 | 70.41 |
| 22 | −34.96390 | 1.00000 | 1.808090 | 22.79 |
| 23 | −151.08370 | (d23) | | |
| 24* | −60.11270 | 1.00000 | 1.693500 | 53.31 |
| 25 | 28.34580 | 2.15000 | 1.728250 | 28.46 |
| 26 | 78.30380 | 4.62360 | | |
| 27 | −25.31330 | 1.00000 | 1.729157 | 54.66 |
| 28 | −74.02640 | (d28) | | |
| 29* | −258.20790 | 4.30000 | 1.589130 | 61.18 |
| 30 | −24.20710 | 0.10000 | | |
| 31 | 31.58110 | 5.85000 | 1.487490 | 70.41 |
| 32 | −43.77790 | 1.99120 | | |
| 33 | −117.57770 | 1.00000 | 1.882997 | 40.76 |
| 34 | 20.29060 | 5.20000 | 1.548141 | 45.79 |
| 35 | −725.37280 | (Bf) | | |

(Aspherical Surface Data)

Surface number = 6

κ = 1.0000
A4 = 3.04550E−06
A6 = −3.32430E−09
A8 = −1.97490E−11
A10 = 7.65670E−14

Surface number = 24

κ = 1.0000
A4 = 3.99640E−06
A6 = −1.46410E−09
A8 = 0.00000E+00
A10 = 0.00000E+00

TABLE 13-continued

Surface number = 29

κ = 1.0000
A4 = −1.52760E−05
A6 = 3.24870E−09
A8 = −4.79200E−12
A10 = −1.47520E−13

(Various Data)
zoom ratio = 15.72

|      | f         | FNO     | ω        | Y     | TL     | Bf       |
|------|-----------|---------|----------|-------|--------|----------|
| W =  | 18.53407  | 4.19822 | 39.09871 | 14.20 | 163.83 | 39.11654 |
| M1 = | 28.28311  | 4.84518 | 25.91447 | 14.20 | 172.73 | 46.29035 |
| M2 = | 49.61061  | 5.60962 | 15.52706 | 14.20 | 188.63 | 62.64242 |
| M3 = | 104.44333 | 5.63139 | 7.44054  | 14.20 | 224.05 | 69.74259 |
| M4 = | 280.42014 | 5.64795 | 2.81841  | 14.20 | 249.11 | 81.54926 |
| T =  | 291.31408 | 5.65065 | 2.71459  | 14.20 | 249.82 | 82.19687 |

|      | φ     | d5       | d15      | d23      | d28     |
|------|-------|----------|----------|----------|---------|
| W =  | 13.60 | 2.15320  | 33.72460 | 3.38090  | 9.98840 |
| M1 = | 13.60 | 13.04850 | 24.55710 | 5.75490  | 7.61440 |
| M2 = | 15.70 | 21.16970 | 15.98250 | 9.65610  | 3.71320 |
| M3 = | 17.60 | 53.87340 | 11.59370 | 11.06770 | 2.30160 |
| M4 = | 20.35 | 76.26610 | 2.46300  | 12.30820 | 1.06110 |
| T =  | 20.50 | 76.78310 | 2.00000  | 12.36930 | 1.00000 |

(Lens Group Data)

| Group | I  | focal length |
|-------|----|--------------|
| 1     | 1  | 118.41983    |
| 2     | 6  | −15.62139    |
| 3     | 16 | 39.52889 (W) |
|       |    | 38.28789 (M1) |
|       |    | 35.01838 (M2) |
|       |    | 33.58746 (M3) |
|       |    | 32.26976 (M4) |
|       |    | 32.20385 (T) |
| 3A    | 16 | 27.10600     |
| 3B    | 24 | −24.65991    |
| 3C    | 29 | 33.56757     |

(Values for Conditional Expressions)

(8) (vd31 + vd32 + vd33)/3 − vd34 = 46.77
(9) vd31 − vd34 = 45.08
(10) vd32 − vd34 = 47.62
(11) vd33 − vd34 = 47.62
(12) f3A/(−f3B) = 1.099
(13) f32/f31 = 1.976
(14) r32a/r31a = 0.999

FIGS. 11A, 11B and 11C are graphs showing various aberrations of the zoom lens system according to Example 13 of the third embodiment, in which FIG. 11A is in a wide-angle end state W, FIG. 11B is in a first intermediate focal length state M1, and FIG. 11C is in a second intermediate focal length state M2.

FIGS. 12A, 12B and 12C are graphs showing various aberrations of the zoom lens system according to Example 13 of the third embodiment, in which FIG. 12A is in a third intermediate focal length state M3, FIG. 12B is in a fourth intermediate focal length state M4, and FIG. 12C is in a telephoto end state T.

As is apparent from the respective graphs, the zoom lens according to Example 13 of the third embodiment shows superb optical performance as a result of good corrections to various aberrations from the wide-angle end state through the telephoto end state.

Example 14

Figure 34:
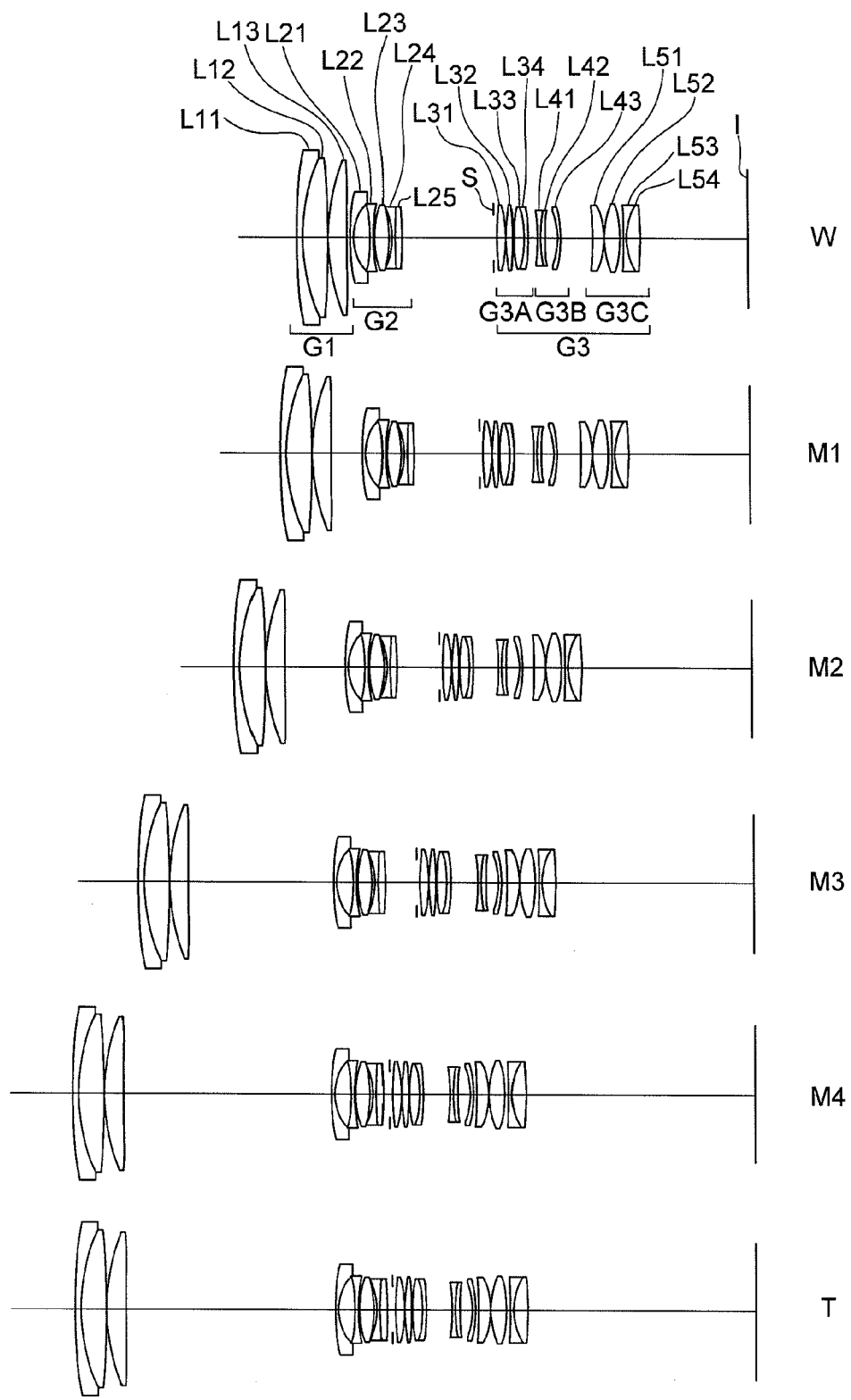
FIG. 34 is a sectional view showing a configuration of a zoom lens system according to Example 14 of the third embodiment.

FIG. 34 is a sectional view showing a configuration of a zoom lens system according to Example 14 of the third embodiment.

As shown in FIG. 34, the zoom lens system according to Example 14 of the third embodiment is composed of, in order from an object side along an optical axis, a first lens group G1 having positive refractive power, a second lens group G2 having negative refractive power, and a third lens group G3 having positive refractive power. The third lens group G3 is composed of a first sub-lens group G3A having positive refractive power, a second sub-lens group G3B having negative refractive power, and a third sub-lens group G3C having positive refractive power.

Upon zooming from a wide-angle end state W to a telephoto end state T, the first lens group G1 is moved monotonously to the object side, the second lens group G2 is moved to an image side from the wide-angle end state W to a first intermediate focal length state M1, and to the object side from the first intermediate focal length state M1 to the telephoto end state T with respect to the image plane I such that a distance between the first lens group G1 and the second lens group G2 increases, and a distance between the second lens group G2 and the third lens group G3 decreases. Moreover, the first sub-lens group G3A, the second sub-lens group G3B and the third sub-lens group G3C are moved monotonously to the object side with respect to the image plane I such that a distance between the first sub-lens group G3A and the second sub-lens group G3B increases, and a distance between the second sub-lens group G3B and the third sub-lens group G3C decreases.

An aperture stop S is disposed to the most object side of the third lens group G3, which is disposed to the image side of the second lens group G2, and constructed in a body with the first sub-lens group G3A.

The first lens group G1 is composed of, in order from the object side along the optical axis, a cemented lens constructed be a negative meniscus lens L11 having a convex surface facing the object side cemented with a biconvex positive lens L12, and a positive meniscus lens L13 having a convex surface facing the object side.

The second lens group G2 is composed of, in order from the object side along the optical axis, a negative meniscus lens L21 having a convex surface facing the object side, a biconcave negative lens L22, a biconvex positive lens L23, and a cemented lens constructed by a biconcave negative lens L24 cemented with a biconvex positive lens L25. The negative meniscus lens L21 disposed to the most object side in the second lens group G2 is a compound type aspherical lens in which an aspherical surface is formed by a resin layer provided on the object side lens surface.

The first sub-lens group G3A is composed of, in order from the object side along the optical axis, a biconvex positive lens L31, a biconvex positive lens L32, and a cemented lens constructed by a biconvex positive lens L33 cemented with a negative meniscus lens L34 having a concave surface facing the object side.

The second sub-lens group G3B is composed of, in order from the object side along the optical axis, a cemented lens constructed by a biconcave negative lens L41 cemented with a positive meniscus lens L42 having a convex surface facing the object side, and a negative meniscus lens L43 having a concave surface facing the object side. The biconcave negative lens L41 disposed to the most object side of the second sub-lens group G3B is a compound type aspherical lens in which an aspherical surface is formed by a resin layer provided on the object side lens surface.

The third sub-lens group G3C is composed of, in order from the object side along the optical axis, a biconvex positive lens L51, a biconvex positive lens L52, and a cemented lens constructed by a biconcave negative lens L53 cemented with a biconvex positive lens L54. The biconvex positive lens L51 disposed to the most object side in the third sub-lens group G3C is a glass mold type aspherical lens, in which an aspherical surface is formed on the object side lens surface. Light rays come out from the biconvex positive lens L54 form an image on the image plane I.

The following Table 14 shows values of various items of data of the zoom lens system according to Example 14 of the third embodiment.

TABLE 14

(Lens Data)

| i | r | d | nd | νd |
|---|---|---|---|---|
| 1 | 175.60560 | 2.20000 | 1.834000 | 37.16 |
| 2 | 67.43020 | 8.80000 | 1.497820 | 82.52 |
| 3 | −587.78480 | 0.10000 | | |
| 4 | 72.27100 | 6.45000 | 1.593190 | 67.87 |
| 5 | 1826.13880 | (d5) | | |
| 6* | 84.76870 | 0.10000 | 1.553890 | 38.09 |
| 7 | 73.93750 | 1.20000 | 1.834807 | 42.72 |
| 8 | 17.18730 | 6.95000 | | |
| 9 | −36.98220 | 1.00000 | 1.816000 | 46.62 |
| 10 | 77.92630 | 0.15000 | | |
| 11 | 36.63460 | 5.30000 | 1.784723 | 25.68 |
| 12 | −36.63460 | 0.80000 | | |
| 13 | −26.19910 | 1.00000 | 1.816000 | 46.62 |
| 14 | 63.73960 | 2.05000 | 1.808090 | 22.79 |
| 15 | −643.27060 | (d15) | | |
| 16 | ∞ | 1.00000 | Aperture Stop S | |
| 17 | 65.83650 | 3.40000 | 1.593190 | 67.87 |
| 18 | −50.15460 | 0.10000 | | |
| 19 | 65.68170 | 2.45000 | 1.487490 | 70.41 |
| 20 | −154.97430 | 0.10000 | | |
| 21 | 46.73330 | 4.20000 | 1.487490 | 70.41 |
| 22 | −35.78330 | 1.00000 | 1.808090 | 22.79 |
| 23 | −191.93180 | (d23) | | |
| 24* | −57.29660 | 0.20000 | 1.553890 | 38.09 |
| 25 | −59.72500 | 0.90000 | 1.696797 | 55.52 |
| 26 | 28.51000 | 2.15000 | 1.728250 | 28.46 |
| 27 | 91.99760 | 4.14020 | | |
| 28 | −32.89540 | 1.00000 | 1.729157 | 54.66 |
| 29 | −144.33150 | (d29) | | |
| 30* | 6427.19190 | 4.65000 | 1.589130 | 61.18 |
| 31 | −27.38180 | 0.10000 | | |
| 32 | 31.47760 | 5.85000 | 1.487490 | 70.41 |
| 33 | −43.75390 | 1.45000 | | |
| 34 | −113.58970 | 1.00000 | 1.882997 | 40.76 |
| 35 | 20.34810 | 5.30000 | 1.548141 | 45.79 |
| 36 | −709.14530 | (Bf) | | |

(Aspherical Surface Data)

Surface number = 6

$\kappa = 1.0000$
$A4 = 2.88220E{-}06$
$A6 = -2.29350E{-}11$
$A8 = -2.35280E{-}11$
$A10 = 9.21570E{-}14$ Surface number = 24

$\kappa = 1.0000$
$A4 = 4.32780E{-}06$
$A6 = 1.88460E{-}09$
$A8 = 0.00000E{+}00$
$A10 = 0.00000E{+}00$ TABLE 14-continued Surface number = 30

$\kappa = 1.0000$
$A4 = -1.36170E{-}05$
$A6 = -3.55860E{-}10$
$A8 = 1.83080E{-}11$
$A10 = -1.86790E{-}13$ (Various Data)
zoom ratio = 15.70

| | f | FNO | ω | Y | TL | Bf |
|---|---|---|---|---|---|---|
| W = | 18.56060 | 3.57565 | 38.80191 | 14.20 | 164.76 | 38.84705 |
| M1 = | 27.94799 | 4.13253 | 26.18802 | 14.20 | 171.03 | 44.06807 |
| M2 = | 48.95245 | 5.36204 | 15.68652 | 14.20 | 189.45 | 62.50183 |
| M3 = | 104.65150 | 5.62482 | 7.44205 | 14.20 | 225.29 | 73.57929 |
| M4 = | 280.18763 | 5.80434 | 2.82863 | 14.20 | 249.99 | 86.00428 |
| T = | 291.42454 | 5.81064 | 2.72113 | 14.20 | 250.61 | 86.64770 |

| | φ | d5 | d15 | d23 | d29 |
|---|---|---|---|---|---|
| W = | 15.80 | 2.15700 | 33.36360 | 3.46820 | 11.83830 |
| M1 = | 15.80 | 11.13190 | 23.94380 | 7.42730 | 9.36420 |
| M2 = | 15.80 | 22.22690 | 15.96870 | 8.95240 | 4.70680 |
| M3 = | 17.50 | 53.01000 | 11.30360 | 9.64300 | 2.66290 |
| M4 = | 19.50 | 75.67850 | 2.48130 | 9.67390 | 1.06600 |
| T = | 19.60 | 76.25220 | 2.00000 | 9.62460 | 1.00000 |

(Lens Group Data)

| Group | I | focal length |
|---|---|---|
| 1 | 1 | 117.72937 |
| 2 | 6 | −15.60945 |
| 3 | 16 | 40.44471 (W) |
| | | 39.66103 (M1) |
| | | 35.67164 (M2) |
| | | 33.95695 (M3) |
| | | 32.73988 (M4) |
| | | 32.70088 (T) |
| 3A | 16 | 27.35473 |
| 3B | 24 | −26.50041 |
| 3C | 30 | 35.20423 |

(Values for Conditional Expressions)

(8) (νd31 + νd32 + νd33)/3 − νd34 = 46.77
(9) νd31 − νd34 = 45.08
(10) νd32 − νd34 = 47.62
(11) νd33 − νd34 = 47.62
(12) f3A/(−f3B) = 1.032
(13) f32/f31 = 1.957
(14) r32a/r31a = 0.998

FIGS. 14A, 14B and 14C are graphs showing various aberrations of the zoom lens system according to Example 14 of the third embodiment, in which FIG. 14A is in a wide-angle end state W, FIG. 14B is in a first intermediate focal length state M1, and FIG. 14C is in a second intermediate focal length state M2.

FIGS. 15A, 15B and 15C are graphs showing various aberrations of the zoom lens system according to Example 14 of the third embodiment, in which FIG. 15A is in a third intermediate focal length state M3, FIG. 15B is in a fourth intermediate focal length state M4, and FIG. 15C is in a telephoto end state T.

As is apparent from the respective graphs, the zoom lens according to Example 14 of the third embodiment shows superb optical performance as a result of good corrections to various aberrations from the wide-angle end state through the telephoto end state.

Then, an outline of a method for manufacturing a zoom lens system according to the third embodiment of the present application is described below.

Figure 47:
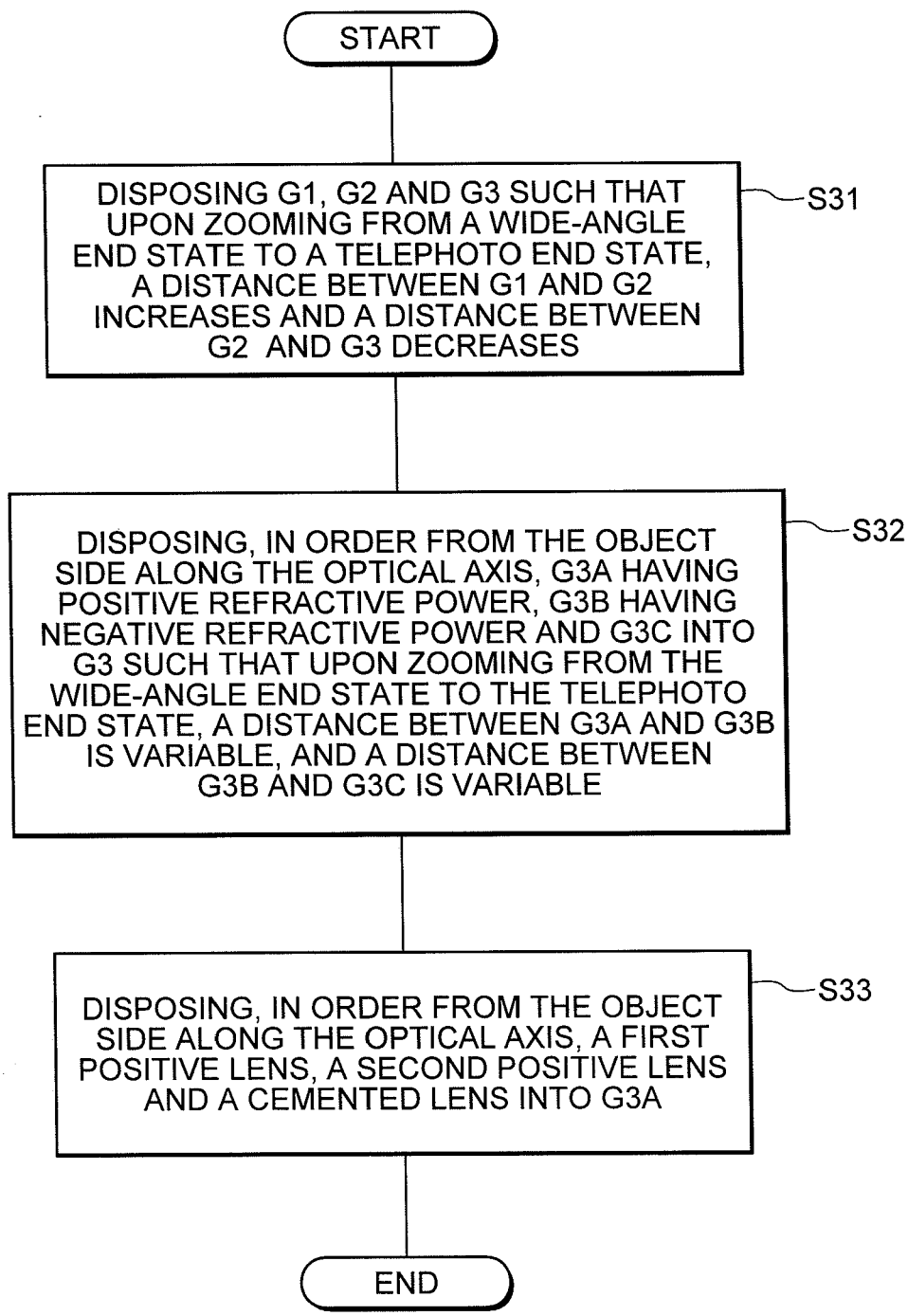
FIG. 47 is a flowchart showing a method for manufacturing a zoom lens system according to the third embodiment.

FIG. 47 is a flowchart showing a method for manufacturing a zoom lens system according to the third embodiment of the present application.

The method for manufacturing a zoom lens system according to the third embodiment is a method for manufacturing a zoom lens system including, in order from an object side along an optical axis, a first lens group having positive refractive power, a second lens group having negative refractive power, and a third lens group having positive refractive power, and the method includes the following steps of S31, S32 and S33.

Step S31: disposing the first lens group, the second lens group and the third lens group such that upon zooming from a wide-angle end state to a telephoto end state, a distance between the first lens group and the second lens group is able to be increased, and a distance between the second lens group and the third lens group is able to be decreased.

Step S32: disposing, in order from the object side along the optical axis, a first sub-lens group having positive refractive power, a second sub-lens group having negative refractive power, and a third sub-lens group into the third lens group such that upon zooming from the wide-angle end state to the telephoto end state, a distance between the first sub-lens group and the second sub-lens group is variable, and a distance between the second sub-lens group and the third sub-lens group is variable.

Step S33: disposing, in order from the object side along the optical axis, a first positive lens, a second positive lens and a cemented lens including a third positive lens and a negative lens into the first sub-lens group.

The method for manufacturing a zoom lens system according to the third embodiment of the present application makes it possible to manufacture a zoom lens system having high optical performance with suppressing variation in aberrations.

In the zoom lens system according to the third embodiment, the first lens group preferably includes two positive lens components. Moreover, the first lens group preferably disposes these lens components, in order from the object side, positive-positive with disposing an air space between them.

In a zoom lens system according to the third embodiment, the second lens group preferably includes one positive lens component and three negative lens components. Moreover, the second lens group preferably disposes these lens components, in order from the object side, negative-negative-positive-negative with an air space between each of them.

In a zoom lens system according to the third embodiment, the first sub-lens group preferably includes three positive lens components.

In a zoom lens system according to the third embodiment, the second sub-lens group preferably includes two negative lens components.

In a zoom lens system according to the third embodiment, the third sub-lens group preferably includes two positive lens components. Moreover, the third sub-lens group preferably disposes these lens components, in order from the object side, positive-positive with an air space between them.

Fourth Embodiment

A zoom lens system according to a fourth embodiment of the present application is explained below.

A zoom lens system according to the fourth embodiment consists of, in order from an object side along an optical axis, a first lens group having positive refractive power, a second lens group having negative refractive power, and a third lens group having positive refractive power. Upon zooming from a wide-angle end state to a telephoto end state, a distance between the first lens group and the second lens group increases, and a distance between the second lens group and the third lens group decreases, thereby realizing a zoom optical system and correcting distortion moderately upon zooming from the wide-angle end state to the telephoto end state.

Moreover, in a zoom lens system according to the fourth embodiment of the present application, the following conditional expressions (1) and (2) are satisfied:

$$0.17 < f1/fT < 0.60 \quad (1)$$

$$1.03 < \phi T/\phi W < 1.70 \quad (2)$$

where fT denotes a focal length of the zoom lens system in the telephoto end state, f1 denotes a focal length of the first lens group, $\phi W$ denotes the maximum diameter of the aperture stop in the wide-angle end state, and $\phi T$ denotes the maximum diameter of the aperture stop in the telephoto end state.

Conditional expression (1) is for obtaining high optical performance with excellently correcting spherical aberration and curvature of field generated in the zoom lens system. However, conditional expression (1) has been already explained above, so that duplicated explanations are omitted.

Conditional expression (2) is for obtaining high optical performance with setting the f-number in the telephoto end state moderately small and excellently correcting spherical aberration and coma. However, conditional expression (2) has been already explained above, so that duplicated explanations are omitted.

In a zoom lens system according to the fourth embodiment, the following conditional expression (3) is preferably satisfied:

$$1.02 < \phi M10/\phi W < 1.70 \quad (3)$$

where $\phi M10$ denotes the maximum diameter of the aperture stop in an intermediate focal length state, in which the intermediate focal length of the zoom lens system is ten times or more of fW when fW denotes a focal length of the zoom lens system in the wide-angle end state.

Conditional expression (3) is for realizing high optical performance with letting the zoom lens system have a sufficient f-number in the intermediate focal length state where the focal length of the zoom lens system is ten times or more of the focal length thereof in the wide-angle end state (fW). However, conditional expression (3) has been already explained above, so that duplicated explanations are omitted.

In a zoom lens system according to the fourth embodiment, the following conditional expression (4) is preferably satisfied:

$$1.02 < \phi M15/\phi W < 1.70 \quad (4)$$

where $\phi M15$ denotes the maximum diameter of the aperture stop in an intermediate focal length state, in which the intermediate focal length of the zoom lens system is fifteen times or more of fW when fW denotes a focal length of the zoom lens system in the wide-angle end state.

Conditional expression (4) is for realizing high optical performance with letting the zoom lens system have a sufficient f-number in the intermediate focal length state where the focal length of the zoom lens system is fifteen times or more of the focal length thereof in the wide-angle end state (fW). However, conditional expression (4) has been already explained above, so that duplicated explanations are omitted.

In a zoom lens system according to the fourth embodiment, the following conditional expression (5) is preferably satisfied:

$$1.00 \leq \phi M5/\phi W < 1.40 \quad (5)$$

where ϕM5 denotes the maximum diameter of the aperture stop in an intermediate focal length state, in which the intermediate focal length of the zoom lens system is five times or more and eight times or less of fW when fW denotes a focal length of the zoom lens system in the wide-angle end state.

Conditional expression (5) is for realizing high optical performance in the intermediate focal length state where the focal length of the zoom lens system is five times or more and eight times or less of the focal length thereof in the wide-angle end state (fW). However, conditional expression (5) has been already explained above, so that duplicated explanations are omitted.

In a zoom lens system according to the fourth embodiment, upon zooming from the wide-angle end state to the telephoto end state, the diameter of the aperture stop keeps the maximum diameter of the wide-angle end state from the wide-angle end state to an intermediate focal length state in which the focal length of the zoom lens system is fM, and the following conditional expression (6) is preferably satisfied:

$$1.50 < fM/fW < 15.00 \qquad (6)$$

where fW denotes a focal length of the zoom lens system in the wide-angle end state.

Conditional expression (6) is for realizing high optical performance in a given intermediate focal length state. However, conditional expression (6) has been already explained above, so that duplicated explanations are omitted.

In a zoom lens system according to the fourth embodiment, upon zooming from the intermediate focal length state, in which the focal length of the zoom lens system is fM, to the telephoto end state, the maximum diameter of the aperture stop preferably increases monotonously. Incidentally, the maximum diameter of the aperture stop is the maximum value of the diameter of the aperture stop with respect to each focal length state.

With this configuration, mechanical construction of the zoom lens system can be simplified, and variation in spherical aberration can be suppressed in the zoom range from the intermediate focal length fM state to the telephoto end state, so that high optical performance can be obtained.

In a zoom lens system according to the fourth embodiment, the following conditional expression (7) is preferably satisfied:

$$0.032 < -f2/fT < 0.064 \qquad (7)$$

where f2 denotes a focal length of the second lens group.

Conditional expression (7) is for realizing high optical performance with suppressing variation in aberrations generated in the second lens group upon zooming from the wide-angle end state to the telephoto end state. However, conditional expression (7) has been already explained above, so that duplicated explanations are omitted.

In a zoom lens system according to the fourth embodiment, an f-number of the zoom lens system preferably increases monotonously upon zooming from the wide-angle end state to the telephoto end state.

With this configuration, upon zooming from the wide-angle end state to the telephoto end state, the height of on-axis ray passing through a lens group in the vicinity of the aperture stop such as the third lens group is prevented from excessive increase. Accordingly, variation in aberrations such as spherical aberration can be suppressed, so that high optical performance can be obtained.

In a zoom lens system according to the fourth embodiment, upon zooming from the wide-angle end state to the telephoto end state, the first lens group is preferably moved to the object side with respect to the image plane.

With this configuration, the diameter of the first lens group can be downsized, and the height from the optical axis of the off-axis rays passing through the first lens group in the wide-angle end state can be suppressed, so that variation in curvature of field and astigmatism upon zooming can be suppressed.

In a zoom lens system according to the fourth embodiment, upon zooming from the wide-angle end state to the telephoto end state, the aperture stop is preferably moved integrally with at least a portion of the third lens group.

With this configuration, mechanical construction of the zoom lens system can be simplified, and variation in spherical aberration can be suppressed, so that high optical performance can be obtained.

In a zoom lens system according to the fourth embodiment, the aperture stop is preferably disposed to the object side of the third lens group.

With this configuration, the diameter of the first lens group can be downsized, and the height from the optical axis of the off-axis rays passing through the first lens group in the wide-angle end state can be suppressed, so that variation in curvature of field and astigmatism upon zooming can be suppressed.

In a zoom lens system according to the fourth embodiment, the third lens group preferably includes two positive sub-lens groups, and a distance between the two positive sub-lens groups preferably varies upon zooming from the wide-angle end state to the telephoto end state.

With this configuration, it becomes possible to increase zooming ability of the third lens group, so that the zoom lens system can be downsized. Moreover, it becomes possible to suppress variation in spherical aberration and astigmatism generated in the third lens group upon zooming from the wide-angle end state to the telephoto end state, so that high optical performance can be realized.

In a zoom lens system according to the fourth embodiment, it is preferable that the third lens group includes a positive sub-lens group, a negative sub-lens group and a positive sub-lens group, and respective distances between the positive sub-lens group, the negative sub-lens group and the positive sub-lens group vary upon zooming from the wide-angle end state to the telephoto end state.

With this configuration, it becomes possible to increase zooming ability of the third lens group, so that the zoom lens system can be downsized. Moreover, it becomes possible to suppress variation in spherical aberration and astigmatism generated in the third lens group upon zooming from the wide-angle end state to the telephoto end state, so that high optical performance can be realized.

Then, each Example according to the fourth embodiment is explained below with reference to accompanying drawings.

Example 15

Figure 35:
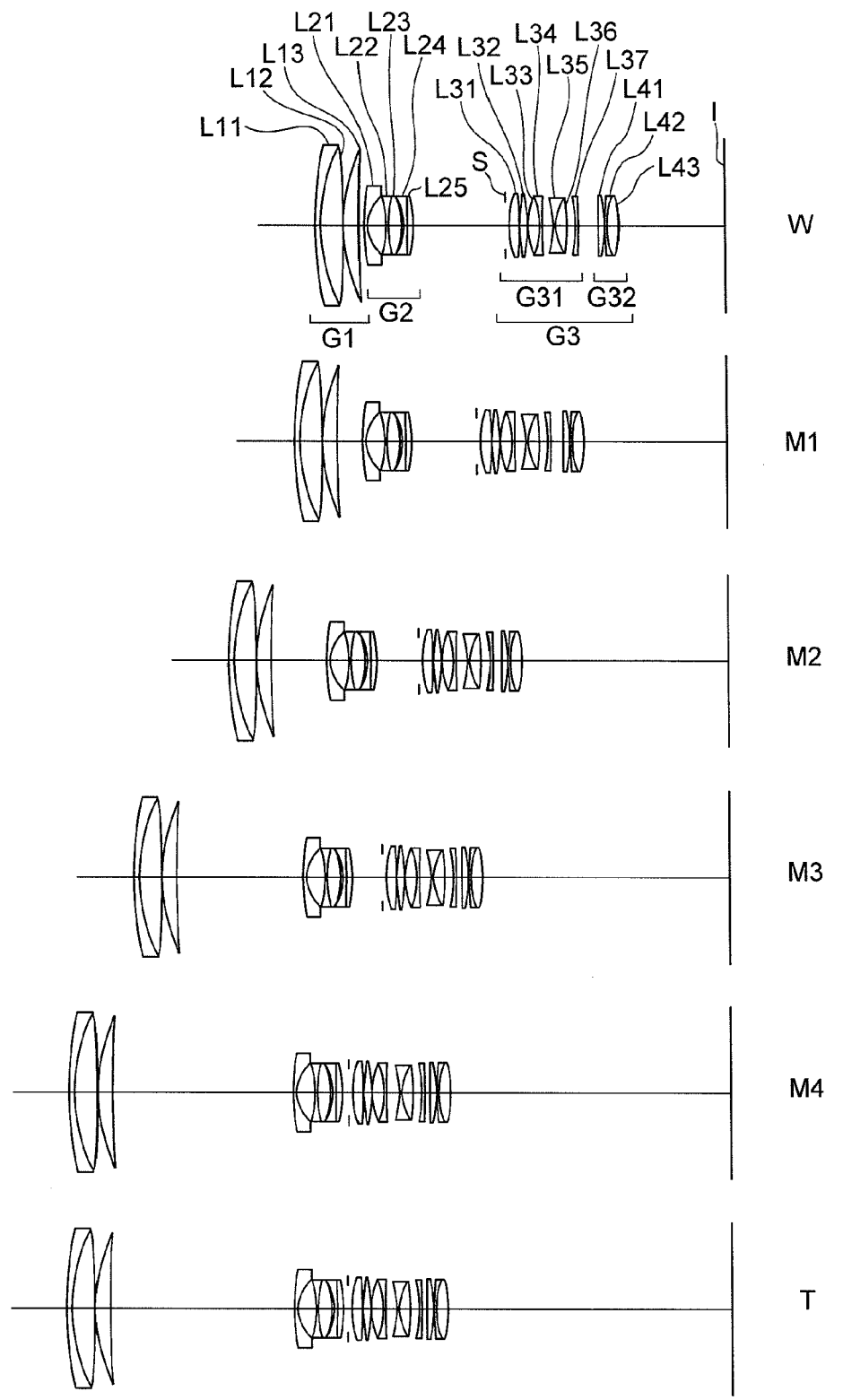
FIG. 35 is a sectional view showing a configuration of a zoom lens system according to Example 15 of the fourth embodiment.

FIG. 35 is a sectional view showing a configuration of a zoom lens system according to Example 15 of the fourth embodiment.

The zoom lens system according to Example 15 of the fourth embodiment is composed of, in order from an object along an optical axis, a first lens group G1 having positive refractive power, a second lens group G2 having negative refractive power, and a third lens group G3 having positive refractive power.

Upon zooming from a wide-angle end state W to a telephoto end state T, the first lens group G1 moves monotonously to the object side, the second lens group G2 moves to the object side, and the third lens group G3 moves monotonously to the object side with respect to the image plane such that a distance between the first lens group G1 and the second lens group G2 increases, and a distance between the second lens group G2 and the third lens group G3 decreases.

Moreover, the third lens group G3 is composed of a front sub-lens group G31 having positive refractive power, and a rear sub-lens group G32 having positive refractive power. Upon zooming from the wide-angle end state W to the telephoto end state T, the front sub-lens group G31 and the rear sub-lens group G32 are moved monotonously to the object side with respect to the image plane I such that a distance between the front sub-lens group G31 and the rear sub-lens group G32 decreases.

An aperture stop S is disposed to the most object side of the third lens group G3, which is disposed to the image side of the second lens group G2, and constructed in a body with the front sub-lens group G31. Moreover, upon zooming from the wide-angle end state W to the telephoto end state T, the aperture stop S keeps the maximum diameter of the wide-angle end state W from the wide-angle end state W to a second intermediate focal length state M2, and increases the maximum diameter monotonously from the second intermediate focal length state M2 to the telephoto end state T.

The first lens group G1 is composed of, in order from the object side along the optical axis, a cemented lens constructed by a negative meniscus lens L11 having a convex surface facing the object side cemented with a biconvex positive lens L12, and a positive meniscus lens L13 having a convex surface facing the object side.

The second lens group G2 is composed of, in order from the object side along the optical axis, a negative meniscus lens L21 having a convex surface facing the object side, a biconcave negative lens L22, a biconvex positive lens L23, and a cemented lens constructed by a negative meniscus lens L24 having a convex surface facing an image side cemented with a positive meniscus lens L25 having a convex surface facing the image side. The negative meniscus lens L21 disposed to the most object side in the second lens group G2 is a compound type aspherical lens in which an aspherical surface is formed by a resin layer provided on the object side lens surface.

The front sub-lens group G31 is composed of, in order from the object side along the optical axis, a biconvex positive lens L31, a biconvex positive lens L32, a cemented lens constructed by a biconvex positive lens L33 cemented with a biconcave negative lens L34, a cemented lens constructed by a biconcave negative lens L35 cemented with a biconvex positive lens L36, and a negative meniscus lens L37 having a concave surface facing the object side. The biconcave negative lens L35 is a glass mold type aspherical lens in which an aspherical surface is formed on the object side surface.

The rear sub-lens group G32 is composed of, in order from the object side along the optical axis, a biconvex positive lens L41 and a cemented lens constructed by a negative meniscus lens L42 having a convex surface facing the object side cemented with a biconvex positive lens L43. The biconvex positive lens L41 disposed to the most object side of the rear sub-lens group G32 is a glass mold type aspherical lens in which an aspherical surface is formed on the object side surface. Light rays come out from the biconvex positive lens L43 form an image on the image plane I.

The following Table 15 shows values of various items of data of the zoom lens system according to Example 15 of the fourth embodiment.

TABLE 15

(Lens Data)

| i | r | d | nd | vd |
|---|---|---|---|---|
| 1 | 127.9445 | 2.0000 | 1.850260 | 32.35 |
| 2 | 66.5460 | 7.8500 | 1.497820 | 82.52 |
| 3 | −596.2307 | 0.1000 | | |
| 4 | 67.4403 | 5.4000 | 1.593190 | 67.87 |
| 5 | 436.1899 | (d5) | | |
| 6* | 135.2961 | 0.1500 | 1.553890 | 38.09 |
| 7 | 107.2597 | 1.0000 | 1.804000 | 46.58 |
| 8 | 15.2626 | 6.7000 | | |
| 9 | −34.5499 | 1.0000 | 1.834807 | 42.72 |
| 10 | 51.8990 | 0.1000 | | |
| 11 | 34.0967 | 4.5000 | 1.784723 | 25.68 |
| 12 | −32.1245 | 0.9000 | | |
| 13 | −21.1157 | 1.0000 | 1.882997 | 40.76 |
| 14 | −2390.2062 | 2.1000 | 1.922860 | 20.50 |
| 15 | −67.6125 | (d15) | | |
| 16 | ∞ | 1.0000 | Aperture Stop S | |
| 17 | 31.6133 | 3.6500 | 1.593190 | 67.87 |
| 18 | −218.5545 | 0.1000 | | |
| 19 | 49.1304 | 3.2000 | 1.487490 | 70.41 |
| 20 | −63.6210 | 0.1000 | | |
| 21 | 35.3573 | 4.2500 | 1.487490 | 70.41 |
| 22 | −34.0783 | 1.0000 | 1.846660 | 23.78 |
| 23 | 659.9606 | 3.9000 | | |
| 24* | −35.0367 | 1.0000 | 1.756998 | 47.82 |
| 25 | 17.5822 | 3.9000 | 1.698947 | 30.13 |
| 26 | −95.2623 | 3.3500 | | |
| 27 | −55.5200 | 1.0000 | 1.882997 | 40.76 |
| 28 | −585.5172 | (d28) | | |
| 29* | 439.7935 | 2.2000 | 1.589130 | 61.16 |
| 30 | −53.2069 | 0.1000 | | |
| 31 | 65.1340 | 1.0000 | 1.834000 | 37.16 |
| 32 | 27.7296 | 4.1000 | 1.487490 | 70.41 |
| 33 | −58.1329 | (Bf) | | |

(Aspherical Surface Data)

Surface number = 6

κ = 4.3350
A4 = 9.45630E−06
A6 = −1.51470E−08
A8 = −1.16860E−12
A10 = 1.65790E−13

Surface number = 24

κ = −0.3009
A4 = 6.23810E−06
A6 = 8.96820E−09
A8 = 0.00000E+00
A10 = 0.00000E+00

Surface number = 29

κ = −20.0000
A4 = −1.92960E−05
A6 = 5.96200E−09
A8 = −1.65600E−10
A10 = 4.18100E−13

(Various Data)
zoom ratio = 15.698

| | f | FNO | ω | Y | TL | Bf |
|---|---|---|---|---|---|---|
| W = | 18.53928 | 3.60631 | 39.00856 | 14.20 | 148.79923 | 39.00067 |
| M1 = | 27.99917 | 4.19068 | 26.78890 | 14.20 | 157.22054 | 52.54373 |
| M2 = | 49.99950 | 5.39086 | 15.55965 | 14.20 | 181.95557 | 76.57450 |
| M3 = | 105.00169 | 5.76130 | 7.48510 | 14.20 | 217.34659 | 91.11965 |
| M4 = | 278.75308 | 5.78421 | 2.85557 | 14.20 | 241.72065 | 104.16125 |
| T = | 291.02949 | 5.78825 | 2.73699 | 14.20 | 242.82932 | 105.34665 |

| | φ | d5 | d15 | d28 |
|---|---|---|---|---|
| W = | 17.20 | 2.10000 | 33.50310 | 7.54546 |
| M1 = | 17.20 | 9.42195 | 24.00476 | 4.60010 |
| M2 = | 17.20 | 20.39318 | 15.75155 | 2.58634 |
| M3 = | 18.40 | 46.65937 | 10.98454 | 1.93303 |

TABLE 15-continued

| | | | | |
|---|---|---|---|---|
| M4 = | 20.40 | 66.86210 | 2.49980 | 1.54750 |
| T = | 20.59 | 67.33267 | 2.00000 | 1.50000 |

(Lens Group Data)

| Group | I | focal length |
|---|---|---|
| 1 | 1 | 104.30654 |
| 2 | 6 | −13.81152 |
| 3 | 16 | 36.15068 (W) |
| | | 34.23169 (M1) |
| | | 33.03282 (M2) |
| | | 32.66171 (M3) |
| | | 32.44660 (M4) |
| | | 32.42030 (T) |
| 31 | 16 | 39.54020 |
| 32 | 29 | 48.03635 |

(Values for Conditional Expressions)

(1) f1/fT = 0.358
(2) φT/φW = 1.197
(3) φM10/φW = 1.186 (φM10 is a value in M4)
(4) φM15/φW = 1.186 (φM15 is a value in M4)
(5) φM5/φW = 1.070 (φM5 is a value in M3)
(6) fM/fW = 2.70 (fM is a value in M2)
(7) −f2/fT = 0.0475

FIGS. 17A, 17B and 17C are graphs showing various aberrations of the zoom lens system according to Example 15 of the fourth embodiment, in which FIG. 17A is in a wide-angle end state W, FIG. 17B is in a first intermediate focal length state M1, and FIG. 17C is in a second intermediate focal length state M2.

FIGS. 18A, 18B and 18C are graphs showing various aberrations of the zoom lens system according to Example 15 of the fourth embodiment, in which FIG. 18A is in a third intermediate focal length state M3, FIG. 18B is in a fourth intermediate focal length state M4, and FIG. 18C is in a telephoto end state T.

As is apparent from the respective graphs, the zoom lens according to Example 15 of the fourth embodiment shows superb optical performance as a result of good corrections to various aberrations from the wide-angle end state through the telephoto end state.

Example 16

Figure 36:
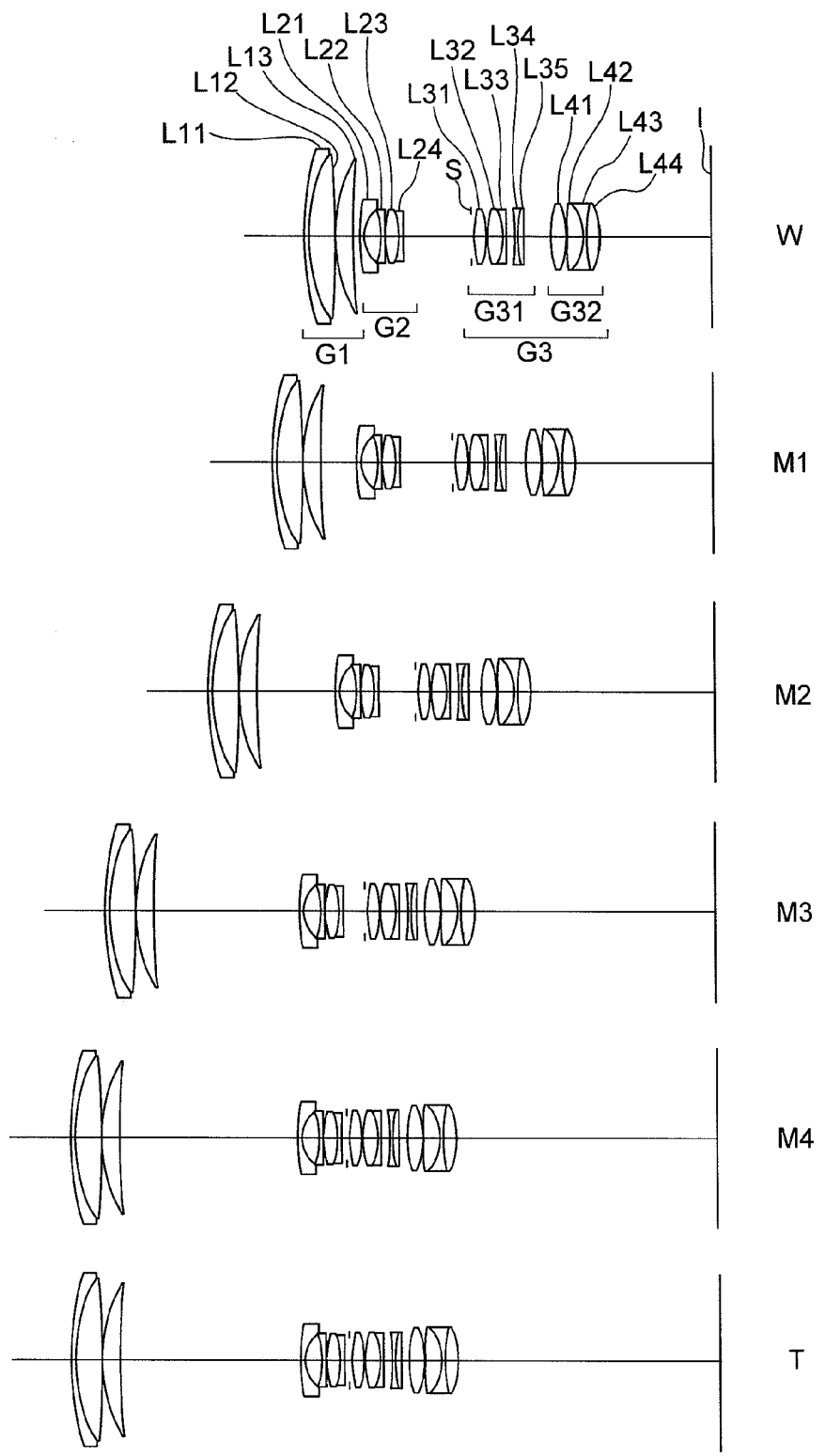
FIG. 36 is a sectional view showing a configuration of a zoom lens system according to Example 16 of the fourth embodiment.

FIG. 36 is a sectional view showing a configuration of a zoom lens system according to Example 16 of the fourth embodiment.

The zoom lens system according to Example 16 of the fourth embodiment is composed of, in order from an object along an optical axis, a first lens group G1 having positive refractive power, a second lens group G2 having negative refractive power, and a third lens group G3 having positive refractive power.

Upon zooming from a wide-angle end state W to a telephoto end state T, the first lens group G1 moves monotonously to the object side, the second lens group G2 moves to the object side, and the third lens group G3 moves monotonously to the object side with respect to the image plane I such that a distance between the first lens group G1 and the second lens group G2 increases, and a distance between the second lens group G2 and the third lens group G3 decreases.

Moreover, the third lens group G3 is composed of a front sub-lens group G31 having positive refractive power, and a rear sub-lens group G32 having positive refractive power. Upon zooming from the wide-angle end state W to the telephoto end state T, the front sub-lens group G31 and the rear sub-lens group G32 are moved monotonously to the object side with respect to the image plane I such that a distance between the front sub-lens group G31 and the rear sub-lens group G32 decreases.

An aperture stop S is disposed to the most object side of the third lens group G3, which is disposed to the image side of the second lens group G2, and constructed in a body with the front sub-lens group G31. Moreover, upon zooming from the wide-angle end state W to the telephoto end state T, the aperture stop S keeps the maximum diameter of the wide-angle end state W from the wide-angle end state W to a third intermediate focal length state M3, and increases the maximum diameter monotonously from the third intermediate focal length state M3 to the telephoto end state T.

The first lens group G1 is composed of, in order from the object side along the optical axis, a cemented lens constructed by a negative meniscus lens L11 having a convex surface facing the object side cemented with a biconvex positive lens L12, and a positive meniscus lens L13 having a convex surface facing the object side.

The second lens group G2 is composed of, in order from the object side along the optical axis, a negative meniscus lens L21 having a convex surface facing the object side, a biconcave negative lens L22, a biconvex positive lens L23, and a biconcave negative lens L24. The negative meniscus lens L21 disposed to the most object side in the second lens group G2 is a compound type aspherical lens in which an aspherical surface is formed by a resin layer provided on the object side lens surface.

The front sub-lens group G31 is composed of, in order from the object side along the optical axis, a biconvex positive lens L31, a cemented lens constructed by a biconvex positive lens L32 cemented with a negative meniscus lens L33, and a cemented lens constructed by a biconcave negative lens L34 cemented with a positive meniscus lens L35 having a convex surface facing the object side. The biconcave negative lens L34 is a compound type aspherical lens in which an aspherical surface is formed by a resin layer provided on the object side surface.

The rear sub-lens group G32 is composed of, in order from the object side along the optical axis, a biconvex positive lens L41, a cemented lens constructed by a biconvex positive lens L42 cemented with a biconcave negative lens L43, and a biconvex positive lens L44. The biconvex positive lens L41 disposed to the most object side of the rear sub-lens group G32 is a glass mold type aspherical lens in which an aspherical surface is formed on the object side surface. Light rays come out from the biconvex positive lens L44 form an image on the image plane I.

The following Table 16 shows values of various items of data of the zoom lens system according to Example 16 of the fourth embodiment.

TABLE 16

(Lens Data)

| i | r | d | nd | vd |
|---|---|---|---|---|
| 1 | 107.0206 | 1.8000 | 1.903658 | 31.31 |
| 2 | 61.2968 | 9.0132 | 1.456500 | 90.27 |
| 3 | −505.7797 | 0.1000 | | |
| 4 | 56.5708 | 6.5660 | 1.603001 | 65.44 |
| 5 | 263.1448 | (d5) | | |
| 6* | 107.6633 | 0.1500 | 1.553890 | 38.09 |
| 7 | 79.4357 | 1.2000 | 1.816000 | 46.62 |
| 8 | 12.5498 | 5.8961 | | |
| 9 | −28.1361 | 1.0000 | 1.816000 | 46.62 |
| 10 | 76.8103 | 0.1000 | | |

TABLE 16-continued

| | | | | |
|---|---|---|---|---|
| 11 | 29.0330 | 5.0805 | 1.846660 | 23.78 |
| 12 | −28.2941 | 0.7021 | | |
| 13 | −20.3234 | 1.0000 | 1.788001 | 47.37 |
| 14 | 328.3222 | (d14) | | |
| 15 | ∞ | 0.5000 | Aperture Stop S | |
| 16 | 38.5144 | 4.3804 | 1.527510 | 66.72 |
| 17 | −31.0868 | 0.1000 | | |
| 18 | 24.8278 | 5.7092 | 1.497000 | 81.64 |
| 19 | −22.4849 | 1.0000 | 1.850260 | 32.35 |
| 20 | −1199.4167 | 3.0000 | | |
| 21* | −52.5575 | 0.1000 | 1.553890 | 38.09 |
| 22 | −56.7769 | 1.0000 | 1.772499 | 49.60 |
| 23 | 32.9354 | 1.9482 | 1.805181 | 25.42 |
| 24 | 83.4259 | (d24) | | |
| 25* | 38.1701 | 5.1517 | 1.677900 | 54.89 |
| 26 | −30.3075 | 0.1000 | | |
| 27 | 119.1216 | 5.7937 | 1.511790 | 49.72 |
| 28 | −16.9262 | 1.0000 | 1.878780 | 41.73 |
| 29 | 40.2625 | 0.7994 | | |
| 30 | 88.7687 | 4.0188 | 1.497970 | 53.26 |
| 31 | −31.8725 | (Bf) | | |

(Aspherical Surface Data)

Surface number = 6

$\kappa = 1.0000$
A4 = 8.23600E−06
A6 = 2.68070E−08
A8 = −2.85680E−10
A10 = 8.96110E−13

Surface number = 21

$\kappa = 1.0000$
A4 = 8.39680E−06
A6 = 4.90050E−09
A8 = 0.00000E+00
A10 = 0.00000E+00

Surface number = 25

$\kappa = 1.0000$
A4 = −1.05940E−05
A6 = 2.60370E−08
A8 = 0.00000E+00
A10 = 0.00000E+00

(Various Data)
zoom ratio = 15.666

| | f | FNO | ω | Y | TL | Bf |
|---|---|---|---|---|---|---|
| W = | 18.57581 | 3.58467 | 38.75301 | 14.20 | 141.06118 | 38.02328 |
| M1 = | 27.79158 | 4.09252 | 26.53439 | 14.20 | 153.60481 | 48.03831 |
| M2 = | 50.03219 | 5.03317 | 15.40656 | 14.20 | 176.97503 | 64.55253 |
| M3 = | 134.79308 | 6.30198 | 5.90773 | 14.20 | 214.13726 | 85.33826 |
| M4 = | 281.38675 | 6.35021 | 2.83943 | 14.20 | 226.92995 | 92.38485 |
| T = | 291.01598 | 6.35739 | 2.74550 | 14.20 | 227.18745 | 92.60805 |

| | φ | d5 | d14 | d24 |
|---|---|---|---|---|
| W = | 15.40 | 2.12080 | 23.69130 | 10.01650 |
| M1 = | 15.40 | 12.45490 | 18.40230 | 7.50000 |
| M2 = | 15.40 | 26.91570 | 13.31350 | 4.98400 |
| M3 = | 15.40 | 50.67230 | 7.80730 | 3.11010 |
| M4 = | 16.20 | 62.28300 | 2.14860 | 2.90420 |
| T = | 16.20 | 62.67010 | 1.80000 | 2.90000 |

(Lens Group Data)

| Group | I | focal length |
|---|---|---|
| 1 | 1 | 95.68946 |
| 2 | 6 | −11.46195 |
| 3 | 15 | 31.13029 (W) |
| | | 29.77152 (M1) |
| | | 28.52664 (M2) |
| | | 27.66506 (M3) |
| | | 27.57355 (M4) |
| | | 27.57169 (T) |
| 31 | 15 | 42.77504 |
| 32 | 25 | 40.12768 |

(Values for Conditional Expressions)

(1) f1/fT = 0.329
(2) φT/φW = 1.052
(3) φM10/φW = 1.052 (φM10 is a value in M4)
(4) φM15/φW = 1.052 (φM15 is a value in M4)
(5) φM5/φW = 1.000 (φM5 is a value in M3)
(6) fM/fW = 7.256 (fM is a value in M3)
(7) −f2/fT = 0.0394

FIGS. 20A, 20B and 20C are graphs showing various aberrations of the zoom lens system according to Example 16 of the fourth embodiment, in which FIG. 20A is in a wide-angle end state W, FIG. 20B is in a first intermediate focal length state M1, and FIG. 20C is in a second intermediate focal length state M2.

FIGS. 21A, 21B and 21C are graphs showing various aberrations of the zoom lens system according to Example 16 of the fourth embodiment, in which FIG. 21A is in a third intermediate focal length state M3, FIG. 21B is in a fourth intermediate focal length state M4, and FIG. 21C is in a telephoto end state T.

As is apparent from the respective graphs, the zoom lens according to Example 16 of the fourth embodiment shows superb optical performance as a result of good corrections to various aberrations from the wide-angle end state through the telephoto end state.

Example 17

Figure 37:
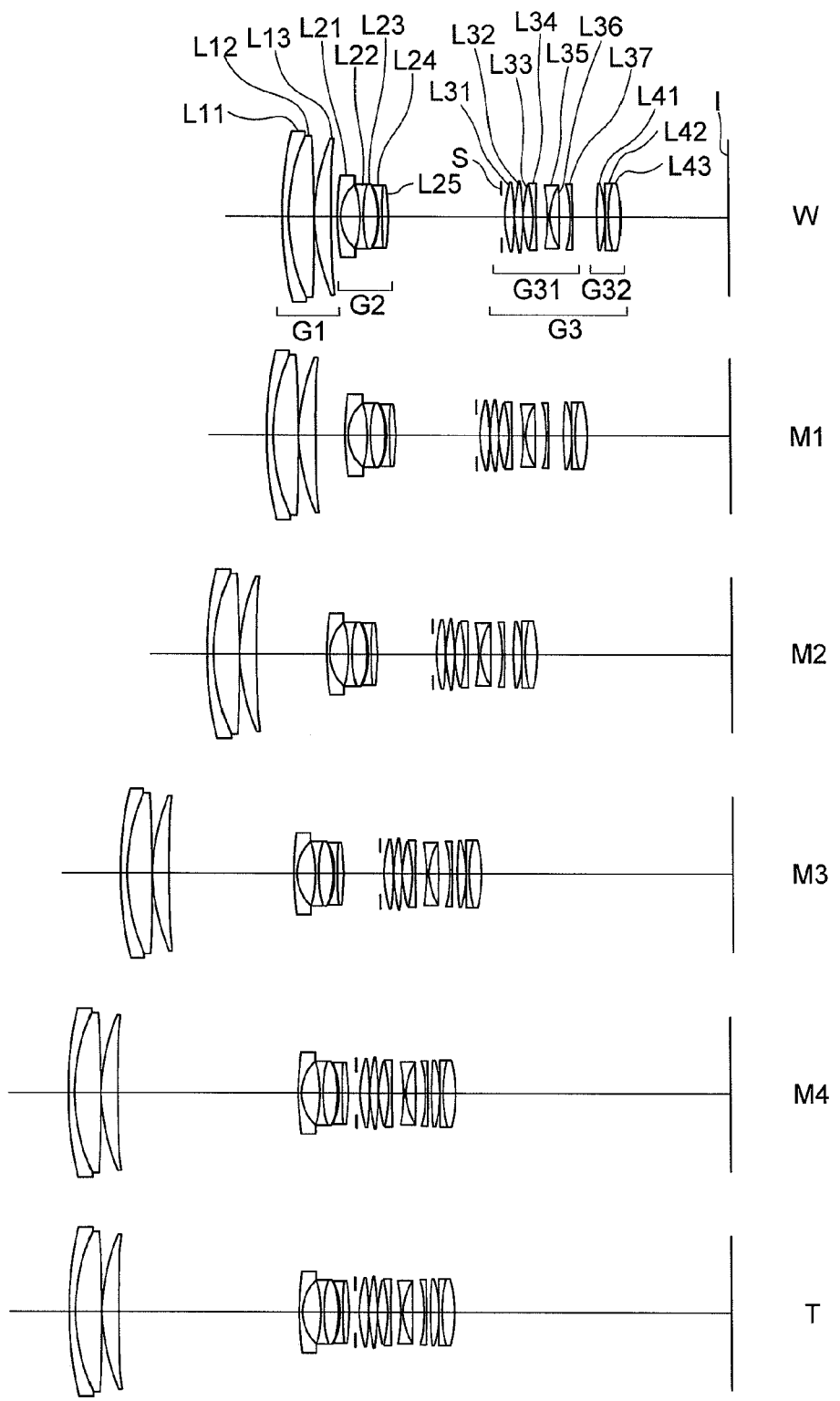
FIG. 37 is a sectional view showing a configuration of a zoom lens system according to Example 17 of the fourth embodiment.

FIG. 37 is a sectional view showing a configuration of a zoom lens system according to Example 17 of the fourth embodiment.

The zoom lens system according to Example 17 of the fourth embodiment is composed of, in order from an object along an optical axis, a first lens group G1 having positive refractive power, a second lens group G2 having negative refractive power, and a third lens group G3 having positive refractive power.

Upon zooming from a wide-angle end state W to a telephoto end state T, the first lens group G1 moves monotonously to the object side, the second lens group G2 moves to the image side from the wide-angle end state W to a first intermediate focal length state M1 and to the object side from the first intermediate focal length state M1 to the telephoto end state T, and the third lens group G3 moves monotonously to the object side with respect to the image plane I such that a distance between the first lens group G1 and the second lens group G2 increases, and a distance between the second lens group G2 and the third lens group G3 decreases.

Moreover, the third lens group G3 is composed of a front sub-lens group G31 having positive refractive power, and a rear sub-lens group G32 having positive refractive power. Upon zooming from the wide-angle end state W to the telephoto end state T, the front sub-lens group G31 and the rear sub-lens group G32 are moved monotonously to the object side with respect to the image plane I such that a distance between the front sub-lens group G31 and the rear sub-lens group G32 decreases.

An aperture stop S is disposed to the most object side of the third lens group G3, which is disposed to the image side of the second lens group G2, and constructed in a body with the front sub-lens group G31. Moreover, upon zooming from the wide-angle end state W to the telephoto end state T, the aperture stop S keeps the maximum diameter of the wide-angle end state W from the wide-angle end state W to the first intermediate focal length state M1, and increases the maximum diameter monotonously from the first intermediate focal length state M1 to the telephoto end state T.

The first lens group G1 is composed of, in order from the object side along the optical axis, a cemented lens constructed by a negative meniscus lens L11 having a convex surface facing the object side cemented with a biconvex positive lens L12, and a positive meniscus lens L13 having a convex surface facing the object side.

The second lens group G2 is composed of, in order from the object side along the optical axis, a negative meniscus lens L21 having a convex surface facing the object side, a biconcave negative lens L22, a biconvex positive lens L23, and a cemented lens constructed by a negative meniscus lens L24 having a convex surface facing an image side cemented with a positive meniscus lens L25 having a convex surface facing the image side. The negative meniscus lens L21 disposed to the most object side in the second lens group G2 is a compound type aspherical lens in which an aspherical surface is formed by a resin layer provided on the object side lens surface.

The front sub-lens group G31 is composed of, in order from the object side along the optical axis, a biconvex positive lens L31, a biconvex positive lens L32, a cemented lens constructed by a biconvex positive lens L33 cemented with a biconcave negative lens L34, a cemented lens constructed by a biconcave negative lens L35 cemented with a positive meniscus lens L36 having a convex surface facing the object side, and a negative meniscus lens L37 having a concave surface facing the object side. The biconcave negative lens L35 is a glass mold type aspherical lens in which an aspherical surface is formed on the object side surface.

The rear sub-lens group G32 is composed of, in order from the object side along the optical axis, a biconvex positive lens L41 and a cemented lens constructed by a biconcave negative lens L42 cemented with a biconvex positive lens L43. The biconvex positive lens L41 disposed to the most object side of the rear sub-lens group G32 is a glass mold type aspherical lens in which an aspherical surface is formed on the object side surface. Light rays come out from the biconvex positive lens L43 form an image on the image plane I.

The following Table 17 shows values of various items of data of the zoom lens system according to Example 17 of the fourth embodiment.

TABLE 17

(Lens Data)

| i | r | d | nd | νd |
|---|---|---|----|----|
| 1 | 123.9595 | 2.0000 | 1.850260 | 32.35 |
| 2 | 65.8189 | 9.3000 | 1.497820 | 82.52 |
| 3 | −679.8190 | 0.1000 | | |
| 4 | 66.6349 | 6.2000 | 1.593190 | 67.87 |
| 5 | 419.9308 | (d5) | | |
| 6* | 162.3242 | 0.1500 | 1.553890 | 38.09 |
| 7 | 146.0754 | 1.0000 | 1.834807 | 42.72 |
| 8 | 16.1304 | 6.5500 | | |
| 9 | −35.2760 | 1.0000 | 1.882997 | 40.76 |
| 10 | 60.4450 | 0.1000 | | |
| 11 | 37.3723 | 5.2000 | 1.846660 | 23.78 |
| 12 | −32.7279 | 0.8214 | | |
| 13 | −23.9463 | 1.0000 | 1.882997 | 40.76 |
| 14 | −252.4150 | 2.0000 | 1.808090 | 22.79 |
| 15 | −72.4479 | (d15) | | |
| 16 | ∞ | 1.0000 | Aperture Stop S | |
| 17 | 36.7222 | 3.3000 | 1.593190 | 67.87 |

TABLE 17-continued

| 18 | −118.1963 | 0.1000 | | |
|----|-----------|--------|----------|-------|
| 19 | 41.3768 | 3.1500 | 1.487490 | 70.41 |
| 20 | −92.3429 | 0.1000 | | |
| 21 | 42.3403 | 3.8000 | 1.487490 | 70.41 |
| 22 | −41.0036 | 1.0000 | 1.805181 | 25.43 |
| 23 | 259.3609 | 3.8191 | | |
| 24* | −63.6485 | 1.0000 | 1.806100 | 40.94 |
| 25 | 22.0000 | 2.9000 | 1.805181 | 25.43 |
| 26 | 150.5781 | 4.2000 | | |
| 27 | −45.8244 | 1.0000 | 1.882997 | 40.76 |
| 28 | −215.9895 | (d28) | | |
| 29* | 77.1794 | 3.1500 | 1.589130 | 61.16 |
| 30 | −37.1187 | 0.1000 | | |
| 31 | −261.2949 | 1.0000 | 1.882997 | 40.76 |
| 32 | 39.9808 | 4.4000 | 1.518229 | 58.93 |
| 33 | −48.5209 | (Bf) | | |

(Aspherical Surface Data)

Surface number = 6

κ = −5.7774
A4 = 6.79980E−06
A6 = −2.52730E−08
A8 = 8.26150E−11
A10 = −1.02860E−13

Surface number = 24

κ = 2.8196
A4 = 4.59750E−06
A6 = 4.28350E−09
A8 = 0.00000E+00
A10 = 0.00000E+00

Surface number = 29

κ = −6.5363
A4 = −1.95310E−05
A6 = 1.79050E−08
A8 = −1.55070E−10
A10 = 4.13770E−13

(Various Data)
zoom ratio = 15.696

| | f | FNO | ω | Y | TL | Bf |
|---|---|---|---|---|---|---|
| W = | 18.53979 | 4.10702 | 38.99845 | 14.20 | 160.00885 | 39.11693 |
| M1 = | 27.99960 | 4.69307 | 26.65869 | 14.20 | 165.81325 | 51.53459 |
| M2 = | 49.99905 | 5.38961 | 15.38789 | 14.20 | 187.27349 | 69.40178 |
| M3 = | 104.99746 | 5.39973 | 7.50128 | 14.20 | 218.99165 | 89.39051 |
| M4 = | 281.99442 | 5.39860 | 2.82458 | 14.20 | 237.63297 | 98.87896 |
| T = | 290.99204 | 5.39939 | 2.73812 | 14.20 | 237.79997 | 99.16649 |

| | φ | d5 | d15 | d28 |
|---|---|----|-----|-----|
| W = | 15.60 | 2.15153 | 40.45482 | 8.84506 |
| M1 = | 15.60 | 10.22614 | 29.25621 | 5.35580 |
| M2 = | 16.50 | 25.00000 | 20.27964 | 3.15156 |
| M3 = | 20.00 | 45.02627 | 13.14016 | 1.99420 |
| M4 = | 21.72 | 65.29400 | 2.48000 | 1.53950 |
| T = | 21.78 | 65.69297 | 2.00000 | 1.50000 |

(Lens Group Data)

| Group | I | focal length |
|-------|---|--------------|
| 1 | 1 | 103.25223 |
| 2 | 6 | −15.13084 |
| 3 | 16 | 39.55369 (W) |
| | | 37.13627 (M1) |
| | | 35.75578 (M2) |
| | | 35.07124 (M3) |
| | | 34.80941 (M4) |
| | | 34.78685 (T) |
| 31 | 16 | 44.76649 |
| 32 | 29 | 47.36030 |

TABLE 17-continued (Values for Conditional Expressions)

(1) f1/fT = 0.355
(2) φT/φW = 1.396
(3) φM10/φW = 1.392 (φM10 is a value in M4)
(4) φM15/φW = 1.392 (φM15 is a value in M4)
(5) φM5/φW = 1.282 (φM5 is a value in M3)
(6) fM/fW = 1.510 (fM is a value in M1)
(7) −f2/fT = 0.0520

FIGS. 23A, 23B and 23C are graphs showing various aberrations of the zoom lens system according to Example 17 of the fourth embodiment, in which FIG. 23A is in a wide-angle end state W, FIG. 23B is in a first intermediate focal length state M1, and FIG. 23C is in a second intermediate focal length state M2.

FIGS. 24A, 24B and 24C are graphs showing various aberrations of the zoom lens system according to Example 17 of the fourth embodiment, in which FIG. 24A is in a third intermediate focal length state M3, FIG. 24B is in a fourth intermediate focal length state M4, and FIG. 24C is in a telephoto end state T.

As is apparent from the respective graphs, the zoom lens according to Example 17 of the fourth embodiment shows superb optical performance as a result of good corrections to various aberrations from the wide-angle end state through the telephoto end state.

Example 18

Figure 38:
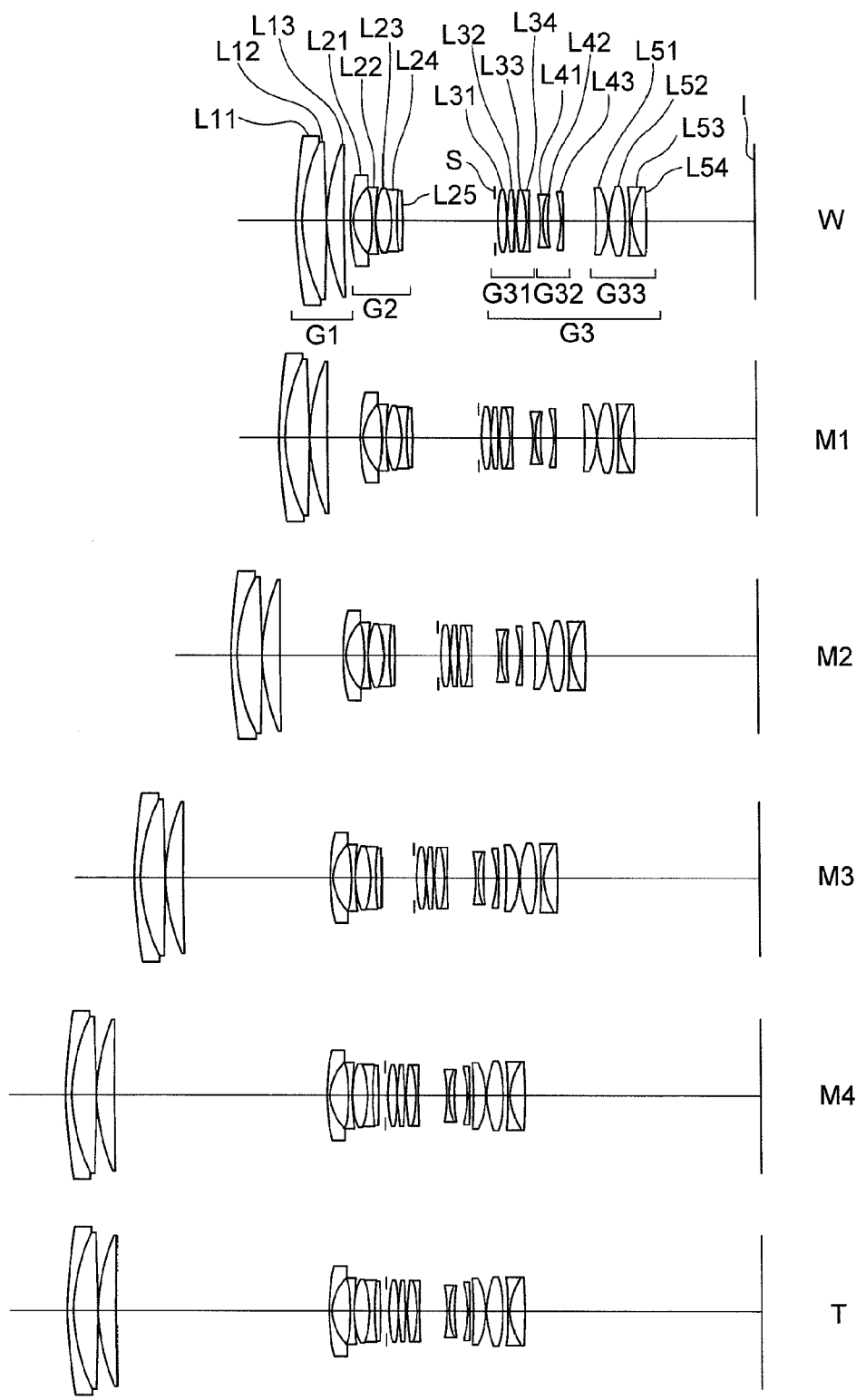
FIG. 38 is a sectional view showing a configuration of a zoom lens system according to Example 18 of the fourth embodiment.

FIG. 38 is a sectional view showing a configuration of a zoom lens system according to Example 18 of the fourth embodiment.

The zoom lens system according to Example 18 of the fourth embodiment is composed of, in order from an object along an optical axis, a first lens group G1 having positive refractive power, a second lens group G2 having negative refractive power, and a third lens group G3 having positive refractive power.

Upon zooming from a wide-angle end state W to a telephoto end state T, the first lens group G1 moves monotonously to the object side, the second lens group G2 moves to the image side from the wide-angle end state W to a first intermediate focal length state M1 and to the object side from the first intermediate focal length state M1 to the telephoto end state T, and the third lens group G3 moves monotonously to the object side with respect to the image plane I such that a distance between the first lens group G1 and the second lens group G2 increases, and a distance between the second lens group G2 and the third lens group G3 decreases.

Moreover, the third lens group G3 is composed of a front sub-lens group G31 having positive refractive power, a middle sub-lens group G32 having negative refractive power, and a rear sub-lens group G33 having positive refractive power. Upon zooming from the wide-angle end state W to the telephoto end state T, the front sub-lens group G31, the middle sub-lens group G32 and the rear sub-lens group G33 are moved to the object side with respect to the image plane I such that a distance between the front sub-lens group G31 and the middle sub-lens group G32 increases, and a distance between the middle sub-lens group G32 and the rear sub-lens group G33 decreases.

An aperture stop S is disposed to the most object side of the third lens group G3, which is disposed to the image side of the second lens group G2, and constructed in a body with the front sub-lens group G31. Moreover, upon zooming from the wide-angle end state W to the telephoto end state T, the aperture stop S keeps the maximum diameter of the wide-angle end state W from the wide-angle end state W to the second intermediate focal length state M2, and increases the maximum diameter monotonously from the second intermediate focal length state M2 to the telephoto end state T.

The first lens group G1 is composed of, in order from the object side along the optical axis, a cemented lens constructed by a negative meniscus lens L11 having a convex surface facing the object side cemented with a biconvex positive lens L12, and a positive meniscus lens L13 having a convex surface facing the object side.

The second lens group G2 is composed of, in order from the object side along the optical axis, a negative meniscus lens L21 having a convex surface facing the object side, a biconcave negative lens L22, a biconvex positive lens L23, and a cemented lens constructed by a biconcave negative lens L24 cemented with a biconvex positive lens L25. The negative meniscus lens L21 disposed to the most object side in the second lens group G2 is a compound type aspherical lens in which an aspherical surface is formed by a resin layer provided on the object side lens surface.

The front sub-lens group G31 is composed of, in order from the object side along the optical axis, a biconvex positive lens L31, a biconvex positive lens L32, a cemented lens constructed by a biconvex positive lens L33 cemented with a negative meniscus lens L34 having a concave surface facing the object side.

The middle sub-lens group G32 is composed of, in order from the object side along the optical axis, a cemented lens constructed by a biconcave negative lens L41 cemented with a positive meniscus lens L42 having a convex surface facing the object side, and a negative meniscus lens L43 having a concave surface facing the object side. The biconcave negative lens L41 disposed to the most object side of the middle sub-lens group G32 is a compound type aspherical lens in which an aspherical surface is formed by a resin layer provided on the object side surface.

The rear sub-lens group G33 is composed of, in order from the object side along the optical axis, a biconvex positive lens L51, a biconvex positive lens L52 and a cemented lens constructed by a biconcave negative lens L53 cemented with a biconvex positive lens L54. The biconvex positive lens L51 disposed to the most object side of the rear sub-lens group G33 is a glass mold type aspherical lens in which an aspherical surface is formed on the object side surface. Light rays come out from the biconvex positive lens L54 form an image on the image plane I.

The following Table 18 shows values of various items of data of the zoom lens system according to Example 18 of the fourth embodiment.

TABLE 18

(Lens Data)

| i | r | d | nd | νd |
|---|---|---|---|---|
| 1 | 175.6056 | 2.2000 | 1.834000 | 37.16 |
| 2 | 67.4302 | 8.8000 | 1.497820 | 82.52 |
| 3 | −587.7848 | 0.1000 | | |
| 4 | 72.2710 | 6.4500 | 1.593190 | 67.87 |
| 5 | 1826.1388 | (d5) | | |
| 6* | 84.7687 | 0.1000 | 1.553890 | 38.09 |
| 7 | 73.9375 | 1.2000 | 1.834807 | 42.72 |
| 8 | 17.1873 | 6.9500 | | |
| 9 | −36.9822 | 1.0000 | 1.816000 | 46.62 |
| 10 | 77.9263 | 0.1500 | | |
| 11 | 36.6346 | 5.3000 | 1.784723 | 25.68 |

TABLE 18-continued

| | | | | |
|---|---|---|---|---|
| 12 | −36.6346 | 0.8000 | | |
| 13 | −26.1991 | 1.0000 | 1.816000 | 46.62 |
| 14 | 63.7396 | 2.0500 | 1.808090 | 22.79 |
| 15 | −643.2706 | (d15) | | |
| 16 | ∞ | 1.0000 | Aperture Stop S | |
| 17 | 65.8365 | 3.4000 | 1.593190 | 67.87 |
| 18 | −50.1546 | 0.1000 | | |
| 19 | 65.6817 | 2.4500 | 1.487490 | 70.41 |
| 20 | −154.9743 | 0.1000 | | |
| 21 | 46.7333 | 4.2000 | 1.487490 | 70.41 |
| 22 | −35.7833 | 1.0000 | 1.808090 | 22.79 |
| 23 | −191.9318 | (d23) | | |
| 24* | −57.2966 | 0.2000 | 1.553890 | 38.09 |
| 25 | −59.7250 | 0.9000 | 1.696797 | 55.52 |
| 26 | 28.5100 | 2.1500 | 1.728250 | 28.46 |
| 27 | 91.9976 | 4.1402 | | |
| 28 | −32.8954 | 1.0000 | 1.729157 | 54.66 |
| 29 | −144.3315 | (d29) | | |
| 30* | 6427.1919 | 4.6500 | 1.589130 | 61.18 |
| 31 | −27.3818 | 0.1000 | | |
| 32 | 31.4776 | 5.8500 | 1.487490 | 70.41 |
| 33 | −43.7539 | 1.4500 | | |
| 34 | −113.5897 | 1.0000 | 1.882997 | 40.76 |
| 35 | 20.3481 | 5.3000 | 1.548141 | 45.79 |
| 36 | −709.1453 | (Bf) | | |

(Aspherical Surface Data)

Surface number = 6

κ = 1.0000
A4 = 2.88220E−06
A6 = −2.29350E−11
A8 = −2.35280E−11
A10 = 9.21570E−14

Surface number = 24

κ = 1.0000
A4 = 4.32780E−06
A6 = 1.88460E−09
A8 = 0.00000E+00
A10 = 0.00000E+00

Surface number = 30

κ = 1.0000
A4 = −1.36170E−05
A6 = −3.55860E−10
A8 = 1.83080E−11
A10 = −1.86790E−13

(Various Data)
zoom ratio = 15.701

| | f | FNO | ω | Y | TL | Bf |
|---|---|---|---|---|---|---|
| W = | 18.56060 | 3.57565 | 38.80191 | 14.20 | 164.76435 | 38.84705 |
| M1 = | 27.94799 | 4.13253 | 26.18802 | 14.20 | 171.02547 | 44.06807 |
| M2 = | 48.95245 | 5.36204 | 15.68652 | 14.20 | 189.44683 | 62.50183 |
| M3 = | 104.65150 | 5.62482 | 7.44205 | 14.20 | 225.28899 | 73.57929 |
| M4 = | 280.18763 | 5.80434 | 2.82863 | 14.20 | 249.99418 | 86.00428 |
| T = | 291.42454 | 5.81064 | 2.72113 | 14.20 | 250.61470 | 86.64770 |

| | φ | d5 | d15 | d23 | d29 |
|---|---|---|---|---|---|
| W = | 15.80 | 2.15700 | 33.36360 | 3.46820 | 11.83830 |
| M1 = | 15.80 | 11.13190 | 23.94380 | 7.42730 | 9.36420 |
| M2 = | 15.80 | 22.22690 | 15.96870 | 8.95240 | 4.70680 |
| M3 = | 17.50 | 53.01000 | 11.30360 | 9.64300 | 2.66290 |
| M4 = | 19.50 | 75.67850 | 2.48130 | 9.67390 | 1.06600 |
| T = | 19.60 | 76.25220 | 2.00000 | 9.62460 | 1.00000 |

(Lens Group Data)

| Group | I | focal length |
|---|---|---|
| 1 | 1 | 117.72937 |
| 2 | 6 | −15.60945 |
| 3 | 16 | 40.44471 (W) |
| | | 39.66103 (M1) |
| | | 35.67164 (M2) |
| | | 33.95695 (M3) |
| | | 32.73988 (M4) |
| | | 32.70088 (T) |
| 31 | 16 | 27.35473 |
| 32 | 24 | −26.50041 |
| 33 | 30 | 35.20423 |

(Values for Conditional Expressions)

(1) f1/fT = 0.404
(2) φT/φW = 1.241
(3) φM10/φW = 1.234 (φM10 is a value in M4)
(4) φM15/φW = 1.234 (φM15 is a value in M4)
(5) φM5/φW = 1.108 (φM5 is a value in M3)
(6) fM/fW = 2.637 (fM is a value in M2)
(7) −f2/fT = 0.0536

FIGS. 26A, 26B and 26C are graphs showing various aberrations of the zoom lens system according to Example 18 of the fourth embodiment, in which FIG. 26A is in a wide-angle end state W, FIG. 26B is in a first intermediate focal length state M1, and FIG. 26C is in a second intermediate focal length state M2.

FIGS. 27A, 27B and 27C are graphs showing various aberrations of the zoom lens system according to Example 18 of the fourth embodiment, in which FIG. 27A is in a third intermediate focal length state M3, FIG. 27B is in a fourth intermediate focal length state M4, and FIG. 27C is in a telephoto end state T.

As is apparent from the respective graphs, the zoom lens according to Example 18 of the fourth embodiment shows superb optical performance as a result of good corrections to various aberrations from the wide-angle end state through the telephoto end state.

As described above, the fourth embodiment makes it possible to provide a zoom lens system having high optical performance with suppressing variation in aberrations.

Then, an outline of a method for manufacturing a zoom lens system according to the fourth embodiment of the present application is described below.

Figure 48:
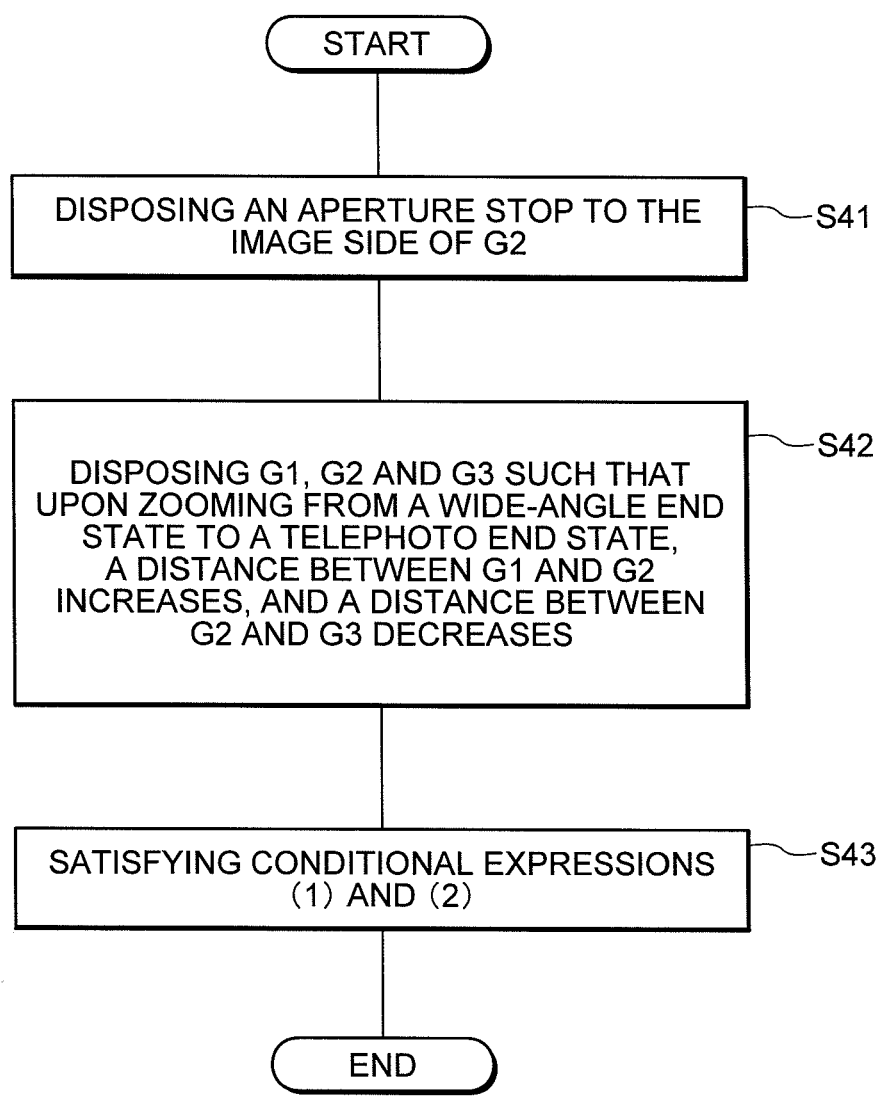
FIG. 48 is a flowchart showing a method for manufacturing a zoom lens system according to the fourth embodiment.

FIG. 48 is a flowchart showing a method for manufacturing a zoom lens system according to the fourth embodiment of the present application.

The method for manufacturing a zoom lens system according to the fourth embodiment is a method for manufacturing a zoom lens system consisting of, in order from an object side along an optical axis, a first lens group having positive refractive power, a second lens group having negative refractive power, and a third lens group having positive refractive power, and the method includes the following steps of S41, S42 and S43.

Step S41: disposing an aperture stop to the image side of the second lens group.

Step S42: disposing the first lens group, the second lens group and the third lens group such that upon zooming from a wide-angle end state to a telephoto end state, a distance between the first lens group and the second lens group increases, and a distance between the second lens group and the third lens group decreases.

Step S43: satisfying the following conditional expressions (1) and (2):

$$0.17 < f1/fT < 0.60 \quad (1)$$

$$1.03 < \phi T/\phi W < 1.70 \quad (2)$$

where fT denotes a focal length of the zoom lens system in the telephoto end state, f1 denotes a focal length of the first lens group, φW denotes the maximum diameter of the aperture stop in the wide-angle end state, and φT denotes the maximum diameter of the aperture stop in the telephoto end state.

The method for manufacturing a zoom lens system according to the fourth embodiment of the present application makes it possible to manufacture a zoom lens system having high optical performance with suppressing variation in aberrations.

In the zoom lens system according to the fourth embodiment, the first lens group preferably includes two positive lens components. Moreover, the first lens group preferably disposes these lens components, in order from the object side, positive-positive with disposing an air space between them.

In a zoom lens system according to the fourth embodiment, the second lens group preferably includes one positive lens component and three negative lens components. Moreover, the second lens group preferably disposes these lens components, in order from the object side, negative-negative-positive-negative with an air space between each of them.

In a zoom lens system according to the fourth embodiment, the third lens group preferably includes three positive lens components and one negative lens component.

Then, a camera, which is an optical apparatus equipped with the zoom lens system according to the Example 1 of the first embodiment, is explained. Although a case that the lens system according to Example 1 of the first embodiment is installed is explained, the same result can be obtained by a lens system according to any other Example of any other embodiment.

Figure 49:
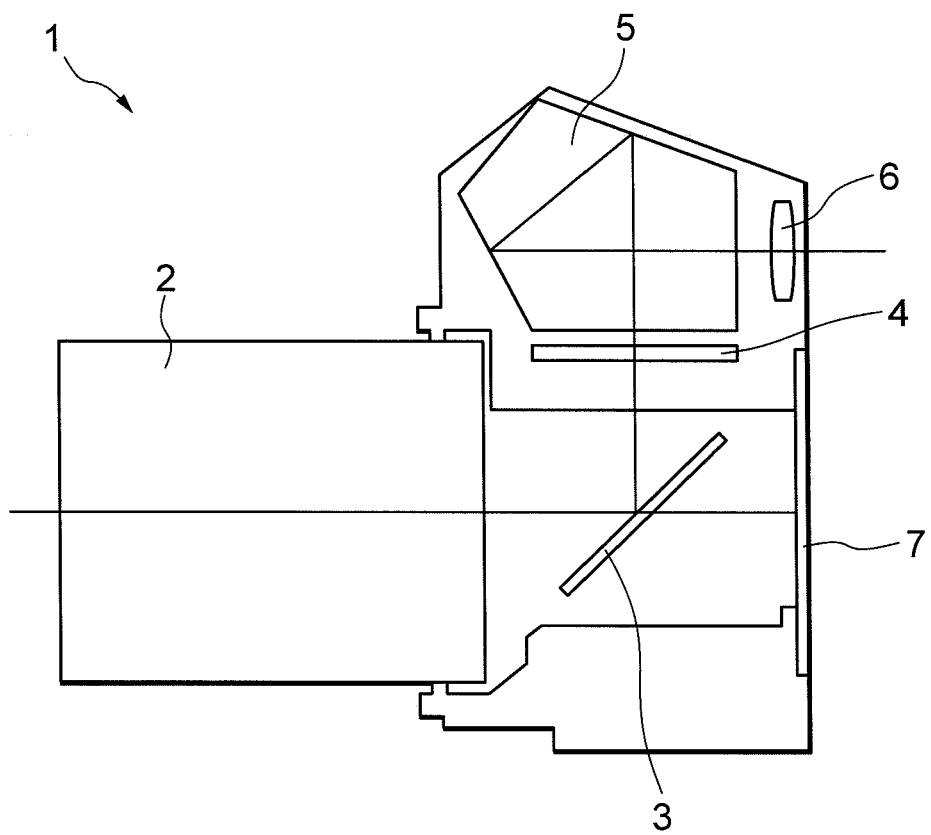
FIG. 49 is a sectional view showing a camera equipped with the zoom lens system according to Example 1 of the first embodiment of the present application.

FIG. 49 is a sectional view showing a single-lens reflex digital camera equipped with the zoom lens system according to Example 1 of the first embodiment.

In FIG. 49, the camera 1 is a single-lens reflex digital camera 1 equipped with the zoom lens system according to Example 1 of the first embodiment as an imaging lens 2. In the camera 1, light emitted from an unillustrated object is converged by the imaging lens 2, reflected by a quick return mirror 3, and focused on a focusing screen 4. The light focused on the focusing screen 4 is reflected a plurality of times in a pentagonal roof prism 5, and led to an eyepiece 6. Accordingly, a photographer can observe the object image as an erected image through the eyepiece 6.

When the photographer presses an unillustrated release button all the way down, the quick return mirror 3 is retracted from the optical path, the light from the unillustrated object forms an object image on an imaging device 7. Accordingly, the light emitted from the object is captured by the imaging device 7, and stored in an unillustrated memory as a photographed image of the object. In this manner, the photographer can take a picture of an object by the camera 1.

With installing the zoom lens system according to Example 1 of the first embodiment as an imaging lens 2 into the camera 1, it becomes possible to realize a camera having high optical performance. Incidentally, even if a zoom lens system according to Example 1 is installed in a so-called mirror-less camera, which does not include the quick return mirror, the same effect as the present embodiment can be obtained.

Incidentally, the following description may suitably be applied within limits that do not deteriorate optical performance.

In Examples described above, although a four-lens-group configuration and a five-lens-group configuration are shown, the lens-group configuration according to the present application is not limited to this, other lens-group configurations such as a six-lens-group configuration is possible. Moreover, a lens configuration that a lens or a lens group is added to the most object side thereof is possible, and a lens configuration that a lens or a lens group is added to the most image side thereof is also possible. Incidentally, a lens group means a portion that includes at least one lens and is separated by air spaces that vary upon zooming.

In order to vary focusing from infinity to a close object, a portion of a lens group, a single lens group, or a plurality of lens groups may be moved along the optical axis as a focusing lens group. In this case, the focusing lens group can be used for auto focus, and suitable for being driven by a motor such as an ultrasonic motor. It is particularly preferable that at least a portion of the second lens group G2 is moved as the focusing lens group.

A lens group or a portion of a lens group may be shifted in a direction including a component perpendicular to the optical axis as a vibration reduction lens group, or tilted (swayed) in a direction including the optical axis for correcting an image blur caused by a camera shake. It is particularly preferable that at least a portion of the third lens group G3 or the fourth lens group G4 is used as a vibration reduction lens group.

A lens surface of a lens may be a spherical surface, a plane surface, or an aspherical surface. When a lens surface is a spherical surface or a plane surface, lens processing, assembling and adjustment become easy, and deterioration in optical performance caused by lens processing, assembling and adjustment errors can be prevented, so that it is preferable. Moreover, even if the image plane is shifted, deterioration in optical performance is little, so that it is preferable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

Moreover, in a zoom lens system according to any of the embodiments, the zoom ratio is about 7 to 25.

What is claimed is:
1. A zoom lens system comprising, in order from an object side along an optical axis:
   a first lens group having positive refractive power;
   a second lens group having negative refractive power;
   a third lens group having positive refractive power;
   a fourth lens group having negative refractive power; and
   a fifth lens group having positive refractive power,
   an aperture stop being disposed to an image side of the second lens group,
   upon zooming from a wide-angle end state to a telephoto end state, a distance between the first lens group and the second lens group increasing, a distance between the second lens group and the third lens group decreasing, a distance between the third lens group and the fourth lens group varying, and a distance between the fourth lens group and the fifth lens group varying, and
   the following conditional expressions being satisfied:

$0.17 < f1/fT < 0.60$ $1.03 < \phi T/\phi W < 1.70$ $1.00 \leq \phi M5/\phi W < 1.40$ where fT denotes a focal length of the zoom lens system in the telephoto end state, f1 denotes a focal length of the first lens group, φW denotes the maximum diameter of the aperture stop in the wide-angle end state, φT denotes the maximum diameter of the aperture stop in the telephoto end state, and φM5 denotes the maximum diameter of the aperture stop in an intermediate focal length state, in which the intermediate focal length of the zoom lens system is five times or more and eight times of fW or less when fW denotes a focal length of the zoom lens system in the wide-angle end state.

2. The zoom lens system according to claim 1, wherein the following conditional expression is satisfied:

$$1.02 < \phi M10/\phi W < 1.70$$

where φM10 denotes the maximum diameter of the aperture stop in an intermediate focal length state, in which the intermediate focal length of the zoom lens system is ten times of fW or more when fW denotes a focal length of the zoom lens system in the wide-angle end state.

3. The zoom lens system according to claim 1, wherein the following conditional expression is satisfied:

$$1.02 < \phi M15/\phi W < 1.70$$

where φM15 denotes the maximum diameter of the aperture stop in an intermediate focal length state, in which the intermediate focal length of the zoom lens system is fifteen times of fW or more when fW denotes a focal length of the zoom lens system in the wide-angle end state.

4. The zoom lens system according
to claim 1, wherein upon zooming from the wide-angle end state to the telephoto end state, the aperture stop keeps the maximum aperture of the wide-angle end state from the wide-angle end state to an intermediate focal length state in which a focal length of the zoom lens is fM, and the following conditional expression is satisfied:

$$1.50 < fM/fW < 15.00$$

where fW denotes a focal length of the zoom lens system in the wide-angle end state.

5. The zoom lens system according to claim 4, wherein the maximum diameter of the aperture stop increases monotonously upon zooming from the intermediate focal length state having a focal length of fM to the telephoto end state.

6. The zoom lens system according to claim 1, wherein the following conditional expression is satisfied:

$$0.032 < -f2/fT < 0.064$$

where f2 denotes a focal length of the second lens group.

7. The zoom lens system according to claim 1, wherein an f-number of the zoom lens system increases monotonously upon zooming from the wide-angle end state to the telephoto end state.

8. The zoom lens system according to claim 1, wherein upon zooming from the wide-angle end state to the telephoto end state, the first lens group moves to the object side with respect to the image plane.

9. The zoom lens system according to claim 1, wherein upon zooming from the wide-angle end state to the telephoto end state, the aperture stop moves in a body with at least a portion of the third lens group.

10. The zoom lens system according to claim 1, wherein the aperture stop is disposed to the object side of the third lens group.

11. The zoom lens system according to claim 1, wherein upon zooming from the wide-angle end state to the telephoto end state, the third lens group moves in a body with the fifth lens group.

12. The zoom lens system according to claim 1, wherein an antireflection coating is applied on at least one optical surface among the first lens group and the second lens group, and the antireflection coating includes at least one layer formed by use of a wet process.

13. The zoom lens system according to claim 12, wherein the antireflection coating is a multi-layered film, and the layer formed by the wet process is a layer of the uppermost surface of the layers composing the multi-layered film.

14. The zoom lens system according to claim 12, wherein the refractive index nd is equal to or smaller than 1.30, where nd denotes a refractive index of a layer formed by use of the wet process.

15. The zoom lens system according to claim 12, wherein the optical surface on which an antireflection coating is applied is a concave surface as seen from the aperture stop.

16. The zoom lens system according to claim 15, wherein the concave surface as seen from the aperture stop on which the antireflection coating is applied is an image side lens surface.

17. The zoom lens system according to claim 15, wherein the concave surface as seen from the aperture stop on which the antireflection coating is applied is an object side lens surface.

18. The zoom lens system according to claim 12, wherein the optical surface on which the antireflection coating is applied is a concave surface as seen from the object side.

19. The zoom lens system according to claim 18, wherein the optical surface having the concave shape on which the antireflection coating is applied is the image side lens surface of the image side second lens from the most object side of the first lens group.

20. The zoom lens system according to claim 18, wherein the optical surface having the concave shape on which the antireflection coating is applied is the object side lens surface of the image side second lens from the most object side of the second lens group.

21. The zoom lens system according to claim 18, wherein the optical surface having the concave shape on which the antireflection coating is applied is the image side lens surface of the image side third lens from the most object side of the second lens group.

22. The zoom lens system according to claim 18, wherein the optical surface having the concave shape on which the antireflection coating is applied is the object side lens surface of the image side fourth lens from the most object side of the second lens group.

23. An optical apparatus equipped with the zoom lens system according to claim 1.

24. A method for manufacturing a zoom lens system including, in order from an object along an optical axis, a first lens group having positive refractive power, a second lens group having negative refractive power, a third lens group having positive refractive power, a fourth lens group having negative refractive power, and a fifth lens group having positive refractive power, the method comprising steps of:
  disposing an aperture stop to an image side of the second lens group;
  disposing the first lens group, the second lens group, the third lens group, the fourth lens group and the fifth lens group such that upon zooming from a wide-angle end state to a telephoto end state, a distance between the first lens group and the second lens group increases, a distance between the second lens group and the third lens group decreases, a distance between the third lens group and the fourth lens group varies, and a distance between the fourth lens group and the fifth lens group varies, and satisfying the following conditional expressions:

$$0.17 < f1/fT < 0.60$$

$$1.03 < \phi T/\phi W < 1.70$$

$$1.00 \le \phi M5/\phi W < 1.40$$

where fT denotes a focal length of the zoom lens system in the telephoto end state, f1 denotes a focal length of the first lens group, φW denotes the maximum diameter of the aperture stop in the wide-angle end state, φT denotes the maximum diameter of the aperture stop in the telephoto end state, and φM5 denotes the maximum diameter of the aperture stop in an intermediate focal length state, in which the intermediate focal length of the zoom lens system is five times or more and eight times of fW or less when fW denotes a focal length of the zoom lens system in the wide-angle end state.

25. The method according to claim 24, further comprising a step of:
satisfying the following conditional expression:

$$1.02 < \phi M10/\phi W < 1.70$$

where φM10 denotes the maximum diameter of the aperture stop in an intermediate focal length state, in which the intermediate focal length of the zoom lens system is ten times of fW or more when fW denotes a focal length of the zoom lens system in the wide-angle end state.

26. The method according to claim 24, further comprising a step of:
satisfying the following conditional expression:

$$1.02 < \phi M15/\phi W < 1.70$$

where φM15 denotes the maximum diameter of the aperture stop in an intermediate focal length state, in which the intermediate focal length of the zoom lens system is fifteen times of fW or more when fW denotes a focal length of the zoom lens system in the wide-angle end state.

27. The method according to claim 24, further comprising steps of:
keeping the maximum aperture of the wide-angle end state from the wide-angle end state to an intermediate focal length state in which a focal length of the zoom lens system is fM upon zooming from the wide-angle end state to the telephoto end state; and
satisfying the following conditional expression:

$$1.50 < fM/fW < 15.00$$

where fW denotes a focal length of the zoom lens system in the wide-angle end state.

28. The method according to claim 24, further comprising a step of:
satisfying the following conditional expression:

$$0.032 < -f2/fT < 0.064$$

where f2 denotes a focal length of the second lens group.

29. The method according to claim 24, further comprising a step of:
applying an antireflection coating, including at least one layer formed by use of a wet process, on at least one optical surface among the first lens group and the second lens group.

30. The method according to claim 29, wherein the refractive index nd is equal to or smaller than 1.30, where nd denotes a refractive index of a layer formed by use of the wet process.

31. The method according to claim 29, wherein the optical surface on which an antireflection coating is applied is a concave surface as seen from the aperture stop.

32. A zoom lens system comprising, in order from an object side along an optical axis:
a first lens group having positive refractive power;
a second lens group having negative refractive power;
a third lens group having positive refractive power;
a fourth lens group having negative refractive power; and
a fifth lens group having positive refractive power,
an aperture stop being disposed to an image side of the second lens group,
upon zooming from a wide-angle end state to a telephoto end state, a distance between the first lens group and the second lens group increasing, a distance between the second lens group and the third lens group decreasing, a distance between the third lens group and the fourth lens group varying, and a distance between the fourth lens group and the fifth lens group varying, and
the following conditional expressions being satisfied:

$$0.17 < f1/fT < 0.60$$

$$1.03 < \phi T/\phi W < 1.70$$

$$1.02 < \phi M10/\phi W < 1.70$$

where fT denotes a focal length of the zoom lens system in the telephoto end state, f1 denotes a focal length of the first lens group, φW denotes the maximum diameter of the aperture stop in the wide-angle end state, φT denotes the maximum diameter of the aperture stop in the telephoto end state, and φM10 denotes the maximum diameter of the aperture stop in an intermediate focal length state, in which the intermediate focal length of the zoom lens system is ten times of fW or more when fW denotes a focal length of the zoom lens system in the wide-angle end state.

33. A method for manufacturing a zoom lens system including, in order from an object along an optical axis, a first lens group having positive refractive power, a second lens group having negative refractive power, a third lens group having positive refractive power, a fourth lens group having negative refractive power, and a fifth lens group having positive refractive power, the method comprising steps of:
disposing an aperture stop to an image side of the second lens group;
disposing the first lens group, the second lens group, the third lens group, the fourth lens group and the fifth lens group such that upon zooming from a wide-angle end state to a telephoto end state, a distance between the first lens group and the second lens group increases, a distance between the second lens group and the third lens group decreases, a distance between the third lens group and the fourth lens group varies, and a distance between the fourth lens group and the fifth lens group varies, and
satisfying the following conditional expressions:

$$0.17 < f1/fT < 0.60$$

$$1.03 < \phi T/\phi W < 1.70$$

$$1.02 < \phi M10/\phi W < 1.70$$

where fT denotes a focal length of the zoom lens system in the telephoto end state, f1 denotes a focal length of the first lens group, φW denotes the maximum diameter of the aperture stop in the wide-angle end state, φT denotes the maximum diameter of the aperture stop in the telephoto end state, and φM10 denotes the maximum diameter of the aperture stop in an intermediate focal length state, in which the intermediate focal length of the zoom lens system is ten times of fW or more when fW denotes a focal length of the zoom lens system in the wide-angle end state.

* * * * *